United States Patent
Hatch

(10) Patent No.: US 12,204,848 B2
(45) Date of Patent: Jan. 21, 2025

(54) SMART INTERFACE WITH FACILITATED INPUT AND MISTAKE RECOVERY

(71) Applicant: I.Q. JOE, LLC, Torrance, CA (US)

(72) Inventor: Jeffrey James Hatch, Wilmington, CA (US)

(73) Assignee: I.Q. JOE, LLC, Wilmington, CA (US)

( * ) Notice: Subject to any disclaimer, the term of this patent is extended or adjusted under 35 U.S.C. 154(b) by 0 days.

(21) Appl. No.: 18/390,617

(22) Filed: Dec. 20, 2023

(65) Prior Publication Data

US 2024/0386191 A1    Nov. 21, 2024

Related U.S. Application Data

(63) Continuation of application No. 17/811,813, filed on Jul. 11, 2022, now Pat. No. 11,861,297, which is a continuation of application No. 17/302,672, filed on May 10, 2021, now Pat. No. 11,386,260, which is a continuation of application No. 15/965,619, filed on Apr. 27, 2018, now Pat. No. 11,003,839.

(60) Provisional application No. 62/492,005, filed on Apr. 28, 2017.

(51) Int. Cl.
G06F 40/166    (2020.01)
G06F 3/04886    (2022.01)
G10L 15/22    (2006.01)

(52) U.S. Cl.
CPC ........ *G06F 40/166* (2020.01); *G06F 3/04886* (2013.01); *G10L 15/22* (2013.01); *G10L 2015/221* (2013.01)

(58) Field of Classification Search
None
See application file for complete search history.

(56) References Cited

U.S. PATENT DOCUMENTS

| | | | |
|---|---|---|---|
| 4,481,598 | A | 11/1984 | Ishiwata |
| 4,545,022 | A | 10/1985 | Hughins |
| 5,025,403 | A | 6/1991 | Stephens |
| 5,089,980 | A | 2/1992 | Bunsen et al. |
| 6,854,001 | B2 | 2/2005 | Good et al. |
| 8,074,172 | B2 | 12/2011 | Kocienda et al. |
| 8,232,973 | B2 | 7/2012 | Kocienda et al. |
| 8,504,600 | B2 | 8/2013 | Hatch |
| 8,788,548 | B2 | 7/2014 | Hatch |

(Continued)

OTHER PUBLICATIONS

PCT International Search Report, App. No. PCT/US2009/032448, Date: Jun. 22, 2009, in 3 pages.

(Continued)

*Primary Examiner* — Toan H Vu
(74) *Attorney, Agent, or Firm* — Knobbe Martens Olson & Bear LLP

(57) ABSTRACT

Systems, methods, and devices including smart interfaces with facilitated input and mistake recovery are described. For example, a smart interface system can identify one or more portions of user input as alterable decisions, and, for each of the one or more alterable decisions, store, in a memory, information about one or more alternative options for the alterable decision. The system can also identify one of the alterable decisions as the currently alterable decision, and upon receiving an input indicative of an actuation of the alteration key, alter the currently alterable decision to another of the one or more alternative options based on the stored information.

20 Claims, 56 Drawing Sheets

(56) References Cited

U.S. PATENT DOCUMENTS

| | | | |
|---|---|---|---|
| 8,904,309 | B1 | 7/2014 | Zhai |
| 9,176,668 | B2* | 11/2015 | Eleftheriou ......... G06F 3/04842 |
| 9,652,448 | B2 | 5/2017 | Pasquero |
| 9,710,070 | B2* | 7/2017 | St. Clair ............... G06F 3/0412 |
| 2005/0179665 | A1 | 8/2005 | Kuo |
| 2008/0104153 | A1 | 5/2008 | Hatch |
| 2008/0168366 | A1 | 7/2008 | Kocienda |
| 2009/0024366 | A1 | 1/2009 | Atkinson |
| 2011/0202876 | A1 | 8/2011 | Badger |
| 2013/0120267 | A1 | 5/2013 | Pasquero |
| 2014/0058725 | A1* | 2/2014 | Longe ................. G06F 3/04886 704/9 |
| 2014/0310639 | A1 | 10/2014 | Zhai |
| 2015/0046804 | A1* | 2/2015 | Weksler ................ G06F 40/232 715/257 |
| 2015/0100524 | A1 | 4/2015 | Pantel |
| 2015/0177981 | A1 | 6/2015 | Starner |
| 2015/0302301 | A1 | 10/2015 | Petersen |
| 2016/0085726 | A1* | 3/2016 | Bannister ........... G06F 3/04886 382/229 |
| 2016/0098098 | A1 | 4/2016 | St. Clair |
| 2016/0188526 | A1 | 6/2016 | Kai |
| 2017/0084201 | A1 | 3/2017 | Dooley |
| 2017/0286395 | A1* | 10/2017 | Bi ......................... G06F 40/274 |
| 2018/0005161 | A1 | 1/2018 | Cong |
| 2018/0143971 | A1* | 5/2018 | Dubs ..................... G06F 40/232 |
| 2018/0173692 | A1 | 6/2018 | Greenberg |
| 2018/0210874 | A1 | 7/2018 | Fuxman |
| 2018/0300021 | A1* | 10/2018 | Montaldi ............ G06F 3/04886 |
| 2019/0304471 | A1 | 10/2019 | Elson |

OTHER PUBLICATIONS

Http://web.archive.org/web/20040401164706/http://ftp.casio.co.jp/pub/world_manual/edu/en/fx115MS_991MS_E.pdf; CASIO Manual; Apr. 1, 2004; pp. 1-42.

Http://web.archive.org/web/20010304195513/http://users.ece.gatech.edu/~bonnie/book/TUTORIAL/tut1.html; MatLab Tutorial; Oct. 30, 2001.

FX-570es User's Guide, Casio, Dec. 31, 2009, http://support.casio.com/pdf/004/fx057ES_Eng.pdf, in 75 pages, See pp. E-8, E-21, E-22.

* cited by examiner

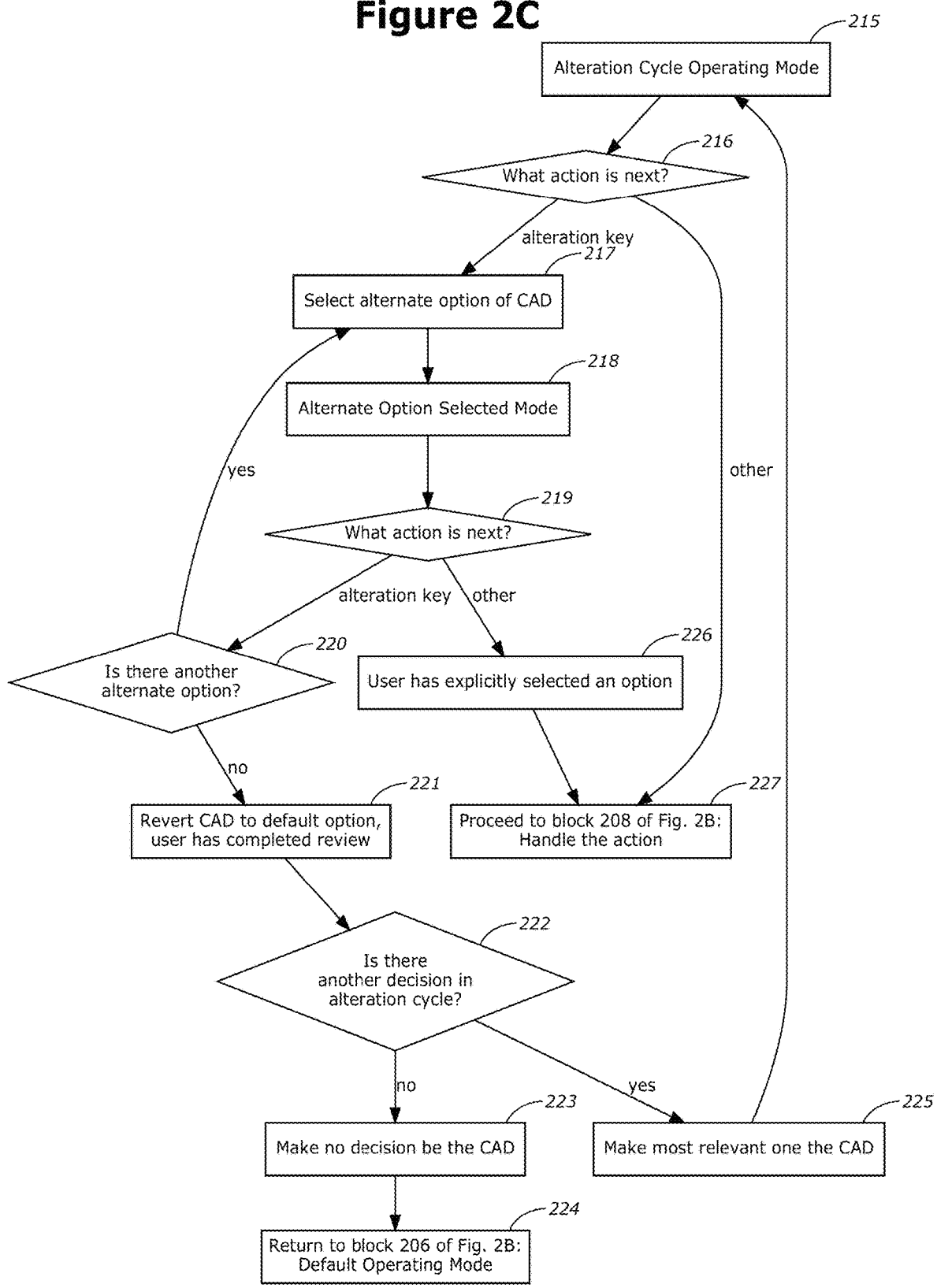

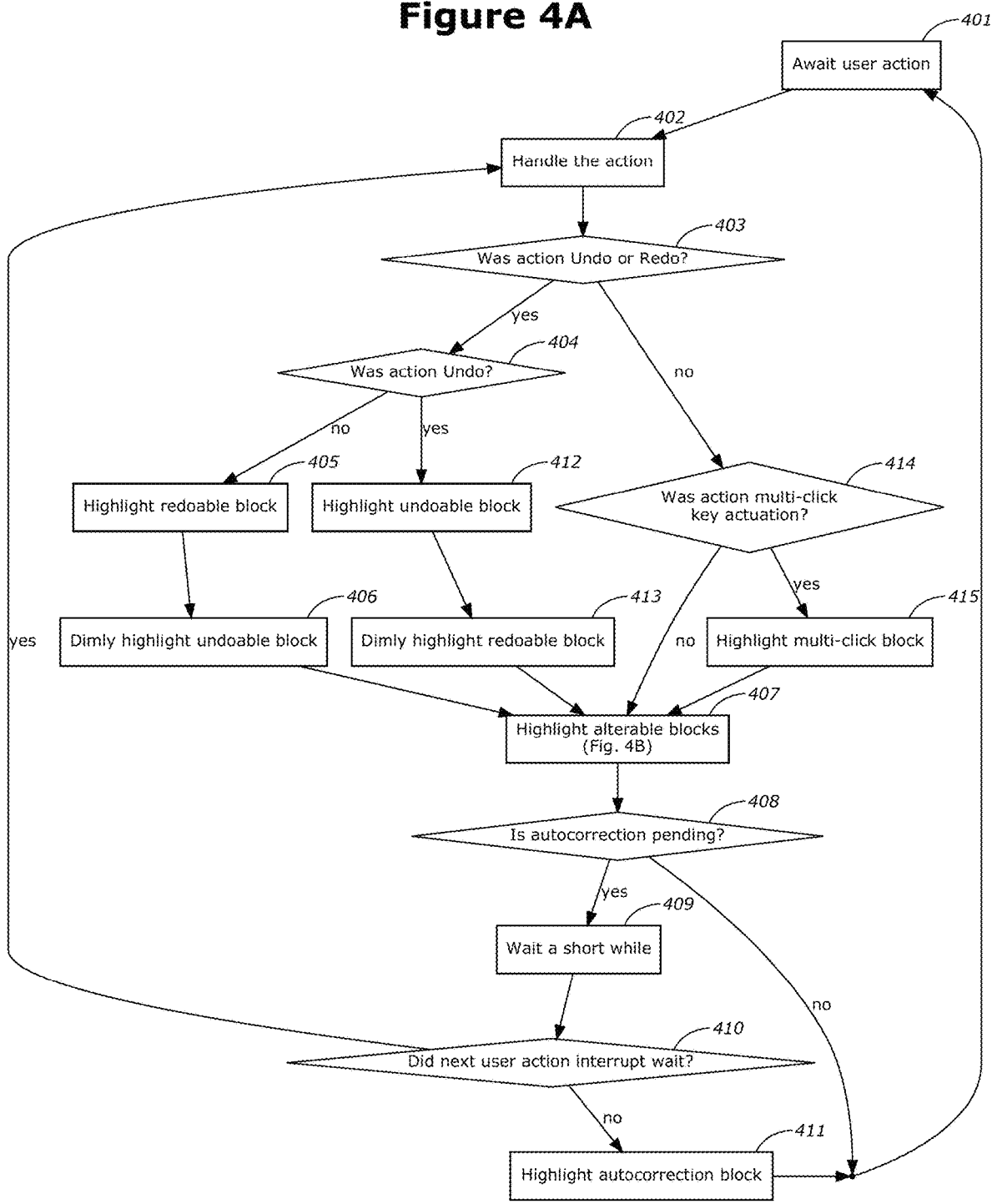

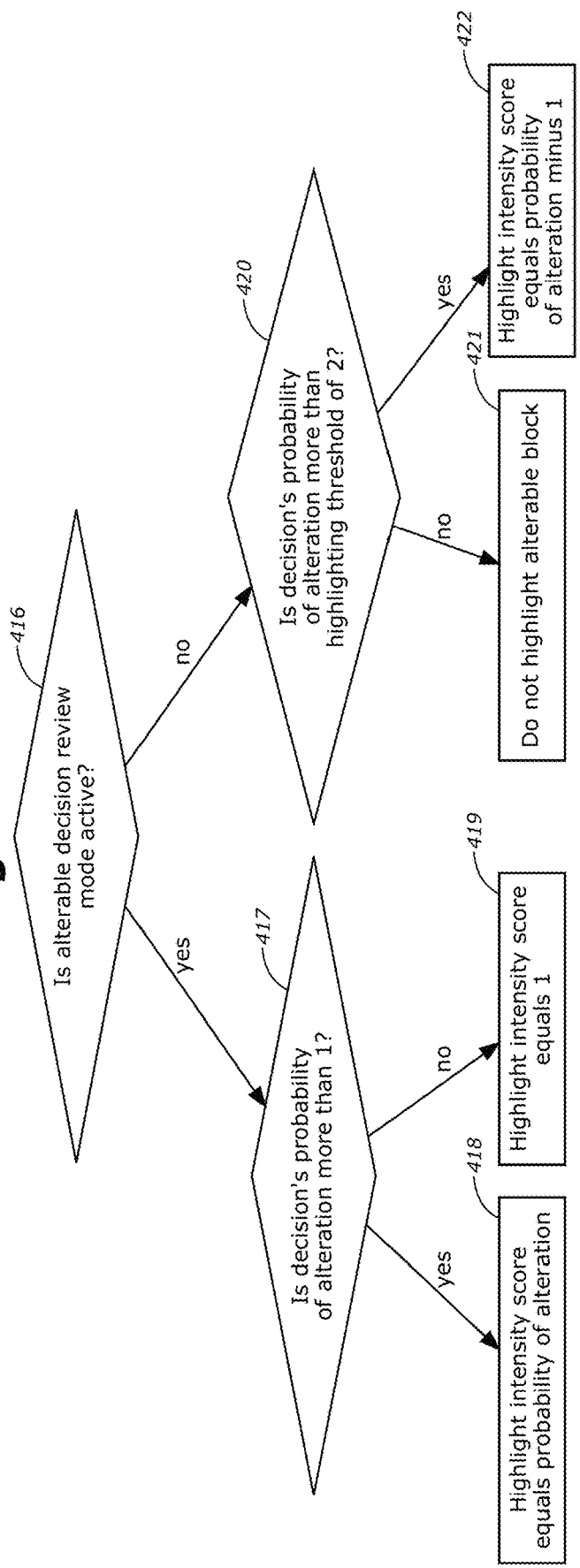

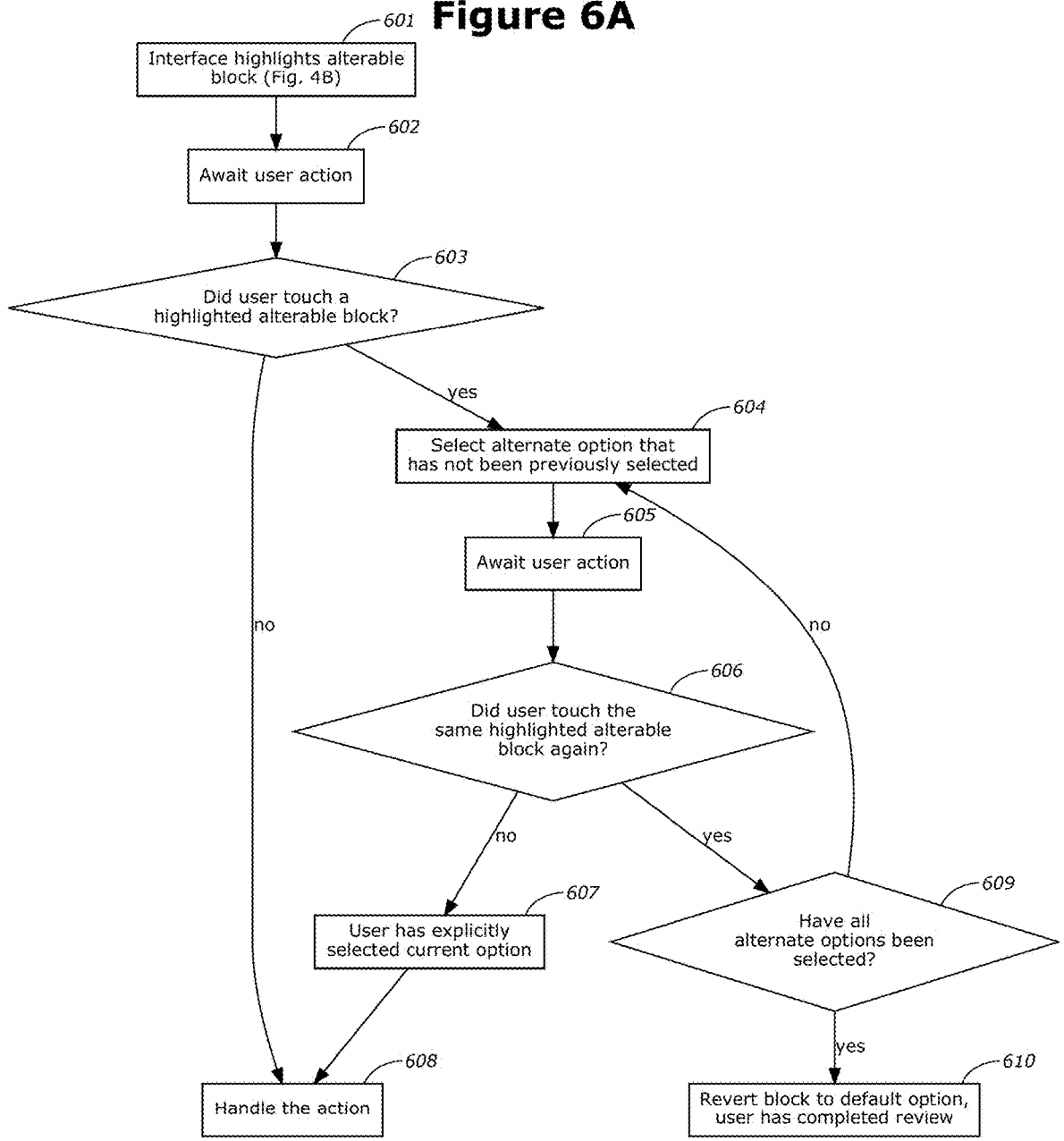

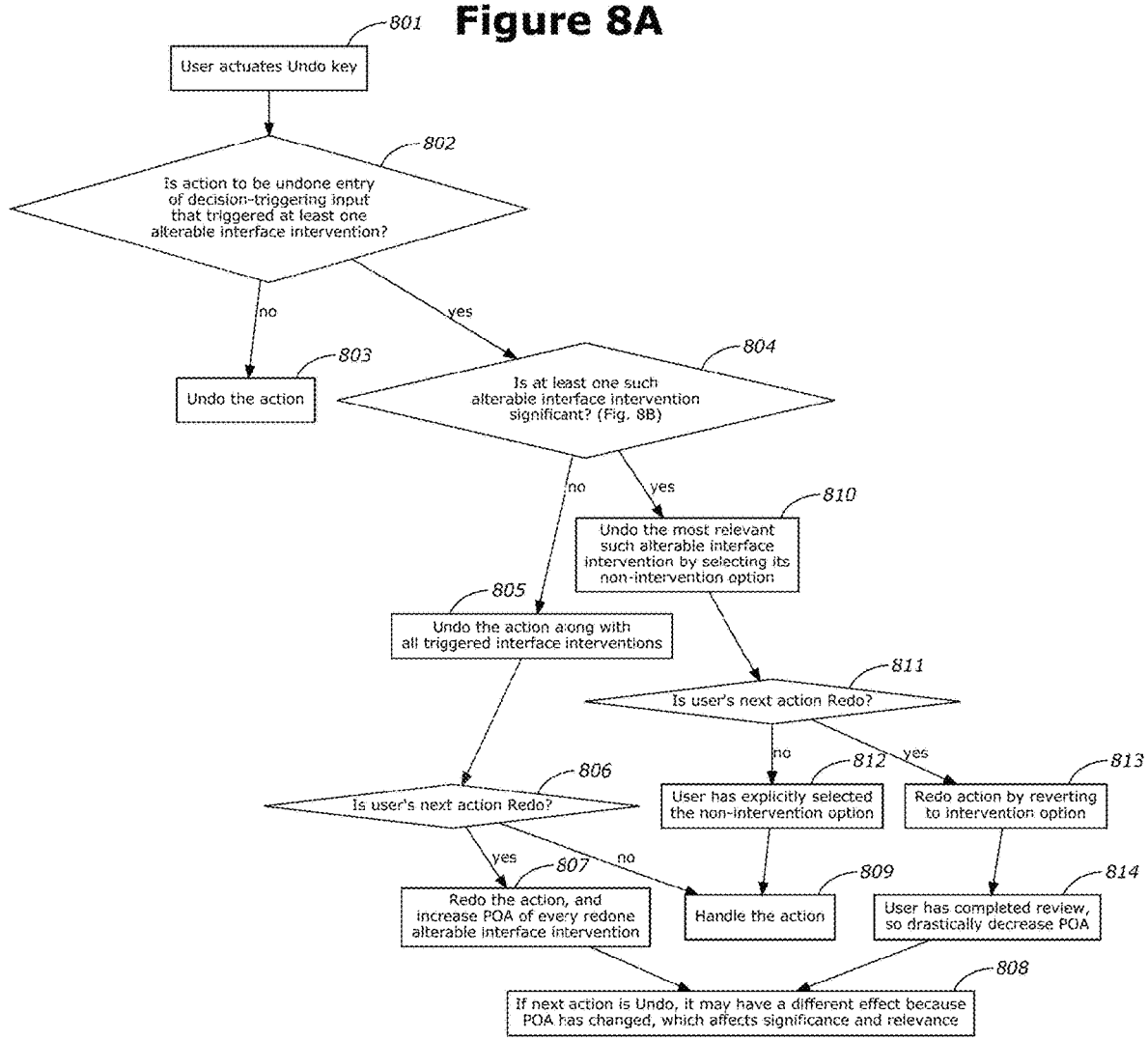

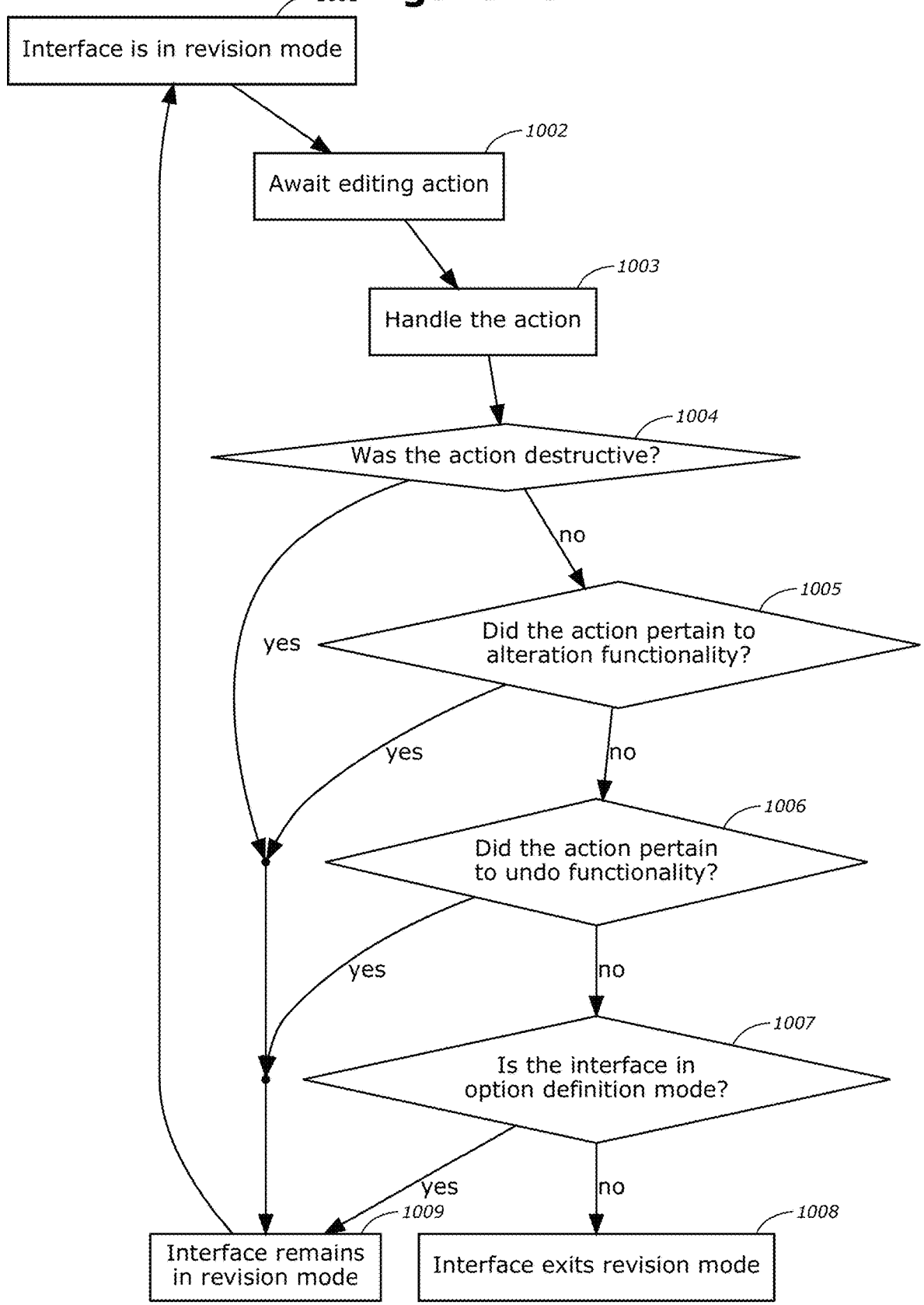

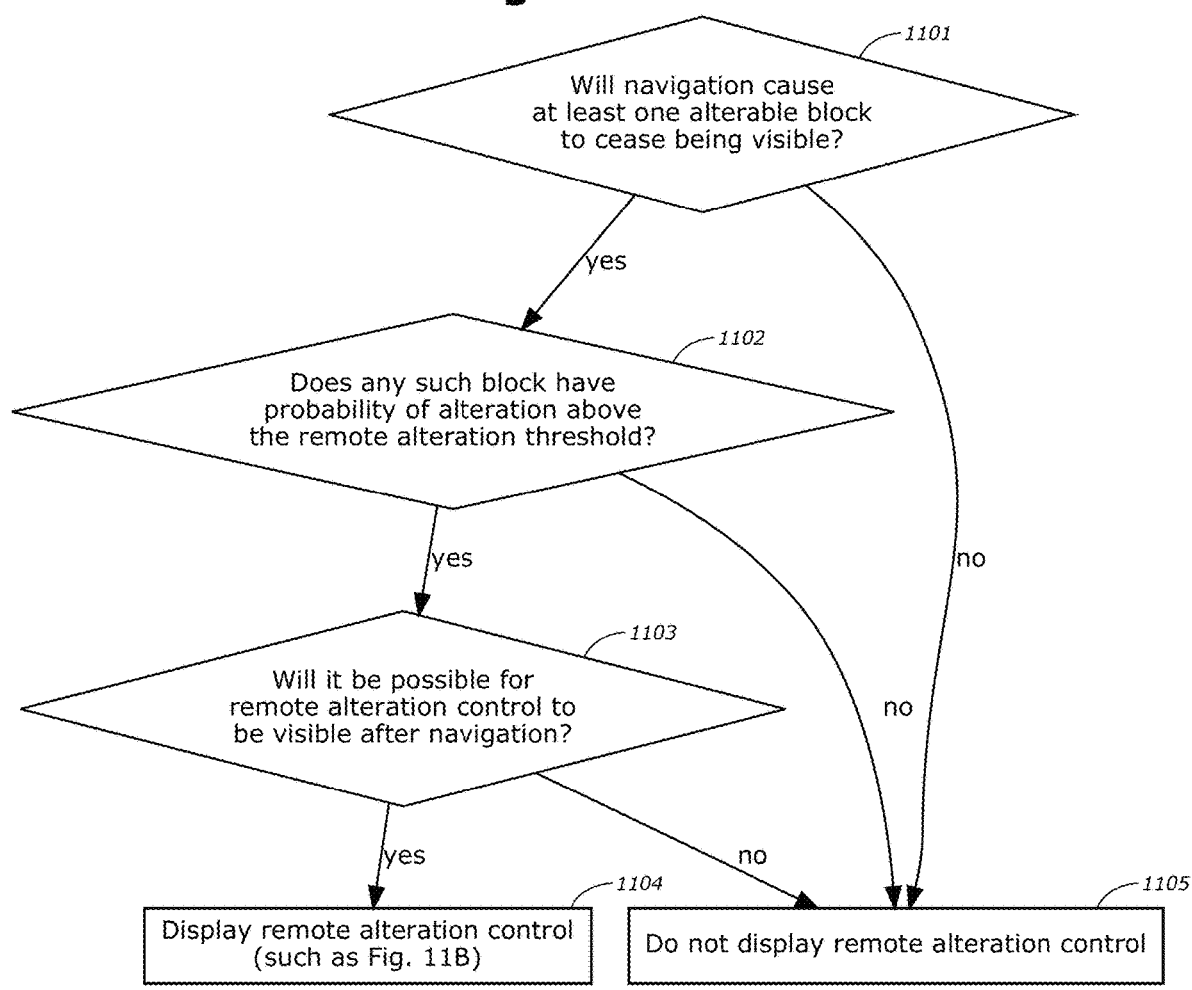

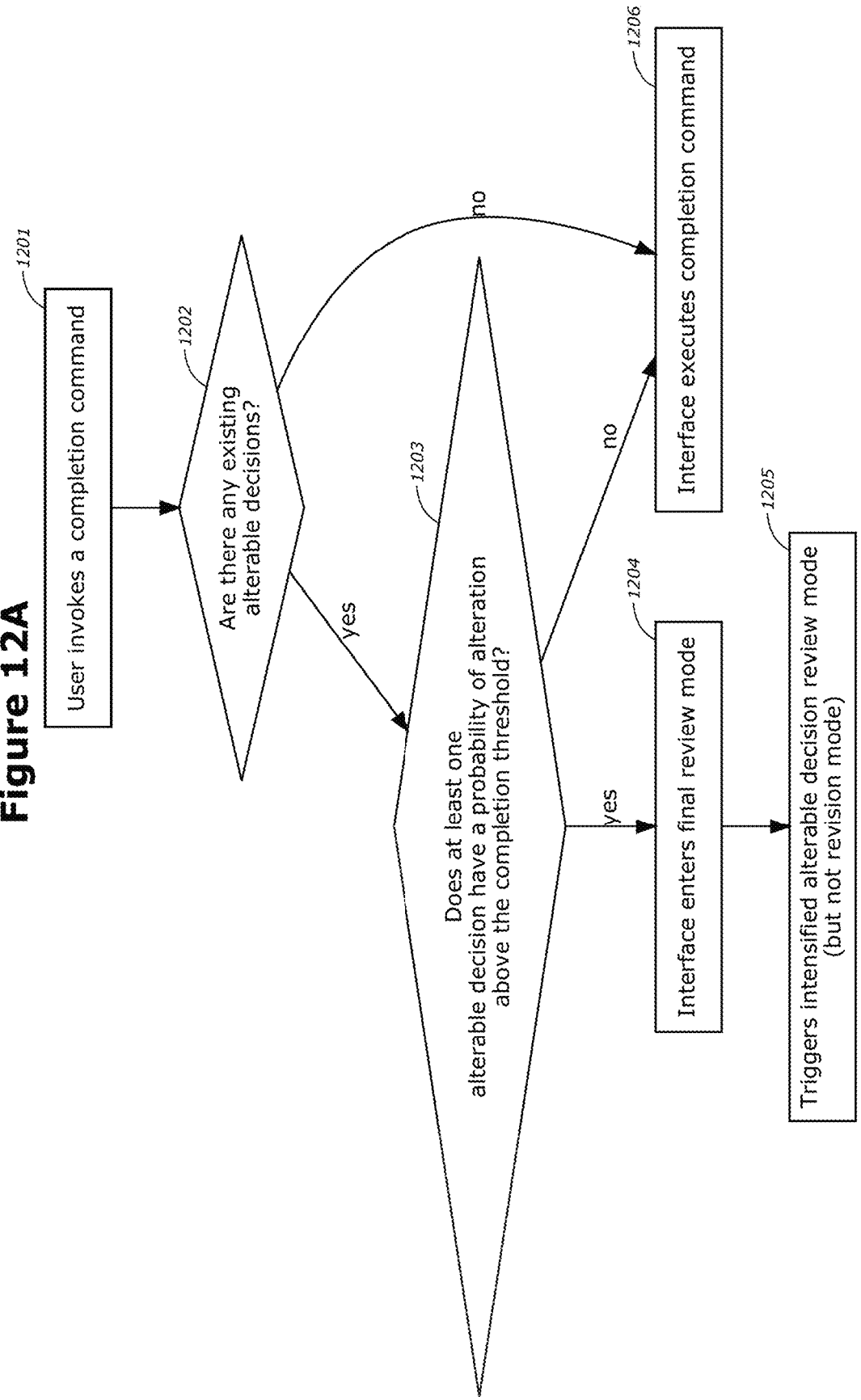

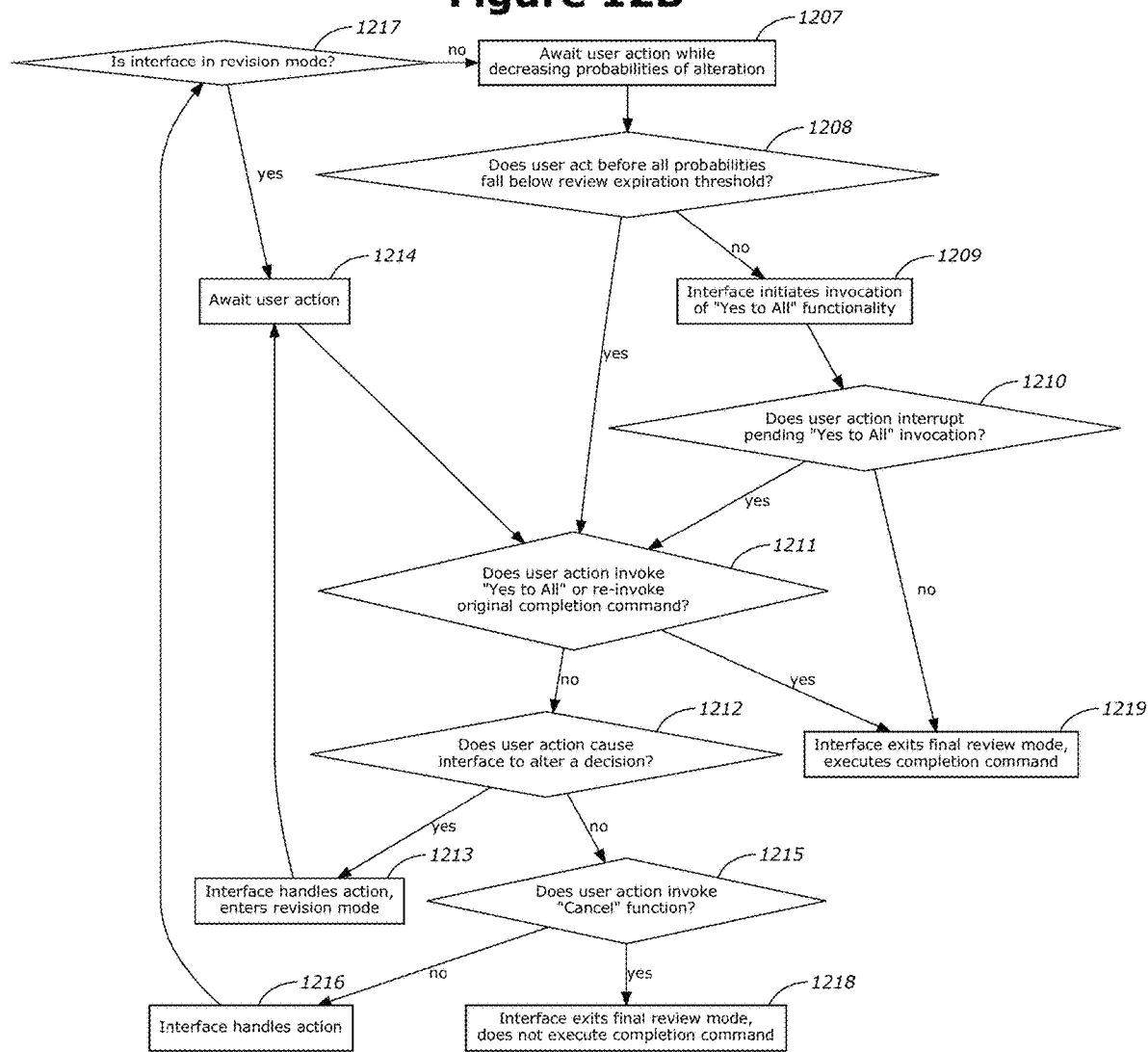

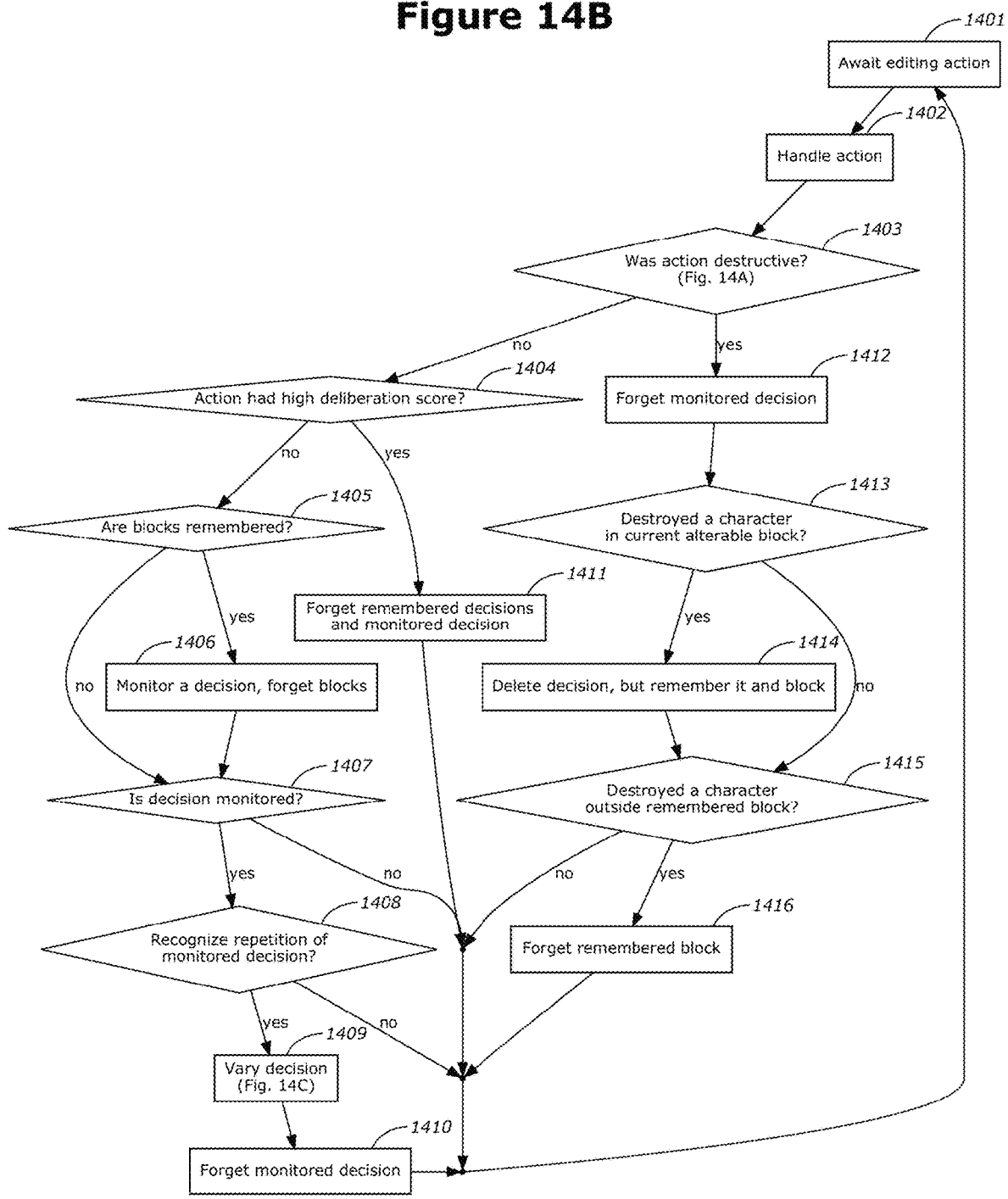

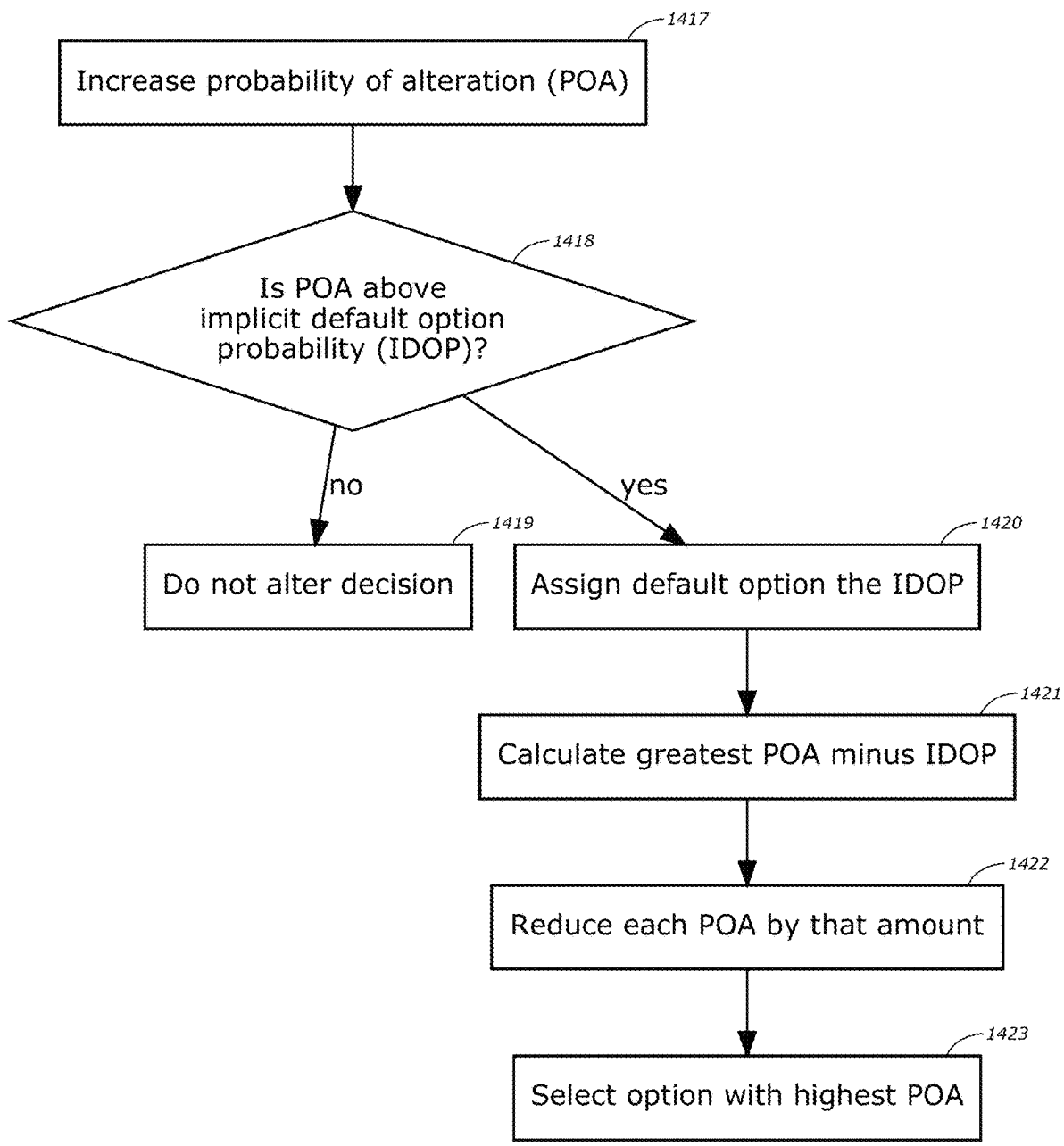

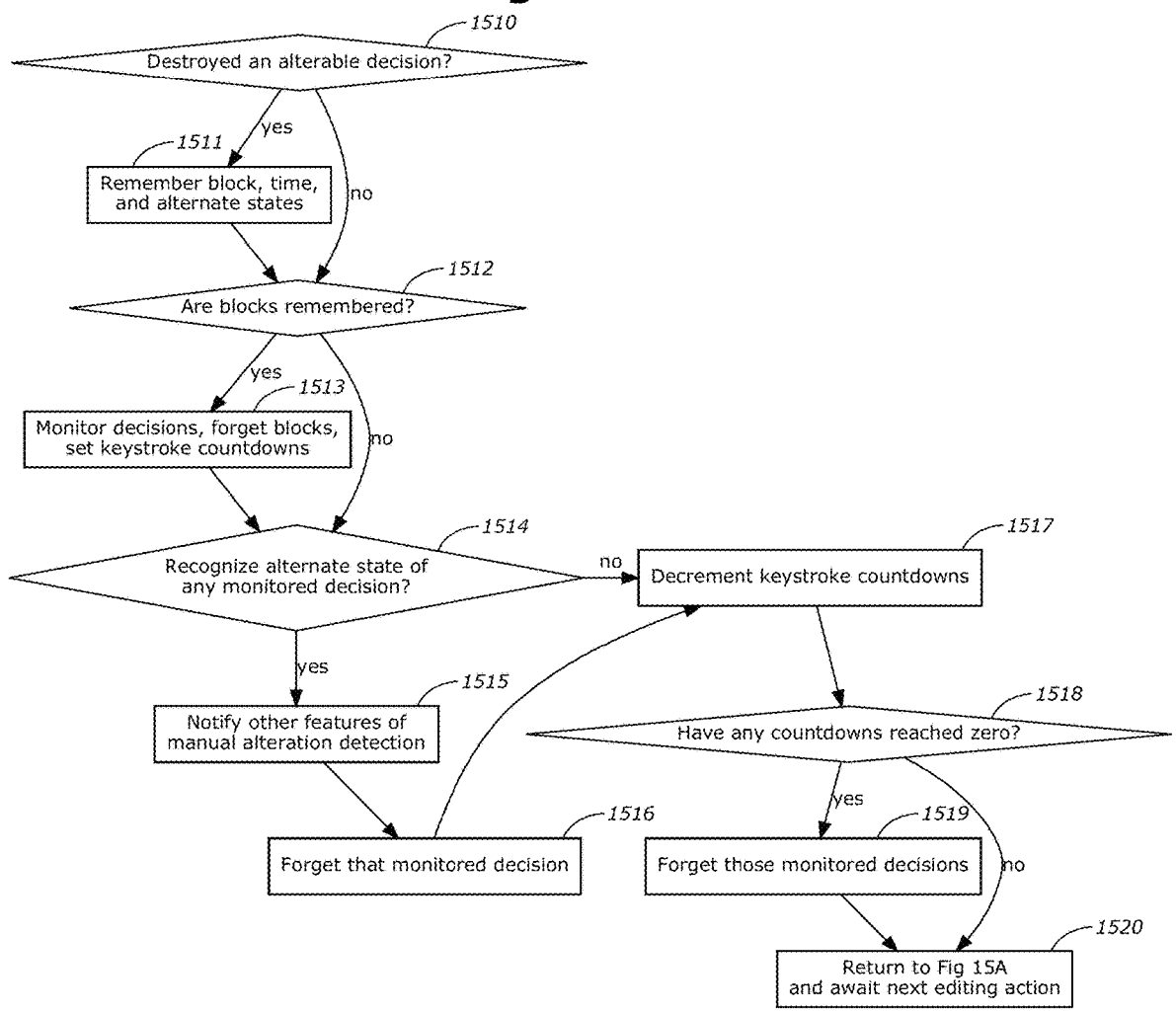

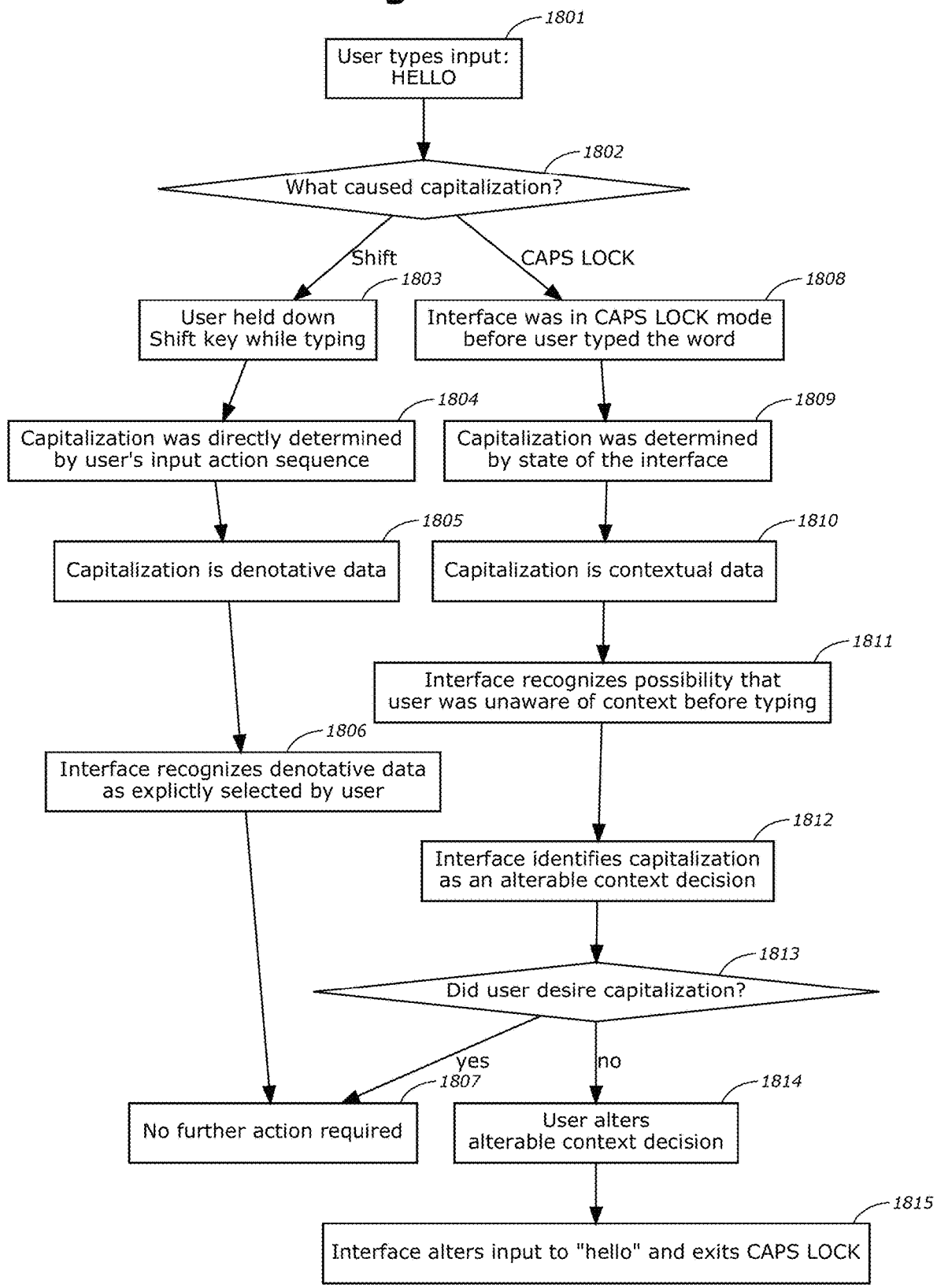

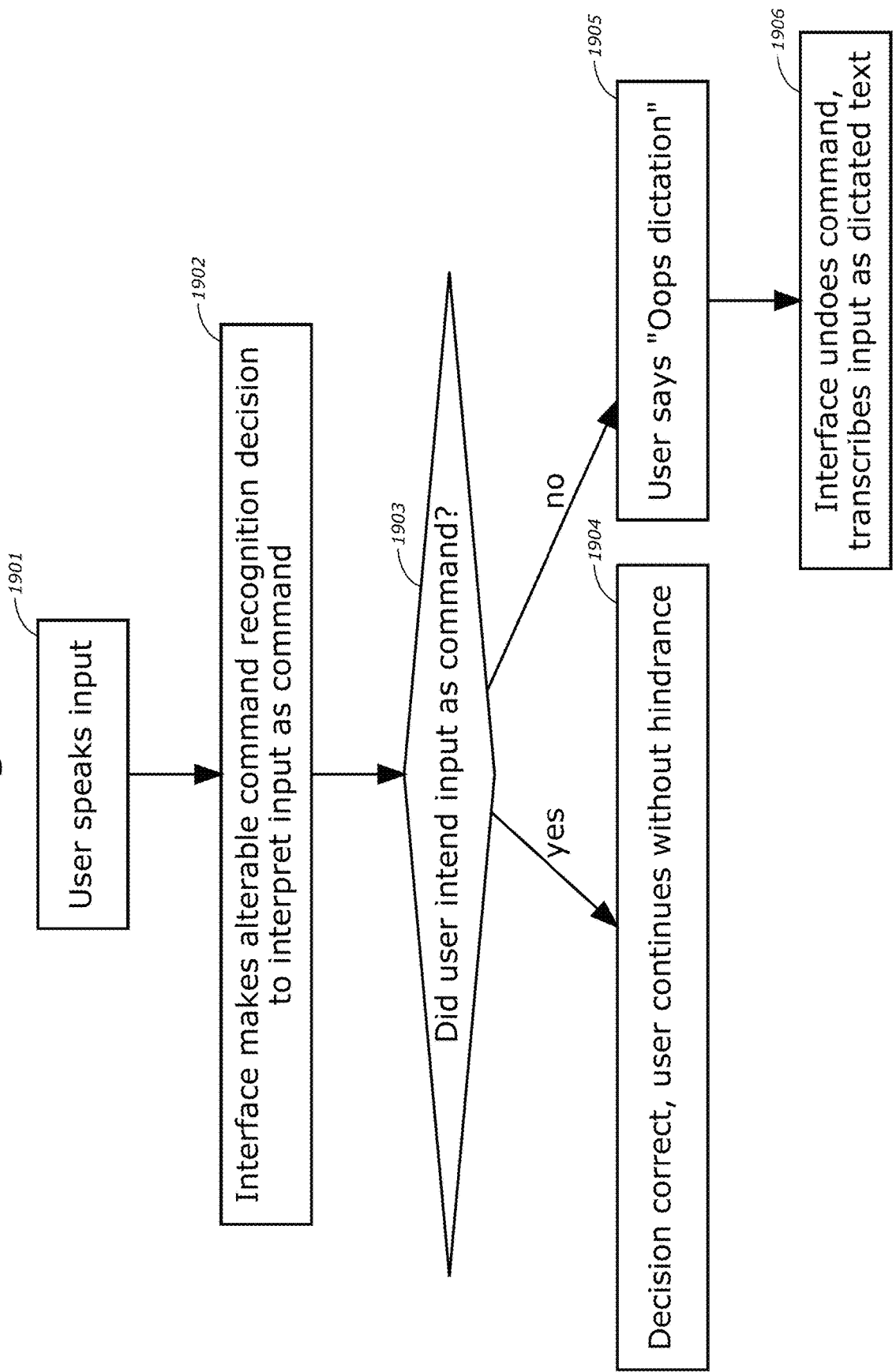

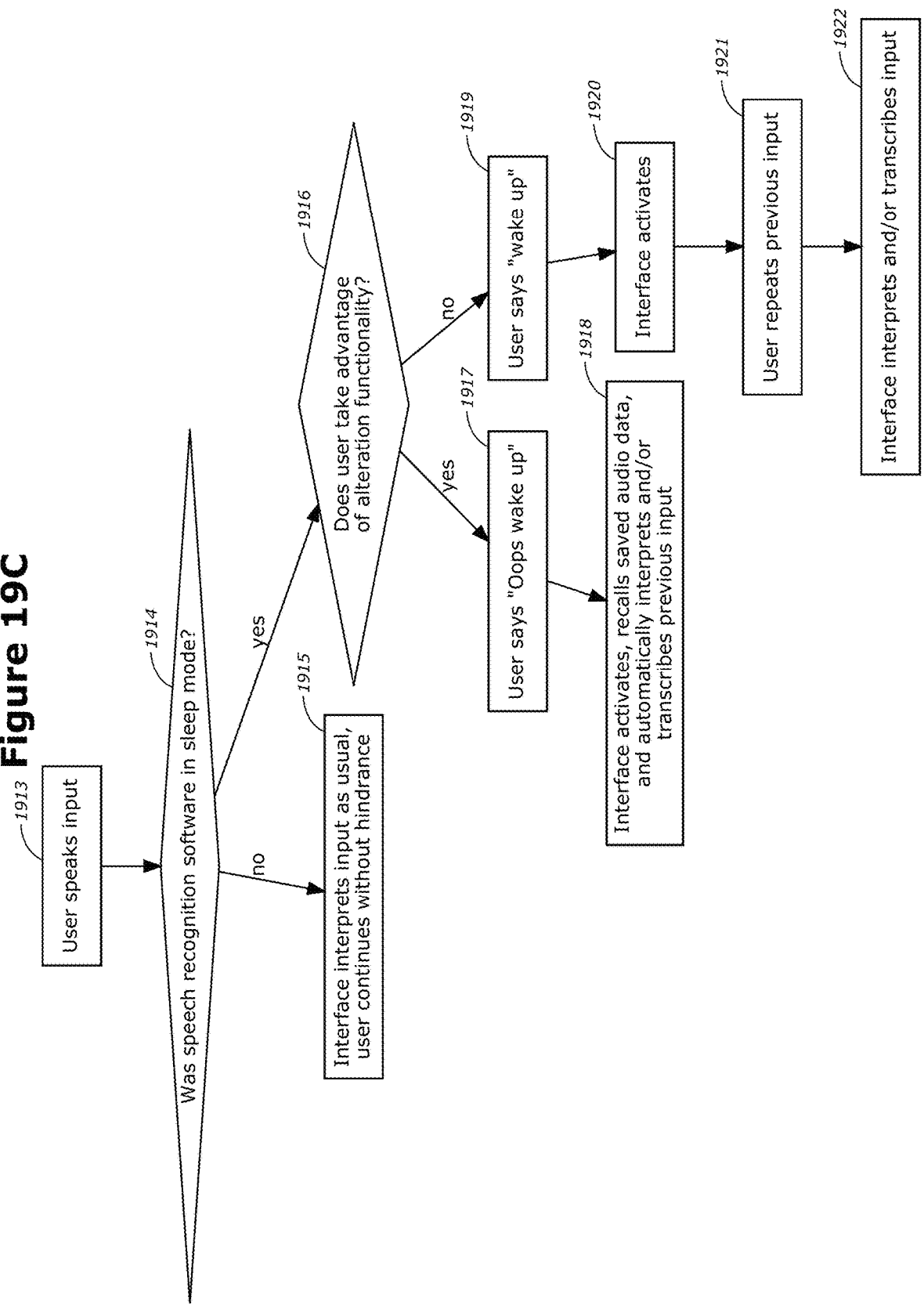

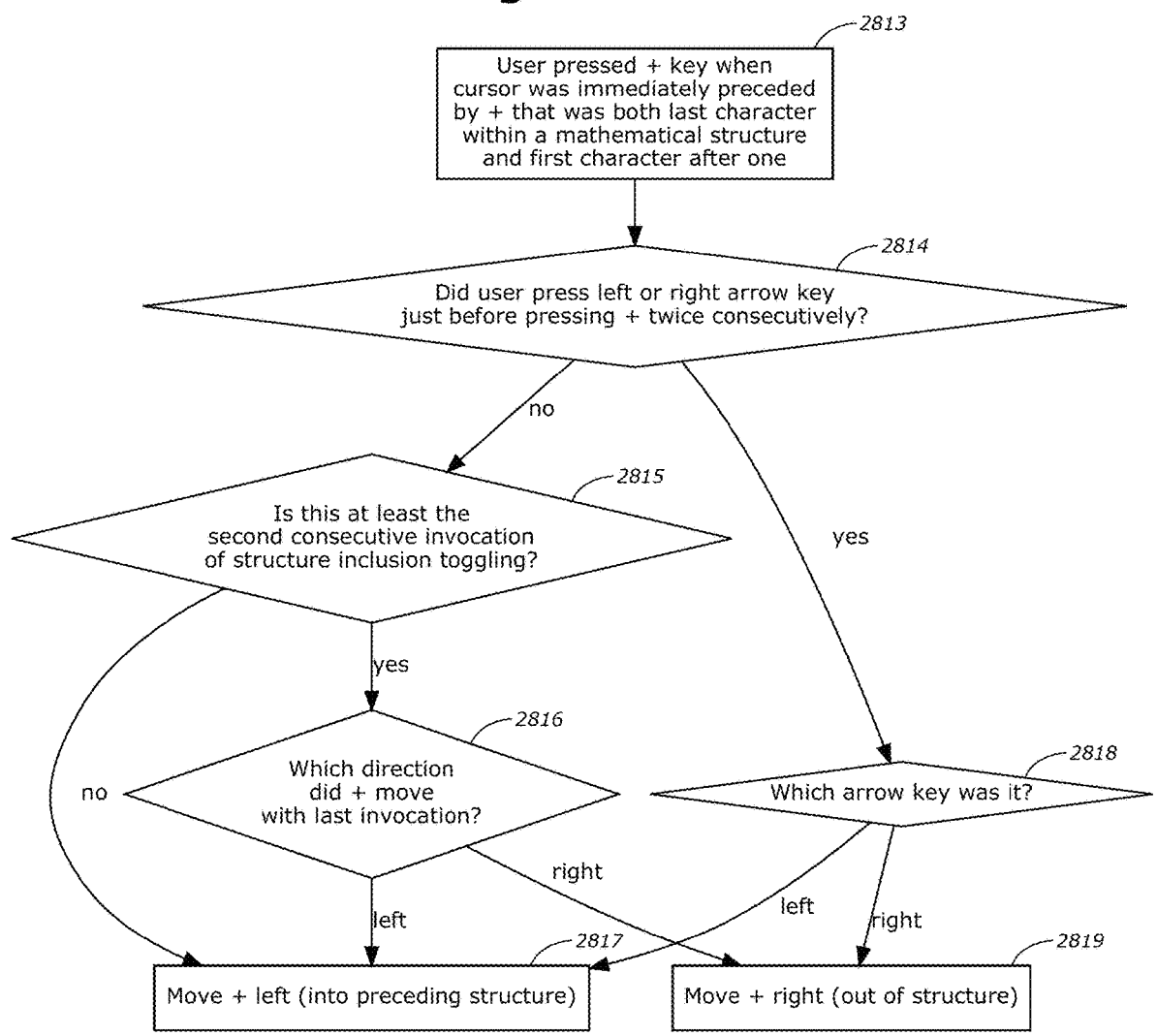

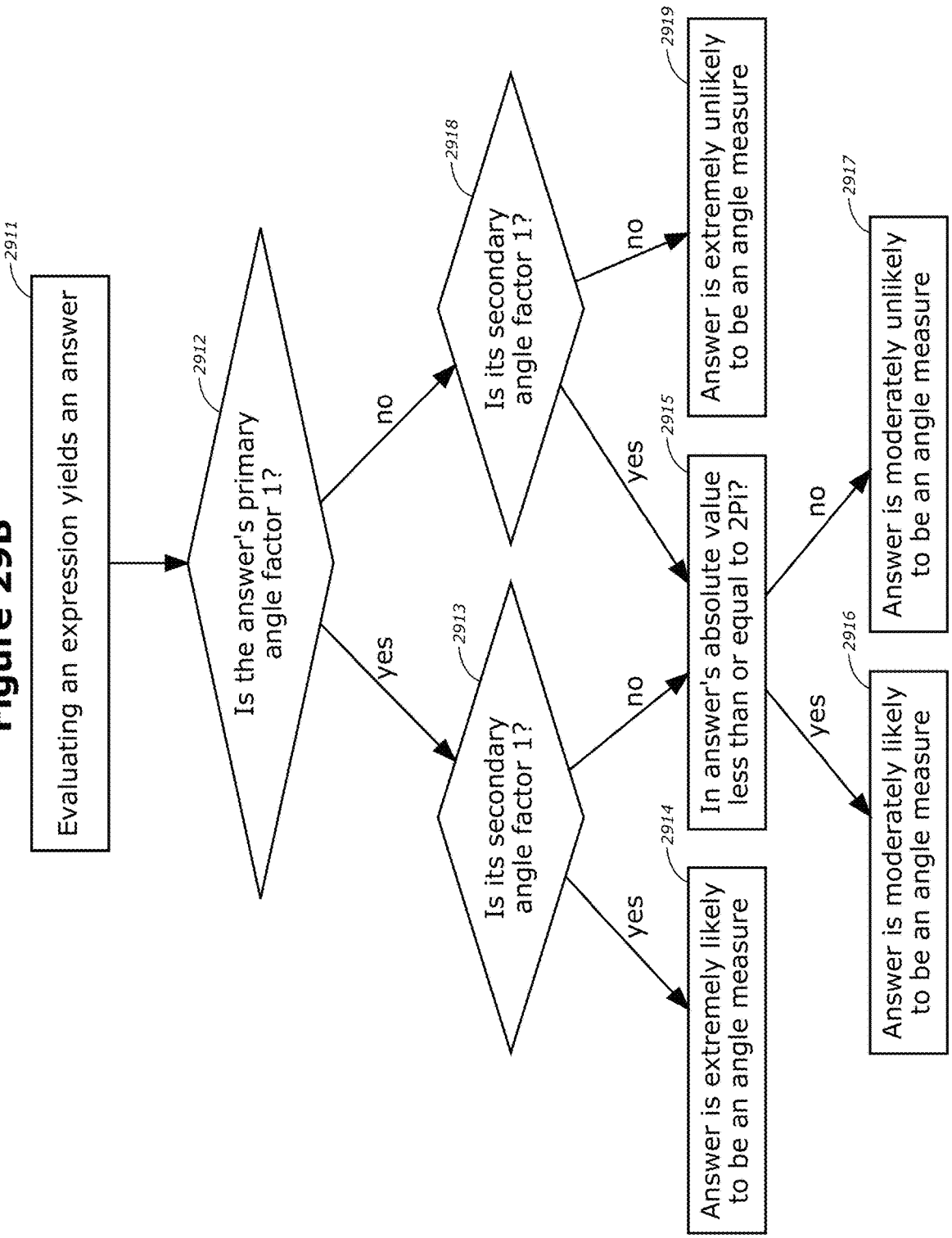

SMART INTERFACE WITH FACILITATED INPUT AND MISTAKE RECOVERY

INCORPORATION BY REFERENCE TO ANY PRIORITY APPLICATIONS

This application is a continuation of U.S. application Ser. No. 17/811,813, filed Jul. 11, 2022, which is a continuation of U.S. application Ser. No. 17/302,672, filed May 10, 2021, and issued as U.S. Pat. No. 11,386,260, on Jul. 12, 2022, which is a continuation of U.S. application Ser. No. 15/965,619, filed Apr. 27, 2018, issued as U.S. Pat. No. 11,003,839, on May 11, 2021, which claims priority to U.S. Provisional Application No. 62/492,005, filed Apr. 28, 2017, each of which is incorporated herein by reference. Any and all applications for which a foreign or domestic priority claim is identified in the Application Data Sheet as filed with the present application are hereby incorporated by reference under 37 CFR 1.57. U.S. application Ser. No. 11/925,560, filed Oct. 26, 2007, now U.S. Pat. No. 8,788,548, and U.S. application Ser. No. 12/363,590, filed Jan. 30, 2009, now U.S. Pat. No. 8,504,600, are also incorporated herein by reference.

BACKGROUND

Field

This application relates to interfaces for electronic devices such as desktop computers, laptops, tablet computers, smartphones, or voice computers, among others. In particular, this application relates to smart interfaces with facilitated input and mistake recovery.

Description

Electronic devices commonly include interfaces that allow users to interact with the devices. Such interfaces often allow users to enter information into the devices and allow the devices to display information to the users. Commonly, interfaces include one or more input devices, for example, keyboards, touchscreens, etc., and a display device, such as a screen. The devices may also include a software component for controlling the interfaces.

SUMMARY

This application relates to systems, methods, and devices including smart interfaces with facilitated input and mistake recovery. For example, in an embodiment, a system having a smart interface can include an input device configured to receive user input from a user. The input device can include an alteration key, which can be implemented as a physical key or on a touchscreen. The system can also include a display for displaying information to the user. The system also includes at least one non-transitory computer readable medium having stored thereon executable instructions, and at least one processor in communication with the at least one non-transitory computer readable medium and configured to execute the instructions. When executed by the processor, the instructions cause the system to provide one or more of the interface functions described throughout this application. For example, the instructions can cause the system to: identify one or more portions of user input as one or more alterable decisions; for each of the one or more alterable decisions, store, in a memory, information about one or more alternative options for the alterable decision; identify one of the one or more alterable decisions as the currently alterable decision; upon receiving an input indicative of an actuation of the alteration key, alter the currently alterable decision to another of the one or more alternative options based on the stored information; and display, on the display, the altered currently alterable decision to the user. Other implementations and interface functionality are described in greater detail below.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

BRIEF DESCRIPTION OF THE DRAWINGS

The features of the present disclosure will become more fully apparent from the following description, taken in conjunction with the accompanying drawings. Understanding that these drawings depict only some embodiments in accordance with the disclosure and are, therefore, not to be considered limiting of its scope, the disclosure will be described with additional specificity and detail through use of the accompanying drawings.

FIGS. 2B and 2C are flowcharts illustrating an embodiment of a method for a smart interface.

FIGS. 4A and 4B illustrate an embodiment of a method for determining what to highlight after each user action.

FIG. 6A is a flowchart that illustrates the behavior of an embodiment of an interface that has a touch alteration feature.

FIG. 8A is a flowchart that illustrates an example method for undo functionality.

FIG. 10 is a flowchart that illustrates an example method for determining whether an interface remains in revision mode, beginning with the assumption that the interface is in revision mode FIG. 11A is a flowchart that illustrates an example decision-making process for determining whether to display a remote alteration control.

FIG. 12A is a flowchart that illustrates a method for deciding whether the interface enters a final review mode in response to a completion command, according to one embodiment.

FIG. 12B is a flowchart that illustrates an example method for interface operation while in a final review mode.

FIG. 14B is a flowchart that illustrates a simplified version of an automatic decision variation feature, according to one embodiment.

FIG. 14C is a flowchart that illustrates an example method for varying a decision that is identical to a monitored alterable decision.

FIGS. 15A and 15B are flowcharts illustrating example methods for a manual alteration detection feature.

FIG. 18 is a flowchart that illustrates a distinction between denotative and contextual data, and also shows how contextual data is associated with alterable decisions, according to an embodiment.

FIGS. 19A and 19B are flowcharts depicting example scenarios where alterable command recognition decisions may facilitate mistake correction.

FIG. 19C is a flowchart depicting an example scenario for applying corrective alteration functionality to a mistake that may occur when speech recognition software is in sleep mode.

FIG. 28B is a flowchart that illustrates an example process that occurs in an ambiguous case where a previously typed plus sign is both the last character within a mathematical structure and the first character after a mathematical structure.

FIG. 29B illustrates an example classification system.

DETAILED DESCRIPTION

Figure 1A:
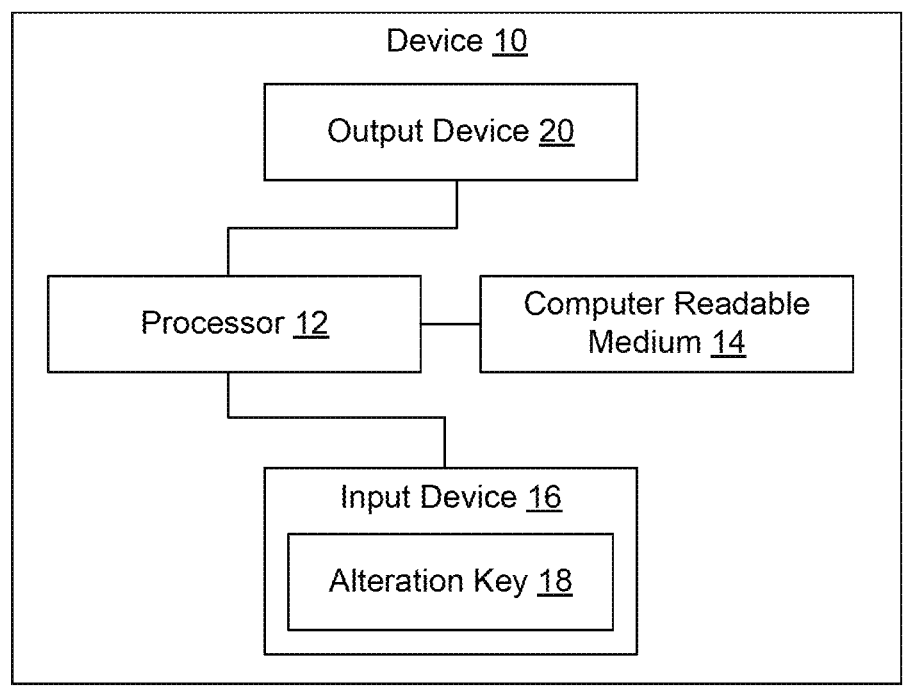
FIG. 1A is a block diagram of an embodiment of a device including an interface as described herein.

This detailed description discusses features and advantages of systems and methods related to smart interfaces with facilitated input and mistake recovery in relation to certain described embodiments, some of which are illustrated in the figures. Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Chapter 1: Introduction

How the Present Specification is Organized

For the convenience of the reader, the present specification is organized into numbered chapters. In some cases, where the present specification refers to a topic that is explained in more detail at a location that is many pages distant, it may reference the number of the chapter where the topic is explained.

The chapters within the present specification generally include section headings that are not numbered. For the most part, chapter titles are intended to broadly summarize the content of the chapters, and section headings are intended to broadly summarize the content of the paragraphs that follow the section headings. However, such chapter titles and section headings are intended only for the convenience of the reader, and are not intended to characterize the invention in a limiting way. For example, the chapter title that says "Alterable Formatting" does not limit the invention to embodiments that have alterable formatting functionality as described in that section. In fact, the chapter title that says "Alterable Formatting" is not even intended to characterize the contents of that chapter itself in a limiting way: certain of the formatting behaviors that are described in that chapter may be quite useful even in an embodiment that includes no alteration functionality whatsoever.

The present specification may be divided into three large sections, along with a smaller amount of additional material at the beginning and at the end. Part I consists of Chapters 2 to 15, which explain various interface features that may facilitate altering "alterable decisions" in order to efficiently recover from mistakes. Part II consists of Chapters 16 to 23, which explain interface features that may tend to prevent the interface from yielding undesired results and interface features that may help educate the user how to achieve desired results more efficiently. Part III consists of Chapters 24 to 52, which explain interface improvements that are applicable to specific situations, and which explain various circumstances in which the interface may make alterable decisions; for example, Chapter 36 explains interface improvements that are applicable when editing a spreadsheet.

The preceding paragraph is intended to summarize the most prominent topic within each of the three large sections of the patent, but is not intended to characterize the invention in a limiting way. Each large section may include descriptions of additional features that do not fit the summaries provided in the preceding paragraph, and such features may be advantageous even in an embodiment that has none of the functionality mentioned in the preceding paragraph. For example, Part I includes explanations of improvements to undo functionality that may be advantageous even in an embodiment that has no functionality pertaining to alterable decisions or to anything else that was mentioned in the preceding paragraph. Each large section itself begins with a summary of the contents of that large section; such summaries may be more detailed and comprehensive than the brief summaries provided above, but still are to be construed in a nonlimiting way. In order to understand the scope of a particular section, it is necessary to actually read the section itself, not just a summary.

An Embodiment May be Described as a Device, Method, or Interface

In some embodiments, the invention that is disclosed herein comprises a computing device that has an improved user interface. Phrased another way, the invention that is disclosed herein comprises an improved method by which a computing device responds to user input actions. Phrased yet another way, the invention that is disclosed herein comprises an improved user interface for a computing device.

Various ways of characterizing some embodiments of the invention may simultaneously be equally valid. A programmer who reads the present specification may observe that the present specification describes an improved method by which a computing device will respond to user input actions; if the programmer then programs a computing device accordingly, then the change that the programmer makes to the computing device will consist of an improvement of the user interface of the computing device; a user may then correctly perceive that the result is an improved computing device.

Embodiments of the invention will generally be described herein in terms of a detailed explanation of how "the interface" will behave in response to various user input actions in certain embodiments. Sufficient information about such interface behaviors will be provided that those of ordinary skill in the art will be able to configure a computing device to follow methods that cause its user interface to behave as described herein.

Various Embodiments are Possible

It is possible for an embodiment to include nearly all the new interface behaviors that are disclosed herein, or to include only a few. Whenever the present specification begins a sentence or paragraph by saying "In an embodiment," this does not necessarily mean that the embodiment whose behavior is described in that sentence or paragraph does or does not include any of the other interface behaviors described elsewhere.

However, in some cases the present specification will describe two or more distinct and incompatible approaches to a particular situation. When the present specification begins a sentence or paragraph by saying, "In an alternative embodiment," in some cases this may mean that the behavior that is described for that alternative embodiment is incompatible with a behavior described prior to that sentence or paragraph. In such cases, this does not necessarily mean that the alternative embodiment is inferior to any such previously described embodiment: it only means that it may be incompatible.

A variety of computing devices may be improved by integrating various interface behaviors that are disclosed herein. For example, an embodiment may be a desktop computer, smartphone, or graphing calculator. However, some of the new interface behaviors that are disclosed herein may be more readily applicable to some computing devices than to others. For example, if a computing device has a touchscreen or mouse or some other means of quickly indicating a location on the display of the computing device, it will be relatively straightforward to implement a feature that is invoked by means of a "touch gesture" that requires the user to indicate a specific location on the display of the computing device. As another example, the present specification may suggest that a particular interface behavior may be applicable "in an embodiment that is a computing device that has a mouse" in order to indicate that the description of that particular interface behavior makes reference to a mouse, and that the behavior may be more readily implemented on a computing device that has a mouse. (Such phrasing emphasizes the configuration of the interface hardware for a particular embodiment, but the phrase "in an embodiment that is an interface that has mouse functionality" would have a substantially identical meaning, since it is equally valid to characterize the invention as an improved interface for a computing device as well as characterizing it as a computing device with an improved interface.)

Internal Implementation Variations do not Distinguish Features

Generally, an interface behavior may be conceived of as a mapping of circumstances and sequences of user input actions to interface responses. In other words, anyone who knows exactly how an interface will respond to every possible sequence of user input actions in all circumstances has a complete understanding of all the interface's behaviors. If two distinct interface algorithms are guaranteed to always yield exactly the same results in response to the same sequence of user input actions in all circumstances, then these two algorithms implement the exact same interface behavior. Internal implementation details do not distinguish one interface behavior from another. For example, if one interface algorithm responds to the backspace key by deleting the character to the left of the input cursor, and another interface algorithm responds to the backspace key by first moving the input cursor past the character to its left and then immediately deleting the character that is now to the right of the input cursor, then these two algorithms implement the exact same interface behavior: they work differently, but yield the same results.

Generally, interface behaviors that make it easier for users to achieve desired results faster may nevertheless be relatively complex and difficult to understand. For example, a user may find that prior art autocorrection functionality makes it easier to achieve desired results faster even if the algorithm that determines the behavior of the autocorrection functionality is too complex for the user to understand.

The present specification describes in detail various interface behaviors that may enable users to achieve desired results faster. Certain of these interface behaviors are relatively complex. In many cases, in order to fully define a complex interface behavior, the present specification will specify a particular means by which a particular embodiment will determine how to respond to a sequence of user input actions. In other words, the present specification will often specify a complex interface behavior by means of explaining how to construct one particular algorithm that implements the interface behavior.

However, those of ordinary skill in the art will understand that it is always possible to create various equivalent algorithms that implement the exact same interface behavior. If a programmer implements an interface feature that will always respond to a sequence of user input actions in exactly the same way as an interface feature that is described herein, but the programmer implements such an interface feature by means of an algorithm that operates in an entirely different way than is suggested herein, then those of ordinary skill in the art will understand that the feature that the programmer has implemented still constitutes exactly the same feature as the one that is described herein. Furthermore, those of ordinary skill in the art will understand that it is possible to create various algorithms that implement interface features that are mostly equivalent to interface features that are described herein, but that behave slightly differently in rare cases.

For example, the present specification describes an embodiment in which a key is configured so that in certain circumstances if a user actuates that key then the interface will move a plus sign that is immediately after a mathematical structure into the mathematical structure. A programmer may instead create an embodiment such that if a user actuates the same key in the same circumstances then the interface will first insert a plus sign within the mathematical structure and will then delete the plus sign that is immediately after the mathematical structure. If a programmer were to do so, then the interface feature the programmer thus implemented would always appear to respond to a user's input actions in exactly the same way as if it moved the plus sign from immediately after the mathematical structure into the mathematical structure, and those of ordinary skill in the art would understand that such use of a distinct yet equivalent algorithm would not distinguish the feature that the programmer thus implemented from the feature that is described herein.

Improvements May be Implemented in Various Software Domains

Those of ordinary skill in the art will understand that various improvements that are described herein may be implemented in the interface of an individual application, or in the interface functionality of a code library, or in the interface layer of the operating system of a computing device, or in some other software domain.

Certain specific improvements that are described herein are applicable when editing text documents, or when editing spreadsheets, or in other specific situations that typically occur within the context of an individual application. Such improvements may of course be implemented within the interface of a particular application, so that a computing device will embody the invention whenever that application is installed on the computing device. However, even improvements such as these may instead be implemented in the interface layer of the operating system of a computing device, within the library of functionality that is available to applications that run on the computing device, so that various applications can easily make use of the improvements. When improvements are implemented in the operating system, in some cases this may enable certain applications to automatically take advantage of such improvements, without necessarily requiring the programmers of such applications to make an explicit effort to integrate these improvements. For example, if the autocorrection functionality within the interface layer of the operating system of a computing device is replaced with improved autocorrection functionality that is described herein, then any application that uses such autocorrection functionality may automatically be improved. It may even be advantageous for relatively specialized functionality to be implemented within the library of functionality that is available to applications that run on a computing device; for example, it may be advantageous for a tablet computer to have an operating system that includes math input interface functionality with math input interface improvements that are described herein, so that programmers of applications for such a tablet computer can easily take advantage of such math input interface functionality.

Some of the improvements that are described herein pertain to functionality that is typically the responsibility of the interface layer of the operating system of a computing device, such as functionality for moving the mouse cursor, for switching the keyboard focus from one application to another, for superimposing a window over an application window, and so forth. Such improvements may of course be implemented within the interface layer of the operating system of a computing device, so that the computing device will embody the invention whenever that operating system is installed on the computing device, regardless of what applications are installed. However, many operating systems include functionality that enables applications to essentially modify the operation of the operating system itself, so that even functionality that is the responsibility of the interface layer of the operating system of the computing device can be improved by installing an appropriately configured application. For example, installing a prior art speech recognition application on a computer with a Microsoft Windows operating system may make it possible for a user to move the mouse cursor by means of spoken commands, as though the operating system functionality pertaining to the mouse cursor had itself been modified; likewise, those of ordinary skill in the art will understand that an application can be created such that installing the application on a computer with a Microsoft Windows operating system may cause the computer to embody the present invention in essentially the same way as if certain improvements were implemented within the interface layer of Microsoft Windows itself.

Putting Features in Perspective

The present specification describes numerous features. An embodiment of the invention may have significant advantages over prior art even if it has only one or two of these features. However, many of these features may have a great deal of synergy with one another, so that an embodiment that has several of the features that are described herein may have advantages that exceed the sum of the advantages of the individual features.

In various places throughout the present specification, in order to put various features in perspective, the present specification will include brief discussions of how certain features compare to prior art, or how the features relate to other features that are described herein, or both. Such a discussion may consist of a single paragraph at the end of a section, or an entire section within a chapter. Such a discussion may point out how a certain feature or group of features has advantages over prior art in its own right, may explain synergistic advantages that a certain feature has in conjunction with other features, may suggest ways to ensure that an embodiment that lacks a certain feature still retains most of the advantages of its other features, and so forth. At the end of the present specification there is a longer discussion of additional possible advantages of some embodiments. Such discussions are intended to be helpful, but are not intended as exhaustive explanations of advantages, synergies, or interrelationships of features; if a particular feature is never specifically mentioned in any such discussion, then this does not mean that the feature does not have any synergy with other features.

Keyboards

Figure 25A:
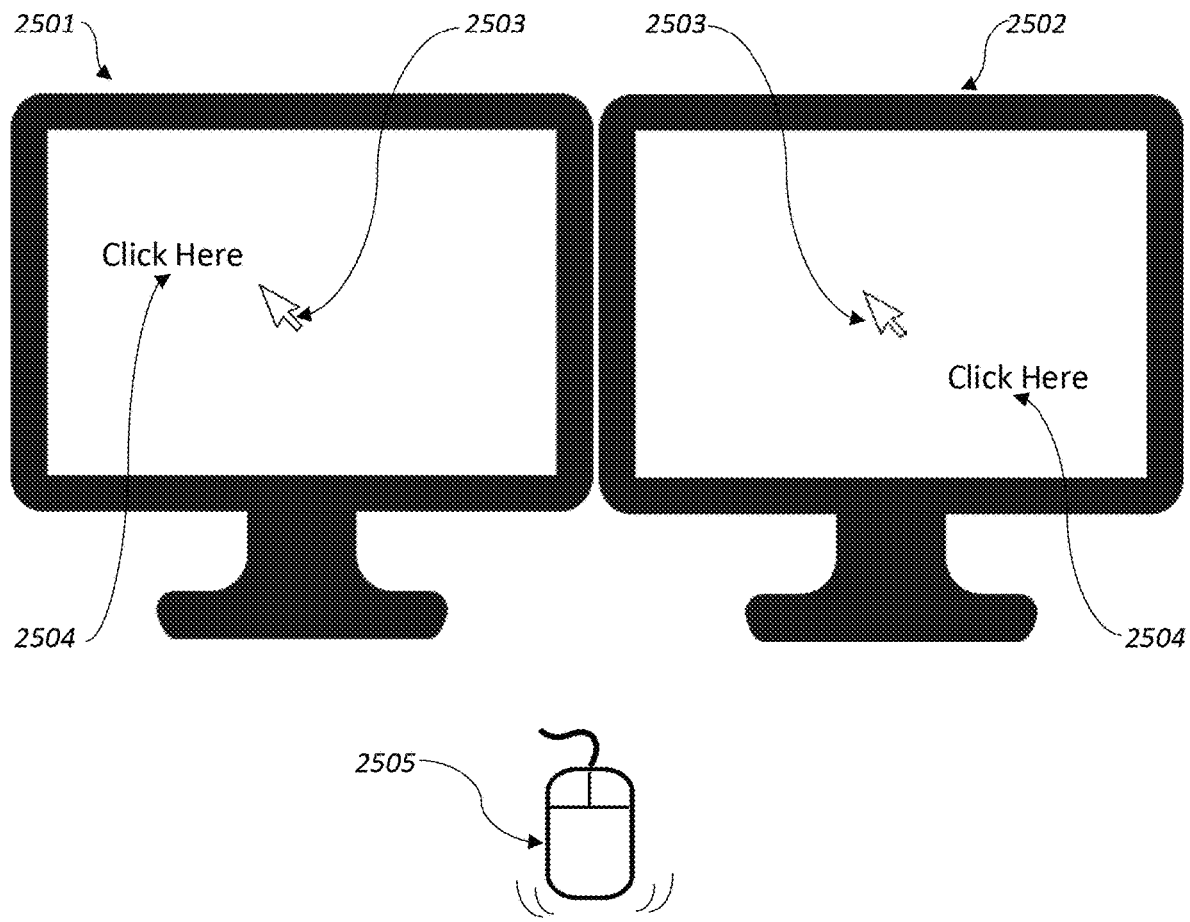
FIG. 25A illustrates a directed input cursor jumping feature in action, according to an embodiment.
Figure 25B:
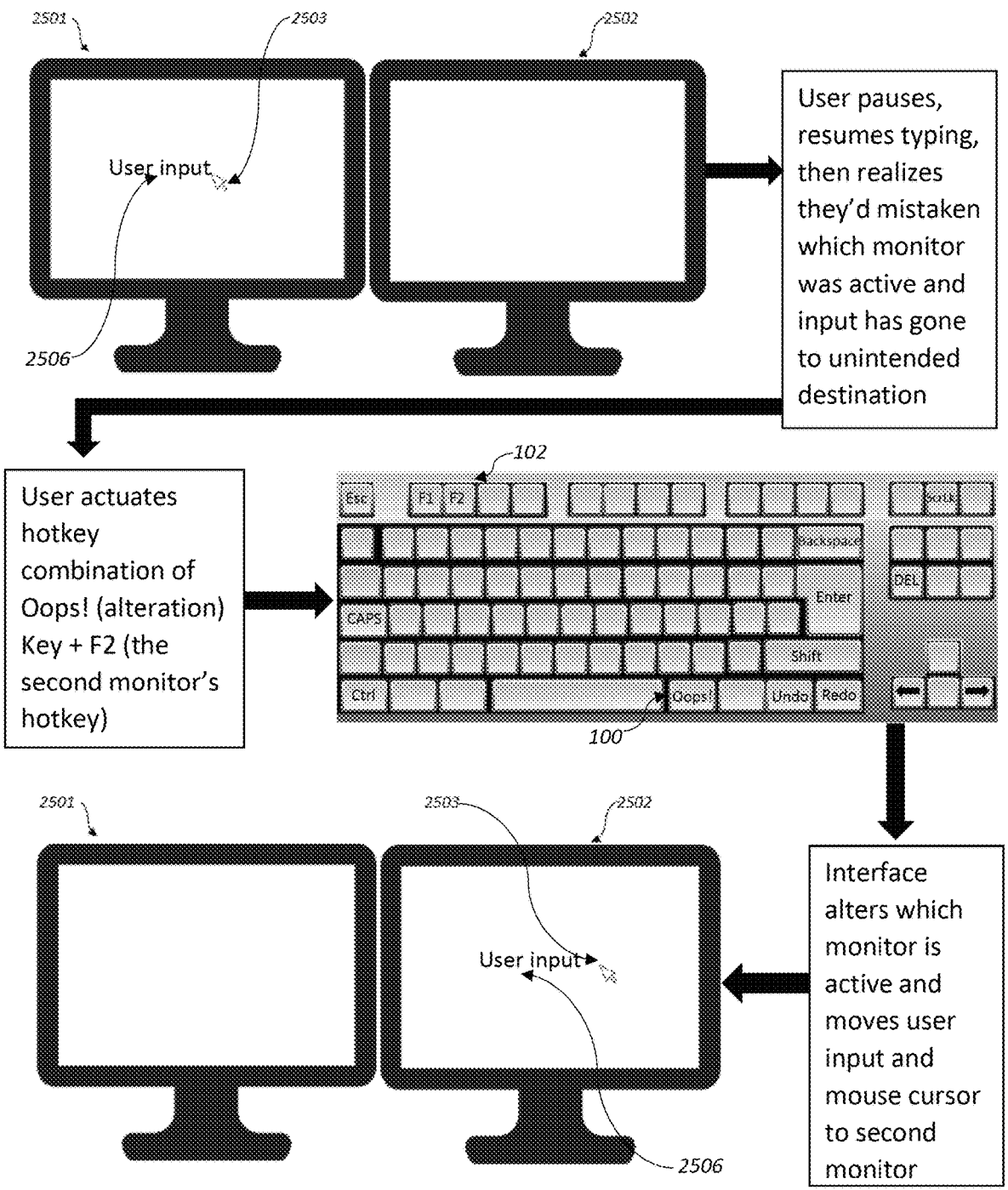
FIG. 25B illustrates advantages associated with some embodiments of a directed mouse cursor jumping feature.
Figure 26A:
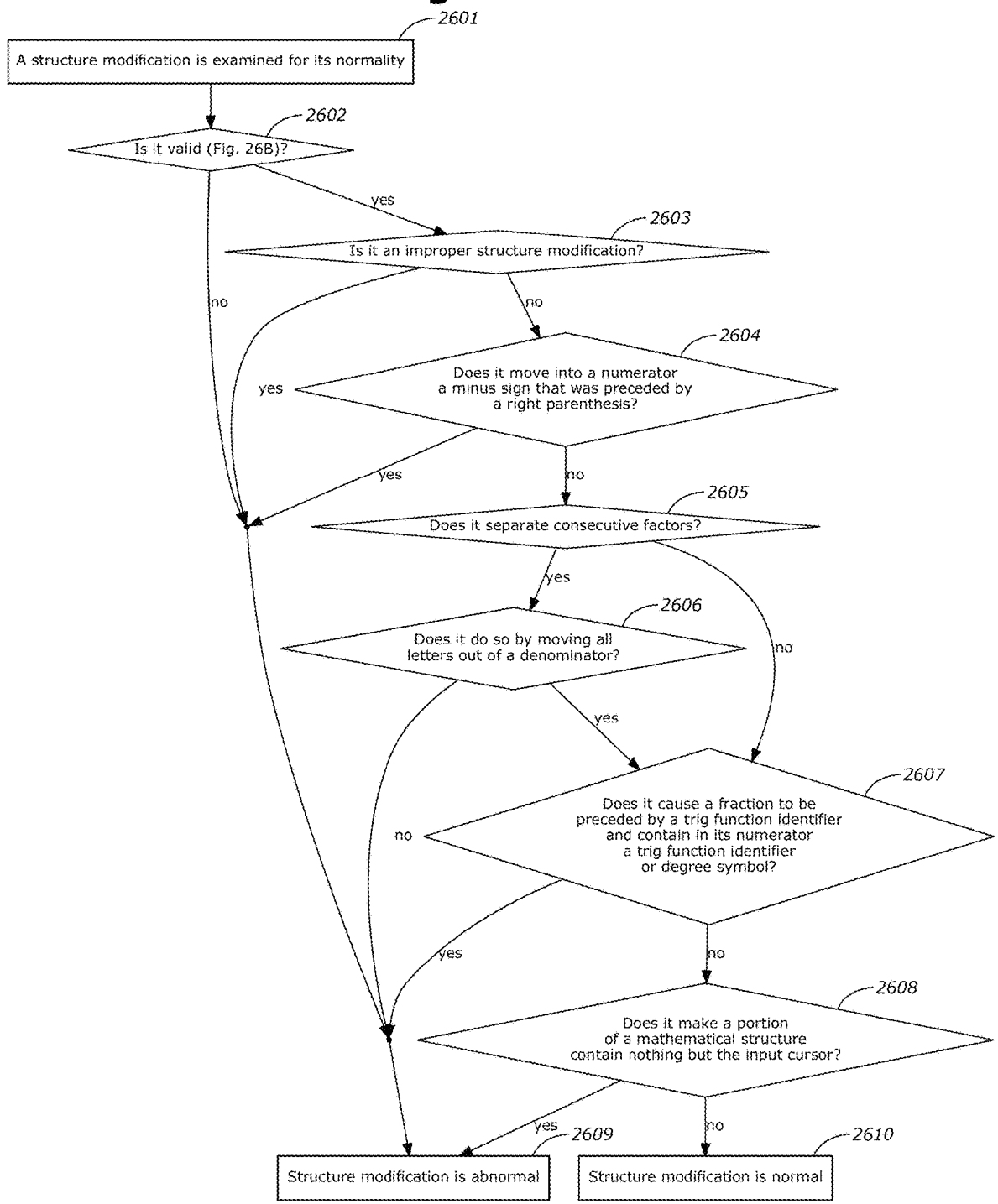
FIG. 26A is a flowchart that illustrates the process of evaluating a structure modification, according to an embodiment.
Figure 26B:
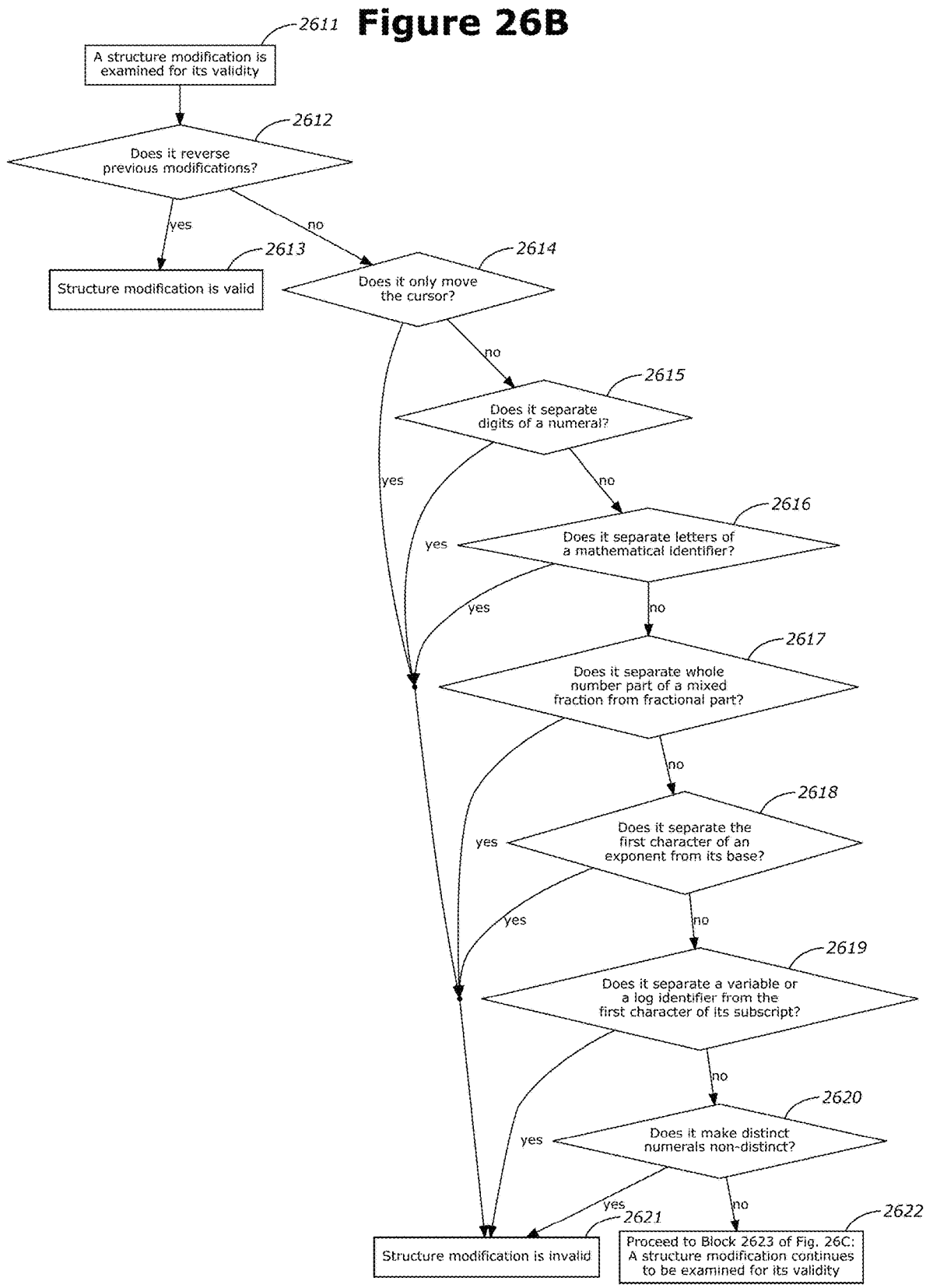
FIGS. 26B and 26C are flowcharts that together illustrate evaluating a structure modification's validity, according to an embodiment.
Figure 26C:
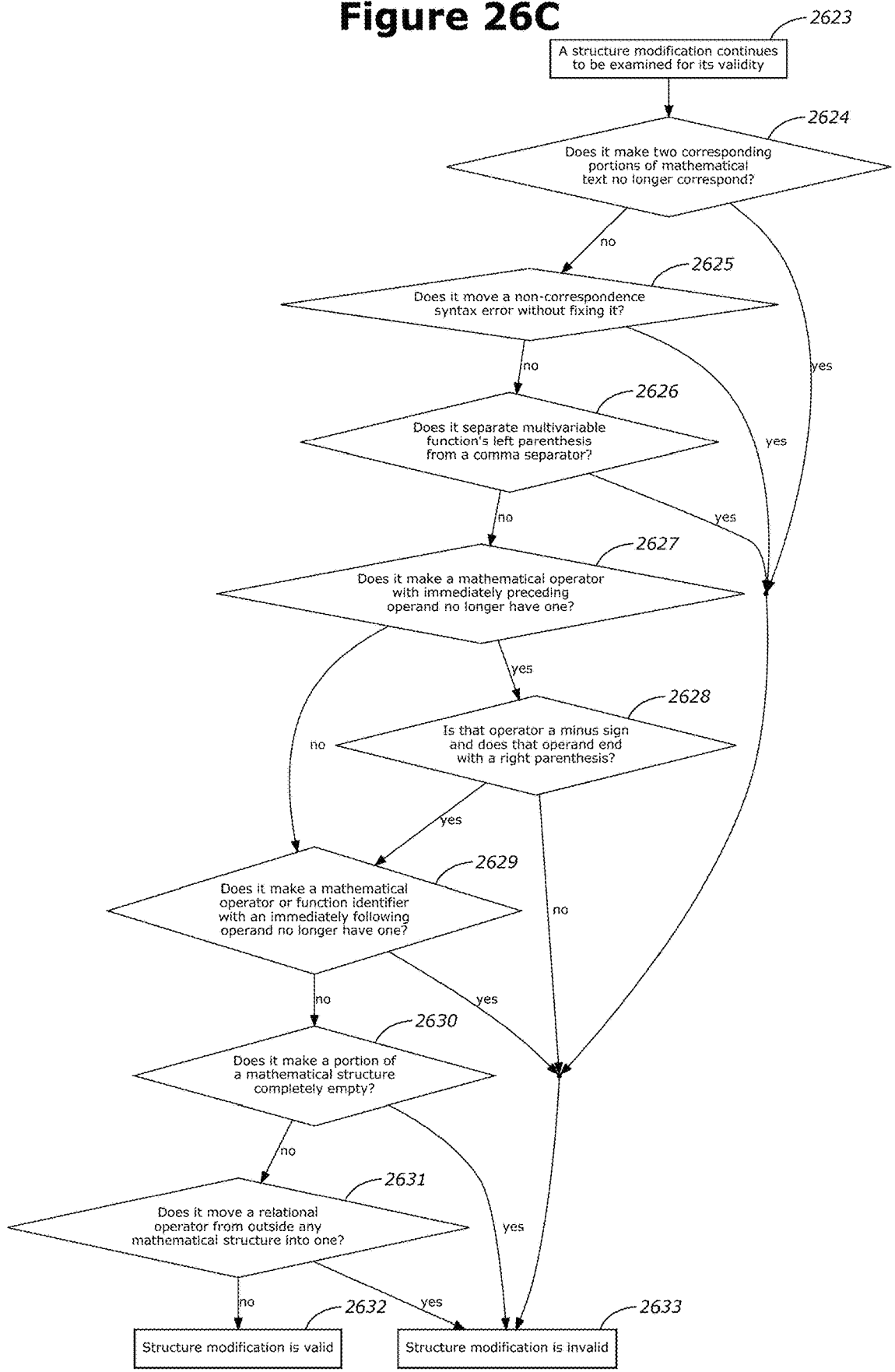
Figure 27:
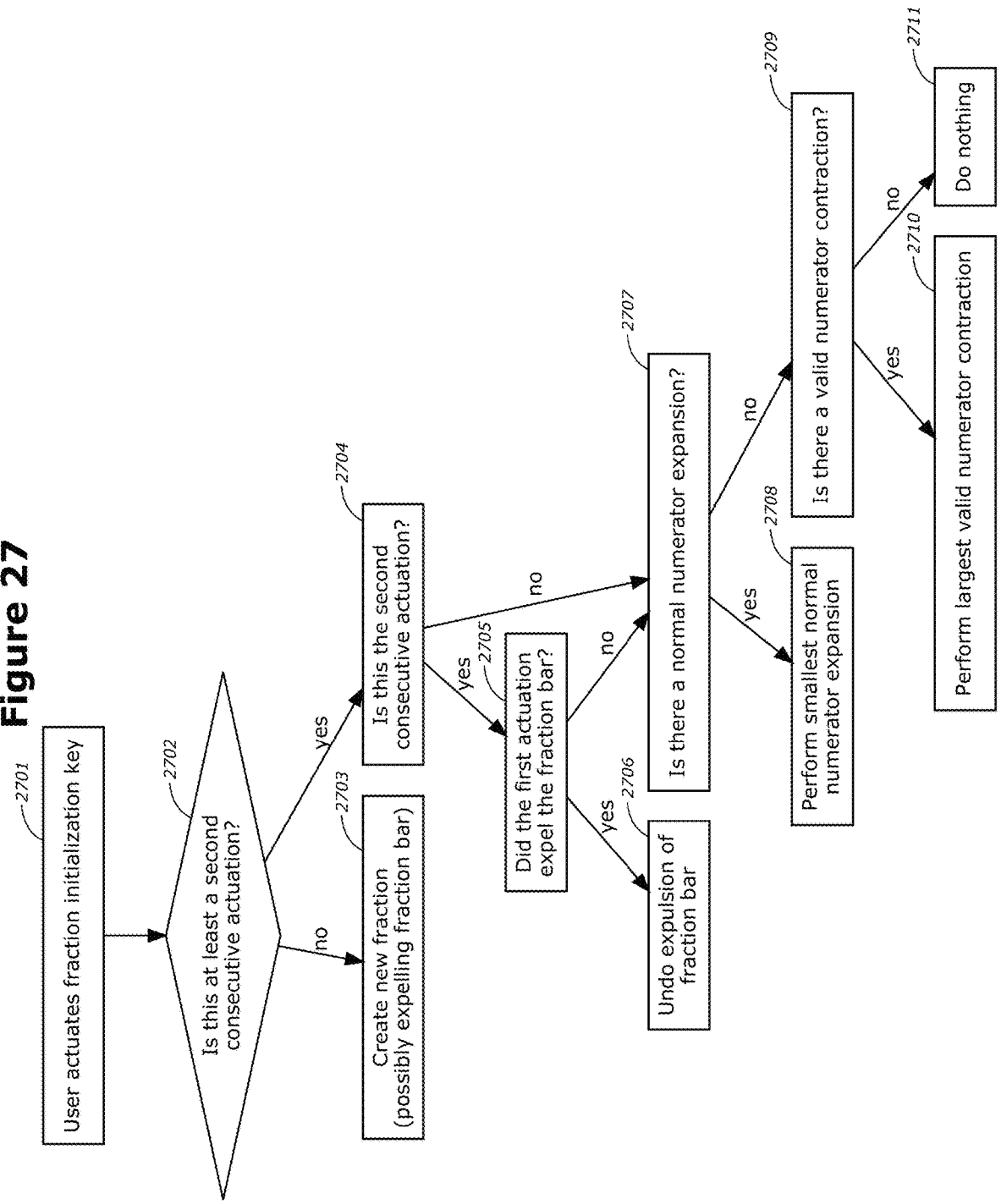
FIG. 27 is a flowchart that illustrates the results that occur when the user presses the fraction initialization key, in an embodiment that has a relatively simple version of the fraction initialization key, according to an embodiment.
Figure 28A:
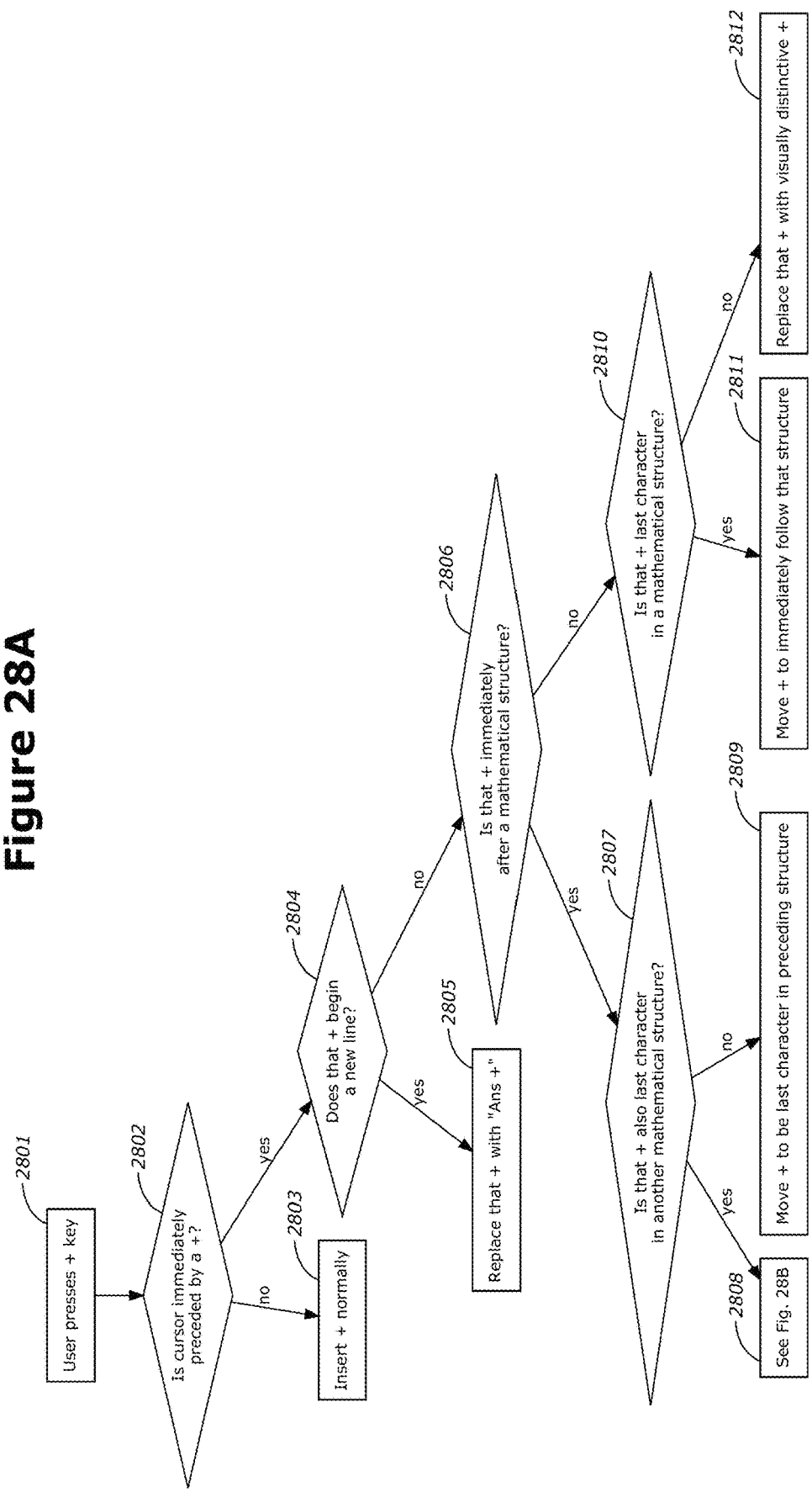
FIG. 28A is a flowchart that illustrates various features that may be invoked when a user double-clicks the plus key, according to an embodiment.
Figure 29A:
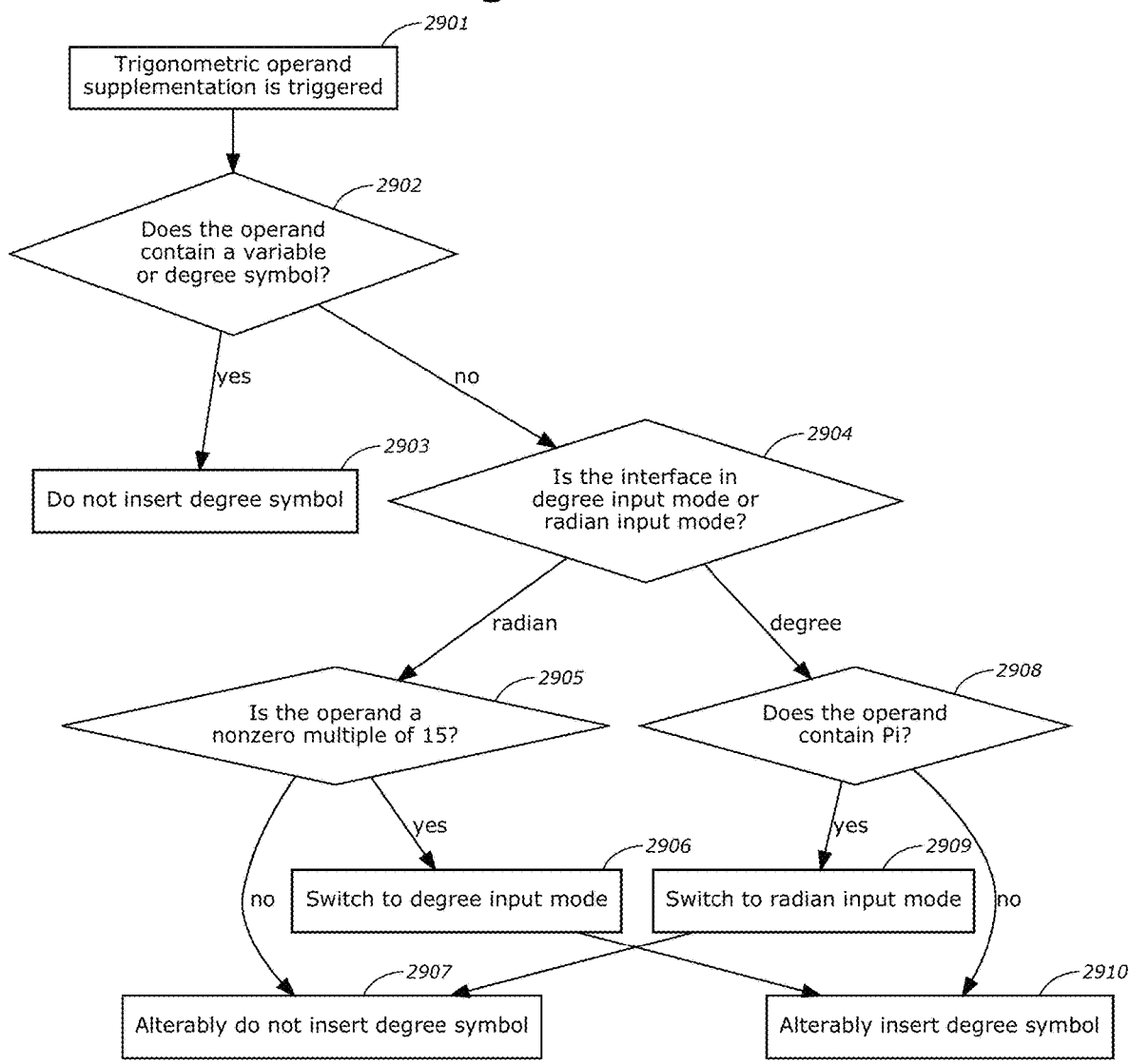
FIG. 29A is a flowchart that illustrates an example method for making smart adaptive angle measure mode decisions.
Figure 29C:
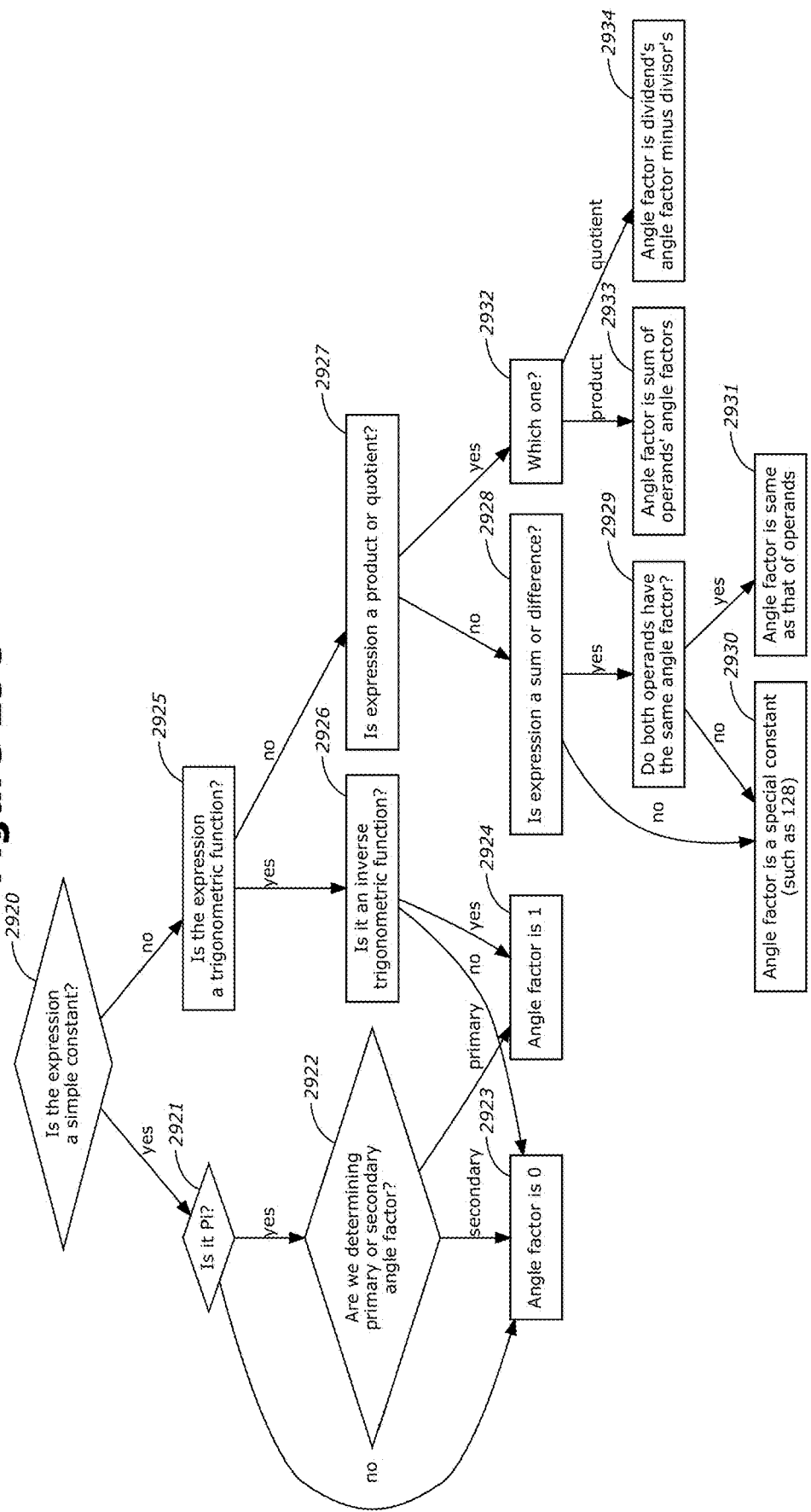
FIG. 29C is a flowchart that illustrates an algorithm that determines, for a mathematical expression, an angle factor, which may be either a primary angle factor or a secondary angle factor, according to an embodiment.

In some embodiments, the computing device has a hardware keyboard. In particular, in some embodiments the computing device has a keyboard with an individual physical key that serves as an alteration key as described in the following chapter. FIG. 1B shows a computer keyboard featuring an alteration key labeled "Oops!" (100) as well as featuring an F12 Key (102) which is also referenced in FIG. 25B. FIG. 1C shows a calculator keypad featuring an alteration key labeled "Oops!" (100), an ANS key (103), an Enter key (104), a Log key (105), a "Right" arrow key (106), a "Left" arrow key (107), a "+" Key (108) that may serve as a fraction initialization key as defined in Chapter 44, a "−" Key (109), and a "+" Key (110).

Key Actuations

For purposes of the following discussion of key actuations, an "invocable function" is an interface function that a user can invoke that takes no parameters. In other words, an invocable function is an interface function that can be assigned to a single key, without any need for the user to supply additional information before the function is invoked. For example, many application interfaces have a Print function such that invoking the function opens a Print dialog box; this is an invocable function that is often assigned to the key combination Ctrl-P, and can often be invoked by other means as well.

In most cases, on most computing devices, most of the invocable functions that are referred to in the present specification can be invoked by pressing a single physical key or a single depiction of a key on a virtual keyboard. In some cases, however, on certain computing devices, certain invocable functions that are referred to in the present specification cannot be invoked by pressing a single physical key or a single depiction of a key, but must instead be accessed by some other means. For example, a TI-84 Plus graphing calculator does not have a dedicated square root key, so on a TI-84 the invocable function of inputting a square root symbol cannot be invoked by pressing a single key, but is instead invoked by means of first pressing the key labeled 2nd and then pressing the key labeled $x^2$.

Generally, for the sake of simplicity, the present specification will not refer to invocations of specific invocable functions, but will instead refer to "actuations" of specific "keys." Those of ordinary skill in the art will understand that any reference to "keys" or "keystrokes" in the present specification applies equally to other means for invoking specific invocable functions; in most cases, the details of how specific invocable functions are invoked are not essential to the present invention. Thus, in the present specification, the word "key" may refer to any means whereby the user of an interface can invoke a single specific invocable function, without regard to whether such means actually consists of pressing a single physical key on a keyboard. Likewise, "actuating a key" refers to invoking such a function, "having a key" refers to having a means for invoking such a function, "keystroke" refers to an invocation of such a function, and so forth.

For example, on a typical desktop computer keyboard, pressing the 2 key while holding down the Shift key constitutes "actuating the @ key" because this combination of actions invokes the function that causes the character @ to be entered into the user's input. Such a keyboard may be said to "have an @ key."

Similarly, in many computer software applications, pressing the S key while holding down the Ctrl key constitutes "actuating the Save key," because this combination of actions invokes the function that causes the software to save the file that the user is currently editing. Likewise, using a computer mouse to open a menu of options and choose the Save option constitutes "actuating the Save key" according to the definition used in the present specification. Similarly, many software applications have a toolbar that can be displayed that includes a depiction of a Save button, and clicking on such a depiction of a button or otherwise actuating such a depiction of a button constitutes "actuating the Save key" according to the definition used in the present specification.

On certain graphing calculators, the sequence of actions consisting of first pressing a key labeled 2nd and then pressing a key labeled $x^2$ has the effect of entering a square root into the user's input; thus, such a sequence of actions constitutes "actuating the square root key" according to the definition used in the present specification, and such a calculator may be said to "have a square root key."

On certain cell phones that have text messaging capabilities and do not have touchscreens, in certain circumstances it is possible to type the letter a by pressing a key labeled 2; thus, pressing the 2 key in such circumstances constitutes "actuating the a key" according to the definition used in the present specification. On certain such cell phones, in certain circumstances, it is possible to type the letter b by pressing the key that is labeled 2 twice rapidly: the first time the key is pressed, the letter a appears, and the second time the key is pressed, the letter a is replaced with the letter b. From the user's perspective, pressing the 2 key twice rapidly is the means of typing the letter b; when the user types the letter b, the temporary appearance of the letter a serves no purpose that the user then desires other then enabling the user to access the letter b, so pressing the 2 key twice rapidly is, from the user's perspective, equivalent to "actuating the b key" according to the definition used in the present specification.

Several examples have now been given in which a user performs more than one action in order to "actuate a key." In each of these examples, the first action that the user performs—such as holding down the Shift key or Ctrl key on a computer keyboard, or opening a menu of options, or pressing the 2nd key on a graphing calculator—has no effect that the user desires other than enabling the user to subsequently perform an action that then causes the invocation of the function that the user desires to invoke. Thus, in each case, although the user may perform a plurality of actions, the user has in view the invocation of a single function.

If a user performs a sequence of actions that has the same result as if the user had invoked a single function, but this sequence of actions consists of a plurality of independent actions each of which causes the invocation of an independent function that yields a portion of the desired result, then this sequence of actions is not a single key actuation according to the definition used in the present specification. For example, if an interface has a cosine key such that actuating the cosine key causes the three letters "cos" to be inserted into the user's input, but a user of the interface instead sequentially types the same three letters by means of actuating three individual letter keys, then the user will not be said to have "actuated the cosine key." As another example, a TI-84 Plus graphing calculator has a cubed function that causes an exponent of 3 to be entered into the user's input, and a user can access this function as the #3 option within the calculator's MATH menu, so if a user presses the calculator's MATH key and then presses the 3 key, this sequence of actions constitutes "actuating the cubed key" according to the definition used in the present specification; but if a user instead enters an exponent of 3 by pressing the ^ key and then pressing the 3 key, this latter sequence of actions does not constitute "actuating the cubed key."

(In a user interface that has Undo functionality, a single invocation of the Undo function will typically reverse a single invocation of an invocable function other than a cursor navigation function; thus, the intutions of an experienced user as to how an Undo function will operate can serve as an approximate guide to what constitutes a single invocation of an invocable function and thus constitutes a single "key actuation" according to the definition used in the present specification. For example, a user of a TI-84 Plus graphing calculator can press the calculator's MATH key to cause the MATH menu to appear and then press the 3 key to choose the cubed function from the MATH menu, thus causing the MATH menu to disappear and an exponent of 3 to be entered into the user's input; if an experienced user of computing devices were then asked what would happen if an Undo function were to be invoked a single time, the user would answer that the exponent of 3 would be removed from the input that was entered. Such a user would not answer that the exponent of 3 would be removed and the MATH menu would reappear; thus, the user's answer indicates that the user would expect a single invocation of an Undo function to undo the entire cumulative effect of pressing the MATH key and then pressing the 3 key, and not to undo only the effect of pressing the 3 key. The user's intuition thus confirms that such a sequence of two keystrokes may be considered to constitute a single invocation of an invocable function.)

Because a "key actuation" as defined above may actually involve a sequence of several actions, reducing the number of key actuations required to accomplish a particular editing task may not always make it easier for a user to perform the task: the ease of accomplishing a task depends not only on how many key actuations are required but also on how easy it is to perform those key actuations. Nevertheless, reducing the number of key actuations required to accomplish various editing tasks will generally tend to make it easier to perform those tasks. Furthermore, reducing the number of actuations of distinct keys required to accomplish various editing tasks will generally tend to make it easier to accomplish those tasks: double-clicking a single key is usually easier than finding and pressing two distinct keys. The present specification will explain specific means by which specific editing tasks can be made more efficient by reducing the number of key actuations or reducing the number of distinct key actuations that are needed in order to accomplish the tasks.

In the present specification, a "first actuation" of a particular key is any actuation of that key such that the most recent user action prior to that actuation was not also an actuation of that key. In other words, any actuation of a key is a first actuation of that key if it is not at least the second consecutive actuation of that key.

Naming of Keys

A "key," as defined above, may serve as a means to invoke a function that determines based on current circumstances which other function to invoke from among a plurality of other functions. When the present specification refers to a particular key, the present specification will typically name the key in terms of the function it invokes; however, because the function that a key invokes may at times be a means for invoking some other particular function, such a key may at times be named in terms of another function it may invoke, and thus a single key may have more than one name in the present specification. For example, a typical desktop computer keyboard has a physical key that could be called the "numeric keypad 2 key" which invokes the same function as a "2 key" when the keyboard is operating in Num Lock mode and invokes the same function as a "down arrow key" at other times; this "numeric keypad 2 key" thus may also be referred to as a "2 key" or as a "down arrow key" under the appropriate circumstances.

Under circumstances where the function that a key invokes is currently a means for invoking some other particular function, that key may be named in terms of the other function it currently invokes; thus, the "numeric keypad 2 key" may be referred to as the "2 key" when the keyboard is operating in Num Lock mode. Under such circumstances, however, a key that serves a simpler function will not be named in terms of the more complex function that currently yields the same result. For example, a "2 key" that never serves any purpose other than entry of a 2 character will not be referred to as a "numeric keypad 2 key" even under circumstances where a "numeric keypad 2 key" would happen to serve the purpose of entry of a 2 character. As another example, it is possible to devise circumstances in a typical text document editing program such that either invoking the Undo function or invoking the Paste function will result in the entry of a 2 character, but a "2 key" that never serves any purpose other than entry of a 2 character will not be referred to as an "Undo key" or a "Paste key" even under such circumstances.

Touch Gestures

The details of how a particular location on the screen of a computing device is indicated by the user are not generally essential, and will not always be explicitly specified in the present specification. Thus, in the present specification, except as otherwise specified, the word "touch" may refer to any means whereby the user of an interface indicates a specific location on the screen of a computing device, without regard to whether or not said means actually consists of touching the screen with a finger or stylus. For example, on a computing device that does not have a touch-sensitive display but that does have a mouse, positioning the mouse cursor over a highlighted region on the screen of a computing device and clicking the mouse button may constitute "touching a highlighted region."

In the present specification, whenever an interface action is described that is invoked by a touch of a specific location, it is to be understood that various alternative embodiments may require various means of "touch" in order to invoke the specified interface action. For example, if an interface action is described that is invoked by "touching a highlighted region," then in one alternative embodiment the interface action may be invoked only if the user rapidly double-clicks the mouse button when the mouse cursor is on the highlighted region, and in another alternative embodiment the interface action may be invoked only if the user presses the highlighted region with a finger and holds the touch for at least one second, and so forth. Various such alternative touch gestures will be obvious to those of ordinary skill in the art.

Embodiment—Specific Terminology

In the discussion of specific features of certain embodiments of the present invention, many terms are defined. In some cases, a term is defined that is said to have a certain meaning "in an embodiment" or is said to pertain to a certain circumstance "in an embodiment," and the specification makes use of that term when describing a feature that is present in certain embodiments. In such cases, for purposes of any feature that is described using that term, that meaning of the term is applicable in at least one embodiment, but it is not necessarily applicable in all embodiments.

For example, in Chapter 11, the present specification details certain functionality pertaining to "significant interface interventions" in certain embodiments. Chapter 11 also says, "In an embodiment, for purposes of the following paragraphs, a 'significant interface intervention' is an alterable interface intervention that does not currently have its non-intervention option selected, and that has a probability of alteration that is above a certain 'undoable intervention threshold.'" It is to be understood that it may also be possible to create an alternative embodiment that still includes functionality pertaining to significant interface interventions, but uses a different definition for "significant interface interventions." (In fact, one such alternative embodiment is also described in Chapter 11: "In an alternative embodiment, a 'significant interface intervention' is any alterable interface intervention that does not currently have its non-intervention option selected, regardless of its probability of alteration.")

Example Device or System

Figure 1B:
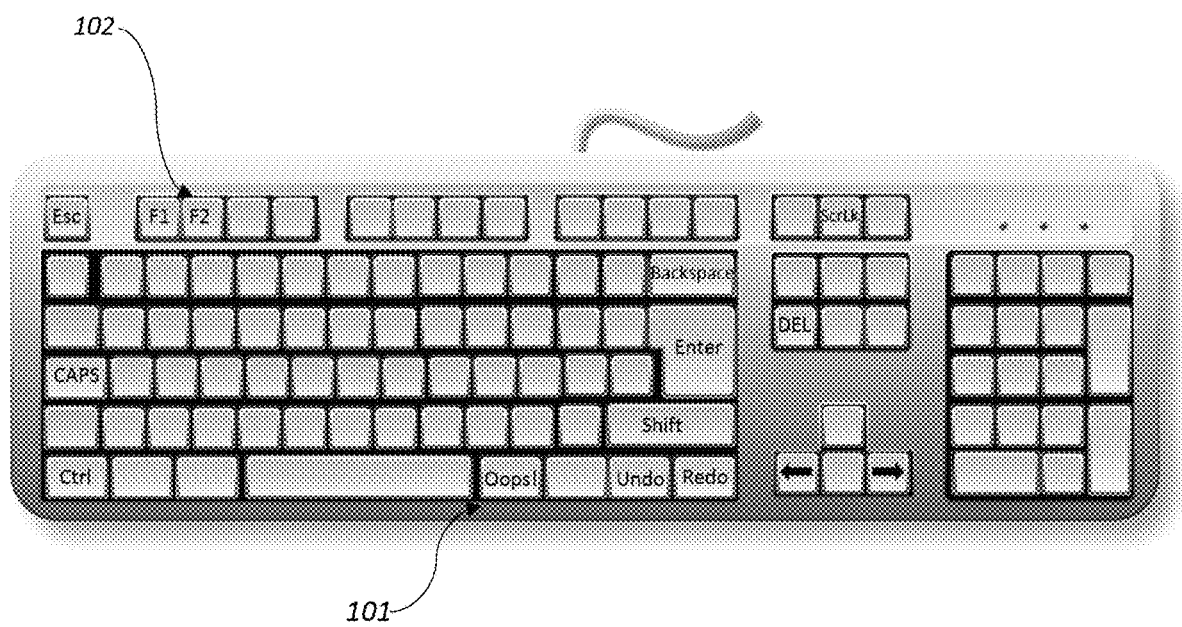
FIG. 1B illustrates an embodiment of a keyboard including an alteration key.
Figure 1C:
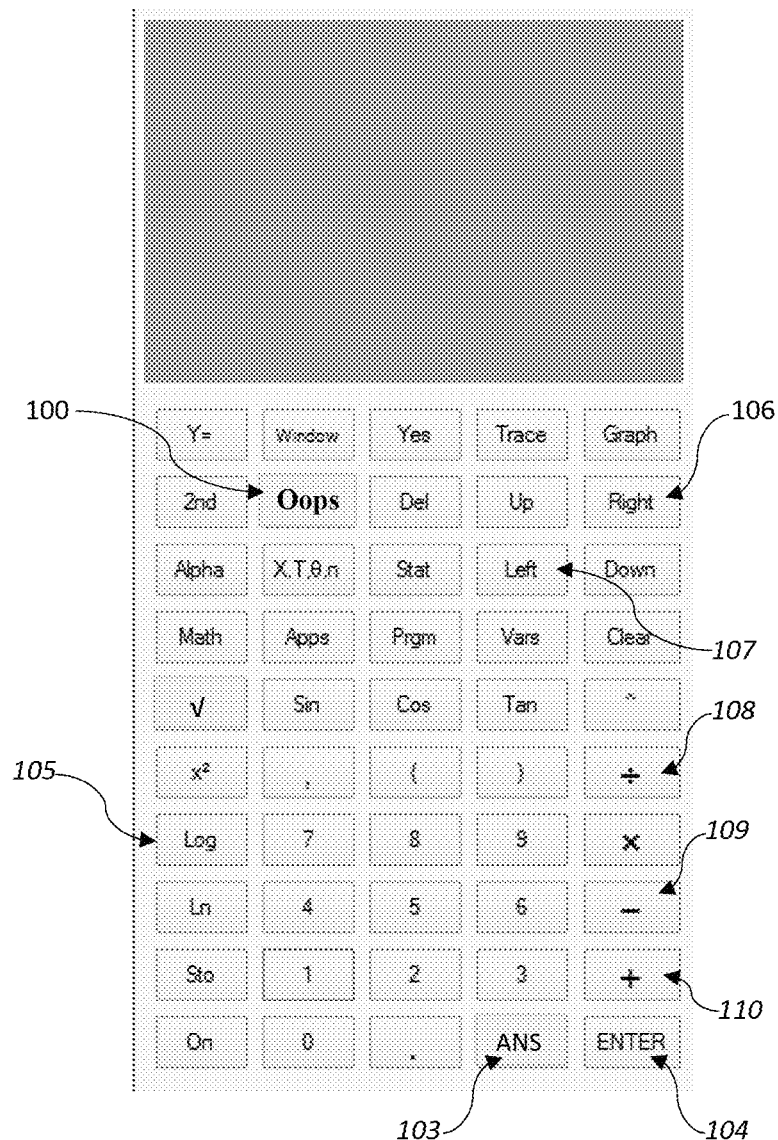
FIG. 1C illustrates an embodiment of a calculator including an alteration key.

FIG. 1A is a block diagram of an embodiment of a device 10 including an interface as described herein. The device 10 can be any type of electronic or computing device including, for example, a desktop computer, a laptop, a tablet, a smartphone, a voice computer, or a calculator, among others. The interface allows a user to interact with the device 10. For example, the interface allows a user to input information into the device 10 and view or receive information from the device 10.

In the illustrated embodiment, the device 10 includes a processor 12 and a computer readable medium 14. The computer readable medium 14 can include instructions that, when executed by the processor 12, cause the device 10 to implement one or more of the many interface functions described herein. The computer readable medium 14 can also be used to store information, as necessary, for use by the interface.

As shown, the device 10 includes an input device 16. The input device 16 allows the user to input information into and interact with the device 10. Many types of input devices 16 are possible, including keyboards, mice, touchscreens, microphones (for voice commands), etc. The input device 16 can include an alteration key 18. The alteration key 18 can be used, for example, to alter an alterable decision made by the interface as described below, as well as for additional functionality as described throughout this application. In some embodiments, the alteration key 18 is a dedicated key or button. In some embodiments, the alteration key 18 is a soft-key implanted on a touch screen. In some embodiments, the alteration key 18 can be implemented by having a user click or press on an alterable decision to alter it. In some embodiments, the alteration key 18 can be a voice command. Additional examples of the alteration key 18 are found throughout this application.

The device 10 also includes an output device 20. The output device 20 can be configured to display or otherwise communicate information to a user. For example, the output device 20 can be a monitor or screen. In some embodiments, the output device 20 can comprise a speaker for audibly communicating information to the user.

As noted previously, the interface of the device 10 can be configured to implement one or more of the various interface functions described herein.

Chapter 2: Alterable Decisions and the Alteration Key

About Part I

Part I of the present specification includes Chapters 2 to 15. Part I explains various features that may facilitate mistake recovery, including features that pertain to "alterable decisions" as described below, and also including features that pertain to undo functionality and autocorrection functionality.

Farther below, Part II explains features that may tend to prevent the interface from repeating mistakes and features that may tend to prevent users from wasting time. Part III explains for various situations interface improvements that may make it easier for a user to achieve desired results quickly; in particular, Part III explains for various situations various specific circumstances in which the interface may make alterable decisions.

Alterable Decisions

Various embodiments include various features that pertain to "alterable decisions." As used in the present specification, an "alterable decision" or "alterable interface decision" can be an interface decision such that the interface either saves sufficient information to subsequently identify the portion of input that the decision pertained to, or sufficient information to later determine what the user's input would then be if the outcome of the earlier decision had been different, or both. For example, in an embodiment, when the interface decides to autocorrect a word that a user typed, the decision to autocorrect the word will be an alterable decision, which means that the interface will either save sufficient information to subsequently identify the word that was autocorrected as the portion of input that this alterable decision pertained to, or sufficient information to later determine what the user's input would be if the word's uncorrected spelling were retroactively restored, or both.

However, the term "alterable decision" may be a misnomer in some embodiments because not all embodiments will necessarily facilitate altering such decisions: some embodiments may, and others may not. For example, an embodiment is described in Chapter 5 in which the interface highlights the outcomes of "alterable decisions" in order to call attention to possible mistakes, and such an embodiment may yield significant advantages over prior art even if it does not also facilitate the correction of such mistakes. Also, the term "alterable decision" may be a misnomer for certain types of alterable decisions because when a user performs an action that causes the interface to "make an alterable decision," the interface will not necessarily have any real choice as to how it initially responds to the user's action. For example, an embodiment is described in Chapter 33 such that if a user pauses for a long time while the interface is in Caps Lock mode, the interface may "alterably decide to remain in Caps Lock mode." In such an embodiment, even though the interface makes a so-called "alterable decision" in such circumstances, it has no real choice: arguably, a long pause is not a sufficient reason for the interface to automatically exit Caps Lock mode. Thus, the term "alterable decision" should be understood in light of the entirety of the present specification, and should not be strictly construed.

Above, and in various other places, the present specification mentions the "portion of input" that an interface decision pertains to. However, in some embodiments, the interface functionality that is specified herein may also interact with software output or interact with something else that is not input. Throughout the present specification, where appropriate, the word "input" should be understood to also refer to software output or to anything else that interface functionality may display and modify. For example, in an embodiment where the interface makes a decision whether to display the output of a calculation as a fraction or as a decimal, the so-called "portion of input" that this interface decision pertains to is actually the output of the calculation.

Alterable Decisions in Perspective

In the present specification, alterable decisions are often associated with potential user mistakes: in some embodiments, if an interface decision has an outcome that a user does not expect and does not desire, then in many cases the user will be able to correct the mistake by altering the decision. However, even though alteration functionality is often associated with mistake recovery herein, it is to be understood that alteration functionality need not be exclusively used for mistake recovery. For example, in some cases, a user who is familiar with alteration technology may deliberately make a "mistake" and then alter an interface decision because this is an efficient way to achieve a desired outcome.

The most common mistakes that a typical user of a computing device will encounter are word entry mistakes, which are typographical errors or spelling mistakes that are the user's fault. In some interfaces autocorrection functionality will often, but not always, correct word entry mistakes. Arguably, the most frustrating mistakes that a typical user of a computing device will commonly encounter are "undesired interface interventions," which are the mistakes that occur when the computing device performs an autocorrection or automatic formatting action that the user does not desire.

An interface decision regarding whether or not to autocorrect a word is a familiar example of an interface decision that is reasonably likely to have an outcome that a user regrets, and for that reason, autocorrection decisions are frequently used herein as convenient examples of alterable decisions. However, autocorrection decisions are not the only possible type of alterable decision: in Part III the present specification explains many other types of interface decisions that are alterable decisions in some embodiments.

Where prior art interfaces include specialized mistake recovery features (other than generic undo functionality), those features typically only facilitate recovery from word entry mistakes or undesired interface interventions. For that reason, when the present specification compares new mistake recovery features to prior art mistake recovery features, the present specification will generally emphasize how new mistake recovery features may do better at facilitating recovery from word entry mistakes or undesired interface interventions. Despite this emphasis on word entry mistakes and undesired interface interventions, it is to be understood that the new mistake recovery features described herein may also do better than prior art at facilitating recovery from various other types of mistakes, since prior art interfaces generally lack functionality that especially facilitates recovery from the other types of mistakes that are described herein.

An embodiment that has even just one feature that interacts with alterable decisions and has just one type of alterable decision may have significant advantages. For example, in a very early prototype, the only feature that interacted with alterable decisions was a simple alteration key, and the only alterable decisions that the alteration key could interact with were alterable structure exiting decisions; even in that relatively simple embodiment, the alteration key was useful.

However, the more interface decisions are alterable decisions, the more useful it will be to add functionality pertaining to such decisions, and conversely, the more functionality an embodiment has pertaining to alterable interface decisions, the more useful it will be to make interface decisions be alterable decisions. Alterable decisions may thus be at the core of a synergistic virtuous cycle.

Much of the present specification is devoted to explaining features that interact with alterable decisions in certain circumstances and features that cause the interface to make alterable decisions in certain circumstances. Other features are explained herein that do not directly pertain to alterable decisions, but may be more advantageous in an embodiment that has alterable decision functionality. For example, if a particular feature usually facilitates faster input, but careless users occasionally tend to make a certain type of mistake when using that feature, then such a feature may be advantageous on its own, but may be more advantageous in an embodiment that has alterable decision functionality that is specifically configured to facilitate correcting that type of mistake.

An Alteration Key Example

Figure 2A:
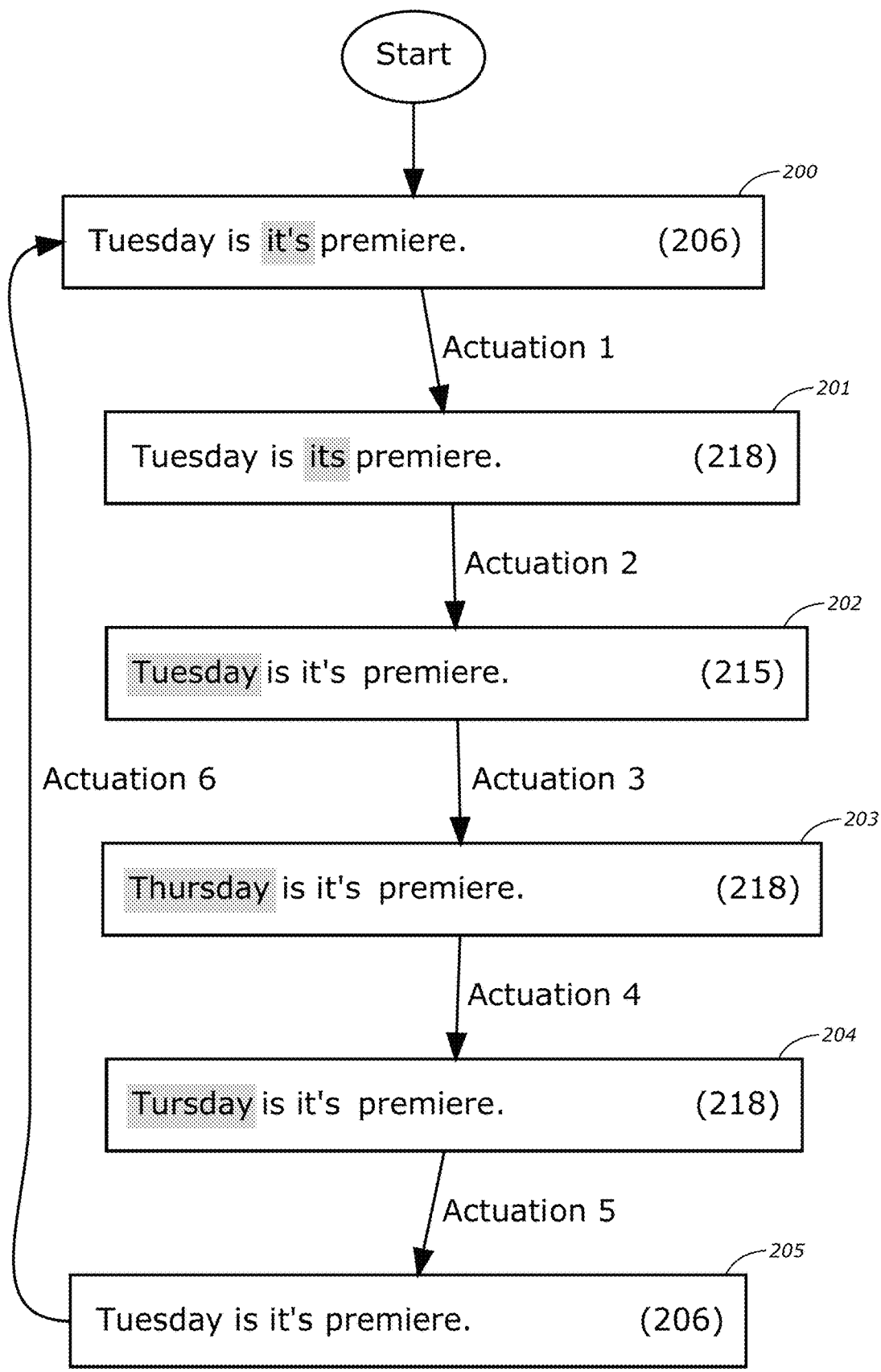
FIG. 2A is a flowchart illustrating repeated consecutive actuations of an alteration key, according to one embodiment.

FIG. 2A illustrates what may happen as a result of repeated consecutive actuations of the alteration key in an embodiment that has an alteration key as described below and in which additional consecutive actuations of the alteration key may have additional effects as described below.

Each block of the figure illustrates what the user's input will be after a certain number of consecutive actuations of the alteration key. In each block, the text that the currently alterable decision pertains to is highlighted (if there is a currently alterable decision). In each block, the number in parentheses corresponds to an interface state from FIG. 2B, and thus indicates what state the interface is in at that point. The effect of each actuation can be seen by comparing the block above that actuation's arrow to the block below it.

Figure 2B:
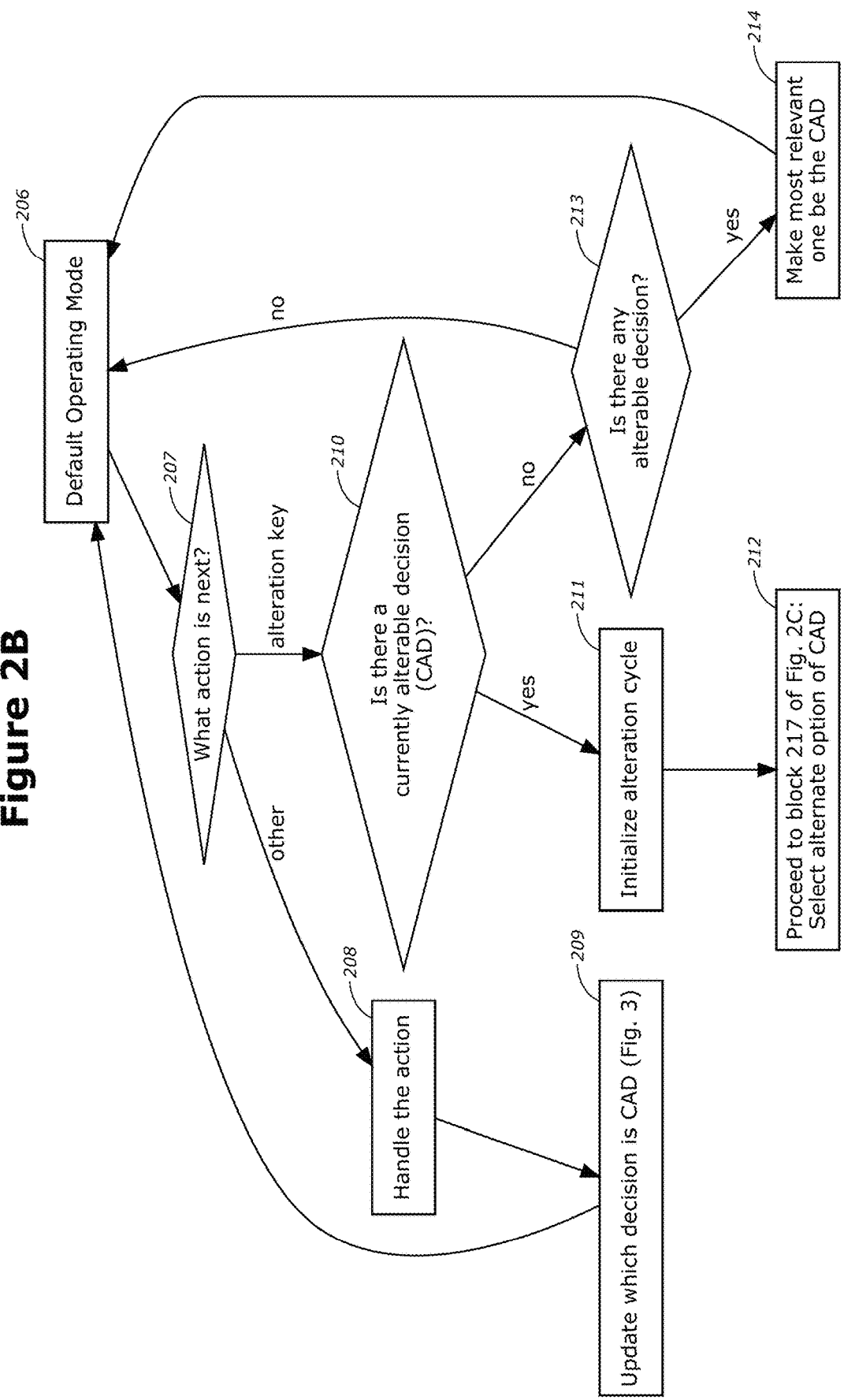

At the beginning of the example in FIG. 2A, the user has typed "Tursday is its premiere" but the interface has made an alterable decision to autocorrect "Tursday" to read "Tuesday" and an alterable decision to autocorrect "its" to read "it's." The text thus reads "Tuesday is it's premiere," as shown in Block 200. The alterable decision pertaining to the word "it's" is the currently alterable decision. The interface is in default operating mode as shown in FIG. 2B, Block 206.

The user then actuates the alteration key a first time. The interface alters the currently alterable decision, yielding "Tuesday is its premiere," as shown in Block 201. The alterable decision pertaining to the word "its" is still the currently alterable decision. The interface is now in alternate option selected mode as shown in FIG. 2C, Block 218.

The user then actuates the alteration key a second consecutive time. The interface alters the currently alterable decision again and thus reverts it to its default option, yielding "Tuesday is it's premiere," as shown in Block 202. The interface then causes the alterable decision pertaining to the word "Tuesday" to become the currently alterable decision, as indicated by the highlighting of that word in Block 202. The interface is now in alteration cycle operating mode as shown in FIG. 2C, Block 215.

The user then actuates the alteration key a third consecutive time and a fourth consecutive time. This yields "Thursday is it's premiere" as shown in Block 203 and then "Tursday is it's premiere" as shown in Block 204. After these actuations, the alterable decision pertaining to the word "Thursday" or "Tursday" is the currently alterable decision, and the interface is in alternate option selected mode as shown in FIG. 2C, Block 218.

The user then actuates the alteration key a fifth consecutive time. The interface reverts the currently alterable decision to its default option, yielding "Tuesday is it's premiere" as shown in Block 205. There is now no currently alterable decision, as indicated by the lack of highlighting in Block 205. The interface has returned to default operating mode as shown in FIG. 2B, Block 206.

The user then actuates the alteration key a sixth consecutive time. Because there is no currently alterable decision, this actuation of the alteration key does not affect the user's input; instead, it causes the alterable decision pertaining to the word "it's" to become the currently alterable decision again. The arrow labeled "Actuation 6" that points from Block 205 to Block 200 indicates that this sixth consecutive actuation of the alteration key causes the interface to return to the same state it was in prior to the first of these consecutive actuations of the alteration key. Subsequently, a seventh consecutive actuation of the alteration key would again yield the result shown in Block 201, and an eighth consecutive actuation would again yield the result shown in Block 202, and so on.

An Alteration Key Algorithm

FIGS. 2B and 2C are flowcharts that illustrate one possible algorithm for an embodiment that has an alteration key as described below, and in which additional consecutive actuations of the alteration key may have additional effects as described below. This algorithm yields the interface behavior that is illustrated in FIG. 2A.

In an embodiment that behaves as indicated by these flowcharts, whenever the user's most recent action was not an actuation of the alteration key (and in certain other circumstances), the interface is in a "default operating mode" as shown in FIG. 2B, Block 206. While the interface is in default operating mode, each time the user performs an editing action (Block 207) other than an actuation of the alteration key, the interface will handle that action (Block 208) and remain in default operating mode. Whenever the interface handles an editing action other than an actuation of the alteration key, this may cause the interface to update which decision is the currently alterable decision or "CAD" (Block 209): in particular, if the interface makes an alterable decision in response to an editing action, then in certain circumstances this new alterable decision will become the currently alterable decision.

While the interface is in default operating mode (Block 206), if a user actuates the alteration key (Block 210) when there is no currently alterable decision (Block 213), this actuation of the alteration key will cause the most relevant alterable decision to become the currently alterable decision (Block 214) if there is any alterable decision, or will have no effect if there are no alterable decisions; in either case, the interface will remain in default operating mode and return to Block 206.

While the interface is in default operating mode (Block 206), if the user actuates the alteration key when there is a currently alterable decision (Block 210), then the interface will add the other alterable decisions to the alteration cycle (Block 211). The interface will then select an alternate option of the currently alterable decision (Block 212, leading to FIG. 2C, Block 217) and enter an "alternate option selected mode" (Block 218). While the interface is in alternate option selected mode, each time the user actuates the alteration key (Block 220), if the currently alterable decision is a multi-alternative decision and there is an alternate option that has not yet been selected, then the interface will select such an option (Block 217) and remain in alternate option selected mode (Block 218).

While the interface is in alternate option selected mode (Block 218), if the user performs an action other than an actuation of the alteration key, then the user has explicitly selected an alternate option of the currently alterable decision (Block 226), which has effects that are described in Chapter 3. The interface will handle the action (Block 227) and revert to default operating mode (Block 206).

While the interface is in alternate option selected mode (Block 218), if the user actuates the alteration key (Block 219) when there is no alternate option (Block 220) for the currently alterable decision that has not yet been selected, the interface will revert the currently alterable decision to its default option (Block 221). The user has completed review of the currently alterable decision, which has effects that are described in Chapter 3. The interface will then move on to the next decision in the alteration cycle (Block 222), as described in the following paragraphs.

When the interface moves on to the next decision in the alteration cycle, if any alterable decisions are remaining in the alteration cycle, then the most relevant such decision will be removed from the alteration cycle and will become the new currently alterable decision (Block 225). The interface will then enter an "alteration cycle operating mode" (Block 215). The alteration cycle operating mode (Block 215) and the default operating mode (Block 206) are quite similar, but when the interface is in the alteration cycle operating mode (Block 215) it already has an alteration cycle in mind, so if the user's next action is an actuation of the alteration key (Block 216) then the interface will not need to initialize the alteration cycle before proceeding to alter the currently alterable decision (Block 217) and enter alternate option selected mode (Block 218). When the interface is in the alteration cycle operating mode (Block 215), if the user's next action is not an actuation of the alteration key, the interface will handle the action (Block 227, leading to Block 208), update which decision is the CAD (Block 209), and revert to default operating mode (Block 206).

When the interface moves on to the next decision in the alteration cycle, if no alterable decisions are remaining in the alteration cycle, there will then be no currently alterable decision (Block 223) and the interface will revert to default operating mode (Block 224, leading to Block 206).

Other algorithms that implement the same interface behavior or similar behavior will be evident to those of ordinary skill in the art.

Altering Decisions

In the present specification, the "default option" of an alterable interface decision can be the actual initial outcome of that decision, and an "alternate option" can be some other outcome that the user might prefer for that decision, except as otherwise specified. For example, in an embodiment, if the interface has automatically corrected the spelling of a word that a user typed, and the interface's decision to correct this word's spelling is an alterable interface decision, then the corrected spelling is the default option and the user's original uncorrected spelling is an alternate option.

In an embodiment, when the interface makes an alterable decision, in addition to saving enough information for the interface to subsequently identify the portion of input that the decision pertained to, the interface will also save enough information about the alternate options of that decision that the interface can later determine what the user's input would then be if an alternate option were chosen instead of the default option. For example, in an embodiment, when the interface makes an alterable decision to automatically correct a word that a user typed, the interface will save enough information to later be able to determine what the user's input would then be if the user's original uncorrected spelling were restored retroactively.

Below, various embodiments are specified in which the interface will "alter an alterable interface decision" in certain circumstances. Except as otherwise specified, when the interface alters an alterable interface decision, it replaces that decision's default option with an alternate option, without prompting the user for any additional confirmation or clarification; however, various other ways that the interface may alter an alterable interface decision in certain circumstances are specified below. In an embodiment, when the interface alters an alterable interface decision, it will retain enough information to be able to subsequently revert that decision to its default option.

In an embodiment, after a user has caused the interface to alter a decision so that an alternate option of that decision is selected, if the user then performs some action that does not cause the interface to alter that decision, this constitutes "explicitly selecting an option" of that alterable interface decision. Unless otherwise specified, when the user's most recent action caused the interface to alter a decision, the user has not yet explicitly selected an option of that alterable interface decision—not until the user performs some other action.

In an embodiment, once a user has explicitly selected an alternate option of an alterable interface decision, if the decision is still alterable, then for purposes of the alteration functionality described herein, the interface will subsequently treat the option the user explicitly selected as the default option of that particular alterable decision and will treat the former default option of that decision as an alternate option. For example, in an embodiment, after the interface makes an alterable decision to automatically replace the word "goof" with the word "good" but then the user explicitly selects the alternate option "goof," if the decision is still alterable, then "goof" will subsequently be treated as the default option of that particular decision for purposes of alteration functionality and "good" will be treated as an alternate option. (This does not mean that explicitly selecting the alternate option "goof" necessarily has any effect on future interface decisions regarding whether or not to automatically replace the word "goof": it only means that "goof" will subsequently be treated as the default option of the alterable decision the interface already made.)

In the present specification, any mention of "alteration features" or "alteration functionality" may refer to features that are disclosed herein that are specifically designed to interact with alterable interface decisions. Any mention of "altering" an alterable interface decision generally refers only to altering such a decision by means of such alteration features, and generally does not refer to manual editing of the portion of the user's input that an alterable interface decision pertains to, unless otherwise specified. For example, if the interface has made an alterable decision to automatically insert an apostrophe in the word "its," then if the user manually deletes the apostrophe, the user will not be considered to have "altered" an alterable interface decision.

The Alteration Key

In an embodiment, in certain circumstances an alterable interface decision is the "currently alterable decision" for purposes of alteration functionality. In Chapter 3, methods and systems are described for determining which alterable interface decision, if any, is the currently alterable decision at any given time. (In an embodiment, the currently alterable decision is often, but not always, the most recent alterable decision, as is explained in Chapter 3. In an embodiment, it may be possible to alter an alterable decision by various means even when it is not the so-called currently alterable decision.)

In an embodiment, the computing device has an alteration key such that when the alteration key is actuated, if there is a currently alterable decision, then the interface will immediately alter that decision. For example, if the interface has made an alterable decision to automatically insert an apostrophe in the word "its" and that decision is the currently alterable decision, then actuating the alteration key will cause that apostrophe to be deleted, regardless of the input cursor's current location, without prompting the user for any additional confirmation or clarification. Such an alteration key will often enable a user to correct an undesired outcome of an interface decision with a single keystroke, without the need to go back and manually correct the interface decision.

In an embodiment, when the alteration key is actuated, if there is then no currently alterable decision but at least one alterable decision exists, then in response to that actuation of the alteration key the interface will cause the "most relevant decision" as defined in Chapter 3 to become the currently alterable decision, and no other effect will occur. (In such an embodiment, it may be particularly advantageous for the interface to then highlight the currently alterable decision, as is described in Chapter 5, so that the user can see the effect of such an actuation of the alteration key.) This behavior is illustrated by Actuation 6 of FIG. 2A.

As is discussed in Chapter 1, the alteration "key" need not necessarily be an individual key on a hardware keyboard, but may be any means of invoking the function that is specified above in the description of the alteration key. For example, in various embodiments, a key labeled "Oops" on a hardware keyboard may be the alteration key, or the F12 key may be the alteration key, or the key combination Ctrl-T may be the alteration key, or a specific virtual key on a virtual keyboard may be the alteration key, and so forth.

Deleting Alterable Decisions

In the present specification, when an alterable interface decision is said to "cease to exist," this means that subsequently none of the functionality disclosed herein that pertains to alterable interface decisions will treat that decision as an alterable interface decision, unless otherwise specified. For example, if an alterable interface decision has "ceased to exist," then that alterable interface decision cannot be the currently alterable decision and actuating the alteration key will not alter that decision. This does not mean that the portion of input that the decision pertained to ceases to exist. After an alterable interface decision has ceased to exist, information about the alterable interface decision may still be retained in the memory of the computing device for various purposes, such as for purposes of the automatic decision variation feature described in Chapter 17 and the manual alteration detection feature described in Chapter 18. In the present specification, if an alterable interface decision is said to be "deleted," this means that the alterable interface decision ceases to exist.

In an embodiment, if an action that causes an alterable interface decision to cease to exist is subsequently undone by means of the Undo key, then the alterable interface decision will be made to exist once again.

In an embodiment, an alterable interface decision will immediately cease to exist if the portion of input that it pertains to is deleted, because that alterable interface decision is no longer applicable. For example, when the interface has made an alterable decision to automatically convert the word "friday" to "Friday," that alterable interface decision will cease to exist if the entire sentence containing the word "Friday" is deleted.

In an embodiment, an alterable interface decision will immediately cease to exist if the portion of input that it pertains to is modified in some way other than by means of altering that particular interface decision, if the modification is sufficiently relevant to the nature of the alterable decision. For example, in an embodiment, when the interface has made an alterable decision to automatically convert the word "friday" to "Friday," that alterable interface decision will cease to exist if the user manually changes the word to "Friendly," but not if the user italicizes the word. In such an embodiment, in certain circumstances, the interface may make more than one alterable decision that pertains to the same portion of input, and altering one such decision need not necessarily cause all the other decisions that pertain to the same portion of input to cease to exist. For example, in an embodiment, if the interface makes an alterable decision to convert the word "friday" to "Friday," and the interface also makes an alterable decision whether or not to italicize this word, then the user can alter either, both, or neither of these two decisions.

In an alternative embodiment, an alterable interface decision will immediately cease to exist if the portion of input that it pertains to is modified in some way other than by means of altering that particular interface decision, regardless of whether or not the modification is relevant to the nature of the alterable decision.

In an alternative embodiment, an alterable interface decision will not necessarily cease to exist immediately as soon as the portion of input that it pertains to is deleted or modified: instead, as soon as it becomes relevant whether or not a particular alterable interface decision still exists, the interface will determine whether the portion of input that alterable decision pertains to appears to have been deleted or modified. For example, in such an embodiment, if a certain portion of input that an alterable interface decision pertains to is deleted and is then retyped exactly as before, the interface may not notice that such activity occurred and may not delete the alterable decision in response to such activity.

In an embodiment, when an alterable interface decision is altered, no other alterable interface decision will be deleted in response to the alteration of that alterable interface decision until the user has explicitly selected an option of that decision, and then only if deletion of the other decision is appropriate based on the option the user selected. In other words, in such an embodiment, if for example a user cycles past various options of an alterable interface decision by repeatedly actuating the alteration key as is described below, then no option that is only temporarily selected will cause any other alterable interface decision to permanently cease to exist.

In implementing an embodiment, a programmer should ensure by some means that if the interface makes an alterable decision and saves information regarding that alterable decision, subsequent editing actions do not cause that information to become inaccurate while it is still possible for the user to cause the interface to alter the decision. For example, if the interface alterably decides to capitalize the word "friday" and saves the information that it alterably chose to capitalize the 100th character in the document the user was editing, then this is sufficient information for the interface to be able to alter that decision by locating that letter F and converting it back to lowercase, but if subsequently the user moves the input cursor to the beginning of the document and inserts additional text there, then that letter F is no longer the 100th character of the document, so the interface should either update its information or delete the alterable decision. Those of ordinary skill in the art will understand how to implement an embodiment that updates location data for alterable decisions when appropriate. However, in an alternative embodiment, the interface deletes every alterable decision whenever a user either performs an action that directly affects input that precedes the current input cursor location or performs an action that moves the input cursor to an earlier location; in such an alternative embodiment, it is thus impossible to edit a portion of the document that is prior to the location of any alterable decision without deleting the alterable decision, and so it may never be necessary to update location data for alterable decisions. Such an alternative embodiment may be somewhat less advantageous, but may still have advantages over prior art, and may take less effort to implement.

The Alteration Key in Perspective

The alteration key as described herein is an unusually efficient means of recovering from a mistake. Generally, prior art mistake recovery features require a user to perform at least two gestures: one gesture to indicate the location of the mistake and cause the interface to display one or more possible corrections, and another gesture to select the desired correction. A single actuation of the alteration key is faster than that two-step process; in fact, for a user who has become accustomed to the alteration key, a single actuation of the alteration key will probably be faster than the first step of that process in most cases.

In many prior art interfaces, a user can fully recover from an undesired interface intervention by means of a single actuation of the Undo key in most cases provided that the user has not performed any other action since the undesired interface intervention occurred. However, if a user performs even one action before noticing an undesired interface intervention, then fully recovering from the mistake by means of the Undo key will require a three-step process: the user must undo everything he did after the undesired interface intervention occurred, and then must actuate the Undo key once more to undo the undesired interface intervention, and then must repeat everything he did after the undesired interface intervention occurred. It is quite common to not notice an undesired interface intervention right away, so in many cases the alteration key will be more efficient than prior art, even for correcting undesired interface interventions.

The present specification includes many illustrative examples of altering decisions, and many of these examples refer to the alteration key. In particular, in various places, in order to show that it may be advantageous to make some particular type of interface decision be an alterable interface decision, the present specification provides an example scenario in which a user who makes a particular type of mistake can easily correct the mistake with just a single actuation of the alteration key. Such examples are not intended to imply that an embodiment must necessarily have an alteration key in order for it to be possible to alter decisions; on the contrary, other means of altering decisions are described below, including means that may be more convenient than the alteration key in certain circumstances. It is to be understood that it may be useful to make various types of interface decisions be alterable decisions even in an embodiment that does not have an alteration key. For that reason, the behavior that constitutes "altering a decision" is defined herein in terms that do not explicitly refer to the alteration key.

Multi-Alternative Decisions

In an embodiment, in certain circumstances, when the interface makes an alterable decision in which the interface selects among more than two relevant available options, the interface will save enough information to later replace the option that was selected with any of the plurality of options that were not selected. In such a case, the alterable decision will have more than one alternate option. In the present specification, an alterable interface decision that has more than one alternate option will be referred to as a "multi-alternative decision"; an alterable interface decision that has only one alternate option will be referred to as a "single-alternative decision." (These terms thus refer to the number of alternate options of an alterable decision, not counting the default option.)

In an embodiment, after the interface has made an alterable interface decision, in certain circumstances, the interface may later add more alternate options to that alterable interface decision or may later remove alternate options from that alterable interface decision. In such an embodiment, it may be possible for a single-alternative decision to later become a multi-alternative decision, or vice versa.

In an embodiment, when the interface first alters a multi-alternative decision, in addition to selecting an alternate option of the decision, the interface will create a list of alternate options of that decision that have been selected. In an embodiment, when the interface alters a multi-alternative decision that the interface has previously altered, if an alternate option currently exists that has not been selected, then interface will replace the selected alternate option with an alternate option that has not yet been selected and will then add the newly selected alternate option to the list of alternate options that have been selected. For example, in a certain embodiment, when a user types the word "Tursday" and presses the space bar key the interface may make a decision between three options: leaving the word as "Tursday," correcting the word to read "Tuesday," or correcting the word to read "Thursday"; if the interface initially decides to correct the word to read "Tuesday," such a correction may be a multi-alternative decision such that if the user then actuates the alteration key once the word will be changed to "Thursday" and if the user then actuates the alteration key a second consecutive time the word will be changed to "Tursday." This example corresponds to Actuations 3 and 4 of FIG. 2A. Thus, in such an embodiment, if the interface responds to a first actuation of the alteration key by selecting an alternate option that is not the particular alternate option a user desired, then the user can simply continue to actuate the alteration key repeatedly until the desired alternate option becomes selected.

Reverting Alterable Decisions

In an embodiment, when the interface alters a single-alternative decision, if the decision already has its alternate option selected, then the interface reverts that decision to its default option. For example, if the currently alterable decision is the interface's decision to insert an apostrophe in the word "it's," and if this decision is a single-alternative decision, then after the user actuates the alteration key once and thus causes the apostrophe to be deleted, actuating the alteration key a second consecutive time will cause the apostrophe to be inserted again, as is illustrated by Actuation 2 of FIG. 2A. Similarly, in an embodiment, when the interface alters a multi-alternative decision, if the decision has already been altered sufficiently many times that it is no longer possible for the interface to again replace the selected alternate option with a different alternate option that has not been selected yet, then the interface will instead revert that decision to its default option, as is illustrated by Actuation 5 of FIG. 2A. Thus, in such an embodiment, if in response to an actuation of the alteration key the interface actually introduces a new mistake by changing a decision that the user did not want to change, then the user can correct this mistake by continuing to actuate the alteration key repeatedly until the decision reverts to its default option.

In an embodiment, once a user causes the interface to alter an alterable decision sufficiently many times that the decision reverts to its default option, the user has "completed review" of that alterable interface decision. When a user causes the interface to alter an alterable decision sufficiently many times that every alternate option of that decision has been selected at some point, the user still has not "completed review" of that decision until the user causes that decision to revert to its default option.

In an embodiment, after the interface reverts a multi-alternative alterable decision to its default option, the interface will discard or empty its list of alternate options of that decision that have been selected, which means that the interface will subsequently regard each alternate option as though it had not been selected yet, and so continuing to repeatedly alter that particular decision will cause the interface to cycle through the various alternate options again.

The Alteration Cycle

In an embodiment, for purposes of the interface behaviors described in the following paragraphs, the alteration key is an "alteration-cycle-related key." Other alteration-cycle-related keys are described in Chapter 9.

In an embodiment, except as otherwise specified, whenever the user's most recent action was not an actuation of an alteration-cycle-related key, the currently alterable decision is the "most relevant" alterable interface decision as defined below. (In an embodiment, the most relevant alterable decision is often, but not always, the most recent alterable decision, as is explained in Chapter 3.)

In an embodiment, when a user actuates the alteration key or some other alteration-cycle-related key, if the user's most recent previous action was not an actuation of an alteration-cycle-related key, then the interface will determine an "alteration cycle" that initially includes every alterable decision other than the currently alterable decision. The interface will continue to remember this alteration cycle until the user performs an action that is not an actuation of an alteration-cycle-related key, except as otherwise specified below. (Once the user performs an action that is not an actuation of an alteration-cycle-related key this alteration cycle is no longer relevant, so after that, the next time the user actuates an alteration-cycle-related key, the interface will determine a new, updated alteration cycle.)

In an embodiment, when a user performs an actuation of the alteration key that causes the currently alterable decision to revert to its default option, the interface will "move on to the next decision in the alteration cycle." When the interface moves on to the next decision in the alteration cycle, this means that if any decisions remain in the alteration cycle, then the most relevant decision that is in the alteration cycle will be removed from the alteration cycle and will become the new currently alterable decision. This is illustrated by Actuation 2 of FIG. 2A, which not only causes an alterable decision to revert to its default option but also causes a different alterable decision to become the new currently alterable decision. Thus, in an embodiment, if a user does not notice that a particular alterable decision had an undesired outcome until after the interface has made other alterable decisions, then as long as that particular decision is still alterable, it is still possible for the user to correct the mistake by means of the alteration key: the user can repeatedly press the alteration key sufficiently many times to cycle past any more relevant alterable decisions (which are, in most cases, the more recent alterable decisions) and then press the alteration key again to alter the decision that had the undesired outcome.

In an alternative embodiment, when a user performs an actuation of the alteration key that causes the currently alterable decision to revert to its default option, if any decisions remain in the alteration cycle, then the interface will move on to the next decision in the alteration cycle as described in the preceding paragraph, and will also alter the new currently alterable decision (if any). (In such an embodiment, it may be particularly advantageous to have a No key or Escape key that can revert the currently alterable decision to its default option without affecting any other alterable decision, as is described in Chapter 9.)

In an embodiment, if no decisions are in the alteration cycle when the interface moves on to the next decision in the alteration cycle, then there will cease to be a currently alterable decision and this alteration cycle will no longer be relevant, as is illustrated by Actuation 5 in FIG. 2A. In an embodiment, after this happens, if the user's next action is an actuation of the alteration key, then that actuation of the alteration key will have the same effect as though it were a nonconsecutive actuation of the alteration key: the most relevant alterable decision will become the currently alterable decision, and the interface will determine a new, updated alteration cycle. This behavior is illustrated by Actuation 6 in FIG. 2A, which returns the user's input to its initial state so that a seventh consecutive actuation of the alteration key would have the same effect that Actuation 1 had. Thus, in such an embodiment, by continuing to actuate the alteration key consecutively, a user may repeatedly cycle through alterable interface decisions.

In an alternative embodiment, if no decisions are in the alteration cycle when the interface moves on to the next decision in the alteration cycle, then there will cease to be a currently alterable decision, and any further consecutive actuations of the alteration key will have no effect: there will be no currently alterable decision until after the user performs an action that is not an actuation of an alteration-cycle-related key.

In another alternative embodiment, if no decisions are in the alteration cycle when the interface moves on to the next decision in the alteration cycle, then the most relevant alterable decision will become the new currently alterable decision (even if it was the previous currently alterable decision) and the interface will add every alterable decision other than that decision to the alteration cycle. In such an embodiment, by continuing to actuate the alteration key consecutively, a user may repeatedly cycle through alterable interface decisions without arriving at any intermediate state in which there is no currently alterable decision.

In an embodiment that behaves as described in the preceding paragraphs, when a user is actuating the alteration key repeatedly, the alteration cycle contains all the alterable decisions that have not yet become the currently alterable decision. It will be evident to those of ordinary skill in the art that alternative embodiments can be constructed where the interface behaves the same way as an embodiment that has an alteration cycle as described above, but where this interface behavior is achieved by a slightly different means. For example, in one alternative embodiment, instead of keeping track of an alteration cycle that contains all the alterable decisions that have not yet become the currently alterable decision, the interface keeps track of a "used decision list" of all the alterable decisions that have already become the currently alterable decision, and when the interface "moves on to the next decision in the alteration cycle," this means that first the currently alterable decision is added to the used decision list, and then if there are any remaining alterable decisions that are not in the used decision list then the most relevant remaining alterable decision becomes the new currently alterable decision.

Specialized Alteration Cycles

Farther below, certain user actions are described such that when a user performs the action, the interface will alter an alterable interface decision that fits certain criteria, in some embodiments. Unless otherwise specified, when performing an action is said to cause the interface to alter an alterable interface decision that fits certain criteria, this means that the action serves the purpose of an alteration key that affects only alterable decisions that fit the criteria, in an embodiment (regardless of whether the embodiment has an alteration key).

In other words, if performing an action is said to cause the interface to alter an alterable interface decision that fits certain criteria, this means that in an embodiment, when the user performs such an action, if the user's previous action was not the exact same action, then the interface will alter the most relevant alterable decision that fits the criteria, and will determine and remember a specialized alteration cycle that includes any other alterable decisions that fit the same criteria. If the user then performs the exact same action several more times consecutively, then after the interface reverts the most relevant decision that fits the criteria to its default option, the interface will begin to cycle through the options of the other alterable decisions in the specialized alteration cycle.

For example, in an embodiment that is described in Chapter 25, a spoken alteration command exists such that if a user says "Alter 'its'" then the interface will alter an alterable interface decision pertaining to an occurrence of the word "its," if any such alterable decision exists. Where that interface behavior is explained, it is not explicitly specified what will happen if a user says "Alter 'its'" when more than one alterable decision exists that pertains to an occurrence of the word "its"; nevertheless, even though it is not explicitly specified below, in light of the above paragraphs it is to be understood that, in an embodiment, in such circumstances the interface will alter the most relevant alterable decision that pertains to an occurrence of the word "its," and then if the user repeats the same spoken command sufficiently many times consecutively, the interface will eventually cycle through every alterable decision that pertains to an occurrence of the word "its."

Repeated Alteration Features in Perspective

In some embodiments, a user may be able to correct a wide variety of mistakes with just a single actuation of the alteration key, with no need to explicitly specify what mistake to correct or what correction is desired, because in many cases the currently alterable decision will be the mistake the user wishes to correct and the first alternate option will be the desired correction. The alteration key may therefore be advantageous even in an embodiment where only a first actuation of the alteration key has any effect.

However, the alteration key may be significantly more advantageous in an embodiment where additional consecutive actuations of the alteration key have additional effects as described above. In such an embodiment, when a first actuation of the alteration key makes a different change than the one a user desires, additional consecutive actuations of the alteration key may revert the undesired change and/or make the desired change. It is usually possible to actuate a single key multiple consecutive times relatively quickly, so actuating the alteration key several consecutive times in order to achieve a desired result may still be a fairly efficient way to achieve that result. Likewise, for similar reasons, various other means of alteration that are described below may be more advantageous in an embodiment where additional consecutive alterations may have additional effects.

Chapter 3: Alteration Probability Alteration Probability

In an embodiment, when the interface makes an alterable decision, the interface will assign to that decision a "probability of alteration" that reflects the approximate ratio of the mathematical probability that a user will wish to select the single most desirable alternate option of the decision to the mathematical probability that the user will wish the default option to remain selected, insofar as the interface is able to determine such a ratio. Such an embodiment will be said to have "the alteration probability feature."

(For most purposes, the probability of alteration of an alterable decision may be thought of as reflecting the approximate probability that a user will wish to alter that decision, insofar as the interface is able to determine such a probability. This is a simpler explanation of the probability of alteration than the one given in the preceding paragraph, and works out to be essentially the same thing except when there is a reasonably high probability that a user will wish to select an alternate option of the decision other than the most desirable alternate option of the decision.)

In an embodiment, the "most relevant" alterable interface decision is the alterable decision that has the highest probability of alteration; if more than one alterable decision is tied for the highest probability of alteration, the "most relevant" alterable interface decision is the most recent decision among the decisions that have the highest probability of alteration. In such an embodiment, an alterable decision is "more relevant" than another decision if it has a higher probability of alteration or if it has an equal probability of alteration and is more recent. Thus, in such an embodiment, if the embodiment has an alteration key, then a first actuation of the alteration key will alter the most recent alterable interface decision unless some other alterable interface decision currently has a higher probability of alteration.

In an alternative embodiment, the "most relevant" alterable interface decision is simply the most recent alterable decision, and an alterable decision is "more relevant" than another decision if it is more recent.

Figure 3:
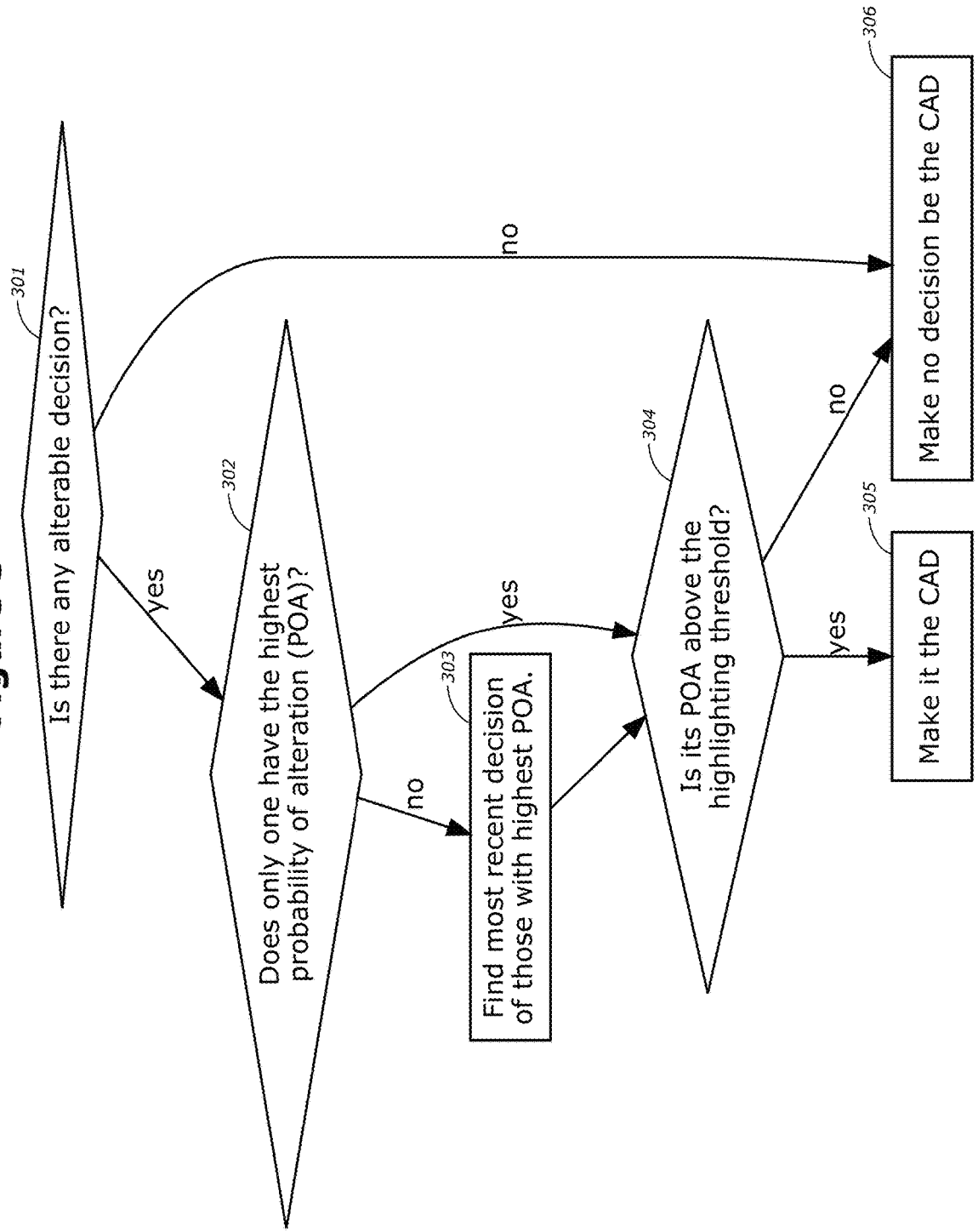
FIG. 3 is a flowchart that illustrates in detail how the currently alterable decision is determined, according to one embodiment.
Figure 5:
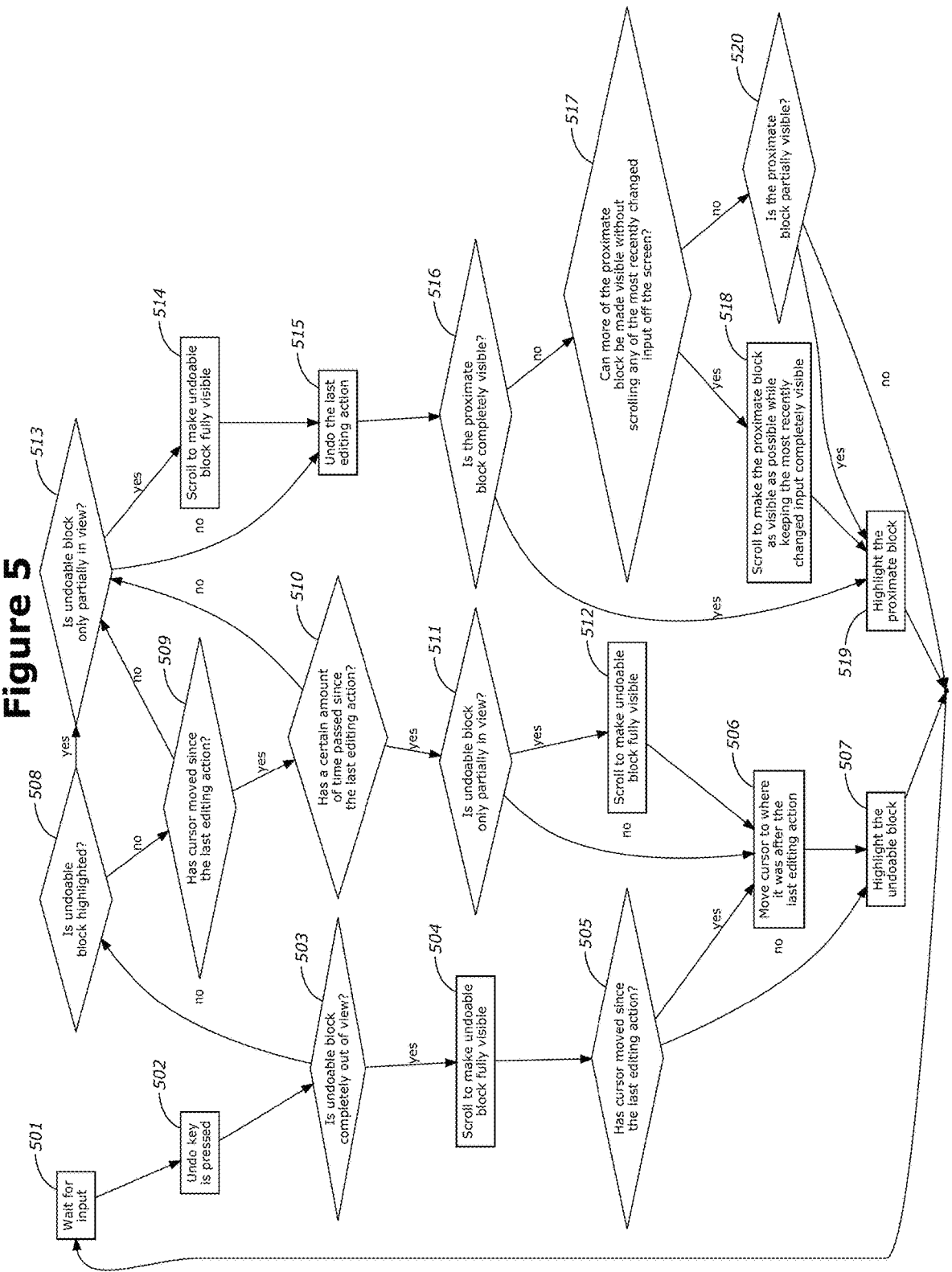
FIG. 5 is a flowchart that illustrates, according to one embodiment, how an interface will react when an Undo key is pressed, with particular attention to how the interface will attempt to make undo changes visible for the user.

FIG. 3 is a flowchart that illustrates in detail how the currently alterable decision is determined, in an embodiment. Block 301 asks, "Is there any alterable decision?" If the answer is yes, then the algorithm proceeds to Block 302, which asks, "Does only one have the highest probability of alteration (POA)?" If more than one alterable decision is tied for the highest probability of alternation, then the answer is no, and the algorithm proceeds to Block 303, which states "Find most recent decision of those with highest POA." The most recent decision is then evaluated using the question in Block 304, "Is its POA above the highlight threshold?" If only one alterable decision has the highest probability of alteration, the answer to the question in Block 302 is yes, and that alterable decision is evaluated using the question in Block 304. If the answer to the question in Block 304 is yes, the alterable decision being considered becomes the currently alterable decision (Block 305). If the answer is no, then no decision will be the currently alterable decision (Block 306). Similarly, if there is no alterable decision initially, then the answer to the question in Block 301 is no and the algorithm proceeds directly to Block 306, which states, "Make no decision be the CAD."

Alteration Probability in Perspective

Generally, if there is a high probability that an interface decision had an undesirable outcome, then it is desirable for the interface to make it as easy as possible for the user to notice the outcome and to alter the outcome if necessary. If there is a moderately low probability that an interface decision had an undesirable outcome, then it is still desirable for the interface to make it easy for the user to alter the outcome if necessary, but it is not as high a priority: for such a decision, it may be more important for the interface to ensure that alteration functionality pertaining to such a decision does not inconvenience the user in any way. It may thus be advantageous to treat alterable decisions somewhat differently depending on their probabilities of alteration.

In various places, the present specification will explain features that treat alterable decisions differently depending on their probabilities of alteration. For example, in an embodiment that has various features that are described in Chapter 13, if, say, the interface has made an alterable autocorrection decision pertaining to a text message, and at the moment when the user attempts to send the message the interface estimates that there is still about a 40% chance that the user wishes to alter that decision, then the interface will prominently highlight the outcome of the decision and will delay sending the message so as to give the user ample opportunity to alter the decision if desired. If the interface estimates that there is only a 4% chance that the user wishes to alter a decision, then it will highlight the outcome of the decision more subtly and will not delay sending a message on account of the decision. If the interface estimates that there is only a 0.4% chance that the user wishes to alter a decision, then it will not even highlight the decision unless the user enters a special alterable decision review mode. In an embodiment that has such functionality, it may be quite advantageous for probabilities of alteration to be roughly accurate in the aggregate, so that it will be quite common for users to wish to alter decisions that have very high probabilities of alteration and not at all common for users to wish to alter decisions that have very low probabilities of alteration.

However, even though it may be advantageous for probabilities of alteration to be roughly accurate in the aggregate, it may not be necessary for probabilities of alteration to be especially fine-tuned. As is mentioned in the preceding paragraph, in an embodiment, there may be an easily noticeable distinction in the way the interface treats an alterable decision depending on whether the interface estimates that there is a 40% chance or a 4% chance or a 0.4% chance that the user wishes to alter the decision; however, there need not be much distinction between the way the interface treats an alterable decision when the interface estimates that there is, say, a 10% chance that the user wishes to alter the decision versus the way it treats a decision when it estimates there is a 20% chance. For that reason, probabilities of alteration may be quite serviceable even if they are only roughly accurate. Besides, even if the probability of alteration that is assigned to a particular alterable decision is wildly unrealistic, this will not directly cause a mistake: at worst, a probability of alteration that is far too high will cause the interface to unnecessarily distract and delay the user; and at worst, a probability of alteration that is far too low will prevent the interface from calling the user's attention to a potential mistake, or may make it slightly less convenient for the user to correct the mistake by means of alteration functionality if it is indeed a mistake, but generally will not present any disadvantages compared to prior art interfaces that do not have alteration functionality at all.

Generally, in discussing functionality that pertains to probabilities of alteration, the present specification will describe quite precisely what the factors are that affect probabilities of alteration in some embodiments, but will not necessarily quantify the degree to which these factors affect probabilities of alteration with especial precision. It is to be understood that such functionality generally need not necessarily be calibrated carefully in order to yield significant advantages over prior art; however, those of ordinary skill in the art will understand how to calibrate such functionality carefully if desired. For example, an interface behavior is described below such that each time time a user inputs a character or otherwise performs an editing action that does not pertain to alteration functionality or undo functionality, the interface will slightly decrease all probabilities of alteration. In an embodiment that has such functionality, if an alterable decision is highlighted because its probability of alteration is above a certain highlighting threshold (as is described in Chapter 5), and a user sees that the alterable decision is highlighted but ignores it and keeps on typing, after a while the alterable decision will no longer be highlighted. Whether the relevant functionality is calibrated in such a way that an alterable decision that originally has a very high probability of alteration remains highlighted for five keystrokes, or whether it is calibrated in such a way that the decision remains highlighted for 50 keystrokes, such functionality may be advantageous in that it may call a user's attention to potential mistakes yet will not continue to distract the user indefinitely. Those of ordinary skill in the art will understand how to ask users their preferences and how to calibrate such highlighting functionality so as to suit the preferences of an average user of a particular computing device, but such careful calibration may not be necessary in order to yield significant advantages.

In various places throughout the present specification, descriptions of various features include explanations of how the features interact with the probabilities of alteration of alterable decisions, under the implicit assumption that such features will be included in an embodiment that also has the alteration probability feature. Such features may be especially advantageous in an embodiment that has the alteration probability feature, but many of these features may still be advantageous even in an embodiment that does not have the alteration probability feature. Where the description of a feature in the present specification implicitly assumes that alterable decisions have probabilities of alteration, it will be obvious to those of ordinary skill in the art how such a feature can be simplified for inclusion in an embodiment that does not have the alteration probability feature. Generally, in an embodiment that does not have the alteration probability feature, every alterable decision can always be treated as though it had, say, a medium probability of alteration, even though alterable decisions do not actually have individual probabilities of alteration in such an embodiment. In such an embodiment, any circumstances that are said herein to cause the interface to substantially reduce a decision's probability of alteration may instead cause the interface to delete the decision outright (which means that the decision will no longer be alterable). In such an embodiment, any interface decision that is described herein as an alterable decision with a very low probability of alteration may instead be implemented as an interface decision that is not alterable. For example, features are described below such that in an embodiment, an alterable decision is highlighted only when its probability of alteration exceeds a certain threshold, and probabilities of alteration tend to gradually decrease over time; in an alternative embodiment that does not have the alteration probability feature, such features can be simplified so that in an embodiment, every alterable decision is always highlighted, and each alterable decision ceases to be alterable after, say, 10 seconds.

Option Probability

In an embodiment, when an alterable interface decision is a multi-alternative decision, the interface may assign individual probabilities of alteration to the various alternate options of that multi-alternative decision, where each such probability of alteration refects the approximate ratio of how probable it is that a user will wish to select that alternate option to how probable it is that the user will wish the default option to remain selected, insofar as the interface is able to determine such a ratio. Such an embodiment will be said to have "the individual option probability feature." For example, if the interface makes a decision among five options and determines that the five options are approximately equally desirable, then regardless of which option becomes the default option, all four of the alternate options will be assigned very high probabilities of alteration. In an embodiment, the probability of alteration that is assigned to a multi-alternative decision will equal the probability of alteration of its alternate option that has the greatest probability of alteration.

In an embodiment, for some or all multi-alternative decisions, the sequence in which the various alternate options of a multi-alternative decision will be selected if the interface repeatedly alters the decision is determined by the probability of alteration of the various alternate options: each time the interface alters the decision, it will replace the currently selected option with the alternate option that has the highest probability of alteration among the options that have not been selected yet, or select an alternate option that is tied for the highest probability of alteration among the options that have not been selected yet, until every option has been selected. Such an embodiment may more frequently enable a user to achieve a desired outcome with fewer keystrokes.

In various places, the present specification will explain how to assign appropriate probabilities of alteration to the alternate options of various multi-alternative decisions. It is to be understood that whenever the present specification explains how to assign appropriate probabilities of alteration to alternate options, such explanations may alternatively be interpreted as explanations of how to arrange alternate options in an appropriate sequence, and so these explanations may also be applicable (with appropriate modifications) even in an embodiment that does not have the individual option probability feature.

In an embodiment that has the alteration probability feature but does not have the individual option probability feature, every alternate option of any particular alterable interface decision may be treated as having the same probability of alteration that is assigned to the decision itself. Thus, whenever the present specification explains interface behaviors that take into account the probabilities of alteration of individual options of alterable interface decisions, it is to be understood that in an alternative embodiment that has the alteration probability feature but does not have the individual option probability feature, each reference in the present specification to the probability of alteration of an individual option of an alterable interface decision may instead be interpreted as a reference to the probability of alteration of the decision itself. For example, for such an embodiment, where the present specification refers to "each alternate option that has a probability of alteration that is above the alteration hint threshold," this may be understood to mean "each alternate option that is an option of an alterable interface decision that has a probability of alteration that is above the alteration hint threshold."

Representing Probabilities of Alteration

In order to implement the alteration probability feature, it is not necessary to represent a probability of alteration in terms of an actual mathematical probability between 0% and 100%; it is necessary only to represent a probability of alteration in a form such that it is possible to distinguish between relatively high probabilities and relatively low probabilities. For example, in an embodiment, the probability of alteration of each alterable interface decision is initially an integer value between 1 and 5 inclusive, where 1 represents a very low probability of alteration and 5 represents a very high probability of alteration.

For certain purposes that are described below, it may occasionally be advantageous for the interface to be able to determine an approximate mathematical probability that corresponds to a particular probability of alteration. Therefore, in an embodiment, the interface will have a conversion table or some other conversion algorithm for converting a probability of alteration from its usual representation to a representation in terms of the mathematical percentage chance that a user who desires either that particular alternate option or the default option will prefer that particular alternate option over the default option. For example, in an embodiment, the interface will determine that a probability of alteration of 5 or more corresponds to approximately a 50% chance that a user will prefer that particular alternate option over the default option (provided that the user does not prefer some other alternate option over the both of them), a probability of alteration of at least 4 but less than 5 corresponds to approximately a 25% chance that a user will prefer that particular alternate option over the default option, a probability of alteration of at least 3 but less than 4 corresponds to approximately a 10% chance, and so forth.

Conversely, in an embodiment, the interface will have a conversion table or some other conversion algorithm for converting a mathematical percentage chance back to a probability of alteration represented in its usual form. For example, in an embodiment, if the interface has somehow determined that there is at least a 20% chance but less than a 40% chance that a user will prefer a particular alternate option over the default option, then the interface will assign that alternate option a probability of alteration of 4.

Those of ordinary skill in the art will understand that any such conversion algorithms can be made more accurate by collecting usage data. For example, an interface designer may initially estimate that for any single-alternative interface decision that has a probability of alteration equal to 3.0 there is approximately a 10% chance that a user will select the alternate outcome of that decision, but may later collect usage data that indicates that users actually select alternate outcomes of such decisions only 2.4% of the time. However, many features described herein were designed with the expectation that probabilities of alteration will be approximate, so conversion algorithms may be quite serviceable even if the interface designer does not go to great lengths to maximize their accuracy.

In an embodiment, for a multi-alternative alterable decision, in certain circumstances, the interface will determine the overall percentage chance that a user will prefer each particular option over all the other options of the decision (as opposed to just the percentage chance the user will prefer that option over the default option provided that the user does not prefer some other option over the both of them). These overall percentage chances may be derived from the mathematical percentage chance that the user will prefer each particular option over the default option; for example, if an alterable decision has two alternate options, and for one of the alternate options there is a 10% chance that a user who desires either that option or the default option will desire that option (and thus a 90% chance that the user will prefer the default option), and for the other there is a 20% chance that the user will prefer that option over the default option (and thus an 80% chance that the user will prefer the default option), then the ratio of the first option's overall percentage chance to the default option's overall percentage chance equals the ratio 10%:90%, and the ratio of the second option's overall percentage chance to the default option's overall percentage chance equals the ratio 20%:80%, and the sum of these three overall percentage chances equals 100%; from this information three equations can be constructed that involve the three overall percentage chances of the three options, and this system of three equations with three variables can be solved by straightforward algebra. Conversely, in an embodiment, for a multi-alternative alterable decision, in certain circumstances, the interface will determine the percentage chance that a user will prefer each particular option over the default option by deriving this from the ratio of the overall percentage chance that the user will prefer that option over all the others to the overall percentage chance that the user will prefer the default option over all the others.

Probability Reduction

In an embodiment, the interface may change the probability of alteration of an alterable interface decision that was previously created, for various reasons.

In an embodiment, when a user explicitly selects an option of an alterable interface decision, or when a user completes review of an alterable interface decision, the interface will drastically decrease the probability of alteration of that decision (and each of its options) so that decision's probability of alteration will become extremely low. In an embodiment, the interface will decrease the probability of alteration by a sufficient amount in such circumstances that even if a first alterable interface decision initially has a very high probability of alteration and a second alterable interface decision initially has a very low probability of alteration, once a user has explicitly selected an option of the first decision or completed review of the first decision but has not yet thus interacted with the second decision, the first decision will have an even lower probability of alteration than the second decision.

In an embodiment, the amount by which the interface reduces probabilities of alteration when a user explicitly selects an option of an alterable interface decision is substantially more than the amount by which the interface reduces probabilities of alteration when a user completes review of an alterable interface decision.

Whenever the present specification describes an embodiment in which the interface will greatly reduce a decision's probability of alteration in certain circumstances, it is to be understood that in an alternative embodiment, the interface will instead delete a decision in such circumstances. For example, the preceding paragraphs are to be understood to mean that in an alternative embodiment, when a user explicitly selects an option of an alterable interface decision or completes review of an alterable interface decision, the interface will delete the decision.

In Chapter 12, other circumstances are described in which the interface will reduce probabilities of alteration, in some embodiments. For example, in an embodiment, each time the user inputs a character or otherwise performs an editing action that does not pertain to alteration functionality or undo functionality, the interface will slightly decrease all probabilities of alteration. As a result, the interface may sometimes consider a recent alterable decision to be more relevant than an alterable decision that is not very recent even if the recent decision has a lower probability of alteration than the other decision initially had. This behavior and other behaviors that pertain to reducing probabilities of alteration are described in more detail in Chapter 12.

For example, in one possible embodiment, every probability of alteration is represented in the memory of a computing device as a signed numeral that is initially an integer between 1 and 5 inclusive. When a user explicitly selects an option of an alterable interface decision, the probability of alteration of that decision (and each of its options) decreases by 20. When a user completes review of an alterable interface decision, the probability of alteration of that decision (and each of its options) decreases by 10. When a user inputs a character or otherwise performs an editing action that does not pertain to alteration functionality or undo functionality, the probability of alteration of all previously existing alterable decisions (and each of their options) decreases by 0.2.

Identical Options

In an embodiment, if options of two distinct alterable interface decisions would yield the same result—that is, if selecting a particular option of one alterable interface decision would happen to yield a result that is exactly identical to the result that would be yielded by selecting a particular option of a different alterable interface decision-then whenever the interface changes the probability of alteration of either one of these options, the interface will also make a corresponding change to the probability of alteration of the other. In particular, when the user explicitly selects an option of either decision or completes review of either decision without selecting an option that yields the particular result, the interface will drastically decrease the probability of alteration of both options that would yield that result.

Deleting Irrelevant Options

In an embodiment, when the probability of alteration of an alterable interface decision becomes lower than a certain "deletion threshold," the interface will automatically delete the decision. In an embodiment, when the probability of alteration of an option of an alterable interface decision becomes lower than the deletion threshold, the interface will automatically delete that option, and if the alterable decision then has no remaining options other than the one that is currently selected, the interface will automatically delete the decision. Of course, in order for alterable decisions that initially have a "very low" probability of alteration to actually be alterable for a while, the deletion threshold should be even lower than a "very low" probability of alteration. In an embodiment, the deletion threshold will be equal to the probability of alteration that would be assigned to an alterable decision after the user completed review of the decision if the decision's probability of alteration had been very low before the user completed review.

In an embodiment, as an exception, when a user performs an action that pertains to alteration functionality, the interface will not delete any alterable decisions or options of alterable decisions due to their probabilities of alteration becoming lower than the deletion threshold until the user performs an action that does not pertain to alteration functionality.

In an embodiment, as another exception, if in some circumstances the only possible way for a user to achieve a certain result is by means of altering a particular alterable interface decision in order to select a particular option, then the interface will ensure that in such circumstances such an option and such a decision will not be deleted while they may still be relevant, either by ensuring that their probabilities of alteration will not fall below the deletion threshold, or by preventing the option or decision from being deleted even if its probability of alteration falls below the deletion threshold. For example, in an embodiment that is a calculator interface where a user can convert an answer to percentage form only by means of altering a particular alterable interface decision in order to select a particular option of that decision, the interface will prevent that option of that decision from being deleted until the user has moved on to the next problem.

In an alternative embodiment, the interface will instead simply delete an alterable decision after a certain minimum amount of time passes during which the user does not alter the decision (such as, in an embodiment, a minute). In another alternative embodiment, the user will delete an alterable decision after a certain minimum number of user actions occur during which the user does not alter the decision (such as, in an embodiment, 50 actions).

Automatic Alteration

In the present specification, every reference to "alteration" refers only to alteration of an alterable interface decision that occurs after the decision was made, in response to a subsequent user action; a single user action will not both cause the interface to make an alterable decision and also cause the interface to immediately alter that decision. "Automatic alteration" refers to what happens if a user action causes the interface to make an alterable decision and then a subsequent user action causes the interface to increase the probability of that alterable decision to a level that is so high that the interface decides to automatically alter the decision on its own initiative.

In the present specification, the "implicit default option probability" is the probability of alteration that would be assigned to an alternate option of an alterable interface decision if the interface determined that the alternate option was exactly as desirable an outcome as the default option. Ordinarily, a decision's probability of alteration will not exceed the implicit default option probability, because that would mean that the interface considered an alternate option to be more desirable than the default option, and that is not usually possible because the interface usually chooses the most desirable option to be the default option. However, in an embodiment, in some cases, after the interface makes an alterable interface decision, subsequent user actions may cause the interface to reevaluate the probability of alteration of the decision in light of new circumstances, which in some cases may cause a probability of alteration to exceed the implicit default option probability.

In an embodiment, after an alterable interface decision is made, if the probability of alteration of any alternate option of the decision subsequently becomes higher than a certain automatic alteration probability threshold, then the interface will automatically alter the decision so that the alternate option that had the highest probability of alteration becomes selected. (In case of a tie, the interface will alter the decision so that any such alternate option becomes selected.) Such an embodiment will be said to have "the automatic alteration feature."

In an embodiment, the automatic alteration probability threshold will be extremely high, so that it is very rare for an undesired automatic alteration to occur. In particular, in an embodiment, the automatic alteration probability threshold will be somewhat higher than the implicit default option probability, so that even if the interface comes to believe there is slightly above a 50% chance that a user desires for the alternate option of a previously made single-alternative alterable decision to become selected, the interface will not take the initiative to automatically alter the decision until it becomes even more confident that the user desires the alternate option. For example, in an embodiment, the implicit default option probability is 5.0, and no alterable interface decision will have a probability of alteration that initially exceeds 5.0, and the automatic alteration probability threshold is 6.0.

In most cases, after an interface has made an alterable interface decision, it will not be possible for subsequent user actions to cause the interface to increase the probability of alteration of that decision or any of its options very much. Furthermore, in an embodiment, the interface will generally tend to gradually decrease probabilities of alteration, as is described in Chapter 12. Therefore, in an embodiment where the probability threshold for the automatic alteration feature is very high, it may be very unusual for the interface to automatically alter a decision after the user has entered much more input-which may be advantageous: a very belated automatic alteration is very likely to be quite unexpected.

In an embodiment, after the interface automatically alters a decision, the option that becomes selected will subsequently be treated as the default option of that decision, and the former default option of that decision will be treated as an alternate option. However, when the interface automatically alters a decision, this does not mean that the user has "explicitly selected an option" of that decision, and so the interface will not drastically decrease the probability of alteration of that decision; on the contrary, such a decision will typically have a high probability of alteration after it is automatically altered, as is explained in the following paragraph.

In an embodiment, after the interface automatically alters a decision, the alternate option that had been the default option before the automatic alteration occurred will be assigned a probability of alteration that equals a very high probability of alteration minus the amount by which the decision's probability of alteration exceeded the automatic alteration probability threshold. Because a decision's probability of alteration will rarely exceed the automatic alteration probability threshold by much, after the interface automatically alters a decision, the option that had been the default option before the automatic alteration occurred will usually have a very high probability of alteration. (Of course, its probability of alteration will not be so high that a second automatic alteration will occur immediately and thus undo the first automatic alteration.) A very high probability of alteration may be desirable in such circumstances, not because it is especially likely that the user will wish to select that previously selected option-on the contrary, if it were likely, then automatic alteration would not have occurred—but because in the event that the user does wish to select that option, the user may be especially frustrated that the interface belatedly introduced a mistake, and so it may be especially desirable to facilitate noticing and correcting any such mistake.

Where the present specification recommends that an alterable interface decision be assigned a probability of alteration that is "very high," this should not be taken to mean that the interface might automatically alter that decision at any point—not unless the present specification explicitly mentions such a possibility.

The automatic alteration feature may generally be advantageous in an embodiment that has certain specific types of alterable decisions such that immediately subsequent user input can make it obvious that the original outcome of the alterable decision was the wrong outcome. For example, after the interface makes an alterable autocorrection decision, it is possible that the next word a user types could make it obvious to an autocorrection algorithm that the interface probably made the wrong decision, if the autocorrection algorithm makes use of data regarding how common certain word combinations are.

Score-Based Decisions

In an embodiment, in some cases, in order for the interface to decide between two or more possible outcomes, the interface will calculate for each outcome a value that is based on circumstances, and then the interface will select the outcome that has the highest such calculated value. Each such calculated value will be referred to herein as a "decision score," and such a decision will be referred to as a "score-based decision." The "score gap" of an option of such a decision equals the decision score of the default option minus the decision score of that option; the score gap of the default option thus equals zero.

In an embodiment, when the interface makes a score-based decision that is an alterable decision, the probability of alteration that is assigned to an alternate option of that decision will be high when the score gap of that alternate option is relatively low, and will be low when the score gap of that alternate option is relatively high; that is, if an option's decision score is almost as high as the decision score of the default option, then that option will be assigned a high probability of alteration, or if an option's decision score is much lower than the decision score of the default option, then that option will be assigned a low probability of alteration.

In an embodiment, for some or all score-based decisions, when such a decision is made, for each outcome that does not have the highest option score, that outcome will become an alternate option of the decision only if its option score is within a certain amount of the highest option score; in other words, if an outcome's score gap is more than a certain amount, then that outcome will not become an alternate option. Such a score-based decision will be an alterable decision if and only if it has at least one alternate option. Such a score-based decision will be referred to herein as a "conditionally alterable score-based decision."

In an embodiment, the exact details of the calibration of probabilities of alteration of score-based decisions are different for some types of score-based decisions than for others. For example, for one type of decision it may be common for decision scores to vary by hundreds of points, so when the decision score of an option of such a decision is just 20 points less than the default option's decision score, that option will be assigned a very high probability of alteration; for another type of decision, when the decision score of an option of such a decision is 20 points less than the default option's decision score, that option will be assigned a very low probability of alteration or eliminated altogether.

In an embodiment, in certain circumstances the interface may recalculate the decision scores of the options of a score-based decision after the user has performed additional actions. If the interface does so, then the interface will accordingly recalculate the probabilities of alteration of the alternate options of that decision. If an alternate option then comes to have a decision score that is higher than the decision score of the default option, then its score gap will be negative, and that alternate option will be assigned an extremely high probability of alteration. In an embodiment that has the automatic alteration feature, if an alternate option comes to have a decision score that exceeds the decision score of the default option by more than a certain amount, then that alternate option may be assigned such a high probability of alteration that the interface will automatically alter the decision, in which case the interface will recalculate the probabilities of alteration of the new alternate options of that decision based on how their decision scores compare to the decision score of the new default option. In an embodiment, after the interface automatically alters a score-based decision, it will add a bonus to the probability of alteration of the alternate option that had been the default option before the automatic alteration occurred (but not such a large bonus that a second automatic alteration will occur immediately).

Threshold Decisions

In an embodiment, in some cases, in order for the interface to decide between exactly two possible outcomes, the interface will calculate a value that is based on circumstances, and then the interface will select one outcome if that value exceeds a certain threshold value or the other outcome if it does not. Such a calculated value will be referred to herein as a "decision score," and such a decision will be referred to as a "threshold decision." For example, in an embodiment, if a user actuates the space bar twice consecutively, the interface will determine the amount of time that elapsed between the two consecutive actuations and will make a threshold decision whether to replace the first space character with a period character: the interface will replace the first space character with a period character if and only if the amount of time that elapsed is below a certain threshold value.

A threshold decision is essentially just a score-based decision that has exactly two possible outcomes where one outcome's decision score is based on circumstances and the other outcome's decision score serves as the threshold value. In the present specification, the term "decision score" in reference to a threshold decision will refer to the particular decision score that is based on circumstances and will not refer to the threshold value, unless otherwise specified.

Whenever a score-based decision is a decision between exactly two possible outcomes, any circumstances that increase the interface's tendency to choose one outcome will necessarily decrease the interface's tendency to choose the other outcome; increasing the decision score of one of the outcomes has essentially the same effect as decreasing the decision score of the other outcome. Any score-based decision between exactly two possible outcomes can therefore be implemented as a threshold decision: one outcome's decision score may be held constant and may thus serve as the threshold value, and the other outcome's decision score may be increased or decreased according to circumstances.

Because a threshold decision is a score-based decision, various interface behaviors pertaining to score-based decisions that are described above are applicable to threshold decisions. In particular, in an embodiment, when the interface makes a threshold decision that is an alterable decision, the score gap is the magnitude of the difference between the decision score and the threshold value, and so the probability of alteration that is assigned to that decision will be high if the decision score is very close to the threshold value, or low if the decision score is much lower or much higher than the threshold value. In an embodiment, for certain threshold decisions, if the score gap is extremely high, then the decision will not be alterable; any such threshold decision will be referred to herein as a "conditionally alterable threshold decision." In an embodiment, in certain circumstances the interface may recalculate the decision score of a threshold decision after the user has performed additional actions, and if the decision score crosses the threshold value then the decision may be assigned an extremely high probability of alteration. In an embodiment that has the automatic alteration feature, if a recalculated decision score moves far enough across the threshold value, then the interface will automatically alter the decision. In an embodiment, after the interface automatically alters a threshold decision, it will add a bonus to the probability of alteration of the decision (but not such a large bonus that a second automatic alteration will occur immediately).

Various types of alterable decisions that are described farther below are explicitly said to be threshold decisions or otherwise score-based decisions. Adaptation functionality that is described in Part II may work quite well with threshold decisions: after a threshold decision has a non-beneficial outcome, such adaptation functionality may adjust the threshold value so as to potentially yield better results in the future.

Chapter 6: Touch Controls Touch Changes

The interface behavior described in the following paragraph will be referred to as "the touch alteration feature" in the present specification.

In an embodiment, if a user touches a highlighted alterable block, then the interface will alter that particular alterable interface decision. Therefore, in such an embodiment, if alteration works as described in Chapter 2, then the first time a user touches a highlighted alterable block that has not previously been altered, the interface will immediately alter that decision by replacing its default option with an alternate option, without prompting the user for any additional confirmation or clarification. In an embodiment, if after touching a highlighted alterable block the user's next action does not cause the interface to again alter that decision, then performing that next action constitutes "explicitly selecting an option" of that alterable interface decision. In an embodiment, if a user touches a highlighted alterable decision's alterable block more than once consecutively, then after any touch that caused the interface to select an alternate option, the next touch will cause the interface to select a different alternate option that was not selected yet if any such alternate option exists, or will cause the interface to revert the decision to its default option otherwise.

FIG. 6A is a flowchart that illustrates the behavior of an embodiment that has the touch alteration feature as described in the preceding paragraph. Block 601 says, "Interface highlights alterable block (FIG. 4B)" and proceeds to Block 602, which states, "Await user action." From there, the algorithm proceeds to Block 603, which asks, "Did user touch a highlighted alterable block?" If the answer is no, the interface simply handles the user action (Block 608). If the answer is yes, the algorithm proceeds to Block 604, which says, "Select alternate option that has not been previously selected" and then to Block 605, which says, "Await user action." From there, the algorithm proceeds to Block 606, which asks, "Did user touch the same highlighted alterable block again?" If the answer is no, the user has explicitly selected the current option of the alterable decision (Block 607) and the interface handles the action (Block 608). If the answer is yes, the algorithm proceeds to Block 609, which asks, "Have all alternate options been selected?" If the answer is no, the algorithm goes back to Block 604 and selects an alternate option that has not been previously selected and continues through the process as described above. If the answer is yes, the interface reverts the block to the default option, and the user has completed review of the alterable decision (Block 610).

In an alternative embodiment, the touch alteration feature will apply only when a user touches the highlighted alterable block of a highlighted alterable interface decision whose probability of alteration is above a certain threshold. In an embodiment, such a highlighted alterable block will be displayed differently than the highlighted alterable block of a highlighted alterable interface decision whose probability of alteration is below the threshold, so that a user can visually distinguish whether or not the touch alteration feature is applicable to any particular highlighted alterable decision.

In an embodiment, if a user touches a highlighted undoable block, the interface will respond as though the user actuated the Undo key; if a user touches a highlighted redoable block, the interface will respond as though the user actuated the Redo key. In an embodiment, if a user touches a highlighted multi-click block, the interface will respond as though the user actuated the relevant multi-click key again. In an embodiment, if a user touches a highlighted autocorrection block, the interface will perform that pending autocorrection. The interface behaviors described in the present paragraph, along with the touch alteration feature, are collectively referred to herein as "touch change features."

In an embodiment, if a highlighted changeable block contains no input and so the interface highlights a small region around the location of the changeable block in lieu of highlighting the changeable block itself, then touching that region counts as touching the highlighted changeable block for purposes of touch change features.

Touch Change Toggling

In an embodiment, in many cases, after a user touches a highlighted changeable block and thus invokes a touch change feature, a highlighted changeable block will then be present at the location the user just touched, and touching this highlighted changeable block will reverse the effect of the previous touch. For example, after a user touches a highlighted alterable block, in many cases that highlighted alterable block will continue to be present at the same location, and if it is the alterable block of a single-alternative alterable decision then touching the highlighted alterable block again will reverse the effect of the previous touch. After a user touches a highlighted undoable block, in many cases a highlighted redoable block will then be present where the highlighted undoable block previously was (in an embodiment where the redoable block is highlighted after an actuation of the Undo key), and touching the highlighted redoable block will reverse the effect of the previous touch. After a user touches a highlighted autocorrection block, in many cases a highlighted alterable block will then be present where the highlighted autocorrection block previously was (in an embodiment where autocorrections are alterable decisions), and touching the highlighted alterable block will reverse the effect of the previous touch. It may be desirable to enable a user to undo the invocation of a touch change feature by such means in even more cases, as is described in the following two paragraphs.

In an embodiment, after the touch alteration feature causes the interface to alter a particular alterable interface decision so that an alternate option of that decision becomes selected, if within a sufficiently short amount of time the user again touches the same location the user just touched, then the interface will again alter the same decision the interface just altered, even if for some reason that decision's alterable block is no longer at that location. For example, in such an embodiment, if the alteration that is triggered by touching a highlighted alterable block causes the highlighted alterable block to be entirely deleted, then for a short while, it will still be possible for the user to cause that alterable decision to revert to its default option by means of the touch alteration feature. In an embodiment, during this short amount of time in which touching the same location will cause the interface to alter the same decision, that location will be highlighted by some means; for example, that location may be a different color than surrounding input.

In an embodiment, when a user touches a highlighted autocorrection block and the interface performs the pending autocorrection, the resulting interface decision to perform that autocorrection is an alterable decision that is automatically assigned a probability of alteration that is above the highlighting threshold, so that if the user wishes to undo the autocorrection, the user can immediately do so by means of the touch alteration feature described above. However, in an embodiment, after a user touches a highlighted autocorrection block and the interface performs the pending autocorrection, once the user performs another action, if that next action is not an alteration of the alterable decision to perform that autocorrection, then the interface will consider the user to have explicitly selected the default option of that alterable decision, and so the interface will drastically decrease that alterable decision's probability of alteration and it will no longer be highlighted.

In an embodiment, the invocation of touch change features can also be reversed by another means in certain circumstances, as is described in Chapter 8, in the explanation of side-sliding changes.

Touch Alteration of Overlapping Blocks

In an embodiment, as is described in Chapter 5, the interface will not highlight an alterable block when it overlaps the alterable block of a highlighted alterable interface decision that has a higher probability of alteration, and in an embodiment, as is described in Chapter 3, the interface will drastically decrease an alterable decision's probability of alteration once the user has completed review of the decision, such as by cycling through all its options. Therefore, in an embodiment, if a user wishes to alter an alterable interface decision by means of the touch alteration feature when that decision's alterable block overlaps the alterable block of an alterable interface decision that has a higher probability of alteration, then the user may do so by touching the overlapping region sufficiently many times consecutively: initially, such touches will cause the interface to alter the decision that has the higher probability of alteration, which the user does not actually wish to alter; but eventually that decision will revert to its default option and its probability of alteration will be drastically decreased, so eventually the alterable decision that the user does wish to alter will have a higher probability of alteration than the other decision and will become highlighted, and then the user's next touch will cause the interface to alter that decision. Similarly, if a user wishes to alter a decision when that decision's alterable block overlaps multiple other alterable blocks, the user may repeatedly touch the overlapping region until all the other alterable decisions have a lower probability of alteration than the one the user wishes to alter, and then the user's next consecutive touch will cause the interface to alter that decision.

In an alternative embodiment where the interface will highlight an alterable block even when it overlaps the alterable block of an alterable interface decision that has a higher probability of alteration, or in an alternative embodiment where the interface does not drastically decrease an alterable decision's probability of alteration once the user has reviewed all its options, each time a user touches a highlighted alterable block, the interface will alter an alterable decision whose alterable block the user touched. In such an embodiment, touching that location will cause the interface to determine and remember a specialized alteration cycle that includes only alterable decisions whose alterable blocks overlap at that location, so that the user will be able to cycle through such decisions by repeatedly touching that location.

Touch Change Cancellation

In an embodiment, when a user touches a highlighted changeable block, the interface will immediately make the resulting change without waiting for the user to release the touch, but if while still holding the touch the user slides the point of touch more than a certain "previewing distance," then the interface will position the current text of the changeable block a little ways above the current point of touch and move it in parallel with the point of touch, so that the user is sliding around the current text of the changeable block. When the current text of the changeable block is slid away from its original location, the former text of the changeable block will be visible at that location, as is illustrated in the last panel of FIG. 6B. In an embodiment, if the user slides the current text of a highlighted changeable block more than a certain "cancellation distance" away from its original position and the point of touch is no longer on any portion of the original location of the highlighted changeable block, then that current text will disappear and the interface will undo the change to the changeable block. If the user releases the touch before sliding the current text that far away, the current text will return to its original location.

Figure 6B:
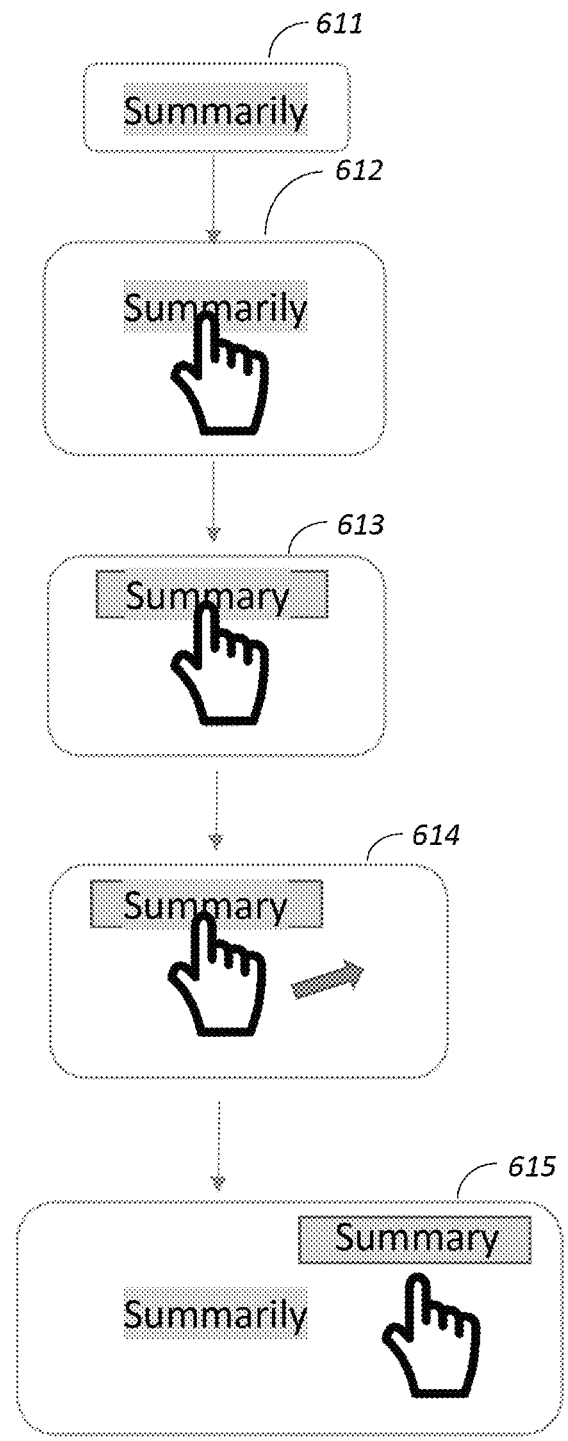
FIG. 6B illustrates an example of touch cancellation.
Figure 7A:
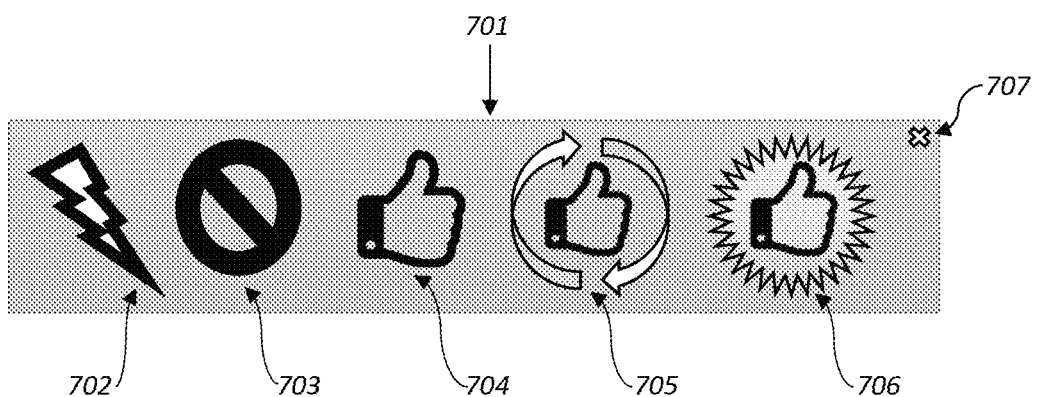
FIG. 7A illustrates an example of an alteration control panel.
Figure 7B:
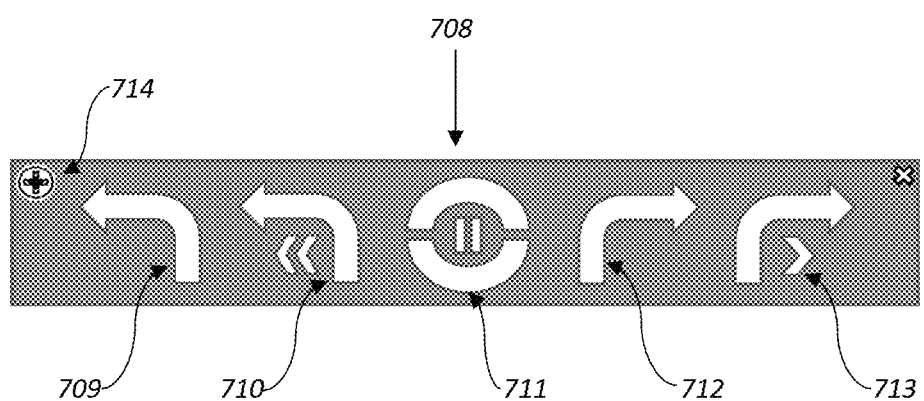
FIG. 7B illustrates an example of an undo control panel.
Figure 8B:
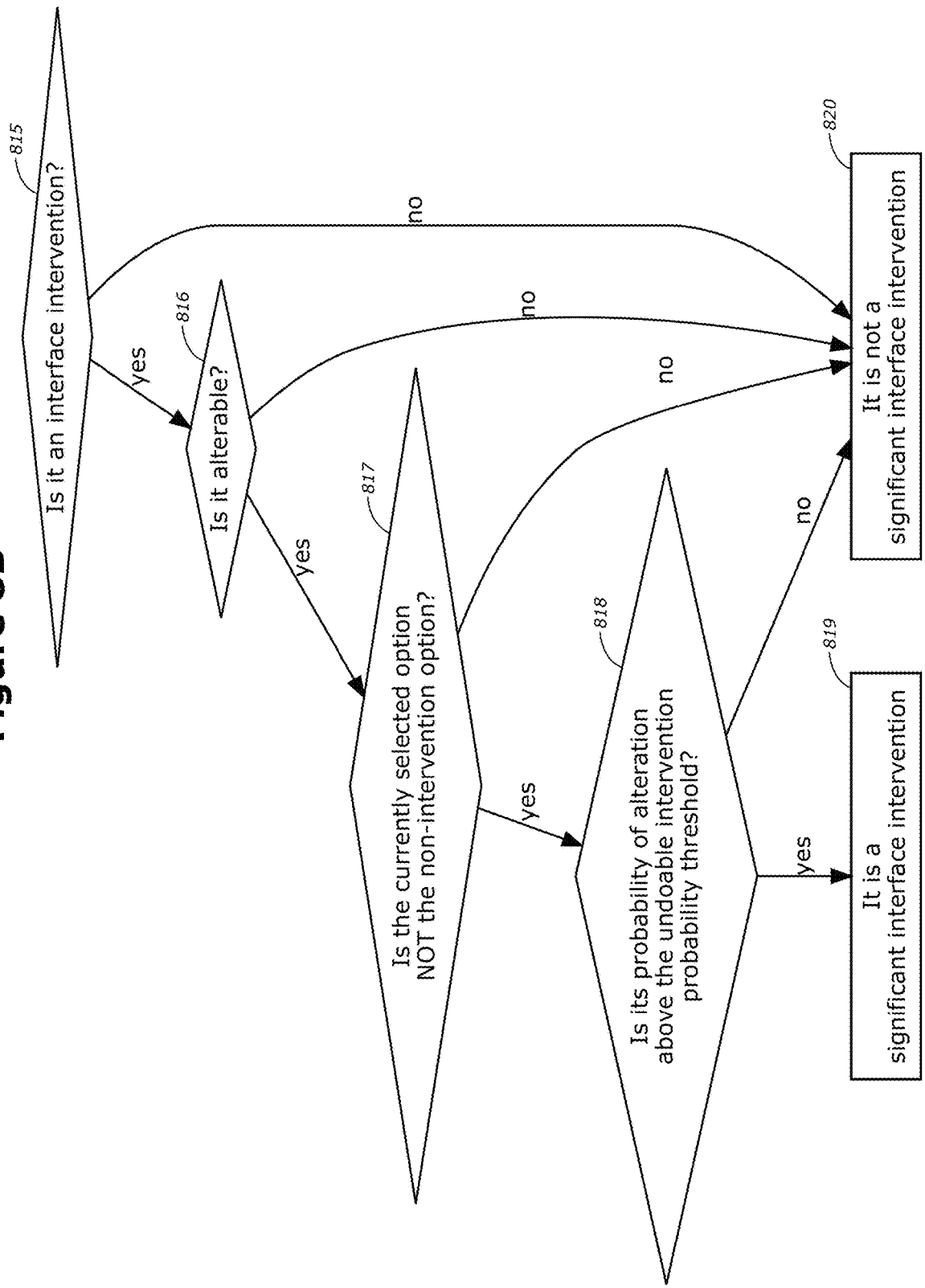
FIG. 8B is a flowchart that illustrates an example decision-making process for determining whether an interface intervention is significant.

FIG. 6B illustrates the behavior described in the preceding paragraph. After the interface highlights an alterable decision (Panel 611) and a user touches the highlighted alterable block (Panel 612), the interface immediately evinces the alternate option without waiting for the user to release the touch (Panel 613). While still holding the touch the user slides the point of touch more than the previewing distance from the highlighted alterable block (Panel 614), so the interface positions the current text of the changeable block a little ways above the current point of touch and moves the image as corresponds with the user's point of touch (Panel 615), and when the current text of the changeable block is slid away from its original location, the former text of the changeable block becomes visible at that location (Panel 615).

In an alternative embodiment, when a user touches a highlighted changeable block, the interface will immediately make the resulting change without waiting for the user to release the touch, but subsequently sliding the point of touch will not have any visible effect on the text of the changeable block; nevertheless, if before releasing the touch the user slides the point of touch more than a certain "cancellation distance" and the point of touch is no longer on any portion of the highlighted changeable block, then the interface will undo that change.

Those of ordinary skill in the art will understand that the behavior described in the preceding paragraphs may also be applied to various alternative embodiments that require various means of "touch" in order to invoke the touch alteration feature. For example, in an embodiment, a user who wishes to temporarily view an alternate option for a highlighted alterable interface decision without permanently altering the decision can do so by positioning the mouse cursor on the highlighted alterable block and pressing the left mouse button and then sliding the mouse cursor sufficiently far away from the highlighted alterable block before releasing the left mouse button.

In an embodiment, for purposes of the following paragraphs, touching a highlighted changeable block and then sliding the point of touch far enough to cause the interface to undo the change as described above constitutes "previewing" the changeable block.

In an embodiment, if a user previews a highlighted alterable block, this counts as explicitly selecting the option that had previously been selected for that highlighted alterable decision, which may cause the interface to reduce the probability of alteration of that alterable decision, which may cause the alterable block to no longer be highlighted.

In an embodiment, if a user previews a highlighted undoable block or redoable block, or if a user previews a multi-click block, this counts as performing an action that is not an actuation of the Undo key or Redo key and is not a multi-click key actuation, and so the undoable block, redoable block, or multi-click block that the user previewed will no longer be highlighted.

In an embodiment, if a user previews a highlighted autocorrection block, the interface will cancel the pending autocorrection, and so the portion of input that had constituted the autocorrection block will no longer be highlighted. However, in an embodiment, if the user's next action is an action that would have caused the pending autocorrection to occur had it not been canceled, then the interface's decision not to perform that autocorrection will be an alterable decision with a very low probability of alteration.

Touch Change Variants

In an alternative embodiment, when a highlighted changeable block can be altered by means of touch change features, that highlighted changeable block is outlined in such a way as to imply that the highlighted changeable block is currently acting as a button. Such behavior may make it easier for a user to become acclimated to touch change features.

In an alternative embodiment, if a user touches the portion of input that an alterable interface decision pertains to, then the interface will alter the most relevant alterable interface decision that the user thus touched even if it is not a highlighted alterable interface decision. Such behavior may make it easier for a user to alter a decision as desired in certain cases, but may also make it easy for a user to alter a decision accidentally, so it may or may not confer a net advantage.

Those of ordinary skill in the art will understand that various alternative embodiments may require various means of "touch" in order to invoke various touch change features. For example, in one embodiment the touch alteration feature is invoked if a user simply touches and releases a highlighted alterable block; in an alternative embodiment the touch alteration feature is invoked only if a user double-clicks a highlighted alterable block; in another alternative embodiment the touch alteration feature is invoked only if a user traces a small clockwise circle that begins and ends on a highlighted alterable block; in another alternative embodiment the touch alteration feature is invoked if a user simply touches and releases a highlighted alterable block, but only when the interface is in alterable decision review mode; and so forth. In one embodiment the same means of touch may invoke touch change features for highlighted alterable blocks, highlighted undoable and redoable blocks, highlighted multi-click blocks, and highlighted autocorrection blocks; in an alternative embodiment single-clicking suffices for a highlighted undoable block, but double-clicking is required for a highlighted alterable block, and touch change features do not work at all for highlighted multi-click blocks or highlighted autocorrection blocks; and so forth.

In an embodiment, more than one distinct touch gesture may exist such that if a user performs the touch gesture on the alterable block of an alterable interface decision, and the decision's probability of alteration is above an optional minimum threshold, then the interface will alter that decision; each such distinct gesture may correspond to a different such optional minimum threshold. For example, in an embodiment, a simple tap gesture will invoke the alteration of a decision only if the decision has a high probability of alteration, and some more complex touch gesture will invoke the alteration of any alterable decision whatsoever. In an embodiment, if the probability of alteration of an alterable interface decision is above any particular such threshold, then the alterable block of that alterable interface decision is displayed differently than the way it would be displayed if its probability of alteration were below the threshold, so that an experienced user can visually distinguish which touch gestures can be used to invoke the alteration of any particular alterable decision.

Diverse embodiments that have touch change features may have diverse advantages. On the one hand, it may be extremely advantageous to minimize the effort required to fix a mistake, so it may be extremely advantageous for the touch alteration feature to be invoked by simply touching and releasing the alterable block of any alterable decision that has a probability of alteration that is not especially low. On the other hand, if a previously existing interface is modified in such a way as to embody the invention, and so users are already familiar with a version of that interface that did not have the touch alteration feature, then it may be advantageous for the touch alteration feature to instead be invoked by a means that is sufficiently complex that users who are not familiar with the touch alteration feature will seldom invoke the touch alteration feature by mistake. For example, in an embodiment, the touch alteration feature can be invoked only when the interface is in alterable decision review mode, and the interface is in alterable decision review mode only while the user is touching the lower left corner of the display of the computing device; in such an embodiment, a user who becomes familiar with the touch alteration feature may come to think of touch alteration invocation as a single input gesture that requires two fingers, and may learn to invoke the feature quite rapidly, but a user who is unfamiliar with the touch alteration feature will seldom invoke the touch alteration feature by mistake.

In an embodiment, the means that is required to invoke the touch alteration feature can be reconfigured. For example, in an embodiment, the touch alteration feature either can be invoked only when the interface is in alterable decision review mode or can be invoked at any time, depending on the current value of a particular interface setting, so that an individual user can explicitly set the touch alteration feature to operate in a way that suits the individual user's preference. Likewise, in an embodiment, the means that are required to invoke various other touch change features can be reconfigured.

Touch Controls in Perspective

Generally, most prior art mistake recovery features require at least two touch gestures, such as a first touch to open a mistake correction menu and a second touch to select the desired outcome. In an embodiment, the touch alteration may generally enable faster correction of a wider variety of mistakes.

U.S. Pat. No. 8,074,172 appears to describe an iPhone feature such that just a single touch of an autocorrected word will undo the autocorrection, but as far as the present writer is aware, that particular feature has never actually been implemented in any of the publicly available iPhones covered by that patent, presumably because that feature as described would be disadvantageous in many cases: on a phone with such a feature, a single touch of a replacement word could instantly undo an autocorrection that was a desired autocorrection of a very obvious typographical error, which is a result that a typical user would not expect and would not desire. In various embodiments, the touch change features that are described herein may be more advantageous than that prior art feature in various ways. In particular, in an embodiment, touch change features are invoked by a simple tap gesture only when the relevant changeable block is highlighted and so merely tapping non-highlighted text will not cause an unexpected change, and autocorrections that have a very low probability of alteration are not highlighted and thus cannot be accidentally undone by a single touch; and in an embodiment, many other types of errors can be corrected by means of touch change features other than just undesired autocorrections.

It may be extremely advantageous for a user to be able to alter an alterable decision by means of a single quick action, so the touch alteration feature may be especially desirable in an embodiment that lacks an alteration key, and vice versa. However, it may be preferable for an embodiment to have both the alteration key and the touch alteration feature, so as to enable users to quickly alter alterable decisions by whatever means they find most convenient.

As is mentioned in the previous chapter, interface behaviors that are described herein that pertain to interface-specified changes may be advantageous when applied to one particular type of interface-specified change, but may have an additional synergistic advantage when applied to multiple types of interface-specified changes. In particular, the touch alteration feature may be advantageous in an embodiment that does not have any other touch change features, and the touch change feature that enables a user to undo an action by means of touching a highlighted undoable block may be advantageous in an embodiment that does not have any other touch change features, but there may be an additional synergistic advantage in having both the touch alteration feature and other touch change features so that for example a user who has become accustomed to touching a highlighted undoable block in order to undo an action may then find it relatively easy to understand that touching a highlighted alterable block will alter a decision.

Chapter 12: Measuring User Attention Eye Movement Tracking

Certain embodiments of the present invention may be computing devices that may have more than one display device; for example, an embodiment may be a desktop computer that may be connected to multiple monitors. For the sake of simplicity, the present specification generally refers to "the display" of a computing device, but it is to be understood that any such reference to "the display" may include more than one display device.

In an embodiment, for purposes of the interface behaviors described herein, the "focal location" is a precise location that the eye tracking technology of a computing device determines to be the location that the user is currently looking at, even if the eye tracking technology is somewhat inaccurate and so this focal location may actually be a certain distance away from the actual location that the user is currently looking at. The "focal zone" is a larger region, typically consisting of a circle that is centered on the focal location, such that the eye tracking technology is reasonably confident that the user is currently looking at a location within the focal zone. For example, in an embodiment that is a computing device that has eye tracking technology that is sufficiently accurate to determine within 3 cm where a user is looking with a reasonable degree of confidence, the focal zone consists of a circle with a 3-cm radius that is centered on the focal location. In an embodiment, as an exception, when eye tracking technology can determine with a reasonable degree of confidence that the user is not looking at the display of the computing device at all, the focal location is "offscreen," and the focal zone is also "offscreen." When the interface "can determine a focal location," this means that the interface has access to eye tracking technology and that either the eye tracking technology can currently determine a location to be the location that the user is currently looking at, or else the eye tracking technology can determine with a reasonable degree of confidence that the user is not looking at the display of the computing device at all.

Figure 9A:
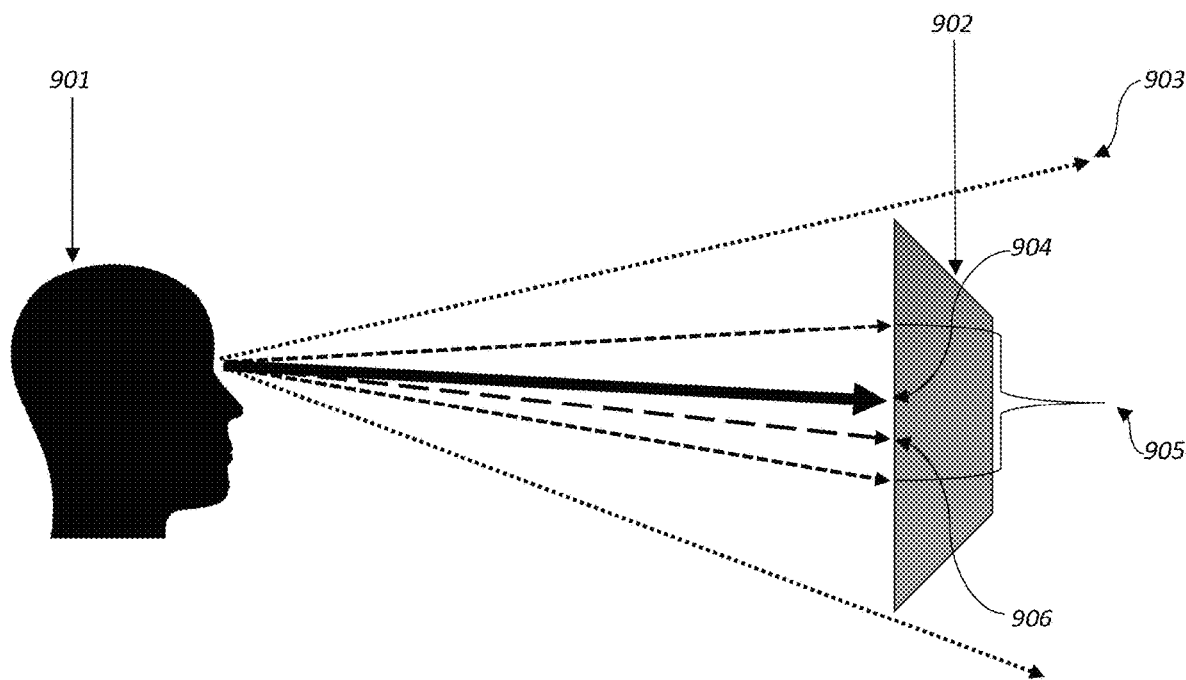
FIG. 9A illustrates a side-view of an interface user who is looking at a display device.
Figure 9B:
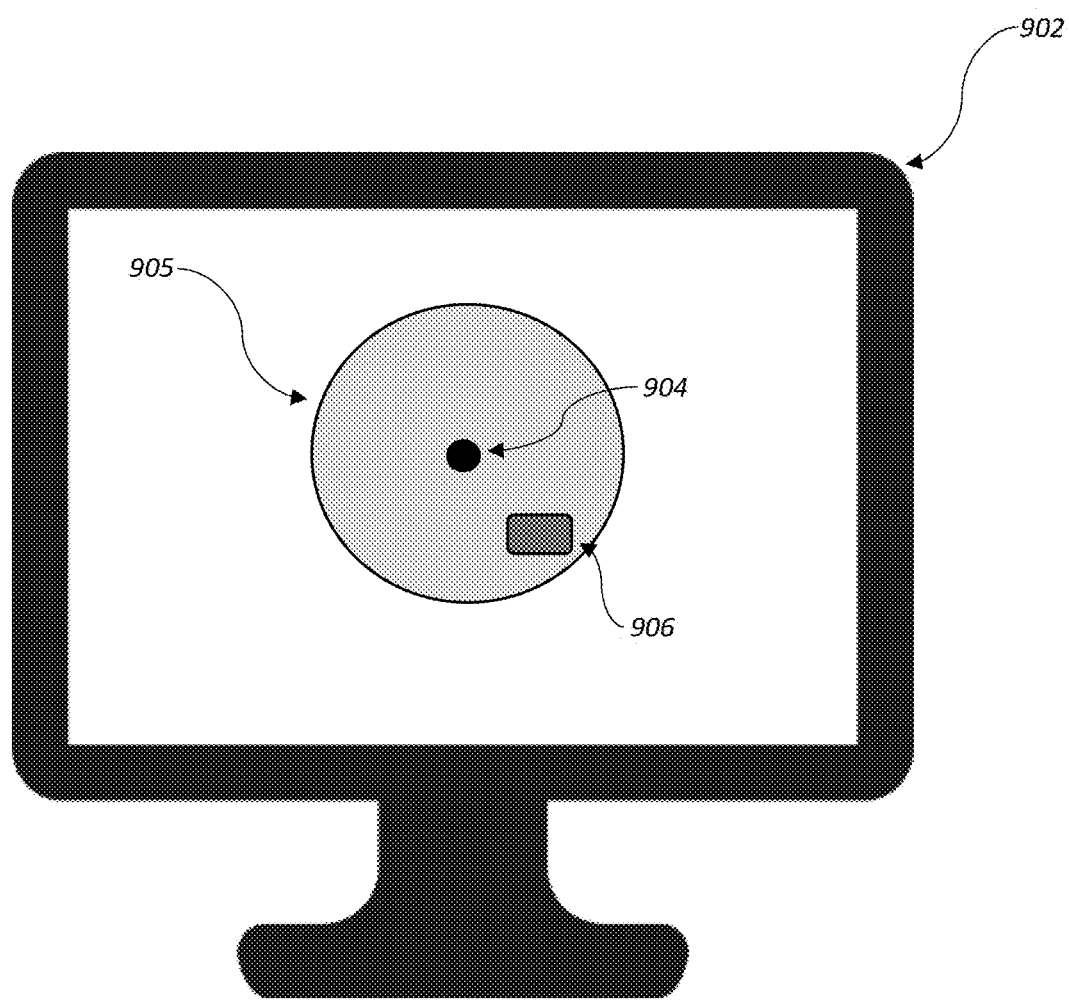
FIG. 9B is a front-facing view of the display device, including the target region and the focal zone centered on the focal location, according to one embodiment.
Figure 11B:
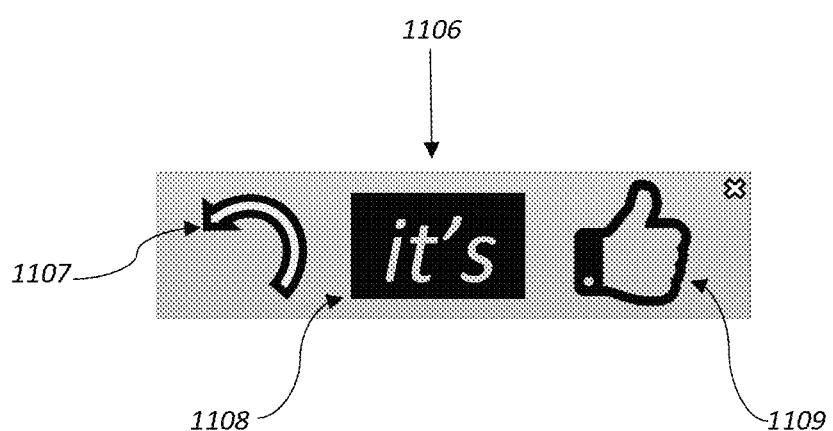
FIG. 11B illustrates an example remote alteration control.
Figure 13:
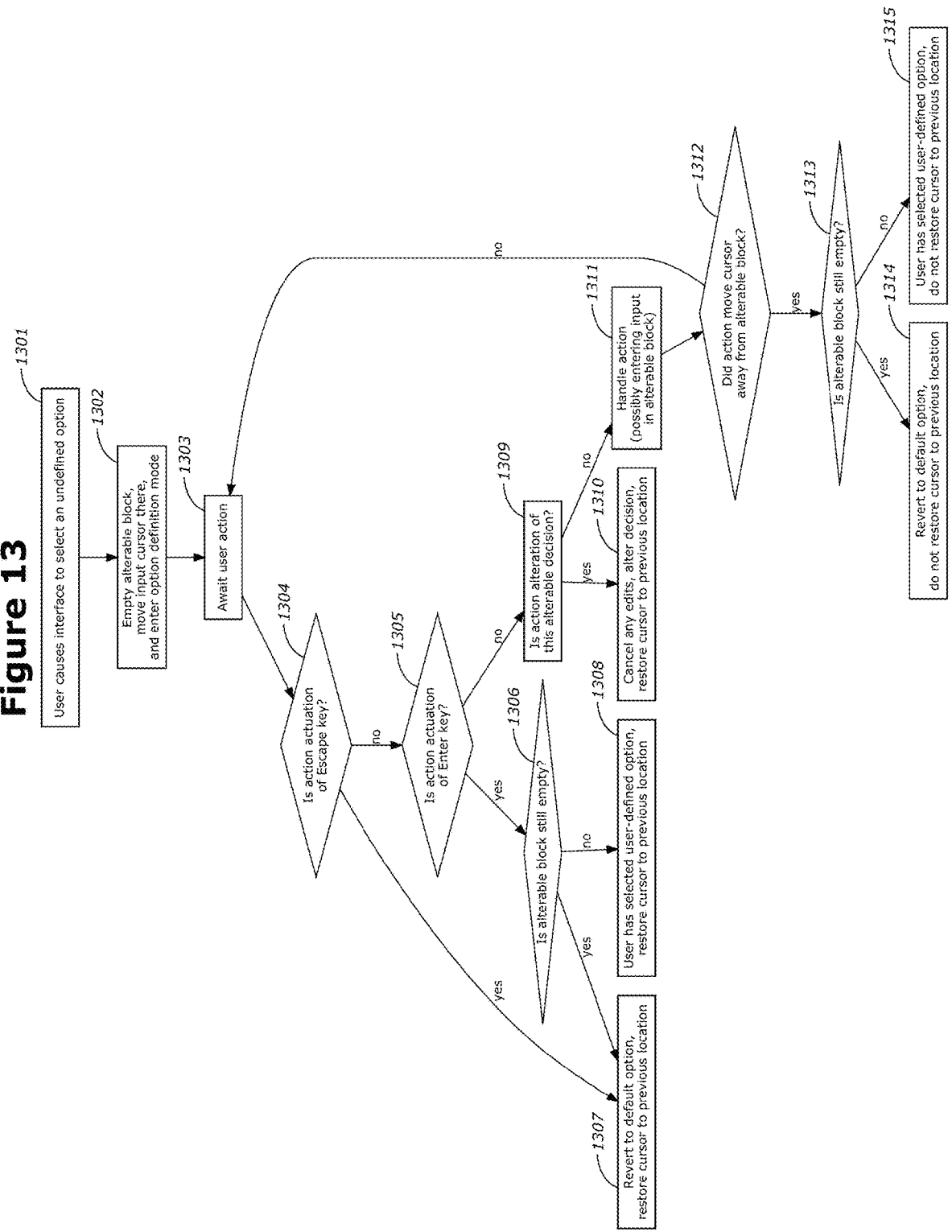
FIG. 13 is a flowchart that illustrates an example method for interface operation while in an option definition mode.

FIG. 9A gives a side-view of an interface user (901) who is looking at a display device (902). On the display is a target region (906) that the user may be looking at. The eye tracking technology believes that the user is looking somewhere within a focal zone (905) that is centered on a focal location (904). If the eye tracking technology were confident that the user was looking in the direction indicated by the top line (903), then the focal location would be offscreen. FIG. 9B is a front-facing view of the display device (902), including the target region (906) and the focal zone (905) centered on the focal location (904).

In an embodiment, for purposes of the interface behaviors described herein, when a user "detectably may be looking at" a certain target region on the display of a computing device, this does not necessarily mean that the target region includes the focal location: instead, in an embodiment, that means that the interface can determine a focal location, and the focal location is not offscreen, and at least some portion of the target region is within the focal zone. For example, in an embodiment that is a computing device that has eye tracking technology that is sufficiently accurate to determine within 3 cm where a user is looking with a reasonable degree of confidence, the user detectably may be looking at any target region such that at least some portion of the target region is within 3 cm of the focal location. In an embodiment, for purposes of the present paragraph and the following paragraph, a "target region" may be any location or locations or visual depiction of something on the display of the computing device.

In an embodiment, for purposes of the interface behaviors described herein, when a user is "detectably not looking at" a target region on the display of a computing device, this means that the interface can determine a focal location and that it is not the case that the user detectably may be looking at the target region. In particular, a user is detectably not looking at any region that is on the display of the computing device whenever the focal location is offscreen. In an embodiment, for purposes of the behaviors that are described herein, a user "detectably has not been looking at" a target region whenever it is the case that at the present moment and for a certain minimum duration of time immediately prior to the present moment (such as, in an embodiment, for at least one full second) the user was detectably not looking at the target region. For example, in an embodiment, if a user detectably has not been looking at the mouse cursor, this means that eye tracking technology has been able to determine that that the user was looking somewhere other than at the mouse cursor for at least one full second.

Some functionality that is described herein that pertains to eye tracking technology may be useful even in an embodiment where the eye tracking technology that is available for the interface can sometimes determine with a reasonable degree of confidence which of a plurality of display devices a user is looking at but cannot make any determination whatsoever regarding what location the user is looking at within that particular display device. In such an embodiment, whenever the interface is able to determine which display device the user is looking at, the "focal zone" consists of the entirety of the display device that the interface believes the user to be looking at, so the user then "detectably may be looking at" every location on that display device, and is "detectably not looking at" every location on all other display devices. In an embodiment, in such circumstances "the focal location" is the center of the display device that the interface believes the user to be looking at.

In an embodiment, the interface will continually monitor where the user is looking and will retain data regarding how long the user has or has not been looking at certain locations, so that, for example, at any moment the interface will be able to determine whether or not it is the case that the user has been detectably not looking at the location of the input cursor for at least one full second.

In prior art, eye tracking technology has not been widely deployed. An article regarding eye tracking technology has claimed that "user interface advancements need to be flawless in order to actually enhance user experience" (https://tech.thefuntimesguide.com/eye-tracking-technology/, accessed 11/25/2016). However, the present specification describes features that may take advantage of any available eye tracking technology and may yield beneficial results even if the eye tracking technology is not entirely reliable or especially precise. For example, the present chapter explains how to use eye tracking technology in order to help the interface more accurately calculate attention factors that represent approximately how much attention the user may be paying to particular regions of the display, and the more accurate these attention factors are the better, but these attention factors need not be especially accurate in order to be somewhat useful. Also, Chapter 37 explains how to use eye tracking technology in order to make the input cursor jump to a location that the user may be looking at, but also explains how to facilitate correcting any mistakes that may result from such a cursor jump.

Deliberation Scores

In an embodiment, when a user presses a key or performs some other action such as a touch gesture, the user action will be assigned a "deliberation score" that reflects approximately how careful the user was in performing that action, insofar as the interface is able to determine this, as described in the following paragraphs.

In an embodiment, the interface will assign a deliberation score to each keypress or other user action based on the interval of time before that user action that elapsed since the interface completed its response to the previous user action, so that if a user pauses a long time before pressing a key, then that keypress will be assigned a relatively high deliberation score.

In an embodiment, as an exception, when a user performs the very first user action, for purposes of determining that action's deliberation score, the time when the interface became active will be treated as the time when the interface completed its response to the previous user action, so for example if a user turns on the computing device, and then a few seconds later the interface becomes ready to respond to user actions, and then five seconds after that the user performs a first user action, then the deliberation score of that first user action will be based on the five-second interval.

Generally, for purposes of the present specification, a "medium deliberation score" is intended to refer to a deliberation score such as may typically be assigned to a user action if a user does not stop to think before choosing to perform the action, yet the user performs the action carefully enough that there is little chance of accidentally invoking a different user action than intended. In particular, if a typical user has in mind a word that he wishes to type and is quite careful to type that word without mistakes (without the help of autocorrection), then most of the user's keystrokes should have medium deliberation scores. Thus, a "low deliberation score" may tend to indicate that a user is typing rapidly enough that a typographical error is not especially unlikely, and a "high deliberation score" may tend to indicate that a user has paused to think for at least a short while before performing a particular user action.

For example, in an embodiment, when a user performs a user action, that action has a "very low deliberation score" of 0 if the time that elapsed since the previous user action is less than 0.2 seconds, a "low deliberation score" of 1 if the elapsed time is between 0.2 seconds and 0.5 seconds, a "medium deliberation score" of 2 if the elapsed time is between 0.5 seconds and 1.0 seconds, a "moderately high deliberation score" of 3 if the elapsed time is between 1.0 seconds and 2.0 seconds, a "high deliberation score" of 4 if the elapsed time is between 2.0 seconds and 5.0 seconds, or a "very high deliberation score" of 5 if the elapsed time is more than 5.0 seconds. As another example, in an alternative embodiment, deliberation scores are on approximately the same scale as the scale described in the preceding sentence, but with additional gradations, so that for example when a user performs a user action, if the time that elapsed since the previous user action is 1.1 seconds, then the action's deliberation score is 2.6.

In an embodiment, if a user action actually requires multiple keystrokes or screen touches, then the interface will individually measure the deliberation scores of the component actions that are required in order to perform that user action and will assign that user action a deliberation score equal to the maximum of the component actions' deliberation scores. Thus, in such an embodiment, if a user quickly presses a virtual key that causes the interface to replace a virtual keyboard containing letters with a virtual keyboard containing digits and then quickly presses a digit, then the resulting actuation of the digit key will have a relatively low deliberation score even if it actually ended up taking a bit longer than a typical single keystroke.

In an embodiment, the scale by which deliberation scores are calculated is different for user actions that consist of speaking into a microphone than for other user actions such as keystrokes or screen touches. For example, in an embodiment, when a user speaks a verbal command into a microphone, the interface will determine the time that elapsed since the previous user action but will calculate a deliberation score based on half that amount of time rather than calculating a deliberation score based on the full amount of time.

In an embodiment, the scale by which deliberation scores are calculated may vary from one specific user action to another, so that for example if a user spends two seconds to actuate the E key then this keypress may be assigned a high deliberation score, but if a user spends two seconds to actuate the { key then this keypress may be assigned a medium deliberation score, because many users require more time just to find the { key than they would require to find the E key.

In an embodiment, the scale by which deliberation scores are calculated for touches of keys that are on the primary virtual keyboard of a touchscreen computing device will take into account the physical distance on the display of the computing device between the key the user most recently touched and the key for which the interface is calculating the deliberation score, so that if 0.3 seconds elapse between the user's previous keystroke and a user keystroke of the letter M, then the M keystroke may be assigned a medium deliberation score if the user's previous keystroke was also an M keystroke, but may be assigned a low deliberation score if the user's previous keystroke was an A keystroke.

In an embodiment, the interface will retain and analyze data regarding how much time a particular user typically spends between user actions, in order to more accurately calibrate the deliberation scores that are assigned to user actions for that user. In an embodiment, the interface will also determine in certain circumstances whether certain keystrokes were accurate keystrokes or whether they were missed keystrokes; such behavior is explained in Chapter 31 in a discussion of evaluating the outcomes of "alterable word replacement decisions." In an embodiment, the interface will retain and analyze data regarding the amount of time that a particular user spent before an accurate keystroke or before a missed keystroke, and will use this information to calibrate the deliberation scores that are assigned to user actions for that user. Therefore, for example, for a user who frequently spends approximately 0.3 seconds between keystrokes when inputting text, if nearly all his keystrokes at that speed are accurate keystrokes, then once the interface has collected sufficient data regarding the behavior of this user, a keystroke that occurs 0.3 seconds after the previous user action will be assigned a medium deliberation score; if instead a rather high percentage of his keystrokes at that speed are missed keystrokes, then a keystroke that occurs 0.3 seconds after the previous user action will be assigned a low deliberation score. In an embodiment, the interface may retain and analyze such data separately for distinct keys, and may accordingly calibrate deliberation scores on a different scale for different keys; for example, if data shows that backspace keystrokes have always been missed keystrokes whenever they occurred less than 0.7 seconds after the previous keystroke, then a backspace keystroke that occurs 0.5 seconds after the previous user action may be assigned a very low deliberation score even if some other keystroke that occurred at that time would have been assigned a medium deliberation score.

In an embodiment, if while a key on the virtual keyboard of the interface is held down a special indicator appears that shows the user which key is currently pressed down, then if a user pauses on a particular key while such an indicator is visible for more than a certain threshold amount of time before releasing the key, the interface will assign that keystroke at least a medium deliberation score, so that if a user finds and presses a key much faster than usual but then briefly pauses to confirm that it is the correct key, then that keystroke will not be assigned a low deliberation score.

In an embodiment, for purposes of interface behaviors that are described farther below, the "hypothetical deliberation score" at any given moment is the deliberation score that would be assigned to a typical user action (such as typing the letter E) if that user action were to occur at that moment, without regard to whether or not any user action actually does occur at that moment. For example, when a user action has just occurred, the hypothetical deliberation score will be very low, but when a long time has elapsed since the most recent user action, the hypothetical deliberation score will be very high. In an embodiment, as a special case, whenever the user's most recent action consisted of speaking into a microphone, the hypothetical deliberation score is the deliberation score that would be assigned to another action consisting of speaking into a microphone if that action were to occur at that moment.

As described above, in addition to taking into account the time that elapsed since the user's previous action, the deliberation score for a user action may take into account other factors, such as how much time it would typically take a user to perform that particular action. However, wherever the present specification describes an embodiment that bases its behavior on a deliberation score, it is to be understood that an alternative embodiment may simply base its behavior on the amount of time that elapses between consecutive user actions. For example, where the present specification says that in a certain embodiment, in certain circumstances, "if the user's next action has a very high deliberation score, then the interface will forget all remembered alterable blocks," this means that in an alternative embodiment, in those circumstances, if a sufficiently long amount of time elapses before the user's next action (such as, in an embodiment, five seconds), then the interface will forget all remembered alterable blocks, without necessarily calculating any deliberation score per se. Likewise, whenever the present specification describes an embodiment that bases its behavior on a hypothetical deliberation score, it is to be understood that an alternative embodiment may simply base its behavior on the amount of time that elapsed since the most recent user action.

The remainder of the present chapter explains how deliberation scores may be useful in calculating approximately how much opportunity a user has had to notice and react to output. Chapter 17 explains how deliberation scores may be useful in determining whether it is more likely that a user who deleted input but then retyped the exact same input did so instinctively or deliberately. Chapter 31 explains how deliberation scores may be useful in autocorrection algorithms.

Attention Scores

In an embodiment, in certain circumstances the interface will assign an "attention score" to output that becomes visible on the display of a computing device or becomes perceptible to a user in some other way, and will subsequently increase that attention score in various circumstances. Such an attention score will reflect approximately how much opportunity the user has had to notice and react to the output, insofar as the interface is able to determine this. For example, the interface may assign an attention score to an alterable block, or to a pop-up window, or to a key on a virtual keyboard. In the present disclosure, anything that has an attention score may be referred to as an "attention object."

In an embodiment, when the interface assigns an attention score to an attention object, the attention score will initially be zero by default, and various factors may cause the attention score to increase; various situations in which the interface may increase the attention score of an attention object are described below.

In an embodiment, the interface will assign a "relative attention factor" to each attention object that reflects approximately how noticeable the attention object is compared to other attention objects; the determination of relative attention factors is described below, after the discussion of attention scores.

In an embodiment, as time passes, the interface will gradually increase the attention score of every visible attention object. For each attention object, the increase in its attention score due to the passage of time will be proportional to the amount of time that elapses multiplied by the relative attention factor of the attention object. Thus, if an attention object has a high relative attention factor, its attention score will increase relatively rapidly; if an attention object has a lower relative attention factor, its attention score will increase relatively slowly.

In an alternative embodiment, each time a user inputs a character or otherwise performs an editing action, the interface will increase the attention score of every attention object by an amount that is proportional to its relative attention factor.

In an embodiment, when a user touches or clicks on an attention object, the interface will greatly increase its attention score. In an embodiment, such an increase in an attention score will not be applied until after the touch or click is handled normally. For example, in an embodiment, if an interface window suddenly appears that is an attention object and a user who was intending to touch something else inadvertently touches the interface window before becoming consciously aware that the window had appeared, then the interface window will have an extremely low attention score at the moment when the user touches it, but will have a much higher attention score thereafter.

In an embodiment, when a user moves the input cursor past an attention object that is visible, the interface will slightly increase its attention score. For example, when an alterable block that has an attention score is in the middle of a line of input that the user has typed and the input cursor is at the end of the line of input, if the user presses the Home key to move the input cursor to the beginning of that line of input, then the interface will slightly increase the attention score of that alterable block.

Dismissing Attention Objects

If a user chooses to reduce his ability to interact with an attention object, this may indicate that the user has already paid enough attention to the attention object that the user is satisfied that is not necessary to interact with the attention object. It may be advantageous to increase the attention score of the attention object to reflect such a possibility. Interface behaviors to that effect are described in the following paragraphs.

In an embodiment, when a user performs an action that causes a previously visible attention object to no longer be visible, the interface will substantially increase its attention score. For example, in an embodiment, if an alterable block has an attention score and the user scrolls up to view a different part of the current document so that the alterable block is no longer in view, the interface will substantially increase the alterable block's attention score when it ceases to be visible (but its relative attention factor will become zero until it becomes visible again, as is explained below).

In an embodiment, for purposes of the following paragraph, certain user actions constitute "completion actions" for certain regions of input. Generally, a completion action is an action that inherently implies that the user is satisfied for the moment with some region of input (in the judgment of the interface designer). In particular, in an embodiment, exiting an application is a completion action for all input within the application. In an embodiment, saving a document is a completion action for the document. In an embodiment, pressing Enter to indicate that edits to a spreadsheet cell are finished is a completion action for that cell. In an embodiment, pressing Enter to cause a calculator interface to evaluate a mathematical expression is a completion action for that expression.

In an embodiment, when a user performs a completion action for a region of input, the interface will increase the attention score of every attention object that was visible immediately prior to that action within that region of input. In an embodiment, if the completion action has a high deliberation score, then the interface will increase such attention scores substantially. However, in an embodiment, when a user performs a completion action, the interface will not for that reason increase the attention score of any attention object that becomes visible in response to the action. For example, when a user presses Enter to cause a calculator interface to evaluate a mathematical expression, if pressing Enter also caused the interface to make an alterable decision to insert an additional character at the end of the mathematical expression, then when the interface increases the attention score of every attention object that was visible in the mathematical expression, this does not include the alterable block of the new alterable decision.

In an embodiment, even after a user has saved changes to a document and closed the document, the saved document may include saved alterable decisions so that when the document is reopened the decisions can be altered. In an embodiment, even after a user has typed a mathematical expression in a calculator interface and pressed Enter, the mathematical expression may include alterable decisions that can still be altered (which could cause the answer to the calculation to change).

Attention Factors

In an embodiment, the interface will assign an "attention factor" to each attention object. An attention object's attention factor is distinct from its relative attention factor: the attention factor reflects approximately how noticeable the attention object is and how strong are the indications that the user is paying attention to it, without regard to the existence of other attention objects that may also be demanding the user's attention, whereas the relative attention factor reflects approximately how noticeable the attention object is compared to other attention objects. (An attention object's attention factor and relative attention factor are both distinct from its attention score.)

In an embodiment, the relative attention factor of an attention object equals the ratio of its attention factor to the sum of all the attention factors of all the attention objects that currently exist. For example, in such an embodiment, if an attention object has an attention factor of 1.0, then its relative attention factor is 1.0 if no other attention object exists, but its relative attention factor is 0.25 if exactly one other attention object exists and that one has an attention factor of 3.0. In such an embodiment, the attention score of a highlighted alterable block will increase more quickly if it is the only highlighted alterable block than if numerous alterable blocks are highlighted. In an alternative embodiment, the relative attention factor of an attention object will simply equal its attention factor.

In an embodiment, for purposes of the preceding paragraph, at all times the interface will behave as though a special "typing attention object" exists. The typing attention object does not actually have an attention score, but has an attention factor that affects the relative attention factors of other attention objects as described in the preceding paragraph. In an embodiment, the attention factor of the typing attention object is at its maximum immediately after the user performs an action, and then decreases over time; more specifically, in an embodiment, at any given moment, the attention factor of the typing attention object equals a certain amount less the current hypothetical deliberation score. For example, in an embodiment, deliberation scores have a minimum of 0.0 and a maximum of 5.0, and at any given moment the attention factor of the typing attention object equals 5.0 minus the hypothetical deliberation score. In such an embodiment, while a user is typing rapidly, the attention factor of the typing attention object will usually be quite high, and so the relative attention factors of other attention objects will be relatively low, but once a user stops performing actions, the attention factor of the typing attention object will soon decrease, and so the relative attention factors of other attention objects will increase. This means that in an embodiment where an alterable block is an attention object such that increasing its attention score causes its associated probability of alteration to decrease (as is described in Chapter 13), if a user who is typing rapidly notices that the interface has made a highlighted alterable decision but does not wish to stop immediately, then the user can continue to type rapidly, with the expectation that the highlight will not fade rapidly until he stops to look.

In an embodiment, the attention factor of an attention object will equal its "base attention factor" except when special circumstances obtain; in various special circumstances, the attention factor of an attention object may temporarily be elevated for as long as the special circumstances obtain. Various such special circumstances are described below.

In an embodiment, a typical attention object will be assigned a base attention factor that is roughly proportional to how strongly the object inherently attracts the user's attention (in the judgment of the interface designer). For example, in an embodiment, an alterable block that has an associated change flag will have a base attention factor of 3.0; if an alterable block does not have an associated change flag but is highlighted, then its base attention factor will range from 2.0 if it has the maximum possible highlight intensity score down to 1.0 if it has the minimum possible highlight intensity score; and if an alterable block does not have an associated change flag and is not highlighted, it will have a base attention factor of 0.2.

In an embodiment, while a user detectably may be looking at an attention object, its attention factor will be elevated. In an embodiment, the amount by which an attention factor is elevated in such circumstances depends on how certain it is that the user is in fact looking at the attention object: if the eye tracking technology that the interface is using can determine where a user is looking within a very small radius, then while a user detectably may be looking at an attention object, its attention factor will be greatly elevated, but if the eye tracking technology can only determine the general region where a user is looking, then while a user detectably may be looking at an attention object, its attention factor will be elevated only slightly.

In an embodiment, if a user has moved the input cursor since the user last performed an editing action, then any attention object that the input cursor is within or immediately adjacent to will have a substantially elevated attention factor (such as, in an embodiment, an attention factor that is 5.0 greater than it would otherwise have), and any other attention object that the input cursor is very close to will have a slightly elevated attention factor. For example, in an embodiment, if the interface makes an alterable decision regarding a word the user types and the user then presses the left arrow key a few times so that the input cursor is at the end of that word, then that decision's alterable block will have an elevated attention factor until either the user moves the input cursor away from its alterable block or the user performs an editing action.

Similarly, in an embodiment, if a user has moved the mouse cursor more than a tiny distance since the user last actuated a key, then any attention object that the mouse cursor is within will have a substantially elevated attention factor, and any other attention object that the mouse cursor is very close to will have a slightly elevated attention factor. In an embodiment, if the interface detects that a stylus is hovering above the display of the computing device at a location that is directly above an attention object, then that attention object will have a substantially elevated attention factor.

In an embodiment, while an attention object is not visible (or otherwise perceptible), its attention factor will be zero until it becomes visible again. For example, if a user scrolls the display so that a highlighted alterable block is no longer visible, its attention factor will be zero until it becomes visible again. In an embodiment, whenever it is impossible for a user to interact with an attention object in any way, its attention factor will be zero until it becomes possible again for the user to interact with it. For example, if a highlighted alterable block is visible in a document, but a modal window has appeared so that it is not possible for the user to alter the decision or to edit the document in any way until the modal window is dismissed, then the attention factor of the highlighted alterable block will be zero until the modal window is dismissed.

In an embodiment, while the interface is in alterable decision review mode, the attention factor of every visible alterable block will be slightly increased, except that if the interface entered alterable decision review mode because the user invoked a command that is explicitly for the purpose of causing the interface to enter alterable decision review mode, or if the interface is in an intensified alterable decision review mode, then the attention factor of every visible alterable block will be substantially increased.

Attention Scores in Perspective

The above paragraphs have explained some relatively sophisticated methods for calculating attention scores. However, in an alternative embodiment, an attention object's attention score may be a simple measure of how much time has elapsed since the attention object became visible. In another alternative embodiment, an attention object's attention score may be a simple measure of how many user actions have occurred since the attention object became visible. Generally, where an attention score is mentioned in the present specification, it is to be understood that in an alternative embodiment where such a score is a simple measure of how much time has elapsed or how many user actions have occurred, language that directly pertains to elapsed time or to a quantity of user actions may be swapped in as a replacement for the reference to an attention score, and the interface behavior that is thus described can be implemented without implementing the explicit calculation of an attention score. For example, the following chapter explains an embodiment such that every alterable block is an attention object and such that whenever the interface increases the attention score of an alterable block the interface will decrease the probability of alteration of its alterable decision by an equal amount. It is to be understood that in an alternative embodiment the interface will simply decrease the probability of alteration of every alterable decision at the same gradual rate, and in another alternative embodiment the interface will simply decrease the probability of alteration of every alterable decision by a fixed amount each time a user action occurs. Such alternate embodiments can be implemented without implementing the explicit calculation of attention scores.

Whether attention scores are calculated by simple methods or by relatively sophisticated methods, an attention score may tend to indicate whether or not a user has had ample opportunity to notice and react to output, and this information may be useful for various interface behaviors that are described below. In particular, Chapter 13 explains how attention scores may be useful in ensuring that users have ample opportunity to notice and alter any alterable decision that has a relatively high probability of alteration even while conversely ensuring that a highlighted alterable decision will cease to be highlighted when a user has ignored it long enough.

Chapter 17: Automatic Decision Variation Destructive Actions

In an embodiment, for purposes of the present chapter, an "editing action" is any user action that causes the user's input to be modified; cursor navigation actions are not "editing actions." A "destructive action" is an actuation of the backspace key, or an actuation of the Delete key, or any other editing action that has no major effect other than causing a portion of the user's input to be deleted. In an embodiment, although an actuation of the Undo key or Redo key may change the status of an undo buffer in some way, such a change to an undo buffer does not constitute a "major effect" for purposes of the preceding sentence, and so an actuation of the Undo key or Redo key may constitute a destructive action if it causes a portion of the user's input to be deleted even though it also changes the status of an undo buffer. In an embodiment, an actuation of the Cut key does not constitute a destructive action.

Figure 14A:
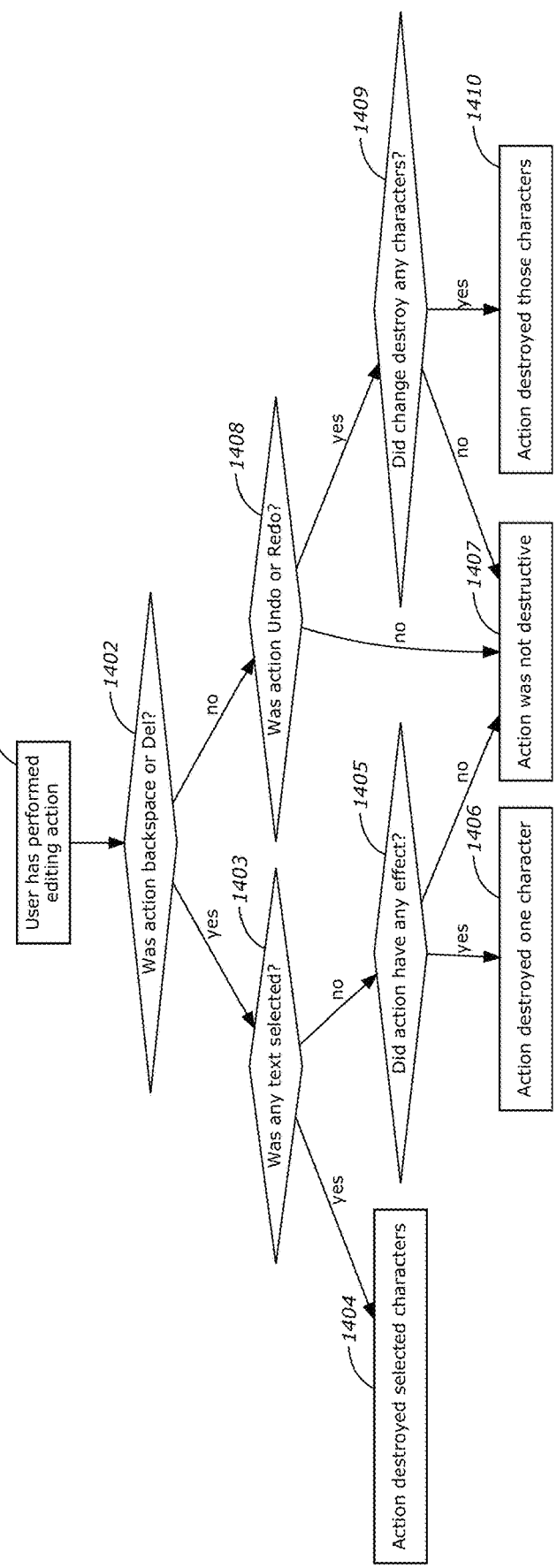
FIG. 14A is a flowchart that illustrates an example method for determining whether or not an action was a destructive action, and what characters it destroyed.
Figure 15A:
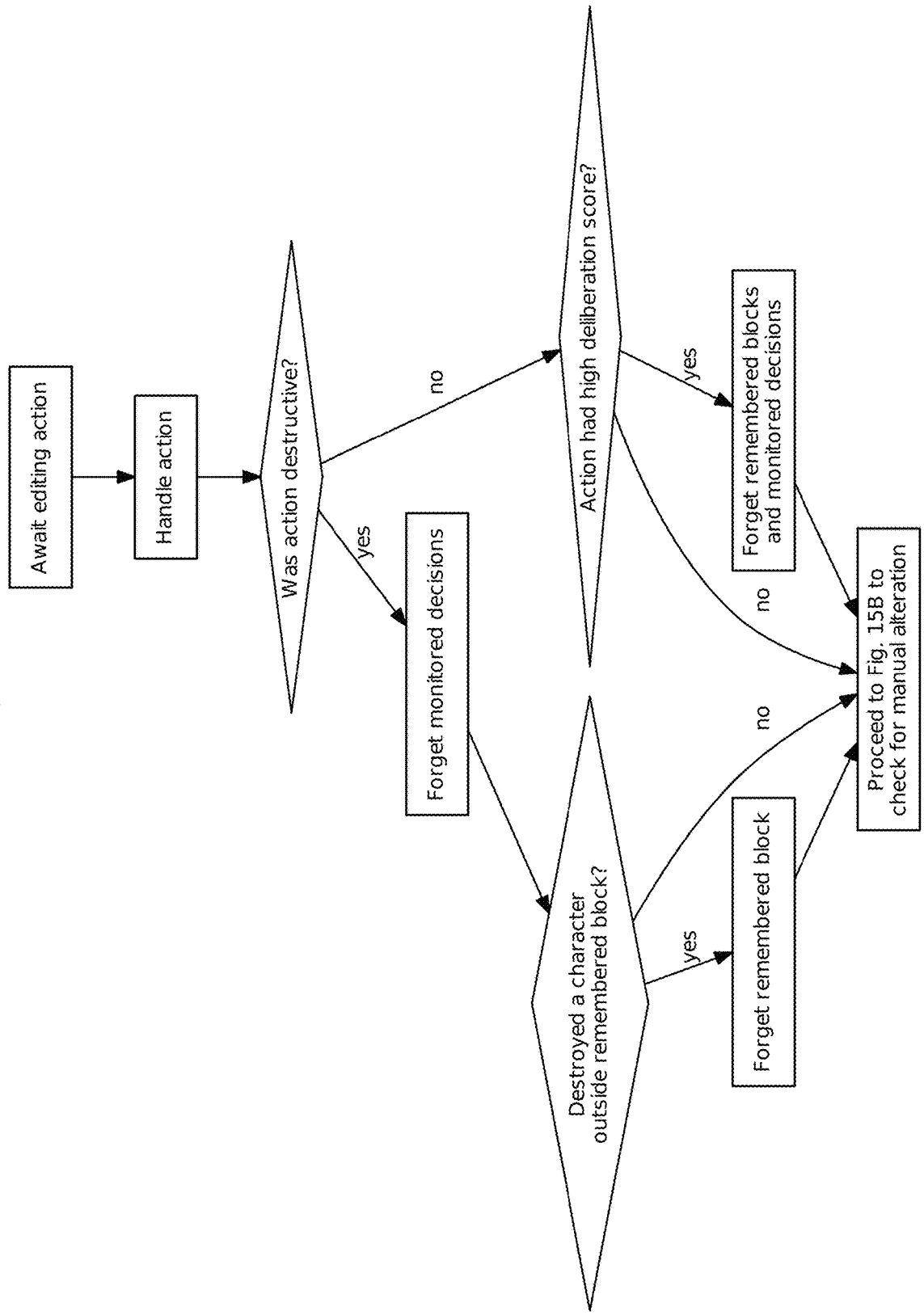

FIG. 14A is a flowchart that illustrates an algorithm for determining whether or not an action was a destructive action, and what characters it destroyed. Block 1401 says "User has performed editing action" and proceeds to Block 1402, which asks, "Was action backspace or Del?" If the answer is yes, then the algorithm proceeds to Block 1403, which asks, "Was any text selected?" If the answer is yes, then the algorithm proceeds to the outcome at Block 1404: "Action destroyed selected characters." If the answer to the question in Block 1403 is no, then the algorithm proceeds to Block 1405, which asks, "Did action have any effect?" If the answer is yes, then that means the action was an ordinary actuation of the backspace key or Del key that deleted only one character, so the algorithm proceeds to the outcome at Block 1406: "Action destroyed one character." If the answer is no, then that means the actuation of the backspace key or Del key had no effect (such as because there were no characters to delete), so the algorithm proceeds to the outcome at Block 1407: "Action was not destructive."

Continuing with the explanation of FIG. 14A, if the user's editing action was not an actuation of the backspace key or Del key, then the answer to the question in Block 1402 is no and the algorithm proceeds to Block 1408, which asks, "Was action Undo or Redo?" If the answer is no, then the algorithm proceeds to the outcome at Block 1407: "Action was not destructive." If the answer is yes, then the algorithm proceeds to Block 1409, which asks, "Did change destroy any characters?" This is the short form of a more complex question, which is, "Did the Undo or Redo change destroy at least one character and have no other effect on the document?" If the answer is yes, then the algorithm proceeds to the outcome at Block 1410: "Action destroyed those characters." If the answer is no, then the algorithm proceeds the outcome at Block 1407: "Action was not destructive."

Overview of Automatic Decision Variation

When an interface mistake occurs, a user may instinctively delete the mistake but then repeat the same editing actions that triggered the mistake in the first place. It may be desirable to systematically ensure that for any potential mistake that corresponds to an alterable interface decision, deleting and retyping the relevant portion of input will tend to not repeat the same potential mistake.

Therefore, in an embodiment, if a user performs a sequence of consecutive destructive actions that deletes the alterable block of an alterable interface decision and soon thereafter the user performs a non-destructive action that causes the interface to make a new alterable decision such that the new decision will have the same options as the decision that was deleted and such that the default outcome of the decision would cause the user's input to match the state it was in prior to the deletion of the old decision's alterable block, then this may cause the interface to select a different outcome for the new alterable decision. Such an embodiment will be said to have "the automatic decision variation feature." The details of such an embodiment are specified below.

The automatic decision variation feature that is described in the present chapter and the manual alteration detection feature that is described in the following chapter are collectively referred to herein as "retyping detection features." Certain details that are specified in the following description of the automatic decision variation feature refer to retyping detection features collectively rather than referring to the automatic decision variation feature individually, in order to explicitly include both the automatic decision variation feature and the manual alteration detection feature.

A Simplified Decision Variation Algorithm

FIG. 14B is a flowchart that illustrates a simplified version of the automatic decision variation feature. At block 1401, the interface will "await editing action." When the user performs an editing action, the interface will proceed to block 1402 and "handle action" normally. After that, the interface will proceed to block 1403 and determine "Was action destructive?" (It may make this determination by means of the algorithm illustrated in FIG. 14A.) If the action was destructive, the interface will proceed to block 1412 and "forget monitored decision," which means that if there was a monitored alterable decision, then it stops monitoring that decision. It will then proceed to block 1413 and ask whether the action "Destroyed a character in current alterable block?" If the action did destroy a character in the alterable block of a current alterable decision, then the interface will proceed to block 1414, "Delete decision, but remember it and block." This means that the alterable decision is deleted as described in Chapter 2, but it now becomes a remembered alterable decision as defined below, and the alterable block becomes a remembered alterable block. The interface also remembers what the state of the user's input was immediately before the destructive action occurred, so it can later recognize whether the exact same state obtains. Whether the answer to the question in block 1413 is no, or whether it is yes and the interface proceeds to block 1414, in either case the interface will subsequently proceed to block 1415, where it will ask whether the action "Destroyed a character outside remembered block?", and if the answer is yes, the interface will proceed to block 1416, "Forget remembered block." This means that for each remembered alterable block, if the user deletes a character that was not part of that alterable block, then that alterable block will cease to be a remembered alterable block, and its alterable decision will cease to be a remembered alterable decision. Whether the answer to the question in block 1415 is no, or whether it is yes and the interface proceeds to block 1416, in either case the interface will subsequently return to block 1401 to await the user's next action.

Continuing with the explanation of FIG. 14B, if the user's action was not a destructive action, the interface will proceed from block 1403 to block 1404, where it will ask whether the "action had high deliberation score?" If the action had a high deliberation score as defined in Chapter 12, then that means that the user took a long time to perform the action, in which case the interface will proceed to block 1411 where it will "forget remembered blocks and monitored decision" (and will also forget any remembered alterable decisions) and will then return to block 1401 to await the user's next action.

In FIG. 14B, if the user's action was not a destructive action and did not have a high deliberation score, then the interface will proceed from block 1404 to block 1405, where it will determine whether there "Are blocks remembered?" If there is at least one remembered alterable block, then the interface will proceed to block 1406 to "monitor a decision, forget blocks," which means that it will cause the remembered alterable decision that has the highest probability of alteration to become the monitored alterable decision, and it will then forget the remembered alterable blocks and the remembered alterable decisions other than the monitored alterable decision. It will then proceed to block 1407. If there were no remembered alterable blocks when the user performed the non-destructive editing action that did not have a high deliberation score, then the interface will proceed from block 1405 directly to block 1407.

In FIG. 14B, at block 1407, the interface will check whether "Is decision monitored?" If there is no monitored alterable decision, the interface will return to block 1401 to await the user's next action. If there is a monitored alterable decision, the interface will proceed to block 1408, "Recognize repetition of monitored decision?" In order for the interface to recognize repetition of the monitored alterable decision, not only must a new alterable decision now exist that has the same options as the monitored alterable decision, but also the state of the user's input must be exactly the same as it was immediately before the first destructive action occurred that deleted a character of the alterable block of the monitored alterable decision. If the interface does not recognize repetition of the monitored alterable decision, it will return to block 1401 to await the user's next action. If the interface does recognize repetition of the monitored alterable decision, it will proceed to block 1409 to "vary decision," which means that it will vary the new alterable decision that is identical to the monitored alterable decision, which may cause it to change which option of that decision is selected, as is explained in FIG. 14C. From 1409 the interface will then proceed to block 1410 to "forget monitored decision." From there, the interface will return to block 1401 to await the user's next action.

FIG. 14C is a flowchart that illustrates a procedure for varying the decision that is identical to the monitored alterable decision. First, in Block 1417, the interface will "Increase probability of alteration (POA)," which means that the interface increases the probability of alteration of the decision and each of its alternate options by an amount equal to the variation score base value as described below, which is an amount that is sufficiently large that even if the decision had a very low probability of alteration its new probability of alteration may exceed the implicit default option probability (as defined in Chapter 3). From Block 1417 the interface will proceed to Block 1418, where it will check, "Is POA above default option probability (IDOP)?" If the decision's probability of alteration is still below the implicit default option probability even after its probability of alteration is increased by the variation score base value (because its probability of alteration was exceedingly low before that), then the decision variation feature has caused the decision's probability of alteration to increase but the interface will proceed to Block 1419: "Do not alter decision."

In FIG. 14C, at Block 1418, if the decision's probability of alteration is above the implicit default option probability then the interface will proceed to Block 1420, "Assign default option the IDOP," which means that the default option of the alterable decision will now explicitly have a probability of alteration equal to the implicit default option probability. The interface will then proceed to Block 1421, "Calculate greatest POA minus IDOP," and from there it will proceed to Block 1422, "Reduce each POA by that amount." These blocks mean that the interface will determine which alternate option has the highest probability of alteration and calculate that probability of alteration minus the implicit default option probability, and will then reduce the probability of alteration of every alternate option by that amount. When the interface does that, the alternate option that has the highest probability of alteration will come to have a probability of alteration that exactly equals the implicit default option probability. The interface will then proceed to Block 1423, "Select option with highest POA," and select that option.

It may be noted that when the interface varies a decision as explained in FIG. 14C, the higher the decision's probability of alteration was before the interface varied the decision, the greater will be the value that is calculated in Block 1421, so the greater will be the reduction of probabilities of alteration in Block 1422. This means that if a decision has a high probability of alteration before a user deletes and retypes its alterable block and in doing so causes the automatic decision variation feature to change the decision's outcome, then the decision may have a low probability of alteration afterwards, which reflects high confidence that the user indeed wanted the interface to change the outcome and is satisfied now that the interface has done so. If a decision has a very low probability of alteration before a user causes the automatic decision variation feature to change the decision's outcome, then it will have a high probability of alteration afterwards, which reflects uncertainty as to whether the user actually wanted the interface to change the outcome.

The following discussion of the automatic decision variation feature is much more detailed than the above explanation of FIGS. 14B and 14C. In an embodiment, the automatic decision variation feature will include the additional nuances that are explained below that are not illustrated in FIG. 14B or FIG. 14C. For example, a more sophisticated version of the automatic decision variation feature as described below may in certain circumstances reduce a "variation score" that initially equals the variation score base value, and if for example a user deletes a decision's alterable block and then deletes one extra character before retyping that extra character and that alterable block, the automatic decision variation feature may perhaps be invoked anyway, but the variation score will be less than the variation score base value and so the decision's probability of alteration will be increased less in Block 1417, which in certain circumstances will cause the decision's probability of alteration to be below the implicit default option probability. In an alternative embodiment, the automatic decision variation feature will behave exactly as explained above and as illustrated in FIG. 14B and FIG. 14C.

Retaining Pre-Deletion Data

In an embodiment, the automatic decision variation feature is a block alteration feature as defined in Chapter 14, and so an alterable interface decision may have more than one distinct alterable block for purposes of the automatic decision variation feature. Below, data pertaining to the automatic decision variation feature will be described as associated with alterable blocks in certain circumstances, and in other circumstances data will be described as associated with alterable decisions. The distinction between data that is associated with alterable blocks and data that is associated with alterable decisions is important only in an embodiment where an alterable interface decision may have more than one distinct alterable block for purposes of the automatic decision variation feature. For example, it is explained below that an alterable block may be assigned a "variation score" when it is deleted; in an embodiment where an alterable interface decision may have distinct alterable blocks, it may be significant that it is the alterable block and not its alterable decision that is assigned a variation score, because this means that a particular alterable decision may have multiple distinct variation scores corresponding to its multiple distinct alterable blocks, but in an embodiment where each alterable interface decision can have only one alterable block, it makes no difference whether a variation score is assigned to the alterable block or assigned to its alterable decision.

In an embodiment, when an alterable decision has only one alterable block, every alternate option of the decision is a relevant alternate option for that alterable block; but when a multi-alternative decision has multiple alterable blocks, in certain circumstances, for certain alterable blocks, certain alternate options of the decision may not be relevant alternate options. Chapter 14 explains which alternate options are relevant alternate options for each alterable block of a multi-alternative decision that has multiple alterable blocks, in an embodiment.

In an embodiment, each alterable block is associated with only one alterable interface decision. If more than one alterable decision pertains to the exact same portion of input, then that portion of input is not considered to be one alterable block that is associated with two alterable interface decisions: it is considered to be two distinct alterable blocks, each of which is associated with only one alterable interface decision, and each of which may have its own distinct variation score.

In an embodiment, an alterable block's "pre-deletion state" is the state of the user's input immediately prior to the first action that causes the deletion or modification of some portion of the alterable block. For example, if a user types 9x2-4 and the interface makes an alterable decision to convert x2 to $x^2$ and the alterable block of this decision consists of $x^2$, then if the user actuates the backspace key repeatedly until the alterable block is deleted, that alterable block's pre-deletion state will be $9x^2$. More than one alterable block may have the same pre-deletion state if a single action is the first action that causes the deletion or modification of some portion of more than one alterable block.

In an embodiment, an "altered pre-deletion state" is a state of the user's input that would obtain if a pre-deletion state were modified so that a different option became selected for the alterable interface decision of the alterable block that is associated with the pre-deletion state. For example, if a user types 9x2 and the interface makes an alterable decision to convert x2 to $x^2$ and the alterable block of this decision consists of $x^2$, then if the user actuates the backspace key, the alterable block's altered pre-deletion state will be 9x2.

In an embodiment, in order to implement the automatic decision variation feature, when an alterable decision is deleted and thus does not exist for purposes of most alteration-related features, the interface still temporarily retains information about the alterable decision in certain circumstances. In the following description of the automatic decision variation feature, a "remembered alterable decision" is an alterable decision that has been deleted such that the interface is still retaining information about the alterable decision for purposes of the automatic decision variation feature. In the following description of the automatic decision variation feature, ordinary alterable decisions that have not been deleted will be referred to as "current alterable decisions" to distinguish them from remembered alterable decisions. Similarly, a "remembered alterable block" is an alterable block that has been partially or fully deleted such that the interface is still retaining information about the alterable block for purposes of the automatic decision variation feature, and a "current alterable block" is an ordinary alterable block that has not been partially or fully deleted.

In the explanation of the automatic decision variation feature, it is to be understood that any mention of "deleting" an alterable block may be understood as a reference to deleting the portion of input that constituted the alterable block, not as a reference to deleting information about the alterable block. For example, if a remembered alterable block is said to have been "partially deleted," this means that some of the input that constituted the alterable block has been deleted. As another example, the phrase "after a remembered alterable block has been fully deleted" refers to when every character of the portion of input that constituted the alterable block has been deleted and yet the interface is still retaining information about the alterable block for purposes of the automatic decision variation feature; it does not refer to when the alterable block is no longer a remembered alterable block and is no longer relevant to any interface behavior.

Below, specific circumstances are described in which an alterable block will become a remembered alterable block, in an embodiment. In an embodiment, whenever a user performs a destructive action that causes the deletion of any portion of an alterable block, if that alterable block becomes a remembered alterable block, then the interface will remember "pre-deletion state data" for that alterable block until the alterable block is no longer a remembered alterable block. In an embodiment, such pre-deletion state data will include the pre-deletion state of that alterable block as well as the altered pre-deletion state of each alternate option of that alterable block's alterable interface decision.

In an embodiment, whenever a user performs a destructive action that causes the interface to delete an alterable decision, if the same action or a previous action caused any alterable block of that decision to become a remembered alterable block, then the decision will become a remembered alterable decision until none of its alterable blocks are remembered alterable blocks.

Analysis of Deletion and Retyping

It may be desirable to prevent an interface from repeating a mistake, but on the other hand, if a user deletes a portion of input and then types the same portion of input a second time simply due to indecisiveness, the user will typically wish the interface to respond to the input the second time the same way it responded the first time, and so a different response may itself be a mistake. For example, on several occasions the present writer has used an iPhone shortcut to input a period, then deleted the period, and then attempted to use the same shortcut to input a period again, only to be disappointed that the iPhone responded differently the second time he attempted to use the shortcut.

Therefore, in an embodiment, the interface will monitor actions that may constitute deliberately deleting an alterable block and monitor actions that may constitute deliberately causing the interface to repeat an alterable decision, and will take various factors into account so that if a user does delete an alterable block and then cause the interface to repeat the corresponding alterable decision, then the interface can attempt to determine whether the user did so due to indecisiveness or due to dissatisfaction with the outcome of the alterable decision. Methods for taking such factors into account are described in detail below.

In various embodiments, the interface will use slightly different approaches to take such factors into account. In one approach, when a user first begins to delete an alterable block, the interface will determine a "variation score" for the alterable block and will subsequently take into account various factors in adjusting this variation score, or in some cases will decide to instantly "forget" the alterable block, which means that the alterable block will no longer be eligible for automatic decision variation. In an alternative approach, when a user first begins to delete an alterable block, the interface will merely determine whether or not the alterable block is initially eligible for automatic decision variation, and then the interface will subsequently take into account various factors in determining whether to instantly forget the alterable block; such an approach may yield beneficial results less often, but may be easier to implement, and may still be a useful improvement over prior art. Both approaches are described in more detail below; in particular, in several cases the present specification explains how in one embodiment a certain user behavior may cause the interface to reduce an alterable block's variation score and then also explains how in an alternative embodiment a similar user behavior may instead cause the interface to instantly forget an alterable block. It is also possible to mix the approaches: even if an embodiment tracks variation scores, in certain situations it may simply forget an alterable block rather than adjusting the block's variation score.

(In an embodiment that also has the manual alteration detection feature that is described in Chapter 18, when the interface forgets a remembered alterable block or a remembered alterable decision for purposes of the automatic decision variation feature, it may still retain information about that alterable block or alterable decision for purposes of the manual alteration detection feature, but that alterable block or alterable decision will no longer constitute a remembered alterable block for purposes of the automatic decision variation feature.)

Deleting Alterable Blocks

In an embodiment, "the threshold of eligibility for automatic decision variation" is a threshold value that is sufficiently low that all or nearly all alterable interface decisions will initially have a probability of alteration that is above this threshold value, and is sufficiently high that an alterable interface decision will typically have a probability of alteration that is below this threshold value after the user explicitly selects an option of the decision or completes review of the decision.

In an embodiment, whenever a user performs a destructive action that causes the deletion of any portion of an existing alterable block, the interface will assign that alterable block a "variation score" that is initially equal to a particular fixed value; the particular fixed value is referred to herein as the "variation score base value." Depending on various circumstances, such a variation score may be modified immediately and/or may be modified later in response to subsequent user actions, as explained below. The interface will retain information about the alterable block so that it becomes a remembered alterable block as defined above. In an embodiment, if a remembered alterable block's variation score is reduced to zero or reduced below zero, then the interface will immediately forget the alterable block.

In an alternative embodiment, whenever a user performs a destructive action that causes the deletion of any portion of an existing alterable block, the interface will simply check whether the probability of alteration of that block's alterable interface decision is above the threshold of eligibility for automatic decision variation. If it is above the threshold of eligibility for automatic decision variation, the interface will retain information about the alterable block so that it becomes a remembered alterable block as defined above until the interface decides to forget the alterable block for some reason; otherwise, the interface will handle the deletion normally: the block will not become a remembered alterable block.

In an embodiment, when a user performs a destructive action that causes the deletion of all or part of an existing alterable block, the interface will immediately add a bonus to that alterable block's variation score if the alterable block has an extremely low attention score as defined in Chapter 12. In an alternative embodiment, to achieve a similar result without the use of an attention score, it will do so if a very short amount of time has elapsed since the interface initially made the corresponding alterable interface decision.

In an embodiment, after a user performs any destructive action, if any remembered alterable blocks exist, then as soon as the user performs any subsequent action, if the deliberation score of that subsequent action is higher than a certain moderately high threshold, then the interface will reduce the variation score of every remembered alterable block by an amount that is proportional to the amount by which that deliberation score exceeds the threshold. In such an embodiment, if a user pauses a bit longer than usual between keystrokes, the interface may slightly reduce the variation score of every remembered alterable block; if the user pauses a long time, the interface will greatly reduce the variation score of every remembered alterable block. In an alternative embodiment, immediately after a user performs any destructive action, if the user's next action has a high deliberation score, then the interface will forget all remembered alterable blocks.

In an embodiment, after a remembered alterable block has been fully deleted, each time the user performs an additional consecutive destructive action, the interface will substantially reduce the variation score of that remembered alterable block; thus, in such an embodiment, an alterable block's variation score will ultimately be reduced by an amount that is proportional to the number of additional consecutive destructive actions the user performs after fully deleting the alterable block. In an embodiment, the amount by which the interface reduces the variation score of a remembered alterable block in such circumstances depends on the ratio of the amount of text that is deleted after the remembered alterable block was fully deleted to the amount of text that was in the remembered alterable block; for example, in such an embodiment, if a user deletes an alterable block consisting of ten characters and then deletes one more character, the remembered alterable block's variation score will be substantially reduced when the user deletes that additional character, but if the user deletes an alterable block consisting of just a single character and then deletes one more character, the remembered alterable block's variation score will be reduced far more.

In an alternative embodiment, after a remembered alterable block has been fully deleted, each time the user performs an additional consecutive destructive action, the interface will reduce the variation score of that remembered alterable block by an amount that is proportional to the deliberation score of the additional consecutive destructive action, so if for example a user deletes an alterable block by means of consecutively pressing the backspace key very rapidly and accidentally overshoots by one character then the interface will only slightly reduce the block's variation score, but if a user deletes an alterable block and then pauses a very long time before deleting one more character then the interface will substantially reduce the block's variation score.

In another alternative embodiment, after a remembered alterable block has been fully deleted, if the user performs an additional consecutive destructive action, then the interface will forget that remembered alterable block.

Region Deletion and Alterable Block Deletion

In an embodiment, if a user selects a region of input containing a plurality of characters and then actuates the backspace key or the Delete key so that all the characters within the region are deleted, for purposes of retyping detection features, the interface will treat such a destructive action as equivalent to a sequence of consecutive destructive actions consisting of deleting the characters one at a time from right to left. For example, if a user selects the expression $9x^2-4$ and then actuates the Delete key, then the automatic decision variation feature will react the same way as if the user had backspaced repeatedly to delete $9x^2-4$, so if $x^2$ is an alterable block, then the pre-deletion state for that alterable block will be $9x^2$.

In an embodiment, if a user selects a region of input and then types new input, for purposes of retyping detection features, the interface will respond as though the user actuated the Delete key after selecting the region of input before typing anything else. For example, if a user selects the expression $9x^2-4$ and then types 9x2-4, the interface will respond in the same way as if the user selected the expression, then actuated the Delete key, and then typed 9x2-4.

In an embodiment, for purposes of the interface behaviors described below, a "mass deletion key" is a key that causes the interface to instantly delete an entire region of input (such as a field in a form) without any need for the user to first select a region or otherwise specify the boundaries of the region to be deleted. An example is the Clear key on a typical graphing calculator, which causes the calculator interface to instantly delete an entire line of input. Another example is the Esc key on a personal computer, which in certain circumstances causes the computer interface to instantly delete a portion of text. A "mass deletion block" is the input that is deleted by an actuation of a mass deletion key.

In an embodiment, when a user actuates a mass deletion key, the interface will forget any and all remembered alterable blocks that were fully deleted before the user actuated the mass deletion key.

In an embodiment, when a user actuates a mass deletion key, for any existing alterable block or remembered alterable block that is partially or fully deleted by that actuation of the mass deletion key, the interface will determine what proportion of the mass deletion block was before the alterable block, what proportion of the mass deletion block was part of the alterable block, and what proportion of the mass deletion block was after the alterable block, and the interface will reduce that alterable block's variation score by an amount that equals a constant value times the percentage of the mass deletion block that was before the alterable block plus a constant value times the percentage of the mass deletion block that was after the alterable block. In an embodiment, the two constant values mentioned in the preceding sentence are not equal: instead, the first value is greater than the second, so the interface will reduce an alterable block's variation score more if an actuation of the mass deletion key deletes input that was before the alterable block then it will if the actuation of the mass deletion key deletes input that was after the alterable block, all else being equal.

In an alternative embodiment, when a user actuates a mass deletion key, for any existing alterable block or remembered alterable block that is partially or fully deleted by that actuation of the mass deletion key, if the mass deletion block included any input that was not part of that alterable block and was not decision-triggering input for that alterable block's decision, then the interface will forget that block. For example, in such an embodiment, if a user types $x^2-4$ and then presses the Clear key, then if $x^2$ was an alterable block, the interface will forget that alterable block because that actuation of the Clear key deleted two characters that were not part of that alterable block and were not decision-triggering input for that alterable block's decision.

Beginning to Watch for Decision Repetition

In an embodiment, when a user performs an editing action that is not a destructive action, before handling that action, the interface will determine whether to begin to "watch for repetition" of a remembered alterable decision by means of the following five steps.

First, the interface will forget every remembered alterable block that has not yet been fully deleted, so that every remaining remembered alterable block will be an alterable block that has been fully deleted. If no remembered alterable blocks remain, then no remembered alterable decisions will remain either, and the interface will not begin to watch for repetition of a remembered alterable decision, so this procedure will end immediately and the remaining steps will not occur.

Second, the interface will select a remembered alterable block. To do so, in an embodiment, for each remembered alterable block, the interface will calculate a "probability of variation" that equals the alterable block's variation score plus the probability of alteration of its alterable decision. The interface will then select the remembered alterable block that has the highest such probability of variation; if more than one remembered alterable block is tied for the highest probability of variation, the interface will select from among those remembered alterable blocks the one whose alterable interface decision is the most relevant. In an alternative embodiment, the interface will merely select the remembered alterable block whose alterable interface decision is the most relevant. (If more than one remembered alterable block belongs to that alterable interface decision, it does not matter which one the interface selects.)

Third, in an embodiment, if the interface calculated a probability of variation for each remembered alterable block and the second highest probability of variation was exactly as high or nearly as high as the highest probability of variation, then the interface will slightly reduce the variation score of the selected alterable block. In an embodiment, if the remembered alterable decision of the remembered alterable block is a multi-alternative decision such that its two alternate options that have the highest probabilities of variation have approximately the same probability of variation, then the interface will slightly reduce the variation score of the selected alterable block. Such behavior is intended to slightly inhibit the automatic decision variation feature in circumstances where it is relatively likely that any change to the user's input that is caused by triggering the automatic decision variation feature will not be the particular change that a user wanted. In an alternative embodiment, the interface will not reduce the variation score of the selected alterable block for either of the reasons described in the present paragraph.

Fourth, the interface will begin to watch for repetition of the remembered alterable decision of the remembered alterable block that was selected in step two. That remembered alterable decision will constitute the "monitored alterable decision" for purposes of the automatic decision variation feature. The remembered alterable block's pre-deletion state data will now be associated with the remembered alterable decision, and will thus be the monitored alterable decision's pre-deletion state data. In an embodiment that keeps track of variation scores, the remembered alterable block's variation score will now be associated with the remembered alterable decision, and will thus be the monitored alterable decision's variation score. In an embodiment that has option-specific alterable blocks, if the remembered alterable block is an option-specific alterable block, the interface will remember which alternate options of the monitored alterable decision are relevant alternate options for the remembered alterable block.

Fifth, for purposes of the automatic decision variation feature, the interface will forget all remembered alterable blocks and all remembered alterable decisions except the monitored alterable decision. In other words, the interface will cease to retain information about alterable blocks and alterable decisions that have been deleted, except that the interface will still retain information about the monitored alterable decision. As an exception, in an embodiment that has the manual alteration detection feature that is described in Chapter 18, the interface may continue to retain information about such remembered alterable decisions for purposes of the manual alteration detection feature, but such information will no longer be relevant for purposes of the automatic decision variation feature.

Watching for Decision Repetition

In an embodiment, whenever the variation score of the monitored alterable decision is reduced to zero or reduced below zero, the interface will immediately stop watching for repetition of the monitored alterable decision. In an embodiment, whenever the interface stops watching for repetition of the monitored alterable decision for any reason, the interface will cease to retain information about that decision and that decision will cease to be a monitored alterable decision.

In an embodiment, while the interface is watching for repetition of a monitored alterable decision, if the user performs an action that has a deliberation score that is higher than a certain moderately high threshold, then the interface will reduce the variation score of the monitored alterable decision by an amount that is proportional to the amount by which that deliberation score exceeds the threshold. In such an embodiment, if a user pauses a bit longer than usual between keystrokes, the interface may slightly reduce the variation score of the monitored alterable decision; if the user pauses a long time, the interface will greatly reduce its variation score. In an alternative embodiment, while the interface is watching for repetition of a monitored alterable decision, if the user performs an action that has a high deliberation score, then the interface will stop watching for repetition of the monitored alterable decision.

In an embodiment, while the interface is watching for repetition of a monitored alterable decision, if the user performs a destructive action, then the interface will substantially reduce the variation score of the monitored alterable decision. In an embodiment, in such circumstances the interface will additionally reduce the variation score of the monitored alterable decision by an amount that is proportional to the ratio of the amount of text deleted by the destructive action to the amount of text contained in the alterable block of the monitored alterable decision; for example, in an embodiment, if a monitored alterable decision has an alterable block with 10 characters and the user makes a typographical error while retyping the alterable block and presses the backspace key, then the monitored alterable decision may still have a variation score greater than zero, but if a monitored alterable decision has an alterable block with just a single character then as soon as the user presses the backspace key the monitored alterable decision's variation score will certainly drop below zero.

In an alternative embodiment, while the interface is watching for repetition of a monitored alterable decision, if the user performs a destructive action, then the interface will stop watching for repetition of the monitored alterable decision.

In an embodiment, while the interface is watching for repetition of a monitored alterable decision, if the user performs a destructive action that causes the deletion of all or part of the alterable block of an alterable interface decision that has a probability of alteration that is above the threshold of eligibility for automatic decision variation, then the interface will stop watching for repetition of the monitored alterable decision, and the alterable block the user just deleted may become a remembered alterable block as explained above.

In an alternative embodiment, while the interface is watching for repetition of a monitored alterable decision, if the user performs a destructive action that causes the deletion of all or part of the alterable block of an alterable interface decision, the interface will continue to watch for repetition of the monitored alterable decision, and also, the alterable block will become an remembered alterable block. When the user next performs an editing action that is not a destructive action, the interface will check whether the user's input contains any text that is not contained in the pre-deletion state of the monitored alterable decision and is not contained within any altered pre-deletion state of the monitored alterable decision. If so, then the interface will forget the monitored alterable decision and determine whether to begin watching for repetition of some other alterable decision. If not, then the interface will check whether or not any remembered alterable block has a higher probability of alteration than the monitored alterable decision; if so, then the interface will forget the monitored alterable decision and determine whether to begin watching for repetition of some other alterable decision, and if not, then the interface will forget all remembered alterable blocks and continue to watch for repetition of the monitored alterable decision. For example, in an embodiment, if the interface is watching for repetition of a monitored alterable decision whose alterable block was "He will; I won't." when the user deletes an alterable block and types a character, then if the text the user has typed while the interface was watching for repetition of the monitored alterable decision now consists of "He will;", then the interface may continue watching for repetition of the monitored alterable decision, but if that text now consists of "They will;", then the interface certainly will not continue watching for repetition of the monitored alterable decision.

In an embodiment, when the interface begins to watch for repetition of a monitored alterable decision the interface will determine by some means approximately how many keystrokes would be required to retype the alterable block of the monitored alterable decision, and if the interface is still watching for repetition of the same monitored alterable decision when the user has typed a certain number of keystrokes more than that amount, then the interface will stop watching for repetition of the monitored alterable decision. For example, in an embodiment, when the interface begins to watch for repetition of a monitored alterable decision the interface will count the characters in the alterable block of the monitored alterable decision, and if the interface is still watching for repetition of the same monitored alterable decision when the user has typed 10 keystrokes more than that number of characters, then the interface will stop watching for repetition of the monitored alterable decision. However, the behavior described in the present paragraph is intended as an implementation suggestion, and may not have any direct effect that a user will ever discern: once a user has typed a significant number more keystrokes than necessary to retype the alterable block of the monitored alterable decision, it will probably be impossible for the automatic decision variation feature to be invoked for that monitored alterable decision, so the interface need not waste computer resources watching for repetition.

In an alternative embodiment, while the interface is watching for repetition of a monitored alterable decision, as soon as the user performs any action that does not cause the state of the user's input to more closely resemble either the pre-deletion state or some altered pre-deletion state of the monitored alterable decision, the interface will stop watching for repetition of the monitored alterable decision. For example, in an embodiment, if the interface begins to watch for repetition of a monitored alterable decision whose alterable block was "its" and whose alternate option was "it's," then if the user types the character "q," the interface will immediately stop watching for repetition of the monitored alterable decision.

Recognizing Decision Repetition

In an embodiment, while the interface is watching for repetition of a monitored alterable decision, if in response to any editing action that is not a destructive action the state of the user's input will match the pre-deletion state of the monitored alterable decision or any altered pre-deletion state of the monitored alterable decision, and a current alterable decision will exist that is essentially identical to the monitored alterable decision (as defined below), then the interface will "recognize repetition of the monitored alterable decision." The current alterable decision that is essentially identical to the monitored alterable decision is referred to below as "the matching alterable decision."

In an embodiment, for purposes of the preceding paragraph, the phrase "any editing action that is not a destructive action" includes the editing action that causes the interface to determine whether to watch for repetition of a monitored alterable decision, so after a user deletes an alterable block that consists of only a single character, if the user's next action is typing the same character, then in response to that single keystroke the interface may first determine to begin watching for repetition of that alterable decision (because the user performed an editing action that is not a destructive action), then enter that character into the user's input, and then recognize repetition of the monitored alterable decision.

In an embodiment, a current alterable decision is considered to be "essentially identical to the monitored alterable decision" if it has the exact same options the monitored alterable decision had, and has the same unmodified default outcome, and its alterable block is exactly where the monitored alterable decision's alterable block was; however, it may have a different option selected and may have different probabilities of alteration assigned to its options. For purposes of the preceding sentence, the "unmodified default outcome" of a decision is the default outcome the decision would have if it were never affected by automatic decision variation or any other alteration-related functionality. In order for the alterable block of a current alterable decision to be "exactly where the monitored alterable decision's alterable block was," either the state of the user's input matches the pre-deletion state of the monitored alterable decision (as opposed to matching an altered pre-deletion state) and the alterable block of the current alterable decision is exactly where the monitored alterable decision's alterable block was before it was deleted, or else it is the case that if the current alterable decision were altered in such a way as to cause the state of the user's input to match the pre-deletion state of the monitored alterable decision, then the current alterable decision's alterable block would be exactly where the monitored alterable decision's alterable block was before it was deleted. For example, if the selected option of the monitored alterable decision was "its," its alternate option was "it's," and its pre-deletion state was "When its," then if in response to an editing action the state of the user's input will become "When it's" and a current alterable decision will exist with a selected option of "it's" and an alternate option of "its," then the alterable block of that current alterable decision is exactly where the monitored alterable decision's alterable block was, and that current alterable decision is essentially identical to the monitored alterable decision, and that current alterable decision is a matching alterable decision.

In an embodiment that behaves as described above, the interface may recognize repetition of a monitored alterable decision when an editing action causes the interface to make a new alterable decision that is a matching alterable decision, and the interface also may recognize repetition of a monitored alterable decision when an editing action causes an alterable decision that had already existed to become a matching alterable decision (which, for example, may happen when the alterable block of an alterable input state decision grows to include additional text as described in Chapter 15). In an alternative embodiment, the interface will recognize repetition of the monitored alterable decision only in response to an editing action that causes the interface to make a new alterable decision that is a matching alterable decision. Such an alternative embodiment will behave the same way most the time, because it is relatively uncommon for the interface to make an alterable decision that is not initially identical to the monitored alterable decision but later comes to be essentially identical to the monitored alterable decision.

In an embodiment that behaves as described above, in certain circumstances the interface will temporarily remember the pre-deletion state and altered pre-deletion states of deleted alterable decisions, and later if the state of the user's input matches either the pre-deletion state or any altered pre-deletion state of the monitored alterable decision, and a matching alterable decision exists, then the interface will recognize repetition of the monitored alterable decision. This way, when a user deletes and retypes an alterable block so that the interface makes a matching alterable decision, if somehow the initially selected option of the matching alterable decision does not match the option of the monitored alterable decision that was selected, the interface will still be able to recognize that the user has essentially done nothing but delete and retype an alterable block, because the interface will recognize the altered pre-deletion state. For example, if a user deletes and retypes an alterable block and in response to this the interface varies the decision so that an alternate option becomes selected, then if the user deletes and retypes the alterable block a second time, the interface may still be able to recognize repetition of the monitored alterable decision the second time.

In various alternative embodiments, the interface behavior that is explained in the preceding paragraph may be achieved by different methods than are described above, without the need for the interface to remember every altered pre-deletion state of deleted alterable decisions. In particular, in one alternative embodiment, the interface will remember only the pre-deletion state of deleted alterable decisions, and later if a matching alterable decision exists and either the state of the user's input matches the pre-deletion state or the matching alterable decision has an alternate option such that selecting this alternate option would cause the state of the user's input to match the pre-deletion state, then the interface will recognize repetition of the monitored alterable decision. In another alternative embodiment, whenever a user performs a destructive action that causes the deletion of any portion of an alterable block, if that alterable block becomes a remembered alterable block, the interface will determine in advance what input state to watch for: it will determine which option of a matching alterable decision will be initially selected if the interface subsequently does make a matching alterable decision, and if that option is the one that was selected for the remembered alterable decision before it was deleted, then the interface will remember the pre-deletion state; otherwise, the interface will remember the appropriate altered pre-deletion state; in either case, later if a matching alterable decision exists and the state of the user's input matches the particular state that the interface remembered, then the interface will recognize repetition of the monitored alterable decision.

In yet another alternative embodiment, the interface will remember only the pre-deletion state of deleted alterable decisions, and the interface will recognize repetition of the monitored alterable decision only when the state of the user's input matches the pre-deletion state and a matching alterable decision exists. Such an embodiment will not recognize repetition of the monitored alterable decision in certain situations where previously described embodiments would recognize repetition of the monitored alterable decision, but it will usually recognize repetition of a decision as long as a user does not delete and retype the same alterable block twice.

Invoking Decision Variation

In an embodiment, when a user performs any editing action that is not a destructive action and the interface recognizes repetition of the monitored alterable decision, if that editing action was an Undo or Redo action, then the interface will stop watching for repetition of the monitored alterable decision and do nothing special: decision variation will not be invoked. For example, if actuating the Paste key causes the interface to make an alterable decision, then actuating the Undo key and then the Paste key again may invoke decision variation, but actuating the Undo key and then the Redo key will not.

In an embodiment, when a user performs any editing action that is not a destructive action and the interface recognizes repetition of the monitored alterable decision, if that editing action was not an Undo or Redo action, then the interface will vary the matching alterable decision as described below, which in most cases will cause the interface to select a different outcome of the decision.

In an embodiment, in some cases, it may be possible that a certain editing action will cause the interface to make an alterable interface decision and then a later editing action will cause the interface to vary that decision. In an embodiment, if a certain editing action causes the interface to make an alterable decision and then a later editing action causes the interface to vary the decision, then when the interface varies the decision, if varying the decision causes a different outcome of the decision to become selected, for purposes of interface visuals, the change to the user's input caused by varying the decision will be an alteration: that change will be highlighted and/or animated in the same way that an alteration would be highlighted and/or animated.

In an embodiment, however, it is likely that usually the editing action that causes the interface to vary a decision will be the same editing action that caused the interface to make the decision. In an embodiment, when the same editing action causes the interface to make an alterable decision and then immediately causes the interface to vary the decision, the interface will not display the outcome of the decision until after it varies the decision, so for purposes of interface visuals, in all respects the eventual outcome of the decision will appear to be the initial outcome of the decision. For example, in such an embodiment, if the interface makes a decision such that the default outcome of the decision would be to automatically convert x2 to $x^2$, but varying the decision causes the interface to select the outcome x2, then the interface will not temporarily display the outcome $x^2$ and then immediately convert the result to x2; instead, the interface will display only the eventual result of x2. As another example, in an embodiment where the interface highlights autocorrection changes in a way that is distinctively different than the way it highlights alterations, if the interface makes an alterable decision such that the default outcome of that decision is to not perform an autocorrection but varying the decision causes the outcome of performing the autocorrection to become selected, the interface will display this outcome as an autocorrection change, not as an alteration. In an embodiment, as an exception, when the same editing action causes the interface to make an alterable decision and then immediately causes the interface to vary the decision, if the change that occurs when the decision is varied will be a subtle change as defined in Chapter 8, then the interface will first display the outcome of the decision and then vary the decision, in order to help call attention to that change; for example, if varying a decision will convert a slanted quotation mark to a straight quotation mark, then the interface will first display the slanted quotation mark and then display the change to a straight quotation mark as an alteration, which will have a block descriptor as described in Chapter 8.

In an embodiment, when a user enters decision-triggering input as defined in Chapter 11, for purposes of retyping detection features, the alterable interface decision that is triggered by this input will actually occur first and may cause a retyping detection feature to be invoked before the decision-triggering input is entered into the user's input. For example, consider the following scenario: A user types "its" followed by a space character and the interface makes an alterable decision to automatically replace "its" with "it's." The user deletes the space character and then deletes the alterable block consisting of the word "it's"; the pre-deletion state of the user's input thus includes the word "it's" but does not include any following space character. The user then immediately retypes "its" and presses the space bar. The entry of a space character may again trigger an alterable decision whether to automatically replace "its" with "it's," so this space character is decision-triggering input. In an embodiment, for purposes of the automatic decision variation feature, the triggered alterable decision whether to replace "its" with "it's" will actually occur first, before the entry of the space character, and so the user's input will momentarily include the word "it's" without a following space character, which will cause the automatic decision variation feature to be invoked before the space character is actually entered into the user's input. The automatic decision variation feature will thus convert "it's" back to "its" before the space character is appended, so the result will be "its".

In various embodiments, the behavior described in the preceding paragraph may be implemented in various ways. The interface may determine that the user has caused the entry of decision-triggering input before actually entering the input, then make the alterable decision, and then enter the input; or the interface may enter the input, then recognize that it is decision-triggering input, then undo the entry of the input, then make the decision, and then redo the entry of the input; or the interface may enter the input, then make the decision, then determine what the input state would be if the decision-triggering input were not present and use this hypothetical input state to determine whether to invoke a retyping detection feature. Other means of implementing such behavior may be evident to those of ordinary skill in the art.

Varying a Decision

In an embodiment, when the interface varies a matching alterable decision, before determining the new selected option of the decision and the new probabilities of alteration of its options, the interface will cause the selected option of the matching alterable decision to be the same option that was selected for the monitored alterable decision (if it was not already), and the interface will cause the probability of alteration of every alternate option of the matching alterable decision to be at least as much as the probability of alteration of the corresponding alternate option of the monitored alterable decision. (In many cases, this will have no effect, because the matching alterable decision will already have the same option selected as the monitored alterable decision and all its alternate options will already have probabilities of alteration that are equal to or greater than the probabilities of alteration of the corresponding alternate options of the monitored alterable decision.)

In an embodiment, when the interface varies a matching alterable decision, in order to determine the new selected option of the decision and the new probabilities of alteration of its options, the interface will apply the variation score of the monitored alterable decision to the matching alterable decision as follows: First, the interface will increase the probability of alteration of each relevant alternate option of the decision by an amount equal to the variation score. If an alternate option then has a probability of alteration that is higher than the implicit default option probability (as defined in Chapter 3), then the interface will assign a probability of alteration to the default option that equals the implicit default option probability and will then reduce the probability of alteration of every relevant alternate option and the default option by the amount that will cause the greatest probability of alteration of any relevant alternate option to equal the implicit default option probability, and then the interface will select a relevant alternate option that has the greatest probability of alteration, so that option becomes the default option. Other mathematically equivalent procedures that achieve identical results will be evident to those of ordinary skill in the art.

(In most cases, every alternate option is a relevant alternate option, but in an embodiment that is explained in Chapter 14, when a user deletes and retypes an option-specific alterable block, certain alternate options will not be relevant alternate options. For example, in such an embodiment, if the interface has made a multi-alternative alterable decision that has an alterable block consisting of $\sqrt{1+3+5}$, and altering the decision would yield either $\sqrt{1}+3+5$ or $\sqrt{1+3}+5$ depending on which alternate option becomes selected, and if the user invokes the automatic decision variation feature by means of deleting and retyping+3+5, then this may convert the result to $\sqrt{1}+3+5$, but definitely will not convert the result to $\sqrt{1+3}+5$.)

In an embodiment, it may generally be expected that if a user deletes and retypes an alterable block reasonably quickly and without deleting or typing anything else, the variation score will be approximately equal to the variation score base value. In an embodiment, the variation score base value equals the amount by which the implicit default option probability exceeds the initial probability of alteration of an alterable interface decision that initially has a very low probability of alteration. In such an embodiment, if an alterable decision has a very low probability of alteration, then a user can still change its outcome by deleting and retyping its alterable block, provided the user does not hesitate after deleting the alterable block or make a typographical error in retyping the alterable block or do anything else that would cause the decision's variation score to be reduced below its initial value. If an alterable decision has a high probability of alteration, then a user may be able to change its outcome by deleting and retyping its alterable block even if the user does so in a way that causes the decision's variation score to be reduced below its initial value. Also, if a single-alternative alterable decision has a high probability of alteration and a user immediately deletes and retypes its alterable block quite rapidly, then not only will this change the decision's outcome, but also it will cause the matching alterable decision to have a relatively low probability of alteration, which accurately reflects the fact that it is quite likely the user's behavior was indeed intended to change the outcome.

In an embodiment that behaves as described above, when the interface applies a variation score to a decision, if the variation score is positive but is so small that it does not affect the outcome of the decision, it still may have an effect on the probability of alteration of the options of the decision. For example, if an alterable decision has a low probability of alteration and a user deletes and retypes its alterable block but hesitates in doing so, and if due to that hesitation the variation score is a relatively small value and so the interface selects the same default option as before, then the decision may now have a high probability of alteration. After that, if the user then deletes and retypes its alterable block just as hesitantly as before, if as explained above the interface causes the probability of alteration of the matching alterable decision to be at least as much as the probability of alteration of the monitored alterable decision, then even though the variation score will be a relatively small value again, the interface may select a different option of the decision because a small variation score may be sufficient to cause a different outcome for a decision that had a high probability of alteration. In other words, when deleting and retyping a decision once does not change the outcome of a decision, doing so twice may change the outcome.

In an alternative embodiment, when the interface varies a decision, in order to determine the new selected option of the decision and the new probabilities of alteration of its options, rather than applying the variation score of the monitored alterable decision as described in the preceding paragraphs, the interface will simply select the next option of the decision as though the decision were altered. (Such an embodiment need not necessarily keep track of any variation scores at all.) In an embodiment, when the interface varies a decision this way, the interface will subsequently remember for the decision which alternate option or options have been previously selected, and if subsequently the user deletes and retypes the decision's alterable block again so that another matching alterable decision exists, the interface will if possible select an option that has not yet been selected. Thus, in such an embodiment, after the interface makes a multi-alternative decision, a user can cycle through the alternate options of the decision by repeatedly deleting and retyping the decision's alterable block in such a way as to cause the interface to vary the decision.

In another alternative embodiment, when the interface varies a decision, the interface will actually undo all user activity that occurred since the last time the user's input was in the pre-deletion state so that the monitored alterable decision exists again as a current alterable decision, and then the interface will alter that decision. In such an embodiment, deleting and retyping an alterable block in such a way as to invoke automatic decision variation has the exact same effect as altering the decision.

Additional Effects of Decision Variation

In an embodiment, for purposes of the interface adaptation functionality described in later chapters, a matching alterable decision is treated as a re-creation of the monitored alterable decision. Therefore, if the interface makes an alterable decision that has a certain outcome and then the user deletes and retypes its alterable block in such a way as to invoke decision variation so that the matching alterable decision has a different outcome, then for purposes of interface adaptation functionality, this constitutes evidence that the initial outcome of the initial alterable decision was a non-beneficial outcome.

However, in an embodiment, invoking the automatic decision variation feature does not actually constitute altering a decision per se, and does not constitute explicitly selecting an option of the decision. When automatic decision variation is invoked, for most purposes, this simply means that the interface makes a decision that is similar to a previous decision but (usually) has a different outcome.
Example of Decision Variation The following example is intended as a detailed illustration of one possible version of the automatic decision variation feature that is described above. It is to be understood that various embodiments that have the automatic decision variation feature may implement the feature in various ways, so certain details of the following example may not be directly applicable to some embodiments that have the automatic decision variation feature.

Suppose that a user types 9x2, and the interface automatically converts x2 to $x^2$, so the result thus far is $9x^2$. The interface's decision to convert x2 to $x^2$ is an alterable decision that has a very low probability of alteration. It has two distinct alterable blocks for purposes of the automatic decision variation feature: one of them is just the exponent 2, and the other is the entire exponential expression $x^2$.

The user types two more characters, yielding $9x^2$-4, but then backspaces those two characters.

The user then immediately backspaces again, deleting the exponent 2. This destructive action causes both alterable blocks of the alterable decision to become remembered alterable blocks, and causes the alterable decision to become a remembered alterable decision. For both alterable blocks, the pre-deletion state is $9x^2$, and the altered pre-deletion state is 9x2. The remembered alterable block that consisted of just the exponent 2 has been fully deleted; the remembered alterable block that consisted of the entire exponential expression $x^2$ has been partially deleted. Both remembered alterable blocks now have a variation score that equals the variation score base value.

The user then immediately backspaces again, deleting the letter x. The remembered alterable block that consisted of just the exponent 2 had already been fully deleted; in response to this additional consecutive destructive action, the interface greatly reduces its variation score. The variation score of the remembered alterable block that consisted of the entire exponential expression $x^2$ is unaffected.

The user then immediately retypes the letter x. This is a non-destructive action, so the interface determines whether to begin to watch for repetition of a remembered alterable decision. For both remembered alterable blocks, the interface calculates a probability of variation that equals the alterable block's variation score plus the probability of alteration of its alterable decision; the remembered alterable block $x^2$ has a much higher variation score, and both alterable blocks belong to the same alterable decision, so the remembered alterable block $x^2$ has the higher probability of variation. The interface begins to watch for repetition of that alterable block's remembered alterable decision, which is now the monitored alterable decision; $9x^2$ is now the pre-deletion state of the monitored alterable decision, and 9x2 is its altered pre-deletion state. The interface forgets the remembered alterable blocks, and remembers only the monitored alterable decision. The interface checks whether the input state matches the monitored alterable decision's pre-deletion state or altered pre-deletion state; it does not.

The user then immediately retypes the digit 2. In response to this action, the interface will again alterably decide to convert x2 to $x^2$, so the state of the user's input will match the pre-deletion state of the monitored alterable decision and a current alterable decision will exist that is identical to the monitored alterable decision, and so the interface recognizes repetition of the monitored alterable decision and varies the matching alterable decision.

To vary the decision, the interface increases the probability of alteration of its alternate option by an amount equal to the variation score. That probability of alteration is very low, but the variation score has not been reduced from the variation score base value, so adding it to the the probability of alteration yields a result that is slightly more than the implicit default option probability. The interface assigns a probability of alteration to the default option that equals the implicit default option probability and then slightly reduces the probability of alteration of both options, so that now the alternate option's probability of alteration equals the implicit default option probability and the default option's probability of alteration is slightly less, but is still a very high probability of alteration. The interface selects the alternate option; it is now the new default option.

The interface displays the result, 9x2.

For purposes of interface adaptation, the interface currently believes that the initial decision to automatically convert the digit 2 to an exponent had a non-beneficial outcome. The matching alterable decision now has a very high probability of alteration, so in an embodiment, x2 is highlighted, and if the user wants the result $9x^2$ then the user can achieve this result by actuating the alteration key. Alternatively, if the user wants the result $9x^2$, the user can first delete the digit 2, which will cause a remembered alterable block to exist, and then immediately retype the digit 2, which will cause the interface to watch for repetition of a monitored alterable decision, and will also immediately make the state of the user's input match an altered pre-deletion state of that monitored alterable decision and make a matching alterable decision exist, so the interface will again vary the matching alterable decision, which will yield the result $9x^2$ this time.

Decision Variation and Memory Constraints

Above, throughout the description of the automatic decision variation feature, for the sake of simplicity the interface is assumed to actually remember entire pre-deletion states and altered pre-deletion states in order to be able to later determine whether such a remembered state matches the then-current state of the user's input. However, in various embodiments, in order to reduce the memory requirements of retyping detection features, the exact same interface behaviors can be achieved by various other means. For purposes of retyping detection features, the interface really only needs to remember enough information about a pre-deletion state to be able to later recognize when the pre-deletion state matches the then-current state of the user's input. Also, for purposes of retyping detection features, whenever a user performs an action that may reasonably be assumed to indicate that the user does not currently intend to invoke a retyping detection feature, then the interface may as well immediately forget a remembered alterable block and its pre-deletion state if it is convenient for the interface to do so.

For example, in an embodiment, the interface will calculate a 256-bit hash code for a pre-deletion state and will remember that hash code in lieu of remembering the pre-deletion state itself, and later, in order to determine whether that pre-deletion state matches the then-current state of the user's input, the interface will calculate a 256-bit hash code for the then-current state of the user's input and check whether this matches the hash code that was generated for the pre-deletion state. If the hash codes match, then the input states themselves may be presumed to match. (There is an infinitesimal possibility that the hash codes will match when the input states themselves would not match, but in the unlikely event that this ever happens, the consequences will not be especially severe: if the automatic decision variation feature is accidentally invoked, then one retyped alterable decision will happen to have a different outcome than expected; if the manual alteration detection feature is accidentally invoked, the consequences will be even less significant.)

As another example, in an embodiment that has a version of the automatic decision variation feature but does not have the manual alteration detection feature, when a user performs a sequence of consecutive destructive actions followed by a non-destructive action, the interface will not remember any pre-deletion state or altered pre-deletion state of any deleted alterable block until it begins to watch for repetition of a monitored alterable decision. Instead, for each deleted alterable block, the interface will remember at what moment the alterable block was deleted so that the interface can later undo all the actions that occurred from the deletion of the alterable block onward. When the interface selects an alterable block whose alterable decision will become the monitored alterable decision, the interface will internally undo all the actions from the deletion of that alterable block onward in order to determine and remember the pre-deletion state and all altered pre-deletion states of that alterable block, and then the interface will internally redo all those actions (without actually displaying any undo changes or redo changes to the user's input). Thus, in such an embodiment, the interface will actually remember one entire pre-deletion state whenever there is a monitored alterable decision; however, when a sequence of consecutive destructive actions simultaneously deletes multiple alterable blocks, the interface will not need to simultaneously remember one pre-deletion state for each alterable block.

As another example, in an embodiment, the interface will never remember any deleted alterable block unless it is a contiguous portion of input that is smaller than a certain size (such as, in an embodiment, 50 characters). When the interface remembers the pre-deletion state of such an alterable block, this pre-deletion state will consist of only the portion of input that was within a certain range of the alterable block before it was deleted (such as, in an embodiment, within 10 characters). If the user subsequently performs any editing action that affects any of the user's input that is outside this portion of input, then the interface will forget the remembered alterable block; after all, if the user went off to do some editing elsewhere in the current document, then the user will probably not invoke a retyping detection feature anyway. Later, in order to determine whether that pre-deletion state matches the then-current state of the user's input, the interface will simply check the relevant portion of the user's input, knowing that no other portion of the user's input has changed.

Other possible implementations of retyping detection features that reduce the memory requirements of retyping detection features will be evident to those of ordinary skill in the art.

Trigger Variation

In an embodiment, after a user inputs a character that is decision-triggering input for an alterable decision, if the user wishes to alter that decision by deleting and retyping text, then rather than deleting and retyping the entire alterable block of the decision, the user may instead delete and retype just the decision-triggering character. Such an embodiment will be said to have "the trigger variation feature." Details of such an embodiment are specified in the following paragraphs.

In an embodiment, when a user performs an action that deletes a character that was decision-triggering input for an alterable decision without deleting any portion of that decision's alterable block, for purposes of decision variation, the deleted character will be treated as though it is an alterable block of that decision, and so it will become a remembered alterable block. In such a case, that remembered alterable block will be the alterable block of an alterable decision that is a current alterable decision, not a remembered alterable decision. In an embodiment, the interface will keep track of a certain value called the "trigger variation penalty," and whenever the interface thus causes a deleted character to become the remembered alterable block of a current alterable decision, the interface will reduce that remembered alterable block's variation score by an amount that is equal to the trigger variation penalty.

In an embodiment, after a deleted character that was decision-triggering input becomes a remembered alterable block of a current alterable decision as described in the preceding paragraph, if the user's next action does not consist of retyping the same character in the same location, then the user will forget that alterable block.

In an embodiment, after a deleted character that was decision-triggering input becomes a remembered alterable block of a current alterable decision, if the user's next action consists of retyping the same character in the same location, then the interface will proceed as described above in the explanation of the automatic decision variation feature. Therefore, in response to the retyping of that character, first the interface will determine whether to begin watching for repetition of an alterable decision, because the user performed an editing action that was not a destructive action; then the interface will enter that character into the user's input. At this point, if the interface decided to begin watching for repetition of that current alterable decision, then it is certain to recognize repetition of the monitored alterable decision: the state of the user's input will certainly match the pre-deletion state, because nothing happened since the pre-deletion state was recorded except the deletion and retyping of a single character, and a current alterable decision will certainly exist that is essentially identical to the monitored alterable decision, because a current alterable decision will exist that actually is itself the monitored alterable decision. In such circumstances, the interface will then vary the monitored alterable decision itself.

For example, in an embodiment that has the trigger variation feature, if a user inputs the word "its" followed by a space character, and the entry of the space character triggers an alterable interface decision to convert the preceding word to "it's," then the user can convert the result back to "its" by immediately deleting and retyping the space character: when the user deletes the space character, it will become the remembered alterable block of that decision, and when the user retypes the space character, that decision will become the monitored alterable decision, and the interface will recognize repetition of the monitored alterable decision, and so the interface will vary that decision, which will cause the outcome "its" to become selected.

As another example, in an embodiment, if a user types the lowercase word "tuesday" followed by a quotation mark, and the entry of the quotation mark triggers an alterable interface decision to automatically capitalize the word "tuesday" and also triggers an alterable interface decision to automatically convert the quotation mark from a straight quotation mark to a slanted quotation mark, then if the user immediately deletes the quotation mark, the deleted quotation mark will then be the remembered alterable block of a current alterable decision regarding the word "Tuesday" and will also be the remembered alterable block of a remembered alterable decision regarding the quotation mark itself, so if the user then immediately retypes the quotation mark, one of those two decisions may become the monitored alterable decision; which decision becomes the monitored alterable decision depends on factors such as the trigger variation penalty and the probabilities of alteration of the two decisions.

In an alternative embodiment, if a user performs an action that deletes a character that was decision-triggering input for an alterable decision without deleting any portion of that decision's alterable block, and the user's next action consists of retyping the same character in the same location, then the interface will alter that alterable decision. Such an embodiment may be easier to implement than the more complex version of the trigger variation feature that is described above, and may yield the same results in most cases, but may be less advantageous in some cases. Such an embodiment also will be said to have "the trigger variation feature."

In an embodiment that has the trigger variation feature, for some users it may seem rather odd at first that it is possible to undo an autocorrection by means of deleting and retyping the space character that is after the word that was autocorrected (for example). Nevertheless, deleting and retyping just a single character is a quick and easy way to correct a mistake, so the trigger variation feature may be quite advantageous for a user who becomes accustomed to it.

Other Versions of Decision Variation

As described above, the automatic decision variation feature may be fairly complex, in some embodiments. However, those of ordinary skill in the art will understand how to create various alternative embodiments with simpler versions of the automatic decision variation feature.

For example, in an alternative embodiment, after a user action causes the interface to make exactly one alterable decision, if each of the user's subsequent actions is a destructive action until the alterable block of that alterable decision is entirely deleted and nothing else is deleted, and then each of the user's subsequent actions is a non-destructive action until the interface makes an exactly identical alterable decision and the user's input is exactly the same as it was after the previous time the interface made the alterable decision, then the interface will alter that decision. In such an alternative embodiment, if a single user action causes the interface to make two distinct alterable decisions, then neither decision can be altered by means of the automatic decision variation feature; also, after the interface makes an alterable decision, if the user's next action is a non-destructive action, then it will no longer be possible for the user to go back and alter that decision by means of the automatic decision variation feature; nevertheless, such an alternative embodiment will often yield the same results as an embodiment with a more complex version of the automatic decision variation feature.

Automatic Decision Variation in Perspective

In various prior art interfaces, in certain circumstances, if the interface performs an autocorrection or automatic formatting action, and then before performing any other actions the user deletes and retypes the same input, then the interface will not necessarily repeat the same autocorrection or automatic formatting action the second time. For example, on a prior art iPhone, typing "woth" and then pressing the space bar may trigger autocorrection and so may yield the result "with," but if it does, then immediately deleting the entire word "with" and typing "woth" a second time may yield the result "woth." Even with respect to undesired autocorrections and automatic formatting actions, the automatic decision variation feature may be advantageous over prior art in various ways. In particular, in an embodiment, because the automatic decision variation feature is sensitive to significant pauses that occur while deleting and retyping text, a user can delete and retype text in such a way that the interface does not repeat an autocorrection or automatic formatting action (by not pausing), or a user can delete and retype text in such a way that the interface does repeat the autocorrection or automatic formatting action (by pausing). Such flexibility may generally make it easier for users to achieve desired results.

The automatic decision variation feature may be especially advantageous in conjunction with various other interface features that are described herein. In an embodiment with the automatic decision variation feature such that the interface highlights an alterable decision when its probability of alteration is above a certain threshold (as described in Chapter 5) and such that it is easy to alter highlighted alterable decisions by means of alteration functionality, if a user deletes and retypes the portion of input that pertains to an alterable interface decision but does not achieve the result he desires (either because the automatic decision variation feature was invoked when the user did not wish it to be or vice versa), then it may be easy for the user to notice and correct the resulting mistake. In an embodiment with the automatic decision variation feature where a wide variety of interface decisions are alterable (as is described in Part III), there will be a wide variety of situations in which deleting an undesired result and then instinctively repeating the behavior that caused the undesired result may actually yield the desired result. Such advantages may be quite significant even in an embodiment that has a very simple version of the automatic decision variation feature.

Chapter 19: Decision Function Optimization
Decision Functions

In certain circumstances a prior art TI-84 Plus C Silver Edition graphing calculator running OS 4.0 will make a decision whether to display an answer in the form of a decimal or in the form of a fraction. The following paragraph explains when the TI-84 will decide to display an answer in the form of a decimal and when it will decide to display the answer in the form of a fraction. This particular decision serves as an example of a somewhat complex interface decision, and in the following discussion of interface decisions, any mention of "the example decision function" is a reference to the behavior that is described in the following paragraph.

The TI-84 Plus C Silver Edition has a mode settings screen with a line that says "ANSWERS:AUTO DEC FRAC-APPROX." When this calculator makes a decision whether to display an answer as a decimal or as a fraction, if the selected ANSWERS mode setting is DEC, then the calculator will decide to display the answer as a decimal. If the selected setting is FRAC-APPROX, then the calculator will decide to display the answer as a fraction. If the selected setting is AUTO, then the calculator will decide to display the answer as a fraction if the problem for which the calculator is providing an answer includes a fraction, or as a decimal otherwise.

In the present specification, a "decision function" is a mapping of circumstances to decision outcomes: that is, a decision function specifies which outcome an interface will choose in any given circumstances. Any particular decision function can be implemented by means of various algorithms. For example, the decision function that is specified in the preceding paragraph could be implemented by an algorithm that as its first step checks the calculator's ANSWERS mode setting, and then if the setting is DEC chooses decimal form; or if the setting is FRAC-APPROX chooses fraction form; or if the setting is AUTO, as its second step checks whether the user's input included a fraction, and then chooses fraction form if the input included a fraction, or decimal form otherwise. However, the same decision function could instead be implemented by an algorithm that as is its first step checks whether the user's input included a fraction, and then if the input included a fraction, as its second step checks the calculator's ANSWERS mode setting and then chooses fraction form unless the setting is DEC; or if the input did not include a fraction, as its second step checks the calculator's ANSWERS mode setting, and chooses decimal form unless the setting is FRAC-APPROX. Throughout the present specification, if a decision function is specified by describing one particular algorithm that implements the decision function, it is to be understood that those of ordinary skill in the art may be able to construct other algorithms that implement the same decision function.

In the present specification, a "decision class" is the set of all decisions such that an interface will make the decisions by means of the same decision function. For example, some interfaces have a setting that determines whether or not the interface will automatically capitalize days of the week, so in such an interface, if a user types "sunday" on one occasion and the interface makes a decision whether or not to capitalize that word, and the user types "monday" on another occasion and the interface makes a decision whether or not to capitalize that word, both these decisions are made by means of the same function, which simply checks the same setting; both these decisions thus belong to the same decision class. In the present specification, an "alterable decision class" is a decision class such that the decisions are alterable decisions; a "threshold decision class" is a decision class such that the decisions are threshold decisions; and so forth. In the present specification, a decision class may be said to be the decision class of a certain decision function, and a decision function may be said to be the decision function of a certain decision class.

Analyzing Decision Outcomes

In the present specification, an "optimizable decision" is any decision that an interface makes such that user behavior may later make it clear in retrospect whether the decision had a beneficial outcome or a non-beneficial outcome. For example, an interface's decision to automatically capitalize the word "tuesday" may be considered to have a non-beneficial outcome if the user immediately changes the word back to lowercase. When for some reason it is not possible to determine in retrospect whether an optimizable decision had a beneficial outcome or non-beneficial outcome, the decision may be considered to have had a neutral outcome. For example, an interface's decision to automatically capitalize the word "tuesday" may be considered to have a neutral outcome if the user immediately deletes the entire paragraph and closes the document.

A decision may be an optimizable decision as defined above even if the interface does not actually analyze the outcome of the decision. For example, when the prior art Microsoft Word interface decides whether or not to automatically capitalize the word "tuesday," this decision is an optimizable decision even though Microsoft Word does not determine in retrospect whether or not the decision had a beneficial outcome. However, the decision adaptation functionality that is described below requires the interface to analyze the outcomes of optimizable decisions in order for them to be adaptive decisions (as defined below).

Below, it will generally be assumed that when the interface determines that a decision had a non-beneficial outcome, the interface will also determine what outcome would have been beneficial. In an embodiment, if somehow a decision has more than two possible outcomes and the interface determines that the initial outcome of the decision was non-beneficial but cannot determine which of the other outcomes would have been beneficial, then such a decision may be treated as having a neutral outcome rather than a non-beneficial outcome for purposes of decision adaptation.

In an embodiment, for any optimizable decision that is an alterable decision, the interface will consider the decision to have a beneficial outcome when its initial default option remains selected. The interface will consider the decision to have a non-beneficial outcome when any other option is selected, and will consider the option that is selected to be the outcome that would have been beneficial. The interface will consider the decision to have a neutral outcome if the alterable decision is deleted because the user deleted or manually modified a portion of its alterable block, except that if the alterable decision is deleted but subsequently the manual alteration feature recognizes manual alteration of the decision then this will be treated as though the user had altered the decision by means of alteration functionality, or if the alterable decision is deleted and then the automatic decision variation feature causes a matching alterable decision to be created then this matching alterable decision will be treated as the same decision for purposes of the decision adaptation feature and so the interface will no longer consider the decision to have a neutral outcome.

If a particular embodiment has the decision adaptation functionality that is described below, and analyzes the outcomes of optimizable decisions that are alterable decisions as described in the preceding paragraph, and has the manual alteration detection feature, then it may be quite advantageous for the embodiment to have a wide variety of optimizable decisions be "alterable decisions" whether or not the embodiment actually includes any features that facilitate altering such decisions, because this will make it easy to take advantage of decision adaptation functionality for such decisions.

Optimizing Decisions

The process of improving the decision function for a particular interface decision class so that such decisions will be more likely to have beneficial outcomes will be referred to in the following discussion as "optimizing a decision."

Optimizing decisions may be more advantageous for some embodiments of the present invention than for prior art interfaces. One reason is that some embodiments of the present invention can easily be configured to analyze the outcomes of a wide variety of optimizable decisions, as described above, which will make it easy to take advantage of decision adaptation functionality to optimize such decisions. Another reason is that some embodiments of the present invention may reduce the need for interface decisions to be simplistic. In prior art interfaces, if a user does not notice right away that an interface decision had a non-beneficial outcome, then the user will typically need to perform several actions in order to achieve the desired outcome and resume working. If an interface is very simple, then although the interface may make decisions that have non-beneficial outcomes, at least a typical user may soon understand the interface well enough to know when to look for a non-beneficial outcome, so the user will usually notice right away if an interface decision has a non-beneficial outcome. In some embodiments of the present invention, though, if a user does not notice right away that an interface decision had a non-beneficial outcome, the user may nevertheless be able to achieve the desired outcome with just a single keystroke or single touch gesture. For that reason, it may be unnecessary for the interface to be very simple: a typical user may not care very much whether it is possible to understand the interface well enough to know when to look for a non-beneficial outcome. Instead, it may be more desirable for the interface to make decisions that have beneficial outcomes as often as possible, even if this means that the user may not know when to look for the occasional non-beneficial outcomes. In other words, an interface can be more aggressively helpful when its inevitable mistakes are unlikely to cause much inconvenience.

To optimize a particular interface decision class, an interface designer may cause the interface to take past decision outcomes into account when making the decision, or may cause the interface to take immediate context into account when making the decision, or both. Causing the interface to take past decisions outcomes into account when making a decision will be referred to herein as "making a decision adaptive," and causing the interface to take current context into account or causing it to do so in a more sophisticated way will be referred to as "making a decision smarter."

Below, the present specification will explain how to divide an interface decision class that has more than two possible outcomes into component decision classes, because it may be easier to optimize such component decisions individually. Next, the present specification will explain a generalized approach for making decisions adaptive. After that, the present specification will discuss some generally applicable principles for making decisions smarter. After that, the present specification will discuss some ways that adaptation behavior can be customized, so that for example the interface may be quicker to adjust the behavior of some decision classes than other decision classes. After that, the present specification will discuss customization of entire alteration-related features (such as the automatic decision variation feature), as opposed to individual decision classes.

Composite Decisions

In some cases, even if an interface decision that has more than two possible outcomes appears to the user to be a single interface decision, the interface may actually make the decision by dividing it into component decisions and making those decisions sequentially. Any decision that is divided into component decisions may be referred to herein as a "composite decision."

As an example, consider an interface decision class regarding whether to display an answer to a calculation as a decimal, proper fraction, improper fraction, or mixed fraction. This decision class will be referred to as "the example composite decision class." This composite decision class may be divided into three component decisions. To decide what form to display a particular answer in, first, the interface will make a component decision whether to display the answer as a decimal or as a fraction. If the interface decides to display the answer as a fraction, then the interface will make a component decision whether or not to display the answer as a proper fraction. If the interface decides not to display the answer as a proper fraction, then the interface will make a component decision whether to display the answer as an improper fraction or as a mixed fraction.

In terms of graph theory, a composite decision can be represented as a tree structure that has more than one internal node, where each internal node represents a component decision and each leaf represents an outcome of the composite decision. When the example composite decision class is represented as a tree, its root node represents the first component decision. The root node has two children: one is a leaf that represents the decimal outcome, and the other is an internal node that represents the second component decision. The node representing the second component decision has two children: one is a leaf that represents the proper fraction outcome, and the other is an internal node that represents the third component decision. The node representing the third component decision also has two children: one is a leaf that represents the improper fraction outcome, and the other is a leaf the represents the mixed fraction outcome.

In some cases, certain outcomes of a decision class will be possible outcomes for some decisions of that class but not for other decisions of that class. In the present specification, an "unavailable outcome" is an outcome that is not possible for a particular decision but would be possible for certain other decisions of the same decision class; an "available outcome" is an outcome that is possible for a particular decision. For example, for the example composite decision class, when a particular answer equals 0.5 it is not possible to display that answer as an improper fraction, so the outcome of displaying the answer as an improper fraction is then an unavailable outcome; in such circumstances, the outcome of displaying the answer as a mixed fraction is also an unavailable outcome. When an answer equals 1.5, the improper fraction outcome and the mixed fraction outcome are available outcomes, but the proper fraction outcome is an unavailable outcome. When an answer equals $\sqrt{2}$, only the decimal outcome is available.

In the following discussion of composite decisions, a "decision path" is a possible sequence of individual outcomes of component decisions that leads to an outcome of the composite decision. When a composite decision is represented as a tree structure, each path from the root node to a leaf thus represents a decision path. For a particular decision, an "available decision path" is a decision path such that each outcome of a component decision is an available outcome for that component decision.

When a composite decision is an alterable decision, in order to determine what outcomes are available, the interface can either determine every available outcome directly, or it can systematically traverse every available decision path in order to determine every available outcome. For example, for the example composite decision class, the interface can directly figure out which outcomes will be available for a particular answer based on the value of the answer. Alternatively, the interface can first check which outcomes of the first component decision are available outcomes; then if the fraction outcome is available, check which outcomes of the second component decision are available; then if the outcome of not displaying the answer as a proper fraction is available, check which outcomes of the third component decision are available.

When a composite decision is an alterable decision, in order to assign probabilities of alteration to the various alternate options, the interface can assign probabilities of alteration directly, or alternatively, if the interface assigns probabilities of alteration to the outcomes of the individual component decisions, then the interface can calculate the probabilities of alteration of the alternate options of the composite decision by treating each possible outcome of the composite decision as a combination of outcomes of the component decisions along the relevant decision path, and calculating the probability of that combination of outcomes as described in Chapter 4. This latter method may be particularly useful in an embodiment where the interface may adjust the probabilities of alteration of outcomes of component decisions, as described below. For example, for the example composite decision class, the interface can, say, assign a low probability of alteration to the mixed fraction outcome whenever it is an alternate option; alternatively, the interface can calculate the probability of alteration for the mixed fraction outcome based on the probabilities of alteration of the component decision outcomes along the decision path that leads to the mixed fraction outcome, so that interface adaptation that affects the probability of alteration of any component decision along that path will affect the probability of alteration of the mixed fraction outcome as an outcome of the composite decision.

When a composite decision is an adaptive decision, the interface can analyze the outcome of each component decision based on its analysis of the outcome of the composite decision. Such behavior may be particularly useful in an embodiment where the interface may adapt its behavior based on its analysis of the outcomes of component decisions, as described below. For purposes of the present paragraph, the "target outcome" of a composite decision is its initial outcome if that outcome was beneficial, or the outcome that would have been beneficial if its initial outcome was not beneficial. In an embodiment, when the interface is able to determine the target outcome of a composite decision, it will then analyze the outcomes of that decision's component decisions as follows: Every component decision that is not along the decision path to the target outcome will be considered to have had a neutral outcome, and every component decision that had only one available outcome will be considered to have had a neutral outcome. If a component decision is along the decision path to the target outcome and had more than one available outcome, then if the outcome of that component decision was the outcome that leads towards the target outcome, or if its outcome would have been the one that leads towards the target outcome if the interface had made that component decision, then that component decision will be considered to have had a beneficial outcome; if it had or would have had an outcome that leads away from the target outcome, it will be considered to have had a non-beneficial outcome. For example, if the interface made a component decision to display an answer as a decimal rather than a fraction, but it would have chosen to display the answer as a mixed fraction rather than an improper fraction if it had chosen to display the answer as a fraction, then if the interface determines that displaying the answer as a mixed fraction would have been beneficial, then the interface will determine that the component decision regarding whether to display the answer as a decimal or a fraction had a non-beneficial outcome but the component decision regarding whether to display the answer as a mixed fraction or an improper fraction had a beneficial outcome.

Dividing Decisions into Components

In the present specification, a "true decision" is an interface decision that has at least two available outcomes; a "false decision" is an interface decision that has only one available outcome. When a decision is a false decision, it cannot be altered or optimized. For example, in the example composite decision class, the component decision regarding whether to display an answer as an improper fraction or as some other kind of fraction always entirely depends on the value of the answer: the answer can be displayed as an improper fraction only if its absolute value is less than 1, and the answer can be displayed as some other kind of fraction only if its absolute value is greater than 1. That component decision is always a false decision.

Below, the present specification explains a general procedure for optimizing interface decisions. In the explanation of this procedure, it will be assumed that any interface decision class that is to be optimized has a constant set of outcomes that are available whenever the decision is a true decision. This procedure thus cannot be directly applied to an interface decision class that has an outcome that may or may not be available when the interface makes a true decision of that class. For example, the procedure cannot be directly applied to the example composite decision class described above, because when a decision of that class has at least two outcomes available, it may or may not have the improper fraction outcome available.

If an interface decision class has an outcome that may or may not be available when the interface makes a true decision of that class, then the interface decision class may be divided into two entirely distinct decision classes-one for when that outcome is available, and one for when it is not available. For example, an interface could have one decision class for deciding how to display an answer whose absolute value is less than 1, and another decision class for deciding how to display an answer whose absolute value is greater than 1. These decision classes may then be optimized separately using the procedure that is described below. However, by causing closely related decisions to be members of entirely distinct decision classes, such an approach may cause interface adaptation to be somewhat inefficient.

For example, if an interface has distinct decision classes for deciding how to display an answer depending on its absolute value, then even after the interface has fully adapted to the fact that a user strongly prefers an answer to be displayed as a decimal when its absolute value is less than 1, the interface may not yet have begun to adapt to the fact that the user also strongly prefers an answer to be displayed as a decimal when its absolute value is greater than 1. Of course, it is possible that such an approach may sometimes yield better results than any other approach would yield, and even when such an approach yields suboptimal results, in some embodiments alteration functionality may reduce the inconvenience caused by such results; nevertheless, another approach may be more desirable in most cases.

Instead, if an interface decision class has an outcome that may or may not be available when the interface makes a true decision of that class, then the interface decision class may be divided into component decision classes such that no component decision class has an outcome that may or may not be available when the interface makes a true decision of that component class. One possible way to achieve such a division is by repeatedly subdividing the decision until each component decision has only two possible outcomes; both of those two outcomes will then be available whenever the interface makes a true decision of that class, because when less than two outcomes are available for a decision, it is not a true decision. These component decision classes may then be optimized separately using the procedure that is described below. This approach has some advantages over the approach described in the preceding paragraph; in particular, if the component decisions of the example composite decision class are optimized separately, then after the interface has fully adapted to the fact that a user strongly prefers an answer to be displayed as a decimal when its absolute value is less than 1, the interface will equally assume that the user strongly prefers an answer to be displayed as a decimal when its absolute value is greater than 1, because the component decision regarding whether or not to display an answer as a decimal is distinct from the component decision that takes into account the absolute value of the answer.

When a decision class has more than two possible outcomes, even if it has a constant set of outcomes that are available whenever the decision is a true decision, it may still be advantageous to divide the decision into component decisions that have only two outcomes each, if the resulting component decision classes will be easier to optimize than the original decision class would be. For example, the present writer has attempted to design an algorithm that would attempt to intelligently decide whether to display an answer as a decimal, improper fraction, or mixed fraction, and ultimately decided it would be easier to accomplish that task by dividing it into smaller pieces: he first designed an algorithm that attempts to intelligently decide whether to display an answer as a decimal or as a fraction and then designed a distinct algorithm that attempts to intelligently decide whether to display an answer as an improper fraction or mixed fraction.

When dividing a composite decision into component decisions, it may generally be preferable to organize the possible outcomes of the composite decision into a hierarchy, so that component decisions between very similar outcomes will tend to occur later in the decision process than component decisions between outcomes that are not very similar. For example, if the three outcomes of a composite decision consist of displaying an answer as an ordinary decimal, displaying it in scientific notation, and displaying it in engineering notation, then it may be preferable for the first component decision to be the decision whether or not to display the answer as an ordinary decimal, and the second component decision to be the decision (if necessary) whether to display the answer in scientific notation or in engineering notation. This can make it easier for an interface designer to optimize the component decisions. For example, both scientific notation and engineering notation are commonly used for extremely large numbers; if an interface designer wishes to bias the composite decision accordingly, then if those two outcomes are grouped together under one possible outcome of the first component decision, the interface designer will only need to bias that first component decision in favor of steering towards those two outcomes whenever an answer is extremely large, but if the composite decision is broken down into two component decisions in a different manner, then the interface designer will need to bias both of the component decisions.

Chapter 20: Decision Function Adaptation Decision Settings

When the interface makes a decision, the outcome is determined by which decision function the interface uses and the circumstances that the decision function takes into account. Generally, the circumstances that a decision function takes into account may or may not be readily visible. This distinction is somewhat subjective, but for many decision functions it is easy to distinguish between circumstances that are readily visible and circumstances that are not readily visible. For example, the example decision function may take into account the input of a problem the user just typed, which will be readily visible, and may also take into account the calculator's ANSWERS mode setting, which is visible in a special settings screen but may not be readily visible when the calculator is displaying the answer to a problem. In the present specification, information regarding circumstances that are readily visible is "decision context." Information regarding circumstances that may not be readily visible is "decision settings." In the present specification, a "setting variable" is a particular decision setting that may vary according to circumstances, and a "setting value" is one possible value for a setting variable. For example, the ANSWERS mode setting mentioned above is a setting variable, and AUTO, DEC, and FRAC-APPROX are setting values. A "setting value combination" is a possible combination of setting values for a decision function, so for any decision function that takes into account the value of only one setting variable, a setting value combination is simply a setting value for that setting variable.

For the sake of brevity, a setting value combination may be referred to herein as a "setting." It is to be understood that such a "setting" may be a specific value for a single setting variable, or may actually be a combination of specific values for multiple setting variables. Also, decision context may be referred to herein as simply "context."

For any decision function that takes into account the current setting values of setting variables, the decision function can be specified in terms of a set of "setting-specific functions," where each setting-specific function describes how the decision function will behave when a specific setting value combination is selected. For example, the example decision function above can be specified in terms of three setting-specific functions, where each setting-specific function describes how the decision function will behave for a specific setting value of the ANSWERS mode setting: the setting-specific function for the DEC setting value will always choose decimal form; the setting-specific function for the FRAC-APPROX setting value will always choose fraction form; and the setting-specific function for the AUTO setting value will choose fraction form if the user's input included a fraction, or decimal form otherwise.

If a decision function does not take into account the current setting values of setting variables, then that decision function can still be considered to have a single possible setting value combination that consists of no setting values whatsoever, and the decision function can be considered to itself constitute a single "setting-specific function" that describes how the function will behave for that setting value combination.

In the present specification, when the behavior of a decision function is described in terms of the behavior of a set of setting-specific functions, this does not imply that such a decision function must be implemented in terms of an algorithm that first checks the current setting value combination and then invokes an algorithm that implements the appropriate setting-specific function. In some cases, it is certainly possible to implement a decision function by an algorithm that first checks the current setting value combination and then accordingly selects and invokes an algorithm that implements the setting-specific function that corresponds to that specific setting value combination. For example, the example decision function may be implemented by an algorithm that first checks the current setting value of the ANSWERS mode setting and invokes either an algorithm that implements the setting-specific function for the DEC setting value (by just choosing decimal form), or an algorithm that implements the setting-specific function for the FRAC-APPROX setting value (by just choosing fraction form), or an algorithm that implements the setting-specific function for the AUTO setting value. However, those of ordinary skill in the art may be able to construct other algorithms that implement the same behavior that do not begin by checking the current setting value combination.

Setting-specific functions do not themselves take into account any setting values. For example, if the example decision function is implemented in terms of an algorithm that checks setting values and then invokes the appropriate setting-specific function, then the algorithm for the DEC setting-specific function will be invoked only after the example decision function checks setting values, and will not itself check any setting values. If the behavior of a decision function is entirely determined by decision context and thus does not take into account any setting values, then that decision function consists of one setting-specific function, in a sense.

In the present specification, a "smart setting-specific function" is a setting-specific function that takes into account decision context (and thus chooses different outcomes depending on context), and a "simple setting-specific function" is a setting-specific function that does not take into account decision context (and thus always chooses the same outcome). For example, when the behavior of the example decision function described above is described in terms of three setting-specific functions, the setting-specific functions for the DEC setting value and the FRAC-APPROX setting value are simple setting-specific functions and the setting-specific function for the AUTO setting value is a smart setting-specific function.

In the present specification, a "smart decision function" is a decision function that takes into account decision context. When a smart decision function is described in terms of the behavior of a set of setting-specific functions, at least one of those functions will be a smart setting-specific function as defined above. For example, the example decision function described above is a smart decision function, and the setting-specific function for its AUTO setting value is a smart setting-specific function. In the present specification, a "simple decision function" is a decision function that does not take into account decision context. When a simple decision function is described in terms of the behavior of a set of setting-specific functions, all of those functions will be simple setting-specific functions.

In the present specification, the setting-specific function that describes the behavior of a decision function when a particular setting value combination is selected may be spoken of as though it were entirely synonymous with that setting value combination, and thus may itself be referred to as a "setting." For example, rather than saying, "The setting-specific function for the DEC setting value always chooses to answer in decimal form," the present specification could say, "The DEC setting always chooses to answer in decimal form."

Setting Adaptation Maps

In the following paragraphs, various terms are defined, and then "setting adaptation maps" are explained. A setting adaptation map is a way of organizing the possible settings that a particular adaptive decision class has. Subsequently, in explaining how to make optimizable decisions adaptive and how to make them smarter, it will be helpful to refer to setting adaptation maps.

The following explanation of setting adaptation maps includes some technical terms from the field of graph theory and is fairly complicated, but only because it is intended to be applicable to a wide variety of possible optimizable decision classes, including optimizable decision classes that have more than two possible outcomes and have multiple smart settings. The setting adaptation map of a typical optimizable decision class will actually turn out to be quite simple.

In the present specification, if two settings are said to be "non-comparable" with respect to a certain outcome, this means that each of the two settings will choose that outcome in at least one context where the other will not choose that outcome. If two settings are "comparable" with respect to a certain outcome, this means that at most one of the two settings will choose that outcome in a context where the other will not choose the outcome. When two settings are comparable with respect to a certain outcome, if one of the two settings will choose that outcome in at least one context where the other will not, then the former may be said to be "more biased" towards that outcome than the latter, and the letter may be said to be "less biased" towards that outcome of the former; otherwise, the two settings may be said to be "equally biased" towards that outcome.

In the present specification, if a setting is said to be "maximally biased" towards a certain outcome, this means that it is comparable to all the other settings of the relevant decision function and it is more biased or equally biased towards that outcome when compared to any other setting. For example, in the example decision function, the FRAC-APPROX setting is more biased towards the outcome of answering in fraction form than the AUTO setting, which is more biased towards that outcome than the DEC setting; the FRAC-APPROX setting is maximally biased towards that outcome.

In the present specification, if a setting is said to be "intermediate between" two other settings, this means that with respect to each possible outcome of the relevant decision function, the setting is comparable with both of those other two settings, and when the setting is compared with those other two settings, either the setting and at least one of those other two are equally biased towards that outcome, or else the setting is more biased towards that outcome than one of those other two settings and less biased than the other. In other words, if a setting is intermediate between two other settings, then there is no outcome such that the setting is more biased towards that outcome than both of the other two settings, and there is no outcome such that the setting is less biased towards that outcome than both of the other two settings. For example, in the example decision function, the AUTO setting is intermediate between the DEC setting and the FRAC-APPROX setting: it is more biased towards the outcome of answering in fraction form than the DEC setting and less biased than the FRAC-APPROX setting, and it is more biased towards the outcome of answering in decimal form than the FRAC-APPROX setting and less biased then the DEC setting.

In the following discussion of setting adaptation maps, a "setting vertex" is any vertex of a graph that corresponds to a setting of a decision function. A setting vertex may be spoken of as though the vertex itself is synonymous with the corresponding setting; for example, one setting vertex may be said to have less bias towards an outcome than another setting vertex. The "destination vertex" for an outcome is some particular setting vertex that is maximally biased towards that outcome; when more than one setting of a decision function is maximally biased towards a particular outcome, only one such setting will be the destination vertex for that outcome. An "empty vertex" is a vertex of a graph that does not correspond to a setting of a decision function.

In the present specification, a "setting adaptation map" is an acyclic connected graph that has one distinct setting vertex for each setting of a decision function (and may also have empty vertices that do not correspond to settings of the function), and that has a destination vertex for each possible outcome, and that has the property that for any particular setting vertex and any particular outcome, if the unique simple path is traced from that setting vertex through zero or more intermediate vertices to that outcome's destination vertex, then that particular setting will have a bias towards that outcome that is less than or equal to the bias of every setting vertex that the path travels through. In other words, a setting adaptation map is a map of paths connecting settings such that the road from any particular setting to a maximally biased setting never passes through a less biased setting.

It is always possible to create a setting adaptation map for any decision function, as long as the decision function has a destination vertex for each possible outcome. One way to do so is to directly connect each setting vertex to a single central empty vertex, and not directly connect any setting vertex to any other setting vertex. However, for most decision functions, it is also possible to create a setting adaptation map that does not have any empty vertices; the following two paragraphs explain a couple of specific situations in which it is possible to create a setting adaptation map that does not have any empty vertices.

If a decision function has one simple setting per possible outcome along with just one smart setting, then a setting adaptation map for that decision function can be an arrangement such that all of the simple setting vertices are directly connected to the smart setting vertex, and none of them are directly connected to each other. An example of such a setting adaptation map is a graph where the setting vertex DEC and setting vertex FRAC-APPROX are both directly connected to the setting vertex AUTO (and not to each other). If the outcome of answering in scientific notation is added to the example decision function and a simple setting called SCI-NOT that always chooses to answer in scientific notation is added to the example decision function, then a graph in which the setting vertices DEC, FRAC-APPROX, and SCI-NOT are all directly connected to the setting vertex AUTO (and not to each other) will be a setting adaptation map for this modified example decision function.

If a decision function has only two possible outcomes, and every possible pair of settings of the decision function is comparable with respect to both of the possible outcomes, then a setting adaptation map for that decision function can be an arrangement of the function's settings in a linear sequence from the least biased towards a certain outcome to the most biased towards that outcome, with an edge directly connecting each setting to the next. For example, the settings of the example decision function can be arranged from the least biased towards the outcome of answering in fraction form to the most biased towards that outcome: DEC, then AUTO, then FRAC-APPROX. If a graph is constructed such that the setting vertex DEC is directly connected to the setting vertex AUTO which is directly connected to the setting vertex FRAC-APPROX (but the setting vertex DEC is not directly connected to the setting vertex FRAC-APPROX), then this constitutes a setting adaptation map for the sample decision function. If another setting called PROBABLY-DEC is added to the example decision function, and this setting is intermediate between the DEC setting and the AUTO setting, then a graph in which DEC, PROBABLY-DEC, AUTO, and FRAC-APPROX are arranged in that order from left to right and adjacent settings are directly connected to each other will be a setting adaptation map for this modified example decision function.

Adaptive Decisions

In an embodiment, for one or more optimizable decision classes, at some time after the interface makes a decision of such a class, the interface will analyze the outcome of the decision, and in certain circumstances will then adjust relevant setting variables in an attempt to increase the likelihood that future decisions of that class will have beneficial outcomes, or in an attempt to increase the likelihood that future decisions of that class will have more appropriate probabilities of alteration assigned to them, or both. Such decisions may be referred to herein as "adaptive decisions."

Figure 16:
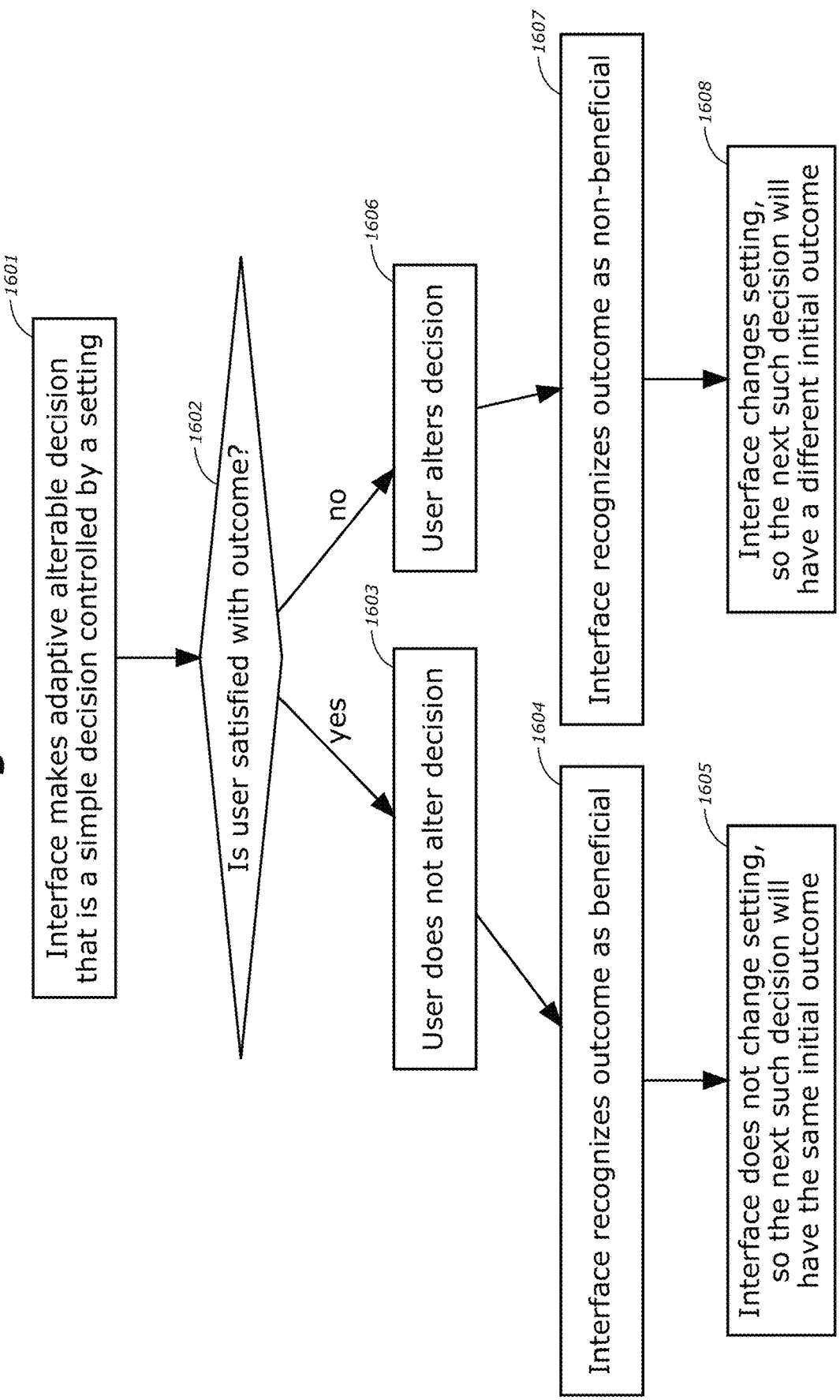
FIG. 16 is a flowchart that illustrates a simple case of an adaptive decision that may affect interface settings, according to one embodiment.
Figure 17:
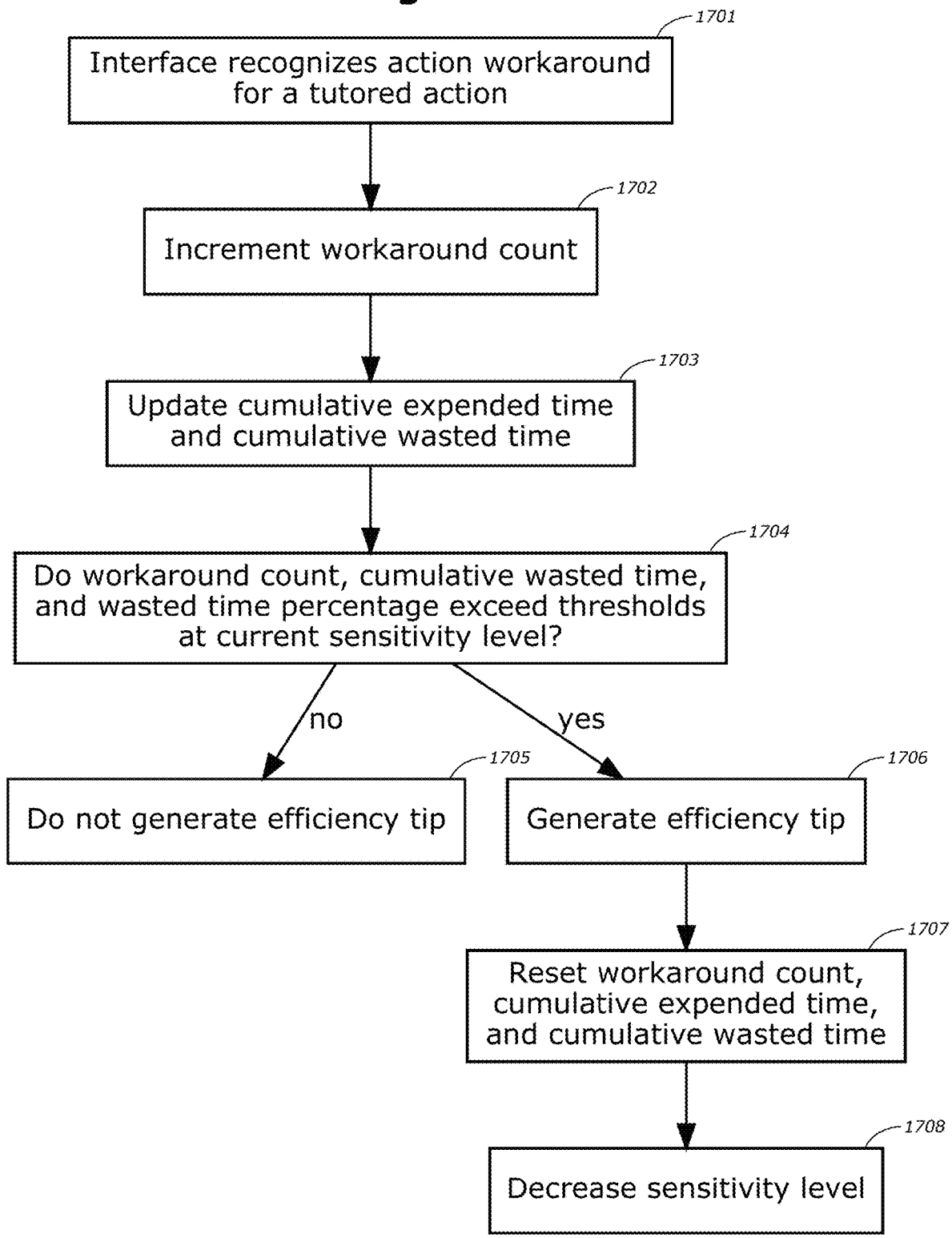
FIG. 17 is a flowchart that illustrates an example process by which an interface decides whether to generate an efficiency tip.
Figure 19B:
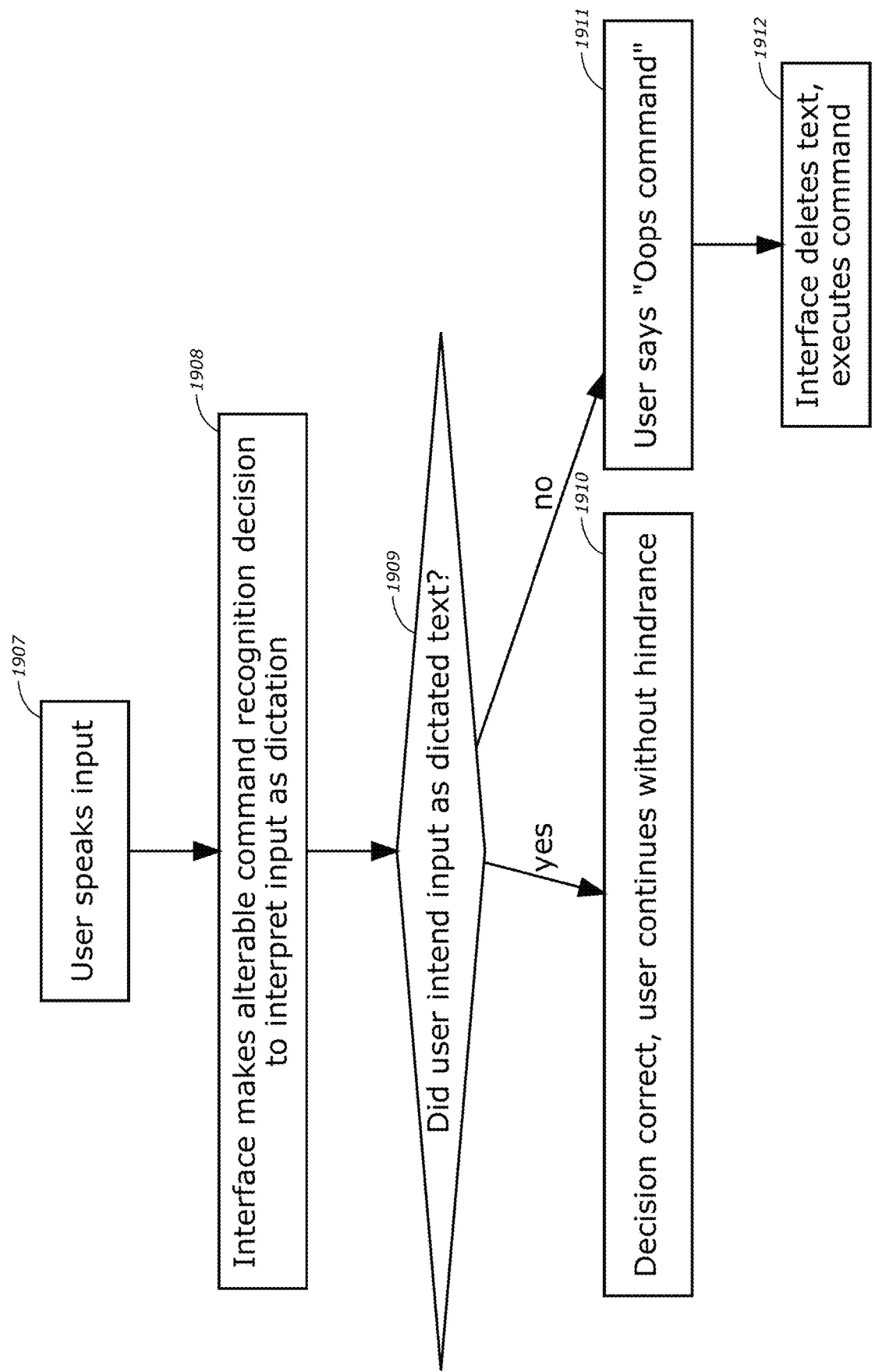

FIG. 16 is a flowchart that illustrates a simple case of an adaptive decision that may affect interface settings, in an embodiment. Block 1601 says "Interface makes adaptive alterable decision that is a simple decision controlled by a setting" and proceeds to Block 1602, which asks, "Is user satisfied with outcome?" If the answer is yes, that means that the user will not alter the decision (Block 1603), so the interface will eventually recognize the outcome as beneficial (Block 1604), and the interface will not change the setting, which means that the next decision of that decision class will have the same initial outcome (Block 1605). If the answer is no, that means that the user will alter the decision (Block 1606), so the interface will recognize the outcome as non-beneficial (Block 1607), and the interface will change the setting so the next decision of that decision class will have a different initial outcome (Block 1608).

For example, in an embodiment, if the interface makes an alterable decision whether or not to automatically capitalize the word "tuesday" and this decision turns out to have a non-beneficial outcome, then the interface will adjust the relevant setting variable so that it will make the opposite decision the next time the user types the word "tuesday." As another example, in a different embodiment, only after three alterable decisions in a row regarding whether or not to automatically capitalize the word "tuesday" have all had non-beneficial outcomes will the interface adjust a setting variable so that it will make the opposite decision the next time the user types the word "tuesday." As another example, in an embodiment, if alterable decisions regarding whether or not to automatically capitalize the word "tuesday" are assigned high probabilities of alteration but then five such decisions in a row all have beneficial outcomes, then the interface will adjust a setting variable so that such decisions will continue to have the same outcome but will be assigned moderate probabilities of alteration.

In an embodiment, when the interface makes an adaptive decision, the interface will immediately treat the decision as having a beneficial outcome for purposes of decision adaptation, and will later reevaluate the outcome of the decision and redo adaptation if necessary. For example, in such an embodiment, if a user types "tuesday tuesday" and as a result the interface makes two consecutive adaptive decisions regarding whether or not to automatically capitalize "tuesday," then at the moment when the interface makes the second decision, the interface may be acting under the assumption that its first decision was correct, because thus far the user appears to be satisfied with that first decision. In an alternative embodiment, the interface will not immediately take the outcome of an adaptive decision into account for purposes of decision adaptation, and will instead evaluate the outcome of an adaptive decision only later, at a point when it is impossible or relatively unlikely for the outcome to change, such as when an adaptive decision that was an alterable decision ceases to be alterable. For example, in such an embodiment, if a user types "tuesday tuesday" and the interface makes two consecutive adaptive decisions regarding whether or not to automatically capitalize "tuesday," then at the moment when the interface makes the second decision, the interface will not necessarily be acting under the assumption that its first decision was correct: at that moment, the interface may not yet have evaluated the outcome of its first decision.

Making Decisions Adaptive

In the present specification, a "non-adaptive decision function" is any decision function that does not in any way take into account past outcomes of decisions of that class. For example, on a TI-84, the example decision function described above takes into account the current value of a setting variable, but the TI-84 interface never takes the initiative to adjust that setting variable based on outcomes of decisions of that class, so that decision function is a non-adaptive decision class.

To convert a non-adaptive decision function into an adaptive decision function, an interface designer may perform the following three steps:

As the first step, for each possible outcome of the decision function, choose an existing setting that is maximally biased towards that outcome as the destination setting for that outcome, or add a new setting if necessary. In most cases this step will be trivial, because for most decision classes there will already be for each possible outcome exactly one setting that is maximally biased towards that outcome; for example, in the example decision function, the FRAC-APPROX setting is maximally biased towards answering in fraction form, and the DEC setting is maximally biased towards answering in decimal form. In the rare cases where a decision function has an outcome such that no setting is maximally biased towards that outcome, as part of the first step, add a new setting for the function such that the new setting will choose that outcome whenever any other setting would choose that outcome; such a setting will then be maximally biased towards that outcome, and can serve as the destination setting for that outcome. (Such a setting usually might as well be a simple setting that always chooses that outcome in every context, but does not necessarily need to be such a setting: it only needs to choose that outcome whenever some other setting would choose that outcome.)

As the second step, create a setting adaptation map for the decision class of the decision function, as described above. Try to avoid using empty vertices. If the decision function has one simple setting per possible outcome along with just one smart setting, or if the decision function has only two possible outcomes and every possible pair of settings of the decision function is comparable with respect to both of the possible outcomes, then it will be possible to create a setting adaptation map that does not have empty vertices, as is explained above.

As the third step, implement the following interface behavior: When the interface evaluates the outcome of a decision of this decision class, if the decision had a non-beneficial outcome, then the interface will determine the nearest beneficial setting and adjust the relevant setting variable or variables so that the nearest beneficial setting becomes selected. The "nearest beneficial setting" is defined as follows: if the unique simple path in the setting adaptation map from the setting vertex of the current setting to the destination vertex for the outcome that would have been beneficial is traced one vertex at a time, then the "nearest beneficial setting" is the setting that corresponds to the first setting vertex that is encountered while tracing this path that fits the requirement that the decision would have had a beneficial outcome if the setting corresponding to this vertex had been selected when the decision was made. If there is no such setting, then the "nearest beneficial setting" is the destination setting for the outcome that would have been beneficial.

In other words, to convert a decision into an adaptive decision, make it so that after such a decision has a non-beneficial outcome, the interface will change its settings the least amount possible such that the decision would have had a beneficial outcome if the change had been made prior to the decision.

An interface designer can use the preceding three-step procedure to convert any non-adaptive decision function to an adaptive decision function. In most cases, though, it will not actually be necessary to perform the entire procedure; most decision functions are so simple that an interface designer of ordinary skill in the art will understand how to implement essentially the same interface behavior that is described in the third step in a more direct fashion, without actually creating a setting adaptation map first. In the following three paragraphs, simpler procedures are described for converting three specific types of non-adaptive decision functions to adaptive decision functions. In each case, the three-step procedure described above will yield the same interface behavior as the simpler procedure described below; these simpler procedures thus serve to illustrate the results that would be achieved by applying the three-step procedure to specific types of non-adaptive decision functions.

When a non-adaptive decision function is a simple decision function that just has one simple setting for each possible outcome, to make the function adaptive, an interface designer may implement the following interface behavior: When the interface evaluates the outcome of a decision of this decision class, if the decision had a non-beneficial outcome, then the interface will select the setting that would have yielded a beneficial outcome.

When a non-adaptive decision function is a smart decision function that has one simple setting for each possible outcome and that also has a single smart setting, to make the function adaptive, an interface designer may implement the following interface behavior: When the interface evaluates the outcome of a decision of this decision class, if the decision had a non-beneficial outcome, if the smart setting would have yielded a beneficial outcome, then the interface will select the smart setting; otherwise, the interface will select the simple setting that would have yielded a beneficial outcome. This is the same interface behavior as is described in the third step of the procedure above, where the setting adaptation map is arranged so that the unique simple path from any simple setting vertex to any other simple setting vertex will travel through only the smart setting vertex.

When a non-adaptive decision function is a smart decision function that has only two possible outcomes and that does not have any settings that are non-comparable to each other, to make the function adaptive, an interface designer may arrange the function's settings in a linear sequence from the least biased towards a certain outcome to the most biased towards that outcome and then implement the following interface behavior: When the interface evaluates the outcome of a decision of this decision class, if the decision had a non-beneficial outcome, the interface will select the setting that would have yielded a beneficial outcome that is nearest in the sequence to the current setting.

If a non-adaptive decision function is a simple decision function that has only two possible outcomes, or if it is a smart decision function that has only two possible outcomes that has one simple setting for each of the two possible outcomes and that also has a single smart setting, then in either case two of the three preceding paragraphs will be applicable, and it does not matter which of the two paragraphs is applied: the same interface behavior will result either way. For example, the example decision function fits the criteria described in the second and third of the preceding three paragraphs. To apply the procedure described in the third paragraph, an interface designer may arrange the function's settings in the sequence DEC, then AUTO, then FRAC-APPROX, and then implement the interface behavior such that when the interface evaluates the outcome of a decision of this decision class, if the decision had a non-beneficial outcome, the interface will move the setting only one position in the sequence if that would have yielded a beneficial outcome, or two positions otherwise. In other words, if the smart setting AUTO was not selected and would have yielded a beneficial outcome, the interface will select AUTO; otherwise, the interface will select the simple setting that would have yielded a beneficial outcome. This is the exact same behavior that would result from applying the procedure described in the second paragraph.

Above, the interface behavior that would be achieved by applying the full three-step procedure is described via terminology that pertains to setting adaptation maps. A programmer of ordinary skill in the art will be able to create data structures that represent setting adaptation maps; as a starting point, source code for data structures that represent graphs, vertices, and so forth is readily available online. However, as can be seen from the above discussion of simpler procedures that achieve the same results as the full three-step procedure for certain specific types of decision functions, it is possible for a programmer to implement most adaptive decision functions by means of simpler algorithms that can use simpler data structures.

Making Probabilities of Alteration Adaptive

In an embodiment, interface adaptation not only may affect the outcome of future decisions of an alterable decision class, but also may affect the probability of alteration that is assigned to future decisions of an alterable decision class.

As an aid to implement such behavior, for any adaptive alterable decision function that makes use of a setting adaptation map as described above, an interface designer may add a distance metric to the setting adaptation map. That is, the interface designer may assign to each edge (direct connection) in the setting adaptation map a numeric value that represents its length, which is an approximate measure of the magnitude of the difference between the two settings the edge connects, in the judgment of the interface designer. For example, if a setting adaptation map has only two setting vertices that correspond to simple settings that make opposite choices, the edge connecting those two vertices will be assigned a high length, but if a setting adaptation map has dozens of vertices arranged sequentially such that each vertex in many situations will yield the same outcome as both of its adjacent vertices, then an edge connecting any two vertices will be assigned a low length. Also, if for any outcome the maximally biased setting in the setting adaptation map is a setting that sometimes does not select that outcome, then the interface designer may add to the setting adaptation map a simple setting that would always select that outcome, and directly connect that simple setting to only the setting that was previously the maximally biased setting for that outcome, and assign an appropriate length to the edge connecting those two settings; if desired, the interface designer may prevent such an additional simple setting from ever being selected, so that it is not included in the setting adaptation map for purposes of automatically adjusting settings as described above, but is included in the setting adaptation map for purposes of determining probabilities of alteration as described below.

In an embodiment, when the interface makes an alterable decision of a decision class that has a setting adaptation map with a distance metric as described in the preceding paragraph, the probability of alteration that is assigned to an alternate option of the decision is inversely related to the total length of the simple path between the current setting and the setting vertex that will be the nearest beneficial setting if that option becomes selected, so that if the current setting is very close to a setting that would have yielded that outcome than its probability of alteration will be high, but if it is far from a setting that would have yielded that outcome than its probability of alteration will be low. For example, if each of the two edges in the example decision function's setting adaptation map are assigned a length of 1, and the user types input that includes a fraction, and the interface makes an alterable decision using the example decision function, and the interface chooses to display the answer as a fraction, then at this point the setting that is selected must be either FRAC-APPROX or AUTO: if it were DEC, the interface would have chosen to display the answer as a decimal. The probability of alteration of this decision depends on which setting is selected. If the setting that is selected is AUTO, then the distance to the only setting that would have yielded a different outcome is 1, but if the setting that is selected is FRAC-APPROX, then the distance to that setting is 2, so the probability of alteration of the decision will be higher if the setting that is selected is AUTO than if it is FRAC-APPROX. This is appropriate: if the user caused the simple setting to become selected such that an answer would be displayed as a fraction even when the input did not include a fraction, then it is that much less likely that the user will want some different outcome now that the input actually includes a fraction.

The behavior described above causes the interface to adjust not only future decision outcomes but also future probabilities of alteration after a decision has a non-beneficial outcome. It may also be advantageous to cause the interface to adjust future probabilities of alteration even when a decision has a beneficial outcome: if a decision repeatedly has a beneficial outcome, it may be advantageous for its probability of alteration to gradually decrease. Therefore, in an embodiment, for some or all adaptive decision classes, in addition to remembering what setting is currently selected for that decision class, the interface will also remember an optional distance penalty for each possible outcome of that class. After the interface makes a decision of such a class, when the interface determines the outcome that was beneficial or would have been beneficial, the interface will reset that outcome's optional distance penalty to zero, and will slightly increase the optional distance penalty of all other outcomes. Whenever the interface makes a decision of such a class, when the interface would determine the probability of alteration to assign to an alternate option by means of determining the total length of the simple path between the current setting and the setting vertex that will be the nearest beneficial setting if that alternate option becomes selected, the interface will also add the current value of the optional distance penalty for that particular outcome. In such an embodiment, for such a decision class, if the same outcome repeatedly turns out to be beneficial, then the optional distance penalty for all the other outcomes will gradually increase, and so the probability of alteration of the decisions of that class will gradually decrease.

Just as it is possible for a programmer to implement most adaptive decision functions by means of algorithms that use simpler data structures than a setting adaptation map, it is also possible in most cases for a programmer to implement the same behavior that is described in the preceding paragraphs by means of algorithms that use simpler data structures than a setting adaptation map. In particular, if an adaptive decision function has only two possible outcomes and has no non-comparable settings, then its setting adaptation map may consist of an arrangement of the function's settings in a linear sequence, so the algorithm for measuring the total length of the path from one setting to another can be quite simple.

Making Simple Decisions Adaptive

In the simplest case, a decision function will have only two possible outcomes, and only two simple settings. For example, a decision whether or not to automatically capitalize a day of the week may be a simple decision between two possible outcomes that never takes context into account. A setting adaptation map may be constructed for such a decision that has only two simple setting vertices with one edge connecting them.

Therefore, in an embodiment, for some or all alterable decision classes that have two possible outcomes and that never take context into account, the interface will keep track of which outcome it currently prefers for each decision class and keep track of a single optional distance penalty that will always represent the optional distance penalty for whichever outcome it does not currently prefer. Such an optional distance penalty may be initialized to have a relatively high value if the interface designer is relatively confident that a typical user will have a strong preference for the outcome that the interface initially prefers. When the interface makes a decision of such a class, the default outcome will be the outcome the interface initially prefers, and the probability of alteration will depend only on the current value of the optional distance penalty. Whenever such a decision has a non-beneficial outcome, the interface will change which outcome it prefers and reset the optional distance penalty to 0, so that the next time it makes such a decision, the decision's probability of alteration will be very high; whenever such a decision has a beneficial outcome, the interface will slightly increase the optional distance penalty, so that the next time it makes such a decision, the decision's probability of alteration will be slightly less than before.

Making Threshold Decisions Adaptive

As defined in Chapter 3, a threshold decision class is a decision class that has two possible outcomes, where the outcome of any particular decision depends on whether or not a decision score that is based on circumstances exceeds a certain threshold value.

In an embodiment, some or all threshold decision classes will be adaptive decision classes such that the threshold itself is not a constant value, but is instead a setting variable that can take on various values. Any possible threshold value is thus a distinct setting. If the possible threshold values are arranged in a linear sequence, then this constitutes a setting adaptation map. As a distance metric for such a setting adaptation map, the distance between any two possible threshold value simply equals the difference between the values.

For such an adaptive threshold decision class, if a decision of that class has a non-beneficial outcome and so the interface causes the nearest beneficial setting to become selected, this means that the interface changes the threshold just enough that the decision would have had a beneficial outcome if the change had occurred before the decision. For example, if before a decision a threshold value is 5.0, and the decision score for the decision is 7.3, and this decision has a non-beneficial outcome, then the interface will change the threshold value from 5.0 to 7.3 (or to infinitesimally more than 7.3 if necessary) because this is the closest threshold value that would have caused the decision to have a different outcome. In an embodiment that determines probabilities of alteration for adaptive decisions by means of a distance metric as described above, unless an optional distance penalty is present, the probability of alteration of such a threshold decision will simply be based on the difference between the decision score and the threshold value: the probability of alteration that is assigned to such a decision will be high if the decision score is almost the same as the threshold value, or low if the decision score is much lower or much higher than the threshold value. This turns out to be exactly the same principle for assigning probabilities of alteration to threshold decisions that was described in the initial explanation of threshold decisions. However, in an embodiment that includes optional distance penalties as described above, when an optional distance penalty is present, the interface may assign a lower probability of alteration to a threshold decision than it otherwise would.

Chapter 21: Decision Function Customization
Adding Smart Settings

Without interface adaptation functionality, it may not be very advantageous for a decision function to have more than one distinct smart setting: if two distinct smart settings would turn out to be particularly appropriate for two different types of users, then many users would not actually make the effort to understand the smart settings in order to select the appropriate one. However, in an embodiment with the interface adaptation functionality that is described above, if two distinct smart settings would turn out to be particularly appropriate for two different types of users, that for each particular type of user, interface adaptation could cause the smart setting to become selected that would be particularly appropriate for that user. Thus, interface adaptation functionality may make it more advantageous for a decision function to include additional distinct smart settings.

In many cases, it may be possible for an interface designer to guess in advance the circumstances in which certain users will desire each particular outcome for a particular decision function. Generally, if an interface designer has a plausible theory regarding the circumstances in which certain users will desire a particular outcome for a particular decision function, and if this theory can be reduced to a function that selects each particular outcome in exactly the circumstances where the interface designer believes certain users will desire that outcome, then it may be advantageous for the interface designer to implement that particular function as an additional smart setting-specific function for that particular decision function.

In particular, once an interface designer has made a decision function be an adaptive decision function by the means described above, it may be advantageous for the interface designer to convert any empty vertex in the decision's setting adaptation map into a setting vertex that is associated with an appropriate smart setting-specific function. It may also be advantageous for the interface designer to insert additional vertices into the setting adaptation map between other vertices, and to have the added vertices be associated with appropriate smart setting-specific functions. In the present paragraph, an "appropriate smart setting-specific function" is a setting-specific function that fits the necessary requirements so that the setting adaptation map continues to be a setting adaptation map as defined above.

For example, if the example decision function did not have the AUTO setting, its setting adaptation map would consist of two setting vertices directly connected to each other-namely, the DEC vertex and the FRAC-APPROX vertex. An interface designer might guess in advance that certain users will desire an answer to be displayed as a fraction when and only when the user's input included a fraction. A setting-specific function that chooses the fraction form when and only when the user's input includes a fraction can be implemented; that is what the AUTO setting-specific function is. The AUTO setting vertex can be inserted in the setting adaptation map between the DEC vertex and the FRAC-APPROX vertex. An interface designer also might guess that certain other users will desire an answer to be displayed as a fraction when the user's input included a fraction, unless the user's input also included a decimal point. A new setting-specific function that behaves accordingly can be inserted in the setting adaptation map between the AUTO vertex and the DEC vertex. Between the vertex of this new setting-specific function and the AUTO vertex, another vertex can be inserted corresponding to a setting-specific function that chooses the fraction form when the user's input included a fraction, unless the number of decimal points in the user's input was more than the number of fractions in the user's input. Each additional smart setting may increase the chance that interface adaptation will eventually cause a setting to become selected that accurately reflects the strength of a particular user's preference for a particular outcome.

Converting to Threshold Decisions

When a decision has only two possible outcomes, and its setting adaptation map consists of an arrangement of the function's settings in a linear sequence, if the decision is not a threshold decision, then it can necessarily be replaced with a threshold decision that always yields exactly the same results as the original decision.

For example, as one way to do so, the function's settings may be numbered from left to right. If an interface designer has assigned edge lengths to the edges between the setting nodes on the setting adaptation map in order to add a distance metric to the setting adaptation map, then numbers may be assigned to the function's settings in such a way that the number assigned to each setting node (other than the leftmost) equals the number of the previous setting node plus the length of the connecting edge. Next, an algorithm may be implemented that yields decision scores that fit the following criteria: in any particular decision context such that the interface's decision between the two possible outcomes depends on which setting is selected, the decision score equals the average of the two numbers of the adjacent settings that would yield different outcomes; in any decision context such that the interface's decision is certain to have a particular outcome and does not depend on which setting is selected, if the setting that is most biased against that outcome is on the far left, then the decision score equals that setting's number minus a certain amount, such as 0.5; if it is on the far right, the decision score equals that setting's number plus a certain amount, such as 0.5. Finally, once the interface can calculate a decision score that is based on context this way, if the interface makes a threshold decision using this decision score and with a threshold value that is equal to the number of the setting that is currently selected, then this threshold decision will always yield exactly the same outcome that the original decision function would have yielded, and can thus serve as a replacement for the original decision function.

For example, the example decision function has only two possible outcomes, and its setting adaptation map may consist of the settings DEC, AUTO, and FRAC-APPROX arranged in a line in that order. Those settings may be numbered DEC 1, AUTO 2, and FRAC-APPROX 3. The interface may calculate a decision score in any particular circumstances as follows: If the user's input included a fraction, then the DEC 1 setting would yield a different outcome than the AUTO 2 setting, so the decision score is 1.5. If the user's input did not include a fraction, then the AUTO 2 setting would yield a different outcome than the FRAC-APPROX setting, so the decision score is 2.5. If a threshold decision function calculates a decision score in this way, and then compares the decision score to a threshold value that is equal to the number of the setting that is currently selected and chooses to display an answer as a decimal if and only if the decision score exceeds the threshold value, then this new threshold decision function will always yield exactly the same outcome that the example decision function would have yielded. For example, by this method, when the AUTO 2 setting is selected, this threshold decision function will choose to display an answer as a fraction if and only if the decision score is less than 2; the decision score will be less than 2 only when an answer can be displayed as a fraction and the user's input included a fraction, and these are the same circumstances that are described above such that the setting-specific function for the AUTO setting will display an answer as a fraction.

As another example, if a decision function is a simple decision function with just two settings corresponding to the two possible outcomes, then it can be replaced with a threshold decision function that always has a constant decision score. One of its two settings will then correspond to a threshold value that is below this decision score, and the other will correspond to a threshold value that is above this decision score. For example, in an embodiment, the interface's decision whether or not to automatically capitalize the word "Tuesday" is always based on a decision score of 1.0, and the outcome will vary depending on whether the threshold value is set to 0.0 or 2.0.

It is thus possible to convert certain decision functions to threshold decision functions without changing their behavior. One advantage of doing so is that a threshold decision necessarily has a distance metric and can thus be made to have adaptive probabilities of alteration that are calculated based on distance, as described above. For example, in an embodiment where the example decision function has been converted to a threshold decision as described above, if the setting DEC 1 is selected, then the interface will display an answer as a decimal regardless of whether or not the user's input included a fraction, but if the user's input included a fraction then the decision score will be 1.5, which is relatively close to the threshold value of 1, so the probability of alteration will be higher than if the user's input did not include a fraction, which makes intuitive sense: a user who has typed a problem involving fractions is probably more likely to want to switch to a fraction answer.

Another advantage of converting a decision to a threshold decision is that it then becomes relatively easy to modify the function so it takes into account additional contextual information: if an interface designer can think of any particular contextual factor that probably ought to increase a particular threshold decision function's tendency to favor one outcome over another, then the interface designer can modify the decision function so as to increase or decrease the decision score based on that contextual factor. For example, an interface designer may think about the example decision function that was converted to a threshold decision function as described in the preceding paragraphs, and may think that if a user's input includes a fraction, but the user's input also happens to include several decimal points, then maybe it is not as likely that the user will want the answer to be a fraction. The interface designer can then accordingly modify the decision function, such as by increasing the decision score by 0.1 for each decimal point in the user's input, up to a maximum increase of 0.5. When a function is a threshold decision function, it is relatively easy to perform such modifications. Of course, the disadvantage of such modifications is that they may cause a decision function to become too complex for a user to understand its behavior, which may occasionally lead to interface mistakes—but in some embodiments, the present invention may mitigate the disadvantages of interface mistakes, so it may be relatively easy to modify a threshold decision in a way that confers a net advantage for most users.

It may be advantageous to implement even the simplest interface decision as a threshold decision, for reasons that are discussed in the two preceding paragraphs; therefore, in an embodiment, most or all interface decisions are threshold decisions, unless otherwise specified. In particular, in an embodiment, any interface decision that is described herein in very simple terms as an alterable decision to choose one alternative over another is actually implemented as an adaptive threshold decision. If a particular alterable decision class does not take context into account, then its decision score will always equal a constant value, but its threshold may vary as interface adaptation occurs. For example, if the present specification were to say that "any interface decision to automatically convert a numeral after a variable into an exponent is an alterable decision," this would mean that in an embodiment, such a decision is also an adaptive threshold decision; for example, its decision score may always equal 1.0, and the initial threshold value of that decision class may initially be 0.1 so that decisions of that class by default have a very low probability of alteration, but interface adaptation may change this threshold value so that such decisions have a different probability of alteration or even a different default outcome.

Customizing Probabilities of Alteration

In an embodiment, generally, as is discussed farther above, when the interface makes a score-based decision that is an alterable decision, the probability of alteration that is assigned to an alternate option of that decision will be high when the score gap of that alternate option is relatively low, and will be low when the score gap of that alternate option is relatively high.

In an embodiment, the specific details of the way in which a probability of alteration is calculated based on a score gap may be different for various score-based decisions. This may be advantageous because various decisions may have completely different scoring scales, and also because some decisions should perhaps be always alterable with at least a certain minimum probability of alteration, while other decisions should perhaps be conditionally alterable. Also, for a threshold decision, the way in which a probability of alteration is calculated based on the score gap may be different depending on whether the decision score is above or below the threshold value.

In an embodiment, for certain score-based decision classes, probabilities of alteration will will take into account gradations of the score gap, so that, for example, small increases in the score gap will cause small decreases in the probability of alteration.

For example, in an embodiment, initial probabilities of alteration of alterable interface decisions typically range from a minimum of 0.0 (which is extremely low) to a maximum of 5.0 (which is very high). In an embodiment, the interface alterably decides whether or not to respond to two consecutive actuations of the same particular key as a special rapid double-click actuation, and the decision score for such a decision is the number of seconds that elapse between the two consecutive actuations. If the decision score is below the threshold value, then the probability of alteration equals 5.0 minus 10 times the score gap, to a minimum of 2.0, so that for example a score gap of 0.2 seconds yields a probability of alteration of 3.0; if the decision score is above the threshold value, then the probability of alteration equals 5.0 minus 5 times the score gap, to a minimum of 2.0. As another example, in an embodiment, the interface alterably decides whether or not to display an answer as a fraction based on a certain decision score that is based on circumstances, and the probability of alteration for such a decision simply equals 5.0 minus the score gap, except that if the score gap is greater than 5.0 then the decision is not alterable.

Making Decisions Smarter

Generally, an interface designer should understand that incorporating various features that are described herein may decrease the need for interface simplicity. When a decision is an alterable decision, in some cases it may not be important for a user to understand how the interface determines the outcome of such a decision; it may be more important for the interface to be as smart as possible in selecting the outcome the user is most likely to desire, even if this leads to occasional interface mistakes. Even more so, when a decision is an alterable decision, it may not be especially important for a user to understand how the interface determines the probability of alteration to assign to such a decision, so even when it is somewhat important for a particular interface decision to be relatively simple, the determination of the probability of alteration for such a decision may be quite complex.

Generally, the challenge of making a particular decision function be relatively intelligent can be divided into three components: identifying criteria that should be taken into account by the decision function; determining how to take the criteria into account, and mitigating the problems caused by any non-beneficial outcomes of the decision function.

The present specification cannot delineate all the criteria that should be taken into account for all possible interface decisions. The present specification explains criteria that may be relevant for certain particular interface decision classes, but an interface designer may also wish to make other decision functions be relatively intelligent that are beyond the scope of the present specification. Generally, an interface designer can identify relevant criteria by simply creating example cases in which the interface designer believes it is reasonably clear that the interface should select a particular outcome and then asking himself what contextual information makes it clear that the interface should select that outcome. (It may also be advantageous to create example cases in which the interface designer believes it is not especially clear what outcome the interface should select, for reasons that are discussed in the following paragraph.) In some cases, the criteria that decision functions should take into account will be obvious to those of ordinary skill in the art; in other cases, the criteria that decision functions should take into account may require unusual insight.

Once an interface designer has identified criteria that should be taken into consideration by a decision function, an interface designer will need to determine how the decision function should take the criteria into account. In many cases, it may be appropriate for an interface designer to quantify the criteria that are involved. An interface designer may then create a spreadsheet listing the quantified values of the various inputs of the decision for various example cases, along with the preferred outcomes for the decision in those example cases. The interface designer may then attempt to determine some type of formula that produces suitable decision scores that will cause the interface to yield the preferred outcome for most of these example cases, and cause it to yield a high probability of alteration in most cases where it does not yield the preferred outcome or where the interface designer does not strongly prefer one particular outcome. In many cases, an interface designer may be able to arrive at a reasonably good formula with just a little bit of ad hoc effort. Interface designers should also keep in mind that at this stage the problem of optimizing the decision function is essentially a problem of abstract mathematical analysis, and so it is a generic enough problem that a vast amount of prior art expertise is applicable: those with ordinary skill in various fields such as artificial intelligence or statistical process control will be familiar with techniques that may prove helpful. (In fact, certain relevant techniques can be automated and incorporated into the interface software, so that the formula used by a decision function can adapt based on actual results for a particular user.)

No matter how well an interface designer does at identifying criteria that should be taken into account by a decision function and determining how to take the criteria into account, it is virtually inevitable that any decision function will occasionally yield undesired results—and the smarter the decision function is, the more likely it is that these undesired results will be unexpected and will thus be frustrating interface mistakes. It may thus be desirable for an interface designer to include interface features that facilitate recovery from such mistakes. Facilitating recovery from undesired outcomes may be desirable not only because it is inevitable that such outcomes will occasionally occur regardless of how smart a decision function is, but also because it may not always be desirable for an interface designer to spend a lot of time and effort trying to make a decision function as smart as possible. If it is very easy to recover from interface mistakes, then may not be essential for a smart decision function to always be right.

Of course, the alteration functionality that is described herein may serve as a generic means of facilitating recovery from interface mistakes, in some embodiments, and may be usefully applied to a wide variety of decision functions. It may sometimes be advantageous for an interface designer to create new mistake recovery features that are particularly useful for recovering from certain specific types of undesired outcomes, but generally, in an embodiment, in order to make sure that it is easy to recover from undesired outcomes, an interface designer need only make such outcomes alterable. The alteration functionality that is described herein may thus greatly reduce the effort an interface designer needs to make in order to facilitate recovery from interface mistakes. Also, by virtue of being generic and applicable to a wide variety of decision functions, the alteration functionality that is described herein may be easier for a user to learn than ad hoc mistake recovery features: a user who has used alteration functionality to fix one particular type of interface mistake may already understand how to use alteration functionality to fix other types of interface mistakes.

Thus, in an embodiment that has certain alteration functionality that is described herein, it may be easy for an interface designer to mitigate the problems caused by non-beneficial outcomes of a decision function, which means that it may not be essential for the interface designer to do especially well at identifying criteria that should be taken into account by the decision function and determining how to take the criteria into account: the interface designer can make a decision function be reasonably smart without the need to worry much about its imperfections.

For example, one of the inventors decided to create a smart interface decision function that decides whether or not to display an answer to a mathematical calculation as a fraction. After much thought, he decided that it is generally more desirable to display an answer as a fraction when the answer can be displayed as a fairly simple fraction, and when the problem the user typed includes fractions, and when the most recent previous answer was displayed as a fraction. It is generally less desirable to display an answer as a fraction when it would have many digits in its denominator, and when it is a very large number, and when the problem the user typed includes decimals, and when the most recent previous answer was not displayed as a fraction. After some additional thought, he decided that if an answer can be displayed as a fraction that is rather complicated then the interface should be somewhat biased against displaying the answer as a fraction, but the bias should not be as strong if the problem the user typed included a fraction that was equally complicated. He spent several hours fiddling with a spreadsheet to create a smart threshold decision function that takes all these criteria into account and yields outcomes that mostly appear to make sense. This decision function is described in Chapter 50. This decision function may not be perfect, but it may be significantly smarter than prior art, and it does not need to be perfect: in an embodiment, a non-beneficial outcome can typically be corrected with a single keystroke. Likewise, an interface designer can make other decision functions be relatively intelligent that are beyond the scope of the present specification, without the need to worry much about their imperfections.

Increasing Decision Consistency

Generally, it may be advantageous for consecutive interface decisions of the same decision class to tend to yield the same results. If the interface makes a threshold decision as explained above such that the decision score is just barely below the threshold value, and then soon afterward the interface makes a threshold decision of the same decision class such that the decision score is just barely above the threshold value, then the fact that the two decision scores are very close to one another indicates that the circumstances of the two decisions were very similar as for the interface can tell, so the user may not expect the second decision to yield a different outcome than the first. For example, if the interface's decision whether to respond to two consecutive actuations of the same particular key as a special rapid double-click actuation is a threshold decision that is based on the amount of time that elapses between the two consecutive actuations, and the threshold value is 1.00 seconds, then if a user has recently actuated the key twice with 0.97 seconds between the actuations and so the interface treated that as a special rapid double-click actuation, then if the user now actuates the key twice with 1.01 seconds between the actuations, the user may not expect the second pair of actuations to yield a different outcome than the first.

Therefore, in an embodiment, certain threshold decisions may have an "outcome repetition bias." For any particular threshold decision class, if that decision class has a certain "maximum outcome repetition bias," then this means that immediately after a decision of that class, the "current outcome repetition bias" will be set to equal that maximum amount, and the interface will remember the decision score of that decision. Whenever the interface makes its next decision of that class, if the difference between the decision score of the new decision and the decision score of the previous decision is less than the current outcome repetition bias, but the decision score of the new decision is on the other side of the threshold value and so the interface would ordinarily select a different outcome than the previous time, then instead the interface will modify the decision score of the new decision just enough that it is on the same side of the threshold value as the decision score of the previous decision, so that the interface will decide to select the same outcome as before and this decision will have an extremely high probability of alteration. For example, if the decision class mentioned in the preceding paragraph has an outcome repetition bias of 0.10 seconds, then if a user actuates the key twice with 0.97 seconds between the actuations and soon thereafter actuates the key twice with 1.01 seconds between the actuations, the decision pertaining to the second pair of actuations will necessarily have the same outcome as the decision pertaining to the first pair. As another example, a threshold decision regarding whether to display an answer as a mixed fraction or as an improper fraction is described in Chapter 50, and this decision has a maximum outcome repetition bias of 3.0, so if the interface makes a decision of this class with a decision score of 1.5 and then immediately thereafter makes another decision of this class with a decision score of −0.5, these two decisions will necessarily have the same outcome.

In an embodiment, however, for certain such decision classes, a "context break" may occur that will cause the interface to reduce the current outcome repetition bias. In various embodiments, for various decision classes, the interface may use different criteria to determine when such a context break occurs. Generally, whenever the interface has some indication that a previous decision's outcome is no longer as likely to influence a user's expectations, such an indication may constitute a context break.

In particular, in an embodiment, if a certain amount of time passes during which no decision of a particular class occurs, this may constitute a context break. For example, in an embodiment, for a threshold decision class that has a maximum outcome repetition bias of 3.0, the current outcome repetition bias will be reduced by 0.1 each minute, so that a previous decision of that class will not affect the next decision of that class if 30 minutes elapse between the two decisions.

In an embodiment, whenever the interface makes a composite decision, for any component decision class that is not involved in the composite decision, this may constitute a context break. For example, in an embodiment, if the interface's decision regarding what form to display the answer to a calculation in is a composite decision, and the composite decision includes a component decision regarding whether to display an answer as a mixed fraction rather than an improper fraction, then whenever a user types a problem such that the answer cannot be displayed as a fraction at all, this will constitute a context break for purposes of that component decision class.

In an embodiment, when a user edits a different document, this may constitute a context break.

Other ways of determining in various embodiments what constitutes a context break for various decision classes will be evident to those of ordinary skill in the art.

Customizing Adaptation Tendencies

In many cases, after an interface decision has a non-beneficial outcome, it will be advantageous for the interface to cause the nearest beneficial setting to become selected, and then leave that setting selected until the next time a decision of that class has a non-beneficial outcome. However, in some cases, for certain decision classes, an interface designer may know or believe that such adaptation behavior may not be optimal. Of course, even if such adaptation behavior leads to non-beneficial outcomes, in some embodiments, the interface mitigates the disadvantages of non-beneficial outcomes; nevertheless, it may be advantageous for an interface designer to cause certain decision classes to adapt to user behavior in slightly different ways.

In particular, it may be advantageous for a decision class to equally take into account all past outcomes of decisions of that class rather than adapting based on the most recent outcome. It may be advantageous for a decision class to resist adapting to the point where an outcome that is not usually desirable becomes the default outcome. It may be advantageous for a decision class where an outcome that is not usually desirable has become the default outcome to automatically revert to a more normal setting in certain circumstances. Such behaviors are described below.

The adaptation behaviors that are described above and the adaptation behaviors that are described below give an interface designer a variety of approaches that can be used to create adaptive decision classes that generally yield good results. However, other ways of customizing adaptation behavior may occasionally be especially advantageous for specific decision classes. For example, in Chapter 48, the present specification describes a decision class that decides between a radian input mode and a degree input mode; for that particular decision class, if a user includes in the same line of input some angles that are measured in radians and other angles that are measured in degrees, then the interface will not select a setting that is strongly biased towards either radians or degrees until the user moves on to the next line of input.

Adaptation that Considers Past History

In an embodiment, for some decision classes, when the interface determines whether a particular decision of that class had a beneficial or non-beneficial outcome, rather than changing the threshold value based on the outcome of just that particular decision so as to ensure that the decision would have had a beneficial outcome if the change had occurred before the decision, the interface will instead recalculate the threshold value based on the history of the outcomes of all decisions of that class, or some more recent subset of the decisions of that class. Such behavior may be advantageous for a decision class where it is relatively unlikely that a user's preferences will change over time (in the judgment of the interface designer), and so other past outcomes may provide information that is just as relevant as the most recent outcome.

In particular, in an embodiment, for some threshold decision classes, when the interface determines whether a particular decision of that class had a beneficial or non-beneficial outcome, the interface will then set the threshold value of that decision class to be a value that would have caused non-beneficial outcomes to be divided between the two possible outcomes of the decision as equally as possible. For example, consider an embodiment where the interface decides whether or not to treat two consecutive actuations of the same particular key as a special rapid double-click actuation, and this is an adaptive threshold decision that is based on the amount of time that elapses between the two consecutive actuations. Suppose the interface has made seven decisions of this decision class. On four occasions, treating the consecutive actuations as a double-click actuation was beneficial or would have been beneficial; on those occasions, the amount of time that elapsed was 0.5 seconds, 0.3 seconds, 0.5 seconds, and 0.6 seconds. On three occasions, treating the consecutive actuations as two distinct actuations was beneficial or would have been beneficial; on those occasions, the amount of time that elapsed was 1.2 seconds, 0.7 seconds, and 2.0 seconds. As a result, the threshold amount of time for this decision class is now somewhere between 0.6 and 0.7 seconds. If a user now actuates the key twice consecutively with 1.3 seconds between the actuations, the interface will alterably treat this as two distinct actuations. If this decision turns out to have a non-beneficial outcome, then in an embodiment, the interface will not adjust the threshold amount of time past 1.3 seconds; instead, the interface will set the threshold amount of time to be somewhere between 0.7 seconds and 1.2 seconds, which is a threshold that would have caused this decision class to yield non-beneficial outcomes that would have been divided equally between the double-click actuation outcome and the distinct actuations outcome: on the one hand, the recent decision not to treat two consecutive actuations that were separated by 1.3 seconds as a double-click actuation would still have had a non-beneficial outcome, and on the other hand, the decision to treat the earlier two consecutive actuations that were separated by 0.7 seconds as a double-click actuation would also have had a non-beneficial outcome. In essence, in such an embodiment the interface may thus adjust a threshold value so that it is sort of an average desirable value based on all previous user behavior, rather than a minimally desirable value based on the most recent user behavior.

Adaptation that Avoids Extremes

In an embodiment, some adaptive decision classes are "adaptation-resistant decision classes." By various means, the interface may resist adapting in such a way as to cause certain settings of an adaptation-resistant decision class to become selected. That is, using the terminology of setting adaptation maps, when the interface determines that an adaptation-resistant decision had a non-beneficial outcome, in certain circumstances the interface may not necessarily cause the nearest beneficial setting to become selected. Such behavior may be advantageous for a decision class where certain settings are so unlikely to yield beneficial outcomes that in the judgment of the interface designer, it is relatively unlikely that such a setting would yield a beneficial outcome for the next decision even when the interface has just determined that the setting would have yielded a beneficial outcome for the most recent decision.

In particular, in an embodiment, within the setting adaptation map of an adaptation-resistant decision class, a setting node may have an "inherent adaptation resistance value," or an edge within the map may have an inherent adaptation resistance value, or an edge may have such a value for purposes of traversing the edge in one direction but not for purposes of traversing the edge in the other direction. Every setting or edge that has an inherent adaptation resistance value will also have a "current adaptation resistance value" that is initially equal to its inherent adaptation resistance value. If a decision of that class has a non-beneficial outcome and so the interface determines the path to the nearest beneficial setting, if at some point following that path would cause the interface to traverse an edge or reach a setting node that has a current adaptation resistance value that is greater than zero, then that edge or setting will block the path: the interface will not select the nearest beneficial setting, but will instead select the node that is immediately before the edge or node that has a current adaptation resistance value that is greater than zero, and will decrease that current adaptation resistance value by one. The interface will also reset all current adaptation resistance values on that setting adaptation map other than the one it just decreased back to their inherent adaptation resistance values. Whenever a decision of that class has a beneficial outcome, the interface will reset all current adaptation resistance values on that setting adaptation map back to their inherent adaptation resistance values. In other words, in such an embodiment, the interface may resist adapting so as to cause a particular setting to become selected until its failure to adapt causes a non-beneficial outcome to occur a certain number of times in a row.

Of course, in most cases a programmer can implement the same behavior that is described in the preceding paragraph by means of algorithms that do not use setting adaptation maps. For example, in an embodiment, when the interface alterably decides to automatically capitalize the word after "Mr.", the interface will simply keep count of how many consecutive times this yields a non-beneficial outcome, and will adapt so as to stop automatically capitalizing the word after "Mr." only if its decisions to automatically capitalize the word after "Mr." yield non-beneficial outcomes three times in a row.

In an embodiment, as another means of making an adaptive decision class be adaptation-resistant, for a class that has a setting adaptation map with a distance metric as described above, when a decision of that class has a non-beneficial outcome, the interface may restrict its adaptation so that rather than necessarily causing the nearest beneficial setting to become selected, it will proceed as far as possible along the path from the currently selected setting to the nearest beneficial setting subject to the restriction that it will thus traverse only a certain maximum adaptation distance before it stops. In an embodiment, in addition to keeping track of which particular setting is selected for a particular adaptive decision class, the interface may also keep track of how much progress has been made from that setting towards an adjacent setting along the connecting edge. For example, if a setting adaptation map has three settings arranged sequentially, and the length of each of the two connecting edges is 5, and the leftmost setting is currently selected and no progress has been made towards the center setting, then if the interface determines that a decision of that class had a non-beneficial outcome and the nearest beneficial setting is the rightmost setting, then if the maximum adaptation distance the interface will traverse along this setting adaptation map is 3, the interface will not arrive at the rightmost setting; it will not even reach the center setting. Instead, it will proceed so that it is ⅗ of the way from the leftmost setting to the center setting; then if the next decision of that class again has an outcome such that the nearest beneficial setting is the rightmost setting, the interface will select the center setting and proceed so that it is ⅕ of the way from the center setting to the rightmost setting.

Various other ways of making an adaptive decision class be adaptation-resistant will be evident to those of ordinary skill in the art. An interface designer can mix various approaches as desired in order to make a particular decision class adapt in a way that the interface designer believes will be advantageous. For example, in an embodiment, for some particular decision class that has one outcome that is usually desirable and another outcome that is rarely desirable (in the opinion of the interface designer), when a decision of that class has a non-beneficial outcome, if the outcome that is usually desirable is the one that would have been desirable, the interface will adapt normally, but if the outcome that is rarely desirable is the one that would have been desirable, then the interface will resist adaptation somewhat: it will proceed along the path towards the nearest beneficial setting, but it will traverse only a certain maximum distance before it stops, where the maximum distance is either a constant adaptation distance or half the distance to the nearest beneficial setting, whichever is greater.

Adaptation that Reverts from Extremes

In an embodiment, for some adaptive decision classes, one or more settings are "extreme settings" such that if an extreme setting is selected when a context break occurs, then the interface will "revert" from the extreme setting, which means that it will either adjust its settings so as to cause the extreme setting to no longer be selected, or it will at least adjust its settings so as to move towards eventually causing the extreme setting to no longer be selected without yet actually doing so. Such behavior may be advantageous for a decision class where certain settings are relatively likely to be disadvantageous in the future, even if they are advantageous currently.

For example, in an embodiment, for each extreme setting a target setting will exist such that if the extreme setting is selected when a context break occurs, then the interface will select its corresponding target setting. Such a target setting may itself be an extreme setting that is less extreme, so that if another context break occurs, the interface will again select a different setting.

Alternatively, in an embodiment, for a decision class that has two possible outcomes and thus has a setting adaptation map that is an arrangement of the function's settings in a linear sequence from the least biased towards a certain outcome to the most biased towards that outcome, if the setting adaptation map has a distance metric as described above, then a certain edge on the setting adaptation map may constitute a boundary between non-extreme settings and extreme settings, and if the setting that is selected is on the extreme side of that boundary when a context break occurs, then the interface will travel a certain fraction of the distance back towards the non-extreme side of that boundary. For example, in an embodiment, if an extreme setting is selected when a context break occurs, then the interface will adjust the relevant setting variable by an amount equal to half the distance towards the nearest non-extreme setting, rounded up.

Other ways of configuring a particular decision class to revert from an extreme setting if it is selected when a context break occurs will be evident to those of ordinary skill in the art.

In various embodiments, for various decision classes, the interface may use different criteria to determine when a context break occurs. Generally, whenever the interface has some indication that the user's previously expressed preference for a particular extreme setting may no longer apply, such an indication may constitute a context break. In particular, if a certain amount of time passes during which no decision of a particular class occurs, this may constitute a context break. Whenever the interface makes a composite decision, for any component decision class that is not involved in the composite decision, this may constitute a context break. When a user edits a different document, this may constitute a context break. For example, in an embodiment, if the interface has adapted so that it will no longer automatically capitalize names of days of the week, this may be applicable only until the user exits the current document, so when the user edits a different document this may constitute a context break that will cause the interface to revert to automatically capitalizing names of days of the week. Other ways of determining what constitutes a context break for a particular decision class will be evident to those of ordinary skill in the art.

In an embodiment, for a decision class that has extreme settings as defined above, the interface's decision whether or not to revert from an extreme setting if it is selected when a context break occurs is itself an adaptive decision, of its own adaptive decision class. Such a decision will be referred to as an "adaptive reversion decision," and the decision class that has extreme settings that it pertains to will be referred to as its "base decision class." After an adaptive reversion decision occurs, the interface will remember the extreme setting that was selected before the context break occurred and will also remember what setting then became selected or would have become selected if it had decided to revert from the extreme setting, and as soon as the interface makes a decision of the base decision class that has a non-beneficial outcome, the interface will determine whether the other setting would have yielded a beneficial outcome, or whether it would at least have been closer to the nearest beneficial setting on the setting adaptation map, and if so, then the interface will determine that its adaptive reversion decision had a non-beneficial outcome. For example, in an embodiment, if the interface has adapted so that it will no longer automatically capitalize names of days of the week, and then the user closes the current document and edits a different document, and this constitutes a context break for that decision class, so the interface makes an adaptive reversion decision and decides to resume automatically capitalizing names of days of the week, then the interface will remember that if it had made the opposite choice when it made the adaptive reversion decision then it would not be automatically capitalizing names of days of the week; subsequently, if the next time the interface automatically capitalizes the name of a day of the week, this decision turns out to have a non-beneficial outcome, then the interface will not only adapt so that it will once again stop automatically capitalizing names of days the week, but will also determine that the adaptive reversion decision had a non-beneficial outcome and will adjust the setting of that adaptive reversion decision class also, so that the next time the user closes the current document and edits a different document, the interface will decide not to revert from the extreme setting despite the context break.

Adaptation to Emphatic Preferences

In Chapter 9, the present specification describes an Emphatic Alteration key, an Emphatic Yes key, and an Emphatic No key that have the same effects as the non-emphatic versions of the keys, along with additional effects that are not described in Chapter 9. In an embodiment, actuating any such emphatic alteration-related key may affect interface adaptation differently than the non-emphatic version of the key. Such behavior is described in more detail in the following paragraphs.

In an embodiment, for any alterable decision that is an adaptive decision, if a user actuates an emphatic alteration-related key while that decision is the currently alterable decision, then the interface will remember that the user has expressed an emphatic preference pertaining to that decision, and then when the interface determines what outcome of the decision was beneficial or would have been beneficial and adjusts its settings accordingly, the procedure for adjusting the interface settings will take into account the fact that the user expressed an emphatic preference.

In particular, in an embodiment, for purposes of interface adaptation, when the interface determines what outcome of an adaptive decision was beneficial or would have been beneficial and adjusts its settings accordingly, if the user expressed an emphatic preference by actuating an emphatic alteration-related key, then the interface will perform the same adaptation procedure that it would perform if the user had not expressed an emphatic preference, but will do so a certain number of consecutive times, such as, in an embodiment, five consecutive times. For example, in an embodiment, if an adaptive decision has a certain default outcome, and a user explicitly indicates approval of this outcome by means of actuating the Emphatic Yes key, then the interface will adjust its settings just as much as if it had happened five consecutive times that the interface made that decision and the user explicitly indicated approval by means of actuating the non-emphatic Yes key. Thus, in such an embodiment, emphatic alteration-related keys will tend to accelerate the process of interface adaptation.

In an alternative embodiment, as an alternative approach to achieving a similar purpose, if a user rejects a particular option of an alterable interface decision by means of the Emphatic Alteration key or the Emphatic No key, then the interface will if possible ensure that the option the user thus rejected will not be the default option the next time the interface makes a decision of that decision class. For example, in an embodiment, if the interface by default alterably decides to automatically capitalize the word after "Mr.", and if the interface ordinarily will not change that behavior until it yields a non-beneficial outcome three times in a row, then if the first time the interface alterably decides to automatically capitalize the word after "Mr." the user alters this decision by means of the Emphatic Alteration key, then the interface will change its behavior immediately even though it has yielded a non-beneficial outcome only once. In an embodiment, after the interface makes an alterable decision that is an adaptive decision, if a user accepts the default outcome of that decision by means of the Emphatic Yes key, then the interface will if possible ensure that the next time the interface makes a decision of that decision class, it will have the same outcome, and the probability of alteration of the decision will be below the highlighting threshold. In an embodiment, after the interface makes an alterable decision that is an adaptive decision, if a user alters the decision and then accepts an alternate option by means of the Emphatic Yes key, then the interface will if possible ensure that the next time the interface makes a decision of that decision class, the option the user thus accepted will be the default option.

Chapter 22: Interface Adaptation Universal Alterable Decision Adaptation

In an embodiment, some or all alterable interface decisions will be adaptive decisions. In an embodiment, a distinct adaptive decision class will exist for each distinct circumstance disclosed herein in which the interface makes an alterable decision. Therefore, throughout the present specification, whenever the default outcome of an alterable decision is stated or implied, it is to be understood that in an embodiment, interface adaptation may cause the default outcome of that type of decision to change. For example, if the present specification says, "In an embodiment, when a user types a numeral that is immediately after a variable, the interface will alterably decide to automatically convert the numeral into an exponent," then it is to be understood that in an embodiment, if such a decision has a non-beneficial outcome, then the next time the user types a numeral that is immediately after a variable, the interface will instead alterably decide to not automatically convert the numeral into an exponent.

Above, the present specification explains how to convert non-adaptive decision functions to adaptive decision functions. In Part III, numerous distinct situations are described in which the interface will make various types of alterable decision. In most cases, the below explanations of alterable decisions will explain the relevant interface decision functions it enough detail to make it clear how to implement those functions as non-adaptive decision functions, without specifically explaining how to make those functions adaptive; however, taking such later portions of the present specification in conjunction with the above explanation of how to convert non-adaptive decision functions to adaptive decision functions, it will be clear how to implement such functions as adaptive decision functions.

In particular, in every case where the present specification describes a particular type of alterable decision that has two possible outcomes, it is to be understood that in an embodiment, that type of decision will be implemented as a distinct adaptive decision class as described above. As is described above, this means that in an embodiment, whenever a decision of such a decision class has a non-beneficial outcome, the interface will adjust its settings so that the next time it makes a decision of that class, it will select the other outcome, and the decision's probability of alteration will be very high; whenever such a decision has a beneficial outcome, the interface will adjust the settings so that the next time it makes a decision of that class, the decision's probability of alteration will be slightly less than before. So, for example, if the present specification says, "In an embodiment, when a user types a numeral that is immediately after a variable, the interface will alterably decide to automatically convert the numeral into an exponent," then it is to be understood that in an embodiment, if that outcome of automatically converting the numeral into an exponent repeatedly and consistently turns out to be beneficial, then eventually the probability of alteration that is assigned to such decisions will become quite low.

Alteration of Adaptation

As described above, adaptation functionality may cause the interface to change its own settings without notifying the user.

However, in an embodiment, when an adaptive decision has a non-beneficial outcome and the interface accordingly adjusts a setting in such a way that if the adjustment had occurred before the decision then the decision would have had a beneficial outcome, then the interface's decision to adjust that setting itself may be an alterable decision such that altering the decision will cause the adjusted setting to revert to its previous value. Such a decision will be referred to as an "alterable adaptation decision."

Any alteration of an alterable adaptation decision will have consequences that are not readily visible, so in an embodiment, such an alteration will be treated as a subtle change as defined in Chapter 8, and so in certain circumstances, a block descriptor will appear for an alterable adaptation decision. In an embodiment, for purposes of such a block descriptor, the options of an alterable adaptation decision will be described as "Adapting" and "Not adapting."

If the interface behaviors described in the preceding two paragraphs cause a block descriptor to appear that notifies the user when the interface is adapting, this may serve to call the user's attention to an unusually helpful interface behavior that the user otherwise might not consciously notice. Also, making the interface's decision to adjust a setting be an alterable decision may give a user more control over the interface's behavior, so that the user can more easily cause the interface to behave more like a prior art interface that does not automatically adjust its own settings, which may possibly be advantageous. On the other hand, there may be little need for an embodiment of the present invention to behave like a prior art interface: if adjusting a setting will cause the interface to make a wrong decision later, then it will be quite easy for the user to fix that mistake later by means of alteration functionality, so there may be little point in making it possible for the user to prevent that mistake rather than fixing it later. Furthermore, if there is not much need to actually alter alterable adaptation decisions, then any block descriptors that pertain to such decisions may be unnecessarily distracting. Therefore, it may be desirable that if adaptation decisions are made to be alterable, then they are configured in such a way that if a user consistently ignores the possibility of altering such decisions, then sooner or later block descriptors for such decisions will not be displayed.

In an embodiment, alterable adaptation decisions are themselves all members of a single adaptive decision class. In an embodiment, the default outcome of such decisions will initially be to perform adaptation, and the alternate outcome will initially have a high probability of alteration, but if a user repeatedly accepts the default outcomes of such decisions, eventually these decisions will have a sufficiently low probability of alteration that a block descriptor will by default not be displayed. In an embodiment, when the interface adjusts a setting for the alterable adaptation decision class itself, its decision to do so is not an alterable decision, and thus is not itself an alterable adaptation decision.

Interface Decision Data Collection

In an embodiment, in certain circumstances the interface will retain usage data regarding an interface decision even after it has determined whether or not such a decision had a beneficial outcome and has adjusted its settings accordingly, so as to be able to potentially make use of information regarding multiple decisions of a particular decision class in order to adjust its settings in a more sophisticated way. For example, in an embodiment, the interface will remember the initial probability of alteration of each alterable decision and remember whether or not the decision had a beneficial outcome until the interface has subsequently made 1000 more alterable decisions, so that the interface will be able to analyze up to 1000 decisions in order to determine a highlighting threshold such that at least 95% of all decisions with a probability of alteration below this threshold had a beneficial outcome.

Furthermore, in an embodiment, in certain circumstances the interface will send anonymous usage data regarding alterable decisions to a developer, so that the developer may subsequently use aggregated data pertaining to multiple users in order to further improve the algorithms pertaining to alterable decisions. For example, in an embodiment, if a user explicitly opts to send anonymous usage data regarding alterable decisions, then once a month the interface will send to a particular email address an email that includes the current threshold value for each adaptive threshold decision class, so that the developer will receive such data from the computing devices of various users and may then aggregate and analyze the data in order to determine more appropriate initial threshold values for various adaptive threshold decision classes.

Below, various interface behaviors are described that may take advantage of data regarding past alterable decisions. In every case that is described below where the interface may take into account such data for an individual user and adjust its behavior for that user, it is to be understood that also, in an embodiment, the interface may send such data to a developer so that the developer can adjust the initial default behavior of the interface for all future users.

Multi-Factor Adaptation

In an embodiment, as described above, if the interface makes a decision by means of taking into account multiple factors in calculating a decision score and then comparing the decision score to a threshold value, then after the interface determines whether or not the decision had a beneficial outcome, adaptation functionality may cause the interface to adjust the threshold value of the threshold decision.

In an embodiment, for certain threshold decision classes, the interface not only may adjust the threshold value of the decision class, but also may adjust the weights of various factors that are taken into account in calculating the decision score for decisions of that class.

For example, in an embodiment, for a certain threshold decision class, in order to be able to intelligently adapt the weights of multiple factors, the interface will remember all the relevant data regarding each decision of that class, including whether or not each decision had a beneficial outcome, until it has made at least 10 decisions of that class. Once the interface has made at least 10 decisions of that class, the interface will determine what threshold values would have caused as many of those 10 decisions as possible to have beneficial outcomes, and then for each factor that was involved in these decisions, one at a time, in some order, the interface will check that factor to determine whether a different weight for that factor would have been more beneficial and will adjust the weight of that factor if so; that is, for each factor, the interface will determine whether increasing or decreasing the weight of the factor would have caused more of those decisions to have beneficial outcomes, or would at least have caused some cases in which the decision had a non-beneficial outcome to have a higher probability of alteration; if so, the interface will accordingly adjust the weight of that factor. If the interface does adjust the weight of a factor that it checks, then it will use this new weight in determining whether or not to adjust the weight of any subsequent factor that it checks. For example, in an embodiment, if the interface sometimes makes an alterable decision whether or not to display a calculated value as a fraction, and by default such decisions are partly based on how many fractions were included in the expression that was evaluated and partly based on how many digits would be in the denominator if the answer were displayed as a fraction, then if a user repeatedly and consistently causes the calculated value to be displayed as a fraction if and only if it would have a single-digit denominator, then eventually the interface will adapt so that when it calculates a decision score for such a decision, the number of digits that would be in the denominator will have far more weight than the number of fractions that were included in the expression that was evaluated.

The preceding paragraph describes a relatively simple technique for adapting the weights of multiple factors. Those with skill in various fields such as artificial intelligence or statistical process control may be familiar with techniques that are more sophisticated. In many cases, though, even a relatively simple technique may yield beneficial results.

Adaptation of Decision Variation

In an embodiment, in certain circumstances the automatic decision variation feature will vary a decision, which may cause a different option of the decision to become selected than would otherwise become selected, as is described in Chapter 17 in more detail.

In an embodiment, the automatic decision variation feature is adaptive. If a user deletes and retypes an alterable block so that the interface recognizes repetition of some particular alterable decision, then the interface's decision whether or not to select a different outcome of the decision will be considered to have a beneficial outcome if and only if the user does not subsequently alter the outcome of that decision by some means.

In the automatic decision variation feature as described in Chapter 17, when the interface varies a decision, the variation score of the monitored alterable decision determines the strength of the interface's tendency to cause a different option of the decision to become selected. In an embodiment, the interface may adapt the strength of such a tendency with respect to each individual decision class, so for example, in an embodiment where the interface alterably decides to automatically convert straight quotation marks to slanted quotation marks, and a user occasionally deletes and immediately retypes a quotation mark but never actually intends to effect any change by doing this, then eventually the interface will adapt so that particular type of alterable decision is essentially immune to the automatic decision variation feature. In particular, in order to achieve such behavior, in an embodiment, for each distinct type of alterable interface decision that is described herein, the interface will keep track of a decision variation bias that is initially 0. When the interface varies a decision, it will increase the variation score by an amount equal to the decision variation bias for that type of decision. After the interface varies a decision, if varying the decision causes a different option to become selected, but later the interface determines that the outcome that would have been beneficial is the option that would have become selected if the interface had not varied the decision, then the interface will slightly decrease the decision variation bias for that type of decision (even if this results in a negative value), so that in the future varying that type of decision will be slightly less likely to cause a different option to become selected. Conversely, after the interface varies a decision, if varying the decision does not cause a different option to become selected, but later the interface determines that the outcome that would have been beneficial is the outcome that would become selected if the variation score had been sufficiently high to cause the interface to select a different option, then the interface will slightly increase the decision variation bias for that type of decision, so that in the future varying that type of decision will be slightly more likely to cause a different option to become selected.

In an embodiment, the interface may also eventually adjust any particular value that controls the overall behavior of the decision variation feature if it determines that such an adjustment would have yielded more beneficial outcomes. For example, as described further in Chapter 17, the automatic decision variation feature will reduce variation scores whenever a user performs an action that has a deliberation score that is above a certain threshold, so that when a user deletes and retypes an alterable decision, if the user pauses very long while doing so, the interface will have less tendency to select a different outcome of the decision; but in an embodiment, if a user frequently pauses while deleting and retyping an alterable block, and yet the user repeatedly and consistently wishes the interface to yield a different outcome in response to the deletion and retyping of the alterable block despite the pause, then eventually the interface will raise the aforementioned threshold so that the automatic decision variation feature will subsequently be less sensitive to such pauses.

Chapter 30: Word Replacement Improvements
Autocorrection of Word Entry Mistakes

The most common mistakes that users of computing devices encounter are word entry mistakes, such as typographical errors and spelling mistakes. Typographical errors are fairly common for users who are entering input by means of a hardware keyboard, and for users who are entering input by means of a small virtual keyboard on a smartphone or by means of speech recognition, word entry mistakes are even more common.

In various prior art interfaces, when a user presses the space bar or any other key that indicates the user has finished typing a word, autocorrection functionality analyzes the word the user typed and determines whether it appears that the user has made a word entry mistake; if so, then the autocorrection functionality replaces the word the user typed with a different word. Autocorrection functionality will successfully correct word entry mistakes without any additional effort from the user in many cases, but not always.

Some prior art autocorrect features operate by means of a simple word replacement table, so that a mistyped or misspelled word is corrected only if it is explicitly present in the table. However, many autocorrect features use algorithms that are more complex. A typical prior art autocorrection algorithm may have an autocorrection dictionary that includes thousands of actual words and includes data regarding how frequently the words are used. When the autocorrection algorithm receives as input a "word" that a user typed, the word replacement algorithm will by some method find words in its dictionary that are similar enough to the typed word to be relevant replacement candidates, and then by some method calculate a score for each candidate word that takes into account the candidate word's similarity to the word the user typed and, in some cases, also takes into account the candidate word's frequency of usage. For example, U.S. Pat. No. 8,232,973 describes an algorithm that, in one possible configuration, assigns each relevant dictionary word 1 point for each letter that exactly matches the corresponding letter in the word the user typed, 0.5 points for each letter that does not match but is a "keyboard layout neighbor" of the corresponding letter the user typed, and 0.25 points for each letter that is a neighbor of a neighbor. That patent also describes an algorithm that assigns scores that take into consideration the distance on a touchscreen keyboard between the center point of a letter in a dictionary word and the actual location the user touched on the touchscreen keyboard, so that for example a dictionary word that includes the letter I where the word the user typed includes the letter O will have a higher score if the user typed that letter O by touching its far left edge (thus barely missing the letter I) rather than touching its far right edge (and thus missing by more).

Because many users rely heavily on autocorrection to correct typos and spelling errors, even small improvements to an autocorrection algorithm may be very advantageous. In an attempt to improve user experiences, autocorrection algorithms have been created that are extremely complex. Some autocorrection algorithms even take context into account, so that a candidate word may receive a score the depends in part on previous words that a user typed, so that, for example, the word "quo" will receive a high score as a replacement for "qua" if a user typed "status qua" but not if the user typed "sine qua." Some autocorrection algorithms may even replace correctly spelled common English words with other words in certain circumstances; for example, the present writer has been pleasantly surprised on several occasions when his iPhone correctly replaced "on" with "in."

However, even the most sophisticated autocorrection algorithm will often yield the wrong word. A user who generally expects and desires that sophisticated autocorrection functionality will correct his typographical errors will often be disappointed. In fact, other than individual typographical errors, probably the most common mistakes that computer users encounter are autocorrection mistakes. Such mistakes may be especially frustrating when the user actually typed the desired word correctly and autocorrection intervened to change the desired result to an undesired result.

Candidate Word Algorithms

In the following discussion of autocorrection, a "word" is a single sequence of consecutive letters that may optionally also include other symbols such as apostrophes and hyphens but does not include space characters, whether or not such a "word" is an actual word in any language. "The input word" is a word that a user typed that may be modified by autocorrection functionality, or any other word or sequence of keystrokes that is provided as input to a candidate word algorithm. A "candidate word algorithm" is a software procedure that takes as input an input word and an autocorrection dictionary of words that are recognized as valid (and that may also include data regarding how frequently these valid words are used), and based on this input determines a list of "candidate words" that have a certain minimum amount of similarity to the word a user typed, and that also determines some sort of "suitability score" for each candidate word, which is some type of measurement of the desirability of each candidate word as a replacement for the input word. A candidate word algorithm may also take into account other input in addition to the dictionary and the input word; for example, a candidate word algorithm may also take into account words that are adjacent to the input word.

Those of ordinary skill in the art will understand that there are various ways to create candidate word algorithms. As a simple example, a candidate word algorithm may simply return as the only candidate word the input word whenever the input word is itself present in the autocorrection dictionary, and in other circumstances may return a list of candidate words that includes only those words that are present in the autocorrection dictionary that can be generated by replacing a single letter of the input word with a different letter, with a suitability score assigned to each candidate word that is proportional to its frequency of usage. Various other candidate word algorithms exist that can be found online; other candidate word algorithms exist that are proprietary trade secrets of various companies. Some prior art candidate word algorithms are very complex and intelligent. Because typographical errors and autocorrection mistakes are the most common types of interface mistakes, and because a well-made candidate word algorithm can help to correct or prevent such mistakes, even an incremental improvement to a candidate word algorithm may greatly enhance an interface.

Below, the present specification will describe various ways that autocorrection functionality can be improved, in some embodiments. Because a great deal of ingenuity has already gone into creating intelligent prior art candidate word algorithms, it may be extremely undesirable to replace such candidate word algorithms and start from scratch. Instead, the present specification will explain how to create an embodiment in which an unspecified base candidate word algorithm is incorporated into an interface's autocorrection functionality in such a way as to yield better results. This way, if an interface designer happens to have access to a particularly intelligent candidate word algorithm, then the interface designer can use that candidate word algorithm as the base candidate word algorithm for purposes of the autocorrection functionality that is described below, so as to create an embodiment of the present invention that has the advantages of the improved autocorrection functionality that is described below while retaining the advantages of the intelligent base candidate word algorithm.

In particular, various enhanced candidate word algorithms are described below such that in an embodiment, each enhanced candidate word algorithm will itself make use of some simpler candidate word algorithm and will typically yield results that are just as advantageous or more advantageous than the results that would be yielded by the simpler candidate word algorithm. In an embodiment, in order to incorporate all the improvements that are described below, the interface's autocorrection functionality will directly use an enhanced typo-correcting candidate word algorithm as described below to determine a candidate word list; the enhanced typo-correcting candidate word algorithm will use a backspace-branching candidate word algorithm, which will use a retyping-sensitive candidate word algorithm, which will use a backspace-sensitive candidate word algorithm, which will use an accuracy-customizable candidate word algorithm, which will be a modified version of the base candidate word algorithm, which will presumably be the most intelligent prior art candidate word algorithm that the interface designer has convenient access to. These various types of candidate word algorithms are explained in detail below. Those of ordinary skill in the art will understand how to refactor such a sequence of nested candidate word algorithms so that it instead consists of a single candidate word algorithm that behaves the same way that the sequence of nested candidate word algorithms would behave.

In the following discussion of autocorrection functionality, it will be assumed that any base candidate word algorithm will assign a higher suitability score to a candidate word that is a more desirable replacement for the input word. If instead an interface designer wishes to incorporate a base candidate word algorithm that assigns a lower suitability score to a candidate word that is a more desirable replacement for the input word, the interface designer can create a modified version of the base candidate word algorithm that assigns higher suitability scores to more desirable candidate words, and then make use of that modified version of the base candidate word algorithm.

Making Word Replacement Decisions Alterable

In the present specification, when the interface has used a candidate word algorithm to find candidate words that may serve as replacements for a word the user typed and the interface then makes its decision whether or not to replace the word the user typed with a different word, such a decision is a "word replacement decision."

In an embodiment, when the interface makes a word replacement decision that has more than one viable alternative, that decision is an alterable interface decision. Such a decision will be referred to herein as an "alterable word replacement decision," and also constitutes an "alterable autocorrection decision."

In an embodiment, an alterable word replacement decision will include one alternate option for each candidate word that was not selected as a replacement for the input word, along with an alternate option corresponding to the input word itself if the input word was replaced. In an embodiment, as an exception, if the number of candidate words is greater than a certain maximum amount (such as, in an embodiment, five), then the alterable word replacement decision will include only that maximum amount of alternate options, with the candidate words that have the highest suitability scores serving as alternate options. In an embodiment, an alterable word replacement decision will always include an option corresponding to the unmodified input word itself, so that whenever autocorrection functionality does cause the interface to replace a word the user typed, it will always be possible for the user to undo the effect of the autocorrection functionality by means of alteration functionality.

In an embodiment, each alternate option of an alterable word replacement decision will be assigned a probability of alteration that is reflective of the approximate probability that a user will wish to select that alternate option relative to the probability that the user will be satisfied with the default option, insofar as the interface is able to determine such a probability. Those of ordinary skill in the art will be able to understand various ways to implement such behavior with respect to any particular candidate word algorithm. For example, in an embodiment, if the candidate word for a particular alternate option has a suitability score that is at least 90% as much as the candidate word that is selected as the default option, then that particular alternate option will be assigned a very high probability of alteration.

In an embodiment, if autocorrection functionality ever replaces a word that is not the most recent word the user typed (such as because the most recent word provided relevant context that caused the autocorrection functionality to reconsider a previous decision it made), that particular alterable word replacement decision will be assigned a very high probability of alteration. For example, in an embodiment, if a user types "sotto" and autocorrection functionality converts this to "ditto" and then the user types "voce" and so autocorrection functionality converts "ditto" back to "sotto," then at this point, the alterable decision regarding "sotto" will have a very high probability of alteration.

In an embodiment, when a user deletes the alterable block of a word replacement decision, it will not become a remembered alterable block for purposes of the automatic decision variation feature: instead, autocorrection functionality itself will be configured in such a way that if a user deletes a single word and then quickly retypes it by means of the exact same keystroke sequence as before, the interface will be biased against choosing the same outcome for the resulting alterable word replacement decision that it chose the previous time. Such behavior of autocorrection functionality is described below, in the explanation of a "retyping-sensitive candidate word algorithm."

Considering Letter Confidence in Word Replacement Decisions

In an embodiment, the interface will have an "accuracy-customizable candidate word algorithm" that can accept as input not only a candidate word and an autocorrection dictionary, but also additional data regarding whether or not the interface thinks that certain particular letters are likely to be desired in certain positions within the word. In particular, in an embodiment, the input for an accuracy-customizable candidate word algorithm may include information regarding whether the interface is more or less confident than usual that a user intended to type a particular letter that the user typed. In an embodiment, the input for an accuracy-customizable candidate word algorithm may include the information that the interface believes it is quite unlikely that a user will desire a particular letter in a particular position within the word. In an embodiment, the input for an accuracy-customizable candidate word algorithm may include the information that the interface is quite confident that a user did not intend to type a particular letter that the user typed, but still believes it is relatively likely that the user intended to type a keyboard-adjacent letter. In an embodiment, the input for an accuracy-customizable candidate word algorithm may include information regarding which letter or letters the interface believes are relatively likely to be the letter that a user intended if a particular letter that the user typed is not the letter the user intended to type, so that for example, if the interface keeps track of typing accuracy statistics that indicate whether or not a particular user who has mistakenly typed X is generally more likely to have intended to type the adjacent letter Z or the adjacent letter C, then if the accuracy-customizable candidate word algorithm is invoked with the input word "raxe," the algorithm can take such typing accuracy statistics into account in determining the suitability scores to assign to the candidate words "raze" and "race."

Those of ordinary skill in the art will understand how to modify a candidate word algorithm if necessary so that it becomes an accuracy-customizable candidate word algorithm as defined above. For example, consider a candidate word algorithm that calculates suitability scores by giving each candidate word 1 point for each letter that exactly matches the corresponding letter in the input word, 0.5 points for each letter that is keyboard-adjacent to the corresponding letter in the input word, 0.25 points for a letter that is keyboard-adjacent to a letter that is keyboard-adjacent to the letter in the input word, and 0 points for any other letter that does not match the corresponding letter in the input word. In an embodiment, instead of necessarily always using these values of 1, 0.5, 0.25, and 0 respectively in determining a number of points to score for every letter of a candidate word that corresponds to any letter in the input word, the candidate word algorithm is modified to use that set of four values when it has the usual level of confidence that a certain letter was typed correctly, but a different set of four values where the algorithm has additional information regarding a particular letter that is provided by the interface as described in the preceding paragraph. For example, when the interface is unusually confident that a certain letter was typed correctly, the candidate word algorithm may use the four values 1, 0.25, 0, and −1 respectively in determining points for that letter. When the interface is unusually uncertain as to whether a certain letter was typed correctly, the candidate word algorithm may use the four values 1, 0.75, 0.5, and 0.25 respectively in determining points for that letter. When the interface is quite confident that a user did not intend to type a particular letter that the user typed, but still believes it is relatively likely that the user intended to type a keyboard-adjacent letter, the candidate word algorithm may use the four values −1, 1, 0.5, and 0.25 respectively in determining points for that letter. When the interface believes that a particular user who has mistakenly typed X is generally more likely to have intended to type the adjacent letter Z then the adjacent letter C, the candidate word algorithm may use the four values 1, 0.5, 0.25, and 0 respectively in determining points for the letter X, with the modification that a candidate word with the keyboard-adjacent letter Z in place of X will receive 0.55 points instead of 0.5 points, and a candidate word with the keyboard-adjacent letter C in place of X will receive 0.45 points instead of 0.5 points. In addition to this example, those of ordinary skill in the art will understand how to modify other candidate word algorithms if necessary so that they become accuracy-customizable candidate word algorithms as defined above. Those of ordinary skill in the art will understand how to create a candidate word algorithm that will accept as input other gradations of certainty and appropriately incorporate these gradations into its calculation of suitability scores.

The behavior that is described above for an accuracy-customizable word algorithm is designed to facilitate unusually sophisticated correction of typographical errors; it is not designed to improve correction of spelling mistakes that are not typographical errors. Therefore, in an embodiment, an accuracy-customizable word algorithm will distinguish potential spelling mistakes from potential typographical errors that are extremely unlikely to be spelling mistakes, and when the accuracy-customizable word algorithm takes into account additional information in assigning suitability scores to candidate words as described above, it will not thereby reduce the score that is assigned to a potential spelling mistake. Such a distinction need not necessarily be implemented in an especially sophisticated way. For example, in an embodiment, an accuracy-customizable word algorithm will regard the substitution of any vowel for any other vowel as a potential spelling mistake provided that the vowel is not the first or last letter of the word, but will not regard a letter substitution as a potential spelling mistake in any other circumstances. When such an algorithm is invoked, if its input is the word "herin" and its input also includes the information that the interface is extremely confident that the user intended to type the letter "i" as the fourth letter of that word, then the interface may nevertheless assign a very high suitability score to the candidate word "heron"; but if its input is the word "soli" and its input also includes the information that the interface is extremely confident that the user intended to type the letter "i" as the fourth letter of that word, then the interface will not assign a high suitability score to the candidate word "solo."

Discouraging Autocorrection from Suggesting Candidates Twice

In an embodiment, if the interface presents a user with a list of candidate words before the user has necessarily finished typing a word, and the user explicitly selects such a candidate word (such as by touching such a candidate word), then the resulting word replacement decision is not an alterable decision: the interface will assume the user selected the word that the user desired.

However, in an embodiment, in such circumstances, the interface will continue to remember what the user had typed before the user selected the candidate word and continue to remember what other candidate words had been visible in the list of candidate words at least until the user performs another action, so as to enable the behavior described in the following paragraph. In the following paragraph, whatever the user had typed before selecting the candidate word will be referred to as "the partial word" (without regard to whether or not it was actually a complete word), and the other candidate words that had been visible in the list of candidate words will be referred to as "the rejected candidate words." The candidate word the user selected will be referred to as "the previous word."

In an embodiment, if the interface presents a user with a list of candidate words before the user has necessarily finished typing a word, and the user explicitly selects such a candidate word, and then the user actuates the backspace key with a low deliberation score, and then the interface presents the user with another list of candidate words that are potential replacement words for the previous word, then the interface will follow special rules in determining what candidate words to include in a list of potential replacement words for the previous word. In particular, in an embodiment, in such circumstances, when autocorrection functionality invokes a candidate word algorithm in order to determine suitability scores for potential replacement words, the candidate word algorithm will be an accuracy-customizable word algorithm, and the interface will inform the candidate word algorithm algorithm that it is extremely likely that each and every letter that was in both the partial word and the previous word is a letter the user desires. In an embodiment, if selecting the previous word extended the length of the partial word by at least three letters, then the interface will also inform the candidate word algorithm that those added letters also have an enhanced likelihood of being desired letters, but this enhanced likelihood will taper off gradually so that it is zero for, say, the last two letters of the previous word. For example, in an embodiment, if a user types the partial word "imp" and then selects the candidate word "impossible" and then immediately actuates the backspace key, the interface will inform the candidate word algorithm that the letters "imp" are extremely likely to be letters the user desires, and the letter "o" is also unusually likely to be a letter the user desires but not quite as likely, and the first letter "s" has slightly less enhanced likelihood, and so on until the letter "l" which has no enhanced likelihood at all. In an embodiment, in such circumstances, after the candidate word algorithm returns a candidate word list, the interface will substantially reduce the suitability score of any word that was a rejected candidate word. Therefore, for example, in an embodiment, if a user wishes to type "impossibility" and begins by typing "imp," and the user then sees that the interface has suggested the replacement words "imperfect," "impossible," and "impossibly," and the user then selects the replacement word "impossible" and immediately presses the backspace key, then when the interface determines a new set of replacement words to suggest, the interface will be biased towards suggesting words that start with a set of letters that are quite similar to the word "impossible," except that the interface will be biased against suggesting "impossibly" again; as a result, it is quite likely that the interface will immediately suggest "impossibility."

In an embodiment, if the interface presents a user with a list of candidate words before the user has necessarily finished typing a word, and the user explicitly selects one of the candidate words, and then the user actuates the backspace key with a low deliberation score, and then the interface presents the user with another list of candidate words that are potential replacement words for the previous word, and then the user continues to repeatedly actuate the backspace key, then after each such actuation of the backspace key, until the previous word has been deleted entirely, for purposes of determining another set of replacement words to suggest, the interface will still reduce the suitability score of any word that was a rejected candidate word by the same amount that it reduced the suitability score of such words after the first actuation of the backspace key. (Of course, the interface will still suggest such a word as a replacement word if somehow its suitability score is higher than other candidate words' suitability scores even after this reduction.)

Adjusting Letter Confidence Based on User Behavior

In an embodiment, when a user types a sequence of letters and the interface invokes a candidate word algorithm in order to make a word replacement decision, the candidate word algorithm the interface uses is an accuracy-customizable candidate word algorithm, and the interface will inform that algorithm of its confidence regarding each letter the user typed, where such confidence is based on the deliberation score of the keystroke by which the user types that letter: if a keystroke had a high deliberation score, then the interface will inform the candidate word algorithm that it is unusually confident that that letter was typed correctly; if the keystroke had a low deliberation score, then the interface will inform the candidate word algorithm that is unusually uncertain as to whether that letter was typed correctly; and so forth.

In such an embodiment, a user may be able to deliberately pause between keystrokes as a means of controlling the behavior of autocorrection functionality. For example, in an embodiment, if a user types "har" very rapidly then the interface will replace it with "hat," but if the user deliberately types "har" quite slowly then the interface will not replace it.

In Chapter 12, an embodiment is mentioned in which the interface determines in certain circumstances whether certain keystrokes were accurate keystrokes or whether they were missed keystrokes, in order to more accurately calibrate the decision scores that are assigned to input actions for a particular user, so that if for example a user frequently makes typographical mistakes when typing at a speed of 0.3 seconds per keystroke than the deliberation score that is assigned to a keystroke that occurs 0.3 seconds after the previous keystroke will be a low deliberation score. However, the circumstances in which keystrokes are determined to be accurate keystrokes or missed keystrokes were not described in Chapter 12: they are described below. Specifically, an embodiment is described below that makes use of the manual alteration detection feature and/or other interface functionality in order to attempt to accurately determine whether or not a sequence of letters that a user types ultimately is shown to have included one or more typographical errors; in an embodiment, the interface may even recognize a typographical error if a user does not correct the mistake until quite a while after he made the mistake. An embodiment that is described below may also be able to determine for each keystroke that is determined to be a missed keystroke what was the intended target, so as to gather typing accuracy statistics regarding what letters are more likely to be intended targets when a particular keystroke is a missed keystroke.

Therefore, in an embodiment, when a user types a sequence of letters and the interface invokes the candidate word algorithm in order to make a word replacement decision, the candidate word algorithm the interface uses is an accuracy-customizable candidate word algorithm, and the interface will inform that algorithm not only of its overall confidence regarding each letter the user typed, but also of what letters are relatively likely to be the intended target or relatively unlikely to be intended the target if a particular letter is a missed keystroke.

Evaluating Word Replacement Decisions

In an embodiment that has the manual alteration detection feature as described in Chapter 18, if the interface makes an alterable word replacement decision and a little while later the user notices the decision had an undesired result and the user manually edits the word in order to achieve the desired result, if the edited result was an alternate option of the alterable word replacement decision, then the interface may consider its initial alterable word replacement decision to have had a non-beneficial outcome and consider the edited result to be the outcome that would have been beneficial.

In an embodiment, whenever a user manually edits a word that is the alterable block of an alterable word replacement decision, if the edited result is sufficiently similar to the word as it was originally typed that the edited result could reasonably have been what the user originally intended to type, then even if the edited result was not an alternate option of the alterable word replacement decision, the interface will still consider its initial alterable word replacement decision to have had a non-beneficial outcome and consider the edited result to be the outcome that would have been beneficial. Those of ordinary skill in the art will understand various ways to measure whether an edited result is "sufficiently similar" to a word as it was originally typed: various prior art autocorrection algorithms measure word similarity in various ways, and this is just a different application of such a similarity measurement. For example, in an embodiment, if a user types "pwnef" and the interface alterably replaces that word with "owned," and the alternate options of this alterable word replacement decision are "pwnef" and "owner," then if the user manually edits this to yield "pwned," the interface will consider its initial alterable word replacement decision to have had a non-beneficial outcome and consider "pwned" to be the outcome that would have been beneficial.

In an embodiment, for purposes of the behavior described in the preceding paragraph, each time a user finishes manually typing a word and the interface's autocorrection feature is thus invoked, if the interface decides not to replace the word the user typed and this decision is not alterable, then the word the user typed will be treated as the alterable block of a pseudo-alterable word replacement decision that has no alternate options and has a probability of alteration that is initially exceptionally low. In an embodiment, such a pseudo-alterable interface decision is not actually alterable, but its probability of alteration will decrease as the attention score of its alterable block increases until its probability of alteration drops below a certain threshold and it is deleted, just as though it were an actual alterable decision. In other words, in such an embodiment, for a little while after a user finishes manually typing a word, if the user manually edits the word, the interface may consider its decision not to replace the word the user typed to have had a non-beneficial outcome and consider the edited result to be the outcome that would have been beneficial, regardless of whether or not the interface's decision not to replace the word was actually an alterable decision.

In an embodiment, if a user performs a sequence of consecutive destructive actions that deletes exactly one word and does not delete any characters before the word, if the user's next actions consist of typing a word, then for purposes of the behaviors described in the preceding paragraphs, the user will be considered to have manually edited the word that the user deleted in order to achieve the result that the user then typed. For example, in such an embodiment, if the word "good" is the alterable block of an alterable word replacement decision when a user selects the entire word and types "goof," the interface will consider the outcome "goof" to be the outcome that would have been beneficial for the alterable word replacement decision.

In an embodiment, whenever the interface makes an alterable word replacement decision (or a pseudo-alterable word replacement decision), it will remember the sequence of letters that the user actually typed until the decision is deleted. In an embodiment, it will also remember the amount of time that elapsed since the user's previous action before the user typed each letter. When the interface evaluates the outcome of the decision, if the letters that the user actually typed exactly match the letters of the outcome that would have been beneficial except that certain particular letters that the user actually typed are one or two keyboard positions away from the letters that would have been beneficial, then the interface will determine the letters that the user actually typed that exactly match the letters of the outcome that would have been beneficial to be accurate keystrokes and will determine the other letters to be missed keystrokes, and will update its typing accuracy statistics accordingly. In an embodiment, for such purposes, if the outcome that would have been beneficial is longer than the sequence of letters that the user actually typed, the excess letters will be ignored.

For example, in an embodiment, if the interface makes an alterable decision to replace the word "degretta" with "regrettably," and eventually that alterable decision's probability of alteration drops low enough that the interface considers it to have had a beneficial outcome and deletes the decision, then the interface will determine that the letter d at the beginning of the sequence of letters that the user actually typed was a missed keystroke, and the letter r was the intended target. The interface will also determine that the letters in "egretta" were accurate keystrokes. The interface will then update its typing accuracy statistics so as to be able to more realistically estimate, for example, how likely it is that a typed letter D was actually intended as a letter R when the user types it with a particular deliberation score.

Considering Backspace in Word Replacement Decisions

In an embodiment, while a user is typing a word, the interface will keep track of the keystroke sequence by which the user types the word, and when autocorrection is invoked, in order to determine candidate replacement words and assign them scores, the interface may take into account not only the actual sequence of letters of the input word, but also other details of the keystroke sequence that was used in order to type those letters, including any occurrences of the backspace key. For example, in an embodiment, if a user has typed "bur," the interface may assign different scores to various candidate replacement words if the user typed "bur" by means of the keystroke sequence B U R than it would assign if the user typed "bur" by means of the keystroke sequence B U T backspace R. Furthermore, in an embodiment, if a user begins to type a word and then backspaces sufficiently far to delete the entire word the user typed, if the user then immediately types another word, then in order to determine candidate replacement words and assign them scores, the interface may take into account other details of the keystroke sequence involved in such behavior, including the character or characters that were typed before the user backspaced the entire word, and including the backspace keystrokes. For example, in an embodiment, if a user has typed "gar," the interface may assign different keystrokes to various candidate replacement words if the user typed "gar" by means of the keystroke sequence G A R that it would assign if the user typed "gar" by means of the keystroke sequence F backspace G A R.

Therefore, in an embodiment, the input for various candidate word algorithms that are described below may include not only an input word but also information regarding the keystroke sequence that was used in order to type the input word. In particular, for each type of candidate word algorithm that is explained below that handles backspace keystrokes in a special way, the input for that type of candidate word algorithm may include information regarding the keystroke sequence that was used in order to type the input word, in order for that type of candidate word algorithm to be able to receive information regarding backspace keystrokes.

In an embodiment, the interface will include a "backspace-sensitive candidate word algorithm." The backspace-sensitive candidate word algorithm will itself make use of an accuracy-customizable candidate word algorithm that does not itself take into account backspacing; this accuracy-customizable candidate word algorithm will be referred to as "the underlying candidate word algorithm" in the following description of the backspace-sensitive candidate word algorithm.

In an embodiment, whenever the backspace-sensitive candidate word algorithm receives as input a keystroke sequence, it will determine the resulting word that the user eventually typed, and it will invoke the underlying candidate word algorithm with that word as input and return the results provided by the underlying candidate word algorithm.

However, in an embodiment, when the backspace-sensitive candidate word algorithm invokes the underlying candidate word algorithm, if the keystroke sequence it receives as input includes at least one backspace keystroke, then for each backspace keystroke that is not immediately followed by another backspace keystroke, the interface will inform the underlying candidate word algorithm that it is quite unlikely that the user will desire a word that has the letter that was thus backspaced and has that letter in the same position that it was in before it was backspaced, unless that letter was subsequently retyped in that same position with a high deliberation score, or unless after that backspace keystroke occurred the user performed some other action before retyping that letter in that same position. For example, in an embodiment, if a user types "ji" and then backspaces once and then very quickly types "ib" and actuates the space bar, then the backspace-sensitive candidate word algorithm may determine that it is actually more likely the user intended to type "job" rather than "jib."

In an embodiment, when the backspace-sensitive candidate word algorithm invokes the underlying candidate word algorithm, for any letter of the word the user typed such that the user did not backspace the letter but did backspace a letter immediately to its right, the interface will inform the underlying candidate word algorithm that it is much more confident than usual that the user intended to type that letter. Additionally, in an embodiment, the interface will inform the underlying candidate word algorithm that it is slightly more confident than usual that the user intended to type any letter that is immediately to the left of such a letter. For example, in an embodiment, if a user types "pqned" and then backspaces four times and then types "wned" and actuates the space bar, then the backspace-sensitive candidate word algorithm may determine that it is reasonably likely the user deliberately chose to type "pwned" instead of the common English word "owned."

Considering Deleted Letters in Word Replacement Decisions

In an embodiment, if a user selects a single word and then begins typing, so that the word that was previously present becomes deleted when the user begins typing, then the interface will remember the word that was previously present, and when autocorrection is invoked, in order to determine candidate replacement words and assign them scores, the interface not only may take into account information regarding the keystroke sequence that was used in order to type the input word, but also may take into account the word that was deleted when the user began typing the input word.

In an embodiment, the interface will include a "retyping-sensitive candidate word algorithm." The retyping-sensitive candidate word algorithm will itself make use of another candidate word algorithm such as the backspace-sensitive candidate word algorithm described above, or some other candidate word algorithm; this other candidate word algorithm will be referred to as "the underlying candidate word algorithm" in the following description of the retyping-sensitive candidate word algorithm.

In an embodiment, whenever the retyping-sensitive candidate word algorithm receives as input a keystroke sequence that does not include any backspace keystrokes, the retyping-sensitive candidate word algorithm will simply invoke the underlying candidate word algorithm and return its results.

In an embodiment, whenever the retyping-sensitive candidate word algorithm is invoked, if it receives as input a keystroke sequence that includes at least one backspace keystroke, the algorithm will determine a list of input words to be analyzed. This list of input words will include a primary input word that consists of the actual word the user eventually typed, and will also include a list of auxiliary input words consisting of each version of the word that existed immediately before the user actuated the backspace key one or more consecutive times, in a sequence from the most recent version of the word to the oldest version. Additionally, if the retyping-sensitive candidate word algorithm also received as input a word that was deleted when the user began typing the input word, then that deleted word will be included as the last of the auxiliary input words. For example, if a user selects the word "sjit," types "a," backspaces once, types "shot," backspaces twice, types "iy," and finally presses the space bar, then the primary input word will be "shiy" and the auxiliary input words will be "shot," "a," and "sjit."

In an embodiment, each auxiliary input word will be assigned a relevance percentage; for example, in an embodiment, the first auxiliary input word will be assigned a relevance percentage of 50%, and any and all auxiliary input words after the first (which are older versions of the word than the first auxiliary input word) will be assigned a relevance percentage of 25%.

In an embodiment, after the retyping-sensitive candidate word algorithm determines such a list of input words to be analyzed, it will invoke the underlying candidate word algorithm with the primary input word as input. If the underlying candidate word algorithm is the backspace-sensitive candidate word algorithm, then the retyping-sensitive candidate word algorithm will inform that algorithm of the entire keystroke sequence that was used to type the primary input word, including backspace keystrokes; otherwise, it will inform that algorithm of only the keystrokes that resulted in the letters that are actually present. The retyping-sensitive candidate word algorithm will save the resulting candidate word list as the "primary candidate word list."

In an embodiment, after determining the primary candidate word list, the retyping-sensitive candidate word algorithm will substantially reduce the suitability score of any candidate word that is or that begins with an auxiliary input word, unless after the user typed the auxiliary input word and backspaced it the user performed at least one action that had a high deliberation score, or unless there is currently a monitored alterable decision (in which case the user may be deliberately retyping a word in order to invoke the decision variation feature). For example, in an embodiment, if a user types "rare" and then very rapidly backspaces and then retypes the last two letters "re" and presses the space bar, then the retyping-sensitive candidate word algorithm will not assign a very high suitability score to the candidate word "rare" (assuming there is currently no monitored alterable decision), but if a user types "rare" and then backspaces twice and then pauses before retyping "re" and pressing the space bar, then the retyping-sensitive candidate word algorithm may assign a relatively high suitability score to the candidate word "rare."

Subsequently, in an embodiment, the retyping-sensitive candidate word algorithm will invoke the underlying candidate word algorithm once for each of the auxiliary input words; if the underlying candidate word algorithm is the backspace-sensitive candidate word algorithm, it will inform that algorithm of the entire keystroke sequence that resulted in the auxiliary input word. The retyping-sensitive candidate word algorithm will examine each resulting auxiliary candidate word list to see whether it contains any candidate word that is also in the primary candidate word list; if so, then for each such candidate word, the retyping-sensitive candidate word algorithm will increase the suitability score of the candidate word in the primary candidate word list by an amount equal to the relevance percentage of that particular auxiliary input word multiplied by the suitability score of the candidate word in the auxiliary candidate word list.

For example, in an embodiment, if a user types "bpot" and then backspaces three times and then rapidly types "oor" and presses the space bar, then when the retyping-sensitive candidate word algorithm processes the auxiliary input word "bpot," this may cause the retyping-sensitive candidate word algorithm to add a substantial bonus to the suitability score of the word "boot," so then depending on the details of the embodiment, the retyping-sensitive candidate word algorithm may determine that it is actually more likely the user intended to type "boot" rather than "boor," or at least may increase the probability of alteration of the alterable word replacement decision if it alterably decides against replacing "boor" with "boot."

Considering Accidental Backspace in Word Replacement Decisions

In an embodiment, the interface will include a "enhanced typo-correcting candidate word algorithm." The enhanced typo-correcting candidate word algorithm will make use of a "backspace-branching" candidate word algorithm that itself makes use of another candidate word algorithm such as the retyping-sensitive candidate word algorithm described above, or some other candidate word algorithm; this other candidate word algorithm will be referred to as "the underlying candidate word algorithm" in the below description of the backspace-branching candidate word algorithm.

In an embodiment, the underlying candidate word algorithm that is used by the backspace-branching candidate word algorithm is modified if necessary so as to be able to receive as input an input word that includes a character that does not match any letter of any word in the autocorrection dictionary, and so as to then treat such a character as though it were an unusual letter that was typed by means of pressing a key that happens to be at the exact same location as the backspace key. Those of ordinary skill in the art will understand how to modify any particular underlying candidate word algorithm as necessary. Such a character is referred to below as "the backspace typo letter." For example, in an embodiment where the backspace key is immediately adjacent to the M key and where the underlying candidate word algorithm takes into account keyboard adjacency in determining suitability scores, if the character θ serves as the backspace typo letter, then the underlying candidate word algorithm may receive as input the input word "implementation" and then assign quite a high suitability score to the candidate word "implementation" because the candidate word "implementation" could be generated by replacing just a single letter of the input word with a letter that is keyboard-adjacent.

In an embodiment, when the enhanced typo-correcting candidate word algorithm is invoked, if the keystroke sequence that it receives as input includes at least one backspace keystroke that is not immediately preceded nor immediately followed by another backspace keystroke, then it will replace every such backspace keystroke with a "marked backspace keystroke." After that, in an embodiment, to prevent excess consumption of processing time, if more than three marked backspace keystrokes are in the keystroke sequence then the interface will replace the marked backspace keystroke with the highest deliberation score (or in case of tie, the one with the highest deliberation score that occurred first) with an ordinary backspace keystroke, and will repeatedly do so until there are only three marked backspace keystrokes. The enhanced typo-correcting candidate word algorithm will then invoke a backspace-branching candidate word algorithm that behaves as described below, and will then return the resulting candidate word list.

Figure 20A:
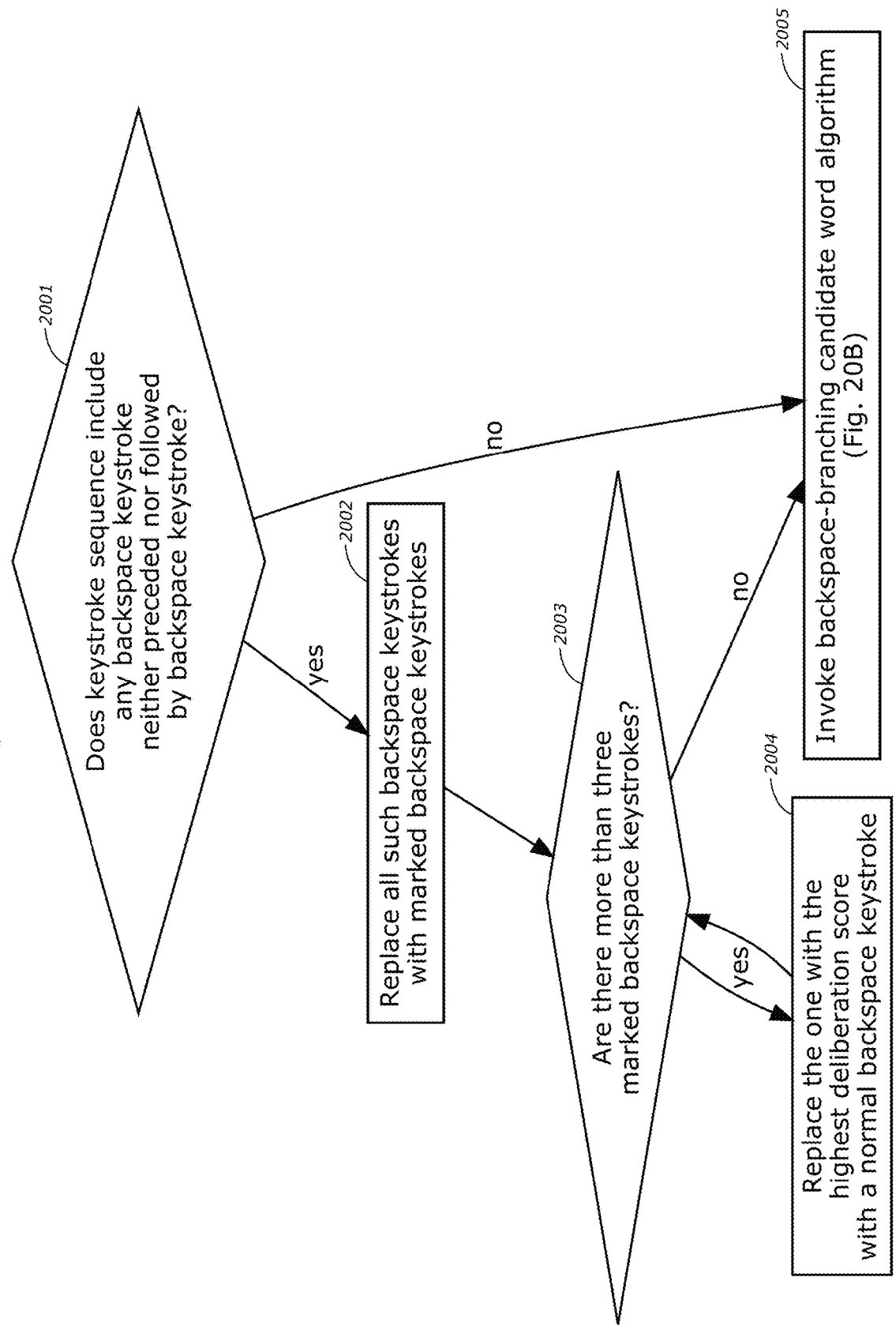
FIGS. 20A and 20B are flowcharts that illustrate an example method that occurs when an enhanced typo-correcting candidate word algorithm is invoked, according to one embodiment.

FIG. 20A is a flowchart that illustrates the process that occurs when the enhanced typo-correcting candidate word algorithm is invoked, in an embodiment. The process begins with Block 2001 which asks, "Does keystroke sequence include any backspace keystroke neither preceded nor followed by backspace keystroke?" If the answer is no, the interface will invoke the backspace-branching candidate word algorithm, which is described further in FIG. 20B (Block 2005). If the answer is yes, the interface will replace all such backspace keystrokes with marked backspace keystrokes (Block 2002). The process continues in Block 2003, which asks, "Are there more than three marked backspace keystrokes?" If the answer is no, then the interface will invoke the backspace-branching candidate word algorithm previously mentioned (Block 2005). If the answer is yes, then the interface will replace the one with the highest deliberation score with a normal backspace keystroke (Block 2004) and will repeatedly do so until there are only three marked backspace keystrokes (as illustrated by the arrow returning to Block 2003).

In an alternative embodiment, as an exception to the behavior described above, a backspace keystroke that has a high deliberation score will not be replaced with a marked backspace keystroke. (However, if the underlying candidate word algorithm takes into account deliberation scores, then it may not make much difference whether or not a backspace keystroke that has a high deliberation score is replaced with a marked backspace keystroke, since such a backspace keystroke is unlikely to be taken for a missed keystroke by the underlying candidate word algorithm.)

In an embodiment, whenever the backspace-branching candidate word algorithm receives as input a keystroke sequence that does not include any marked backspace keystrokes, the backspace-branching candidate word algorithm will simply invoke the underlying candidate word algorithm and return the resulting candidate word list.

In an embodiment, whenever the backspace-branching candidate word algorithm receives as input a keystroke sequence that includes at least one marked backspace keystroke, the backspace-branching candidate word algorithm will generate two distinct keystroke sequences based on the input sequence. In one of these keystroke sequences, the first marked backspace keystroke will be replaced with an ordinary backspace keystroke; this is the "intentional-backspace keystroke sequence." In the other, the first marked backspace keystroke will be replaced with the backspace typo letter; this is the "accidental-backspace keystroke sequence." After the backspace-branching candidate word algorithm generates these two distinct keystroke sequences, it will invoke itself twice, once with each of these two keystroke sequences as input, in order to generate two distinct candidate word lists: the "intentional-backspace candidate word list" and the "accidental-backspace candidate word list." The algorithm may then reduce the suitability scores of all the words in the intentional-backspace candidate word list as explained in the following paragraph. The algorithm will then combine the two resulting candidate word lists into one combined candidate word list that includes every candidate word that was in either of the two distinct lists. For any candidate word that is in both lists, the candidate word's suitability score in the combined candidate word list will equal the greater of its two suitability scores from the two distinct lists. The backspace-branching candidate word algorithm will then return the resulting combined candidate word list.

In an embodiment, as a special case, after the backspace-branching candidate word algorithm generates two distinct candidate word lists as described in the preceding paragraph, before it combines the two resulting candidate word lists into one combined candidate word list, if the marked backspace keystroke had a low deliberation score then the suitability scores of all the words in the intentional-backspace candidate word list will be reduced by a certain percentage. If the marked backspace keystroke had a very low deliberation score, then those suitability scores will be reduced even more. Thus, for example, if a user types "wo" and then very rapidly presses the backspace key and types "an," then the candidate word "wan" may not receive an extremely high suitability score even though it is exactly what the user typed. This reflects the fact that it generally takes a little extra time to notice and react to a typographical error, and so a backspace keystroke with a very low deliberation score is less likely to actually be an intentional backspace keystroke.

In an embodiment, when the backspace-branching candidate word algorithm generates two distinct candidate word lists and combines them into one combined candidate word list, the combined candidate word list will also include information for each word in the combined candidate word list that indicates whether that word came from the intentional-backspace candidate word list or from the accidental-backspace candidate word list. If a word was in both candidate word lists then it will be identified as though it came from the candidate word list in which it had the higher suitability score; if it had an equally high suitability score in both candidate word lists then it will not be identified as coming from either candidate word list. If the interface ends up recognizing a word that came from the intentional-backspace candidate word list as the outcome that would have been beneficial for a word replacement decision, then it will regard that marked backspace keystroke as an accurate keystroke; if it ends up recognizing a candidate word that came from the accidental-backspace candidate word list as the outcome that would have been beneficial, then it will regard that marked backspace keystroke as a missed keystroke.

Figure 20B:
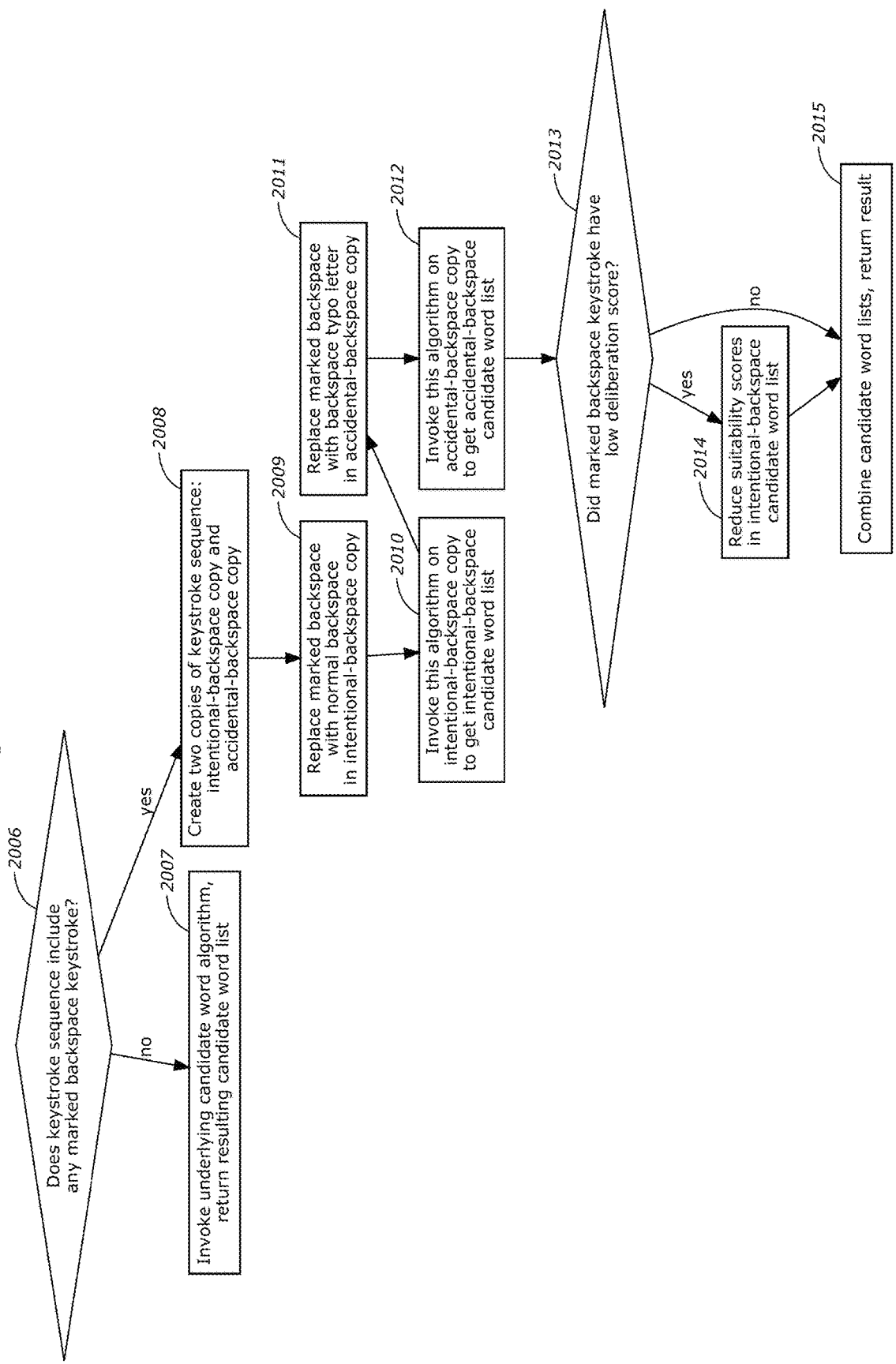

FIG. 20B is a flowchart which illustrates the behavior of the backspace-branching candidate word algorithm, in an embodiment. The process begins with Block 2006, which asks, "Does keystroke sequence include any marked backspace keystroke?" If the answer is no, the algorithm will simply invoke the underlying candidate word algorithm and return the resulting candidate word list (Block 2007). If the answer is yes, the backspace-branching candidate word algorithm will create two copies of the keystroke sequence (Block 2008). Subsequently, in one copy the algorithm will replace the first marked backspace keystroke with a normal backspace keystroke to create the intentional-backspace copy (Block 2009). The algorithm will invoke itself on the intentional-backspace copy to generate the intentional-backspace candidate word list (Block 2010). Similarly, in the second copy, the algorithm will replace the first marked backspace keystroke with the backspace typo letter to create the accidental-backspace copy (Block 2011). The algorithm will invoke itself on the accidental-backspace copy to generate the accidental-backspace candidate word list (Block 2012). The process continues in Block 2013, which asks, "Did marked backspace keystroke have low deliberation score?" If the answer is yes, then the algorithm reduces the suitability scores in the intentional-backspace candidate word list (Block 2014), combines the candidate word lists, and returns the resulting combined candidate word list (Block 2015). If the answer is no, then the algorithm combines the candidate word lists without adjusting suitability scores and returns the result (Block 2015).

For example, in an embodiment, if the keystroke sequence that the backspace-branching candidate word algorithm receives as input consists of "imple" followed by a marked backspace keystroke with a low deliberation score followed by "entation," then it will generate two distinct keystroke sequences. One of these keystroke sequences will consist of "imple" followed by an ordinary backspace keystroke followed by "entation"; this is essentially the input word "implentation," along with additional information regarding the exact keystroke sequence that was used to type the input word "implentation." The other keystroke sequence will consist of "impleθentation." The backspace-branching candidate word algorithm will then invoke itself twice, once with each of these two keystroke sequences as input. Neither of these two keystroke sequences now includes a marked backspace keystroke, so each of these invocations of the backspace-branching candidate word algorithm will now cause it to simply invoke the underlying candidate word algorithm. One of these invocations of the underlying candidate word algorithm may yield the candidate word "implantation" with a medium suitability score, and the other may yield the candidate word "implementation" with a high suitability score, so the backspace-branching candidate word algorithm (and ultimately the enhanced typo-correcting candidate word algorithm) may return a candidate word list that includes the word "implantation" from the intentional-backspace candidate word list and the word "implementation" from the accidental-backspace candidate word list. The word "implementation" may have a higher suitability score. If as a result the interface autocorrects the word to yield "implementation" and the user accepts this outcome, then the interface will regard that backspace keystroke as a missed keystroke.

Because the backspace-branching candidate word algorithm as described in the preceding paragraph is a recursive algorithm, if the algorithm receives an input a keystroke sequence that includes more than one marked backspace keystroke, it will end up invoking the underlying candidate word algorithm more than twice. For example, in an embodiment, if a user types "rember" by means of the keystroke "t," followed by an actuation of the backspace key, then the keystroke sequence "reme," then an actuation of the backspace key, and then the keystroke sequence "ber," then the underlying candidate word algorithm will be invoked four times, with the four input words "tθremeθber," "tθrember," "remeθber," and "rember." If the algorithm receives as input a keystroke sequence that includes three marked backspace keystrokes, it will end up invoking the underlying candidate word algorithm eight times; if it receives a keystroke sequence that includes four marked backspace keystrokes, it will end up invoking the underlying candidate word algorithm 16 times; and so forth. (This is why it may be desirable to replace marked backspace keystrokes in excess of a certain number with ordinary backspace keystrokes, as is described above.)

In an alternative embodiment, not only will the enhanced typo-correcting candidate word algorithm replace nonconsecutive backspace keystrokes with marked backspace keystrokes as described above, but also, whenever the enhanced typo-correcting candidate word algorithm receives as input a keystroke sequence that includes a sequence of exactly two consecutive backspace keystrokes that are preceded by at least two consecutive characters that are not backspace keystrokes, it will replace that pair of actuations of the backspace key with a pair of marked backspace keystrokes. When the backspace-branching candidate word algorithm receives as input a keystroke sequence that includes at least one pair of adjacent marked backspace keystrokes, it will generate two distinct keystroke sequences based on the input sequence; in one, the first such pair of marked backspace keystrokes will be replaced with a pair of ordinary backspace keystrokes, and in the other, the first such pair of marked backspace keystrokes will be replaced with two consecutive occurrences of the backspace typo letter. The backspace-branching candidate word algorithm will then invoke itself twice, combine the two resulting candidate word lists into one, and return the result, as described above. For example, in an embodiment, if the user types "er" by means of the keystroke sequence "ha" followed by two consecutive actuations of the backspace key followed by the keystroke sequence "er," then the underlying candidate word algorithm will be invoked once with the input word "haθθer" and once with the input word "er."

Word Replacement Improvements in Perspective

Word entry mistakes may be the most common of all mistakes that users of computing devices encounter, so even a slight improvement to an autocorrection functionality may be important. Even in an embodiment that does not facilitate altering alterable interface decisions, autocorrection functionality that makes use of the enhanced candidate word algorithms that are described above may have significant advantages over prior art.

In various prior art interfaces, after autocorrection fails to correct a word entry mistake or itself causes a word entry mistake, in certain circumstances a user can replace an incorrect word by means of just two gestures. For example, on an iPhone, after the iPhone replaces a word that a user typed with some other word, if the user subsequently backspaces to position the cursor after the replacement word, in certain cases a word replacement balloon graphic will appear that contains at least the word the user originally typed, and if the user then touches that original word then the iPhone will undo the replacement of that word. The present writer has often found this feature to be useful, but also has often found this feature to be annoyingly obtrusive: on numerous occasions, he has pressed the space bar on an iPhone just to trigger a desired autocorrection and then immediately backspaced the undesired space character, and was distracted by the undesired balloon graphic that then appeared. Also, even when this feature would be advantageous, this feature is not triggered if backspacing to position the cursor after the replacement word causes the replacement word to become united with the immediately following word; for example, if a user positions the input cursor immediately before the word "iPhone" and deliberately types "Cwazy" followed by a space character, and the iPhone replaces "Cwazy" with "Crazy," then backspacing once will yield "CrazyiPhone" and will not cause a word replacement balloon graphic to appear.

U.S. Pat. No. 8,074,172 describes an iPhone feature such that just a single touch of an undesired replacement word will undo the replacement; Chapter 6 briefly discusses the disadvantages of that feature and explains how the touch alteration feature described herein may be significantly more advantageous even for recovery from an undesired word replacement.

Generally, in various embodiments that make alterable word replacement decisions, if a word replacement decision has an undesired outcome, then various features that facilitate altering alterable interface decisions may enable the user to recover from the resulting word entry mistake, and may enable the user to do so more efficiently than prior art word entry mistake recovery features would. It may be extremely advantageous for word replacement decisions to be alterable decisions even in an embodiment where no other types of decisions are alterable decisions. However, in an embodiment where numerous other types of decisions are also alterable decisions as described herein, users may become accustomed to efficient alteration technology when they encounter word entry mistakes, and then they may find it especially intuitive and convenient to correct other types of mistakes by means of alteration technology.

Chapter 32: Alterable Smart Capitalization
Capitalization Attribute Sets

In an embodiment, for purposes of the following discussion of capitalization behaviors, a "capitalization attribute set" is a set of data pertaining to capitalization behaviors. A location where an input cursor may become located may have a capitalization attribute set; an abbreviation may have a capitalization attribute set. In an embodiment, a capitalization attribute set includes an attribute that is either uppercase or lowercase and an attribute that is either alterable or non-alterable. For example, a location may be non-alterable lowercase, non-alterable uppercase, alterable lowercase, or alterable uppercase.

In an embodiment, every location where an input cursor may become located has a capitalization attribute set. By default, a location's capitalization attribute set will have the lowercase attribute and the non-alterable attribute, unless otherwise specified. In the following discussion of capitalization behaviors, locations will frequently be spoken of in terms of their capitalization attributes without explicit mention of a "capitalization attribute set." For example, a location may be said to be an "alterable uppercase location," which means that the location's capitalization attribute set includes the uppercase attribute and the alterable attribute. In the following discussion of capitalization behaviors, an "alterable capitalization location" is a location whose capitalization attribute set has the alterable attribute; that is, it is either an alterable uppercase location or an alterable lowercase location.

In an embodiment, in certain circumstances that are described below, an abbreviation's capitalization attribute set may affect a location's capitalization attribute set, and in certain circumstances a location's capitalization attribute set either may directly affect an interface decision regarding whether or not to capitalize a letter, or may affect an interface decision regarding whether or not to enter uppercase mode which may in turn affect the capitalization of the next letter a user types. Thus, in certain circumstances, a capitalization attribute set may affect the capitalization of a letter a user types. Generally, if a capitalization attribute set affects a letter's capitalization, then that letter's capitalization will be alterable if the capitalization attribute set included the alterable attribute, and will not be alterable otherwise. Such behavior is described in more detail below.

In an embodiment, a capitalization attribute set that includes the alterable attribute may include a probability of alteration, and if such a capitalization attribute set causes an alterable capitalization decision or a potentially alterable capitalization decision to exist, then that decision's probability of alteration will equal the probability of alteration in the capitalization attribute set, as described below.

In an embodiment, a capitalization attribute set that includes the alterable attribute may include a capitalization score. In such an embodiment, the capitalization attribute set will include either the uppercase attribute or the lowercase attribute depending on whether or not the capitalization score exceeds a certain capitalization threshold value, and the capitalization attribute set will include a high probability of alteration if the capitalization score is very close to the capitalization threshold value, or a low probability of alteration if the capitalization score is far from the capitalization threshold value, or will not include the alterable attribute at all if the capitalization score is extremely far from the capitalization threshold value. Thus, in such an embodiment, if such a capitalization attribute set affects an alterable interface decision, then the capitalization score will in effect serve as a decision score for a conditionally alterable threshold decision. In the following discussion of capitalization behaviors, if a means for determining a capitalization score is specified for a capitalization attribute set and no other information is specified about the capitalization attribute set, then it may be inferred that the uppercase or lowercase attribute, alterable or non-alterable attribute, and probability of alteration of that attribute set will all be derived from the capitalization score.

Whenever capitalization scores are discussed in the present disclosure, it will be assumed that a capitalization score that is above a certain capitalization threshold value will be associated with the uppercase attribute and a capitalization score that is below the capitalization threshold value will be associated with the lowercase attribute; however, those of ordinary skill in the art will understand that identical interface behaviors may instead be implemented by means of capitalization scores that work in the opposite fashion. For example, a table of abbreviations is described below such that each abbreviation in the table is assigned a specific capitalization score, and such that a high capitalization score is assigned to any abbreviation that usually occurs at the end of a sentence; those of ordinary skill in the art will understand that an identical interface behavior could instead be implemented by causing capitalization scores that are below the capitalization threshold value to be associated with the uppercase attribute and accordingly assigning a low capitalization score to any abbreviation that usually occurs at the end of a sentence.

In the following discussion of capitalization behaviors, when a capitalization attribute set is said to include the alterable attribute and the uppercase attribute, if no probability of alteration is specified and no capitalization score is specified, it may be inferred that the attribute set's capitalization score is above the capitalization threshold value by a moderate amount, in an embodiment where capitalization attribute sets have capitalization scores. Likewise, a capitalization attribute set that includes the alterable attribute and the lowercase attribute may be inferred to include a capitalization score that is below the capitalization threshold value by a moderate amount, unless otherwise specified.

Capitalization and Whitespace

In an embodiment, a location immediately after a single space character has the same capitalization attribute set as the location before that space character, except as otherwise specified below.

For purposes of the present paragraph, a tab character constitutes a "whitespace gap" if it is immediately after a non-whitespace character, and a sequence of two or more characters such that each of the characters is either a space character or a tab character constitutes a "whitespace gap" if it is immediately after a non-whitespace character; a single space character alone does not constitute a whitespace gap. In an embodiment, the location immediately after a whitespace gap has a capitalization attribute set that depends on the location before the whitespace gap: if the location before the gap is a non-alterable lowercase location, then the location after the gap is an alterable lowercase location; if the location before the gap is an alterable lowercase location or an alterable uppercase location, then the location after the gap is an alterable uppercase location; and if the location before the gap is a non-alterable uppercase location, then the location after the gap is also a non-alterable uppercase location.

In an embodiment, for purposes of the following paragraphs, a text document or other text region is separated into lines by newline characters; characters that are not separated by a newline character are considered to be on the same "line" even when they happen to be separated by a line break due to wordwrap. A "blank line" consists of a line that is empty or contains only whitespace characters. A "line of text" is a line that includes at least one non-whitespace character, so a blank line is not considered to be a "line of text." A line of text "ends uppercase" if the location after its last non-whitespace character is an uppercase location or if inserting a space character after its last non-whitespace character would cause the location after that space character to be an uppercase location; for example, if a line of text reads "This is a complete sentence.", then that line ends uppercase because inserting a space character after the period would cause the location after that space character to be an uppercase location. A line of text "ends lowercase" otherwise; for example, if a line of text reads "This sentence fragment is", then that line ends lowercase because the location after its last letter is a lowercase location and inserting a space character after that letter would cause the location after that space character to be a lowercase location.

In an embodiment, a location immediately after a newline character is an uppercase location. In an embodiment, such a location is not an alterable uppercase location, except as described in the following two paragraphs.

In an embodiment, the location immediately after a newline character is an alterable uppercase location if a line of text is above it somewhere and the nearest such line of text ends lowercase. In an embodiment, such a location has a high probability of alteration if the line immediately above it is a line of text that ends lowercase, or a low probability of alteration if the line immediately above it is a blank line.

In an embodiment, for any location immediately after a newline character, if the location is immediately followed by a lowercase letter and either there is no line of text above that location or the nearest such line of text ends uppercase, then every location that is sufficiently nearby (such as, in an embodiment, within 20 lines) and is immediately after a newline character and is an uppercase location is an alterable uppercase location.

Text Analysis

In an embodiment, the interface will attempt to determine when standard linguistic rules require that the next letter be capitalized, and will then automatically enter uppercase mode if it is likely that this would be helpful. Such behavior is described in detail below.

In an embodiment, the interface may distinguish a "sentence uppercase location" or "sentence alterable capitalization location" from a "title uppercase location" or "title alterable capitalization location." For example, in an embodiment, the location after "I know." is a sentence uppercase location, and the location after "Mrs." is a title uppercase location, as is explained below. For purposes of such an embodiment, any uppercase location or alterable capitalization location that is referred to in the present specification may be assumed to be a sentence uppercase location or sentence alterable capitalization location, except as otherwise specified.

The following three paragraphs describe text analysis algorithms that may sometimes help to determine whether a certain location should be a capitalization location, in an embodiment. Applications for these algorithms are mentioned farther below. When one of these text analysis algorithms is invoked, it need not necessarily provide a definitive result; instead, either the algorithm may provide a result and also return information regarding how confident the algorithm is in the result, or the algorithm may only return the information that it was unable to provide even a tentative result. The examples of such algorithms that are provided in the following three paragraphs are simplistic examples that may nevertheless be useful. Other such text analysis algorithms that are more intelligent can be created by those of ordinary skill in the art, and it may also be possible for the unusually skilled artisan to create an unusually intelligent text analysis algorithm.

In an embodiment, the interface includes a text analysis algorithm that can attempt to determine whether or not two portions of text are part of the same sentence (or sentence fragment). For example, in an embodiment, the interface includes a text analysis algorithm that determines with a high degree of confidence that if two portions of text are separated by a line break then they are not part of the same sentence, and determines with a high degree of confidence that if between two portions of text there is no line break and no sentence uppercase location or sentence alterable capitalization location that is actually followed by a capital letter, then the two portions of text are part of the same sentence. In an embodiment, such an algorithm determines with a high degree of confidence that if two portions of text are separated by a sentence uppercase location or sentence alterable capitalization location that is actually followed by a capital letter, then the two portions of text are not part of the same sentence.

In an embodiment, the interface includes a text analysis algorithm that can attempt to determine whether a particular portion of text that ends with a period is a complete sentence in English or is only a sentence fragment. For example, in an embodiment, the interface includes a text analysis algorithm that determines with a high degree of confidence that a sequence of English words that does not include any verb is not a complete sentence, and that does not make any determination whether or not any other portion of text that ends with a period is a complete sentence.

In an embodiment, the interface includes a text analysis algorithm that can attempt to determine whether a particular portion of text that follows text enclosed in quotes is likely to be a continuation of a sentence that includes the quoted text, and that does not take into account whether or not the portion of text begins with a capital letter (because the algorithm will be used in situations where the user did not explicitly choose whether or not to capitalize that letter). For example, in an embodiment, the interface includes a text analysis algorithm such that if a particular portion of text follows text enclosed in quotes, and the beginning and ending of the portion of text are probably part of the same sentence, and the portion of text ends with a period or other sentence-ending punctuation, and the portion of text includes less than four words, and the last word of the text is a verb such as "asked," "said," or "exclaimed," then the text analysis algorithm will determine with confidence that the portion of text is likely to be a continuation of a sentence that includes quoted text. For example, such a text analysis algorithm will determine with a high degree of confidence that the last two words of "'Why?' he asked." are probably part of the same sentence as the quoted text "Why?".

Capitalization and Miscellaneous Punctuation

In an embodiment, if a colon is immediately followed by a space character, then the location immediately after that space character is an alterable lowercase location.

In an embodiment, if an uppercase location is immediately followed by an asterisk, then the location after the asterisk is an alterable uppercase location. In an embodiment, as an exception, within an instant messaging application, if an uppercase location that is at the beginning of a message is immediately followed by an asterisk, then the location after the asterisk is an alterable lowercase location.

In an embodiment, if a period, question mark, or exclamation point is immediately followed by a space character, then the location immediately after that space character is a non-alterable uppercase location, except as otherwise specified below.

In an embodiment, if an ellipsis that consists of three dots is immediately followed by a space character, then the location after that space character is an alterable uppercase location. In an embodiment, such an ellipsis may either consist of a single three-dot ellipsis character, or of three consecutive period characters, or of three period characters that are separated by single space characters. However, in an embodiment, any period character that is at the end of an ellipsis that consists of four dots is treated as an ordinary period character, so for example the location after "I know . . . ." is a non-alterable uppercase location.

Capitalization and Abbreviations

In an embodiment, if a user types a single lowercase letter followed by a period, the interface will alterably decide to convert that single lowercase letter to an uppercase letter. In an embodiment, for purposes of highlighting, such a change constitutes an autocorrection.

In an embodiment, if a word that consists of a single uppercase letter is immediately followed by a period that is immediately followed by a space character, then the location immediately after that space character is an alterable lowercase location if the word is immediately preceded by another word that begins with a capital letter and does not end with a period, or is an alterable uppercase location otherwise. For example, in such an embodiment, the location after "Jeff H." is an alterable lowercase location; the location after "J.R.R." is an alterable uppercase location.

In an embodiment, the interface initially has in memory a table of certain abbreviations that end with periods along with corresponding capitalization attribute sets, where each abbreviation's corresponding capitalization attribute set is based on the probability that an average user will want the word after that abbreviation to be capitalized, in the judgment of the interface designer. For example, if the interface designer believes that the average user will want the word after a certain abbreviation to be capitalized slightly less than half the time, then the interface designer will assign that abbreviation a capitalization score that is barely less than the capitalization threshold value, which means that the abbreviation's capitalization attribute set will include the alterable attribute and the lowercase attribute and a high probability of alteration. In an embodiment, when a user's input includes an abbreviation that is in such a table of abbreviations, if the abbreviation's ending period is immediately followed by a space character, then the location immediately after that space character has the same capitalization attribute set as the abbreviation's capitalization attribute set from the table of abbreviations.

In an embodiment, such a table of abbreviations will also include information regarding whether the abbreviation is a "title abbreviation," which is an abbreviation that is frequently followed by a proper noun. For example, the interface will recognize that abbreviations such as "Mr." and "Dr." are frequently followed by proper nouns. In an embodiment, for any occurrence of any title abbreviation, if the abbreviation's ending period is immediately followed by a space character and the location after that space character is an uppercase location or an alterable capitalization location, then that location is a title uppercase location or title alterable capitalization location.

In an embodiment, the capitalization scores of abbreviations are not constant but are variable, and can be adjusted by interface adaptation. In other words, in such an embodiment, each abbreviation in a table of abbreviations corresponds to a distinct adaptive decision class, so if for example the first time a user types "vs." and presses the space bar the interface decides to automatically switch to uppercase mode, and this occurs repeatedly and leads to a non-beneficial outcome each time, then eventually the interface will modify the capitalization score of "vs." sufficiently that the interface will then decide to remain in lowercase mode in such circumstances.

In an embodiment of the present invention, when a user's input includes an abbreviation that ends with a period that is in a table of abbreviations as described above and the period is immediately followed by a space character, then the interface will run a text analysis algorithm that attempts to determine whether or not the period is at the end of a complete sentence in English. If the algorithm is able to make a determination regarding whether or not the period is at the end of a complete sentence, then if the period is at the end of a complete sentence, then the interface will increase the capitalization score of the location after the space character; if the period is not at the end of a complete sentence and the abbreviation is not a title abbreviation, then the interface will decrease the capitalization score of the location after the space character. In an embodiment, any such increase or decrease of the capitalization score will be proportional to the confidence of the text analysis algorithm in its determination regarding whether or not the period is at the end of a complete sentence. For example, in an embodiment, the location after "I asked Wilson et al." is an alterable uppercase location because "et al." has a capitalization score that is slightly above the capitalization threshold value and the text analysis algorithm is unable to determine whether or not "I asked Wilson et al." is a complete sentence, but the location after "I asked. Wilson et al." is an alterable lowercase location because the text analysis algorithm determines with confidence that "Wilson et al." is not a complete sentence and "et al." is not a title abbreviation, and so the interface decreases the location's capitalization score substantially.

Capitalization and Quotes

In the following discussion of capitalization within and after quotation marks, examples of user input will contain quotation marks. For the sake of legibility, such examples will not themselves be enclosed in quotation marks, but will instead be enclosed in angle brackets. The angle brackets that enclose these examples are not themselves part of the examples.

In an embodiment, for purposes of the interface behaviors described in the following paragraphs, a "quotation mark" is either a double quote or a single quote (such as an apostrophe). In an embodiment, as an exception, the interface has a list of recognized contractions that begin with apostrophes, such as 'em, 'til, 'cause, 'cept, and so forth, and an apostrophe that is at the beginning of such a recognized contraction does not constitute a quotation mark for purposes of the interface behaviors described in the following paragraphs.

In an embodiment, if a comma is immediately followed by a space character that is immediately followed by a quotation mark, then the location after that quotation mark is an alterable uppercase location. For example, in an embodiment, the location after <She said, "> is an alterable uppercase location. In an embodiment, as an exception, if a comma is immediately followed by a space character that is immediately followed by a quotation mark, and if before that sequence of characters and after the most recent previous line break (if any) there is a region enclosed in quotes such the last character within the quotes is a comma, then the interface will run a text analysis algorithm that attempts to determine whether the most recent such region enclosed in quotes is part of the same sentence as the comma followed by the space character followed by the quotation mark, and if the interface determines with a high degree of confidence that the region is part of the same sentence, then the location after the quotation mark is an alterable lowercase location instead of an alterable uppercase location. For example, in an embodiment, the location after <"Because," she said, "> is an alterable lowercase location.

In an embodiment, except as specified in the preceding paragraph, the location immediately after any quotation mark has the same capitalization attribute set as the location before the quotation mark. However, if a quotation mark is immediately followed by a space character, then special rules apply to the location immediately after that space character due to the presence of the quotation mark, as specified in the following paragraphs.

In an embodiment, if a period that is not part of an ellipsis is immediately followed by a quotation mark that is immediately followed by a space character, then the interface will determine what the capitalization score of the location after that space character would be if the quotation mark were not present, and the capitalization score of that location will equal what the capitalization score would have been if the quotation mark were not present plus an additional amount. For example, in an embodiment, if the location after <etc.> would be an alterable lowercase location with a capitalization score that is slightly below the capitalization threshold value, then the capitalization score of the location after <etc."> will exceed the capitalization threshold value, so the location after <etc."> will be an alterable uppercase location. If the location after < that.> would be a non-alterable uppercase location, then the location after < that."> will also be a non-alterable uppercase location.

In an embodiment, if a question mark or exclamation point or ellipsis is immediately followed by a quotation mark that is immediately followed by a space character, then by default the location after that space character is an alterable uppercase location with a high probability of alteration, and thus has a capitalization score that is slightly above the capitalization threshold value. However, in an embodiment, in such circumstances, if such a quotation mark is at the end of a region that is enclosed in quotes, then if the region enclosed in quotes is very short, the interface will slightly decrease that capitalization score; if the region enclosed in quotes is relatively long, the interface will slightly increase that capitalization score; and if the region enclosed in quotes is preceded by a space character that is preceded by a comma, the interface will slightly increase that capitalization score. For example, in an embodiment, the capitalization score of the location after <"Why?"> is lower than the capitalization score of the location after <He said, "You're not going to explain, are you?">

In an embodiment, if an alterable capitalization decision comes to exist because a user typed a letter after the input cursor became located at an alterable capitalization location, then while that alterable capitalization decision exists, if the interface modifies the capitalization score of that location then the interface will accordingly modify the alterable capitalization decision. If such an embodiment has the automatic alteration feature, then if the interface makes an alterable capitalization decision regarding a letter and then in response to subsequent user activity the interface changes the capitalization score of the location where that letter was typed, then the interface may even change that capitalization score so much that the interface automatically alters that decision. In particular, the following paragraph describes circumstances that may cause the interface to retroactively change a letter's capitalization, in an embodiment.

In an embodiment, if a question mark or exclamation point or ellipsis is immediately followed by a quotation mark that is immediately followed by a space character, and if the location after that space character is an alterable capitalization location as explained above, then if that location comes to be followed by a portion of text such that a text analysis algorithm determines with a high degree of confidence that the portion of text not only follows text that is enclosed in quotes but also is likely to be a continuation of the sentence that includes the quoted text, then the interface will greatly decrease the capitalization score of that location. Similarly, if that location comes to be followed by a portion of text such that an algorithm determines with a low degree of confidence that the portion of text is likely to be a continuation of the sentence, then the interface will slightly decrease the capitalization score of that location, or if that location comes to be followed by a portion of text such that an algorithm determines that the portion of text is unlikely to be a continuation of the sentence, then the interface will increase the capitalization score of that location. In an embodiment, changing the capitalization score of such a location may cause the interface to retroactively change a letter's capitalization, as explained in the preceding paragraph. For example, in an embodiment, if a user types <"Why?"> then the interface will enter alterable uppercase mode, but if the user continues to type without explicitly choosing whether or not the next letter should be uppercase and the user's input comes to say <"Why?" He asked.> then the interface will automatically alter its capitalization decision so the result becomes <"Why?" he asked.>

In an embodiment, if a period or question mark or exclamation point or ellipsis is immediately followed by a sequence of two or more consecutive quotation marks that is immediately followed by a space character, then the interface will determine what capitalization score the location after the space character would have if only one quotation mark were present, and will substantially increase that location's capitalization score for each quotation mark that is present beyond the first. Therefore, in such an embodiment, if that location would be an alterable lowercase location if only one quotation mark were present, then in most cases that location will be an alterable uppercase location; if that location would be an alterable uppercase location if only one quotation mark were present, then that location will be an alterable uppercase location with a low probability of alteration or an uppercase location that is not alterable at all.

Capitalization and Parentheses

In an embodiment, a location immediately after a left parenthesis or left bracket has the same capitalization attribute set as the location before that left parenthesis or left bracket. In an embodiment, a location that is immediately after a right parenthesis or right bracket is a non-alterable lowercase location; however, special rules may apply to a location that is after a space character that is after a right parenthesis or right bracket. Such rules are described in the following paragraphs.

In an embodiment, for purposes of the following paragraphs, a "parenthetical enclosure" consists of either a left parenthesis followed by a certain amount of text that includes at least one character and does not include any blank lines followed by a right parenthesis followed by a space character, or a left bracket followed by certain amount of text that includes at least one character and does not include any blank lines followed by a right bracket followed by a space character. Text that is "within" a parenthetical enclosure is between the parentheses or brackets, so for example "the first character within a parenthetical enclosure" is the first character after the left parenthesis or left bracket at the beginning of the parenthetical enclosure.

The following paragraphs explain how to determine the capitalization attribute set of the location after a parenthetical enclosure, in an embodiment. In the following paragraphs, if the interface is said to "ignore the right parenthesis for capitalization purposes," this means that the location immediately after the parenthetical enclosure has the same capitalization attribute set that it would have if the right parenthesis were not present, except as otherwise specified. If the interface is said to "ignore the parenthetical enclosure for capitalization purposes," this means that the location immediately after the parenthetical enclosure has the same capitalization attribute set as the location immediately before the parenthetical enclosure, except as otherwise specified. In an embodiment, if more than one rule from the following discussion of capitalization after parenthetical enclosures would apply to a particular situation, the rule that is specified first takes precedence. (This is why many of the following paragraphs say "except as specified above.")

In an embodiment, if the text within a parenthetical enclosure entirely consists of a title abbreviation, then the interface will ignore the right parenthesis for capitalization purposes, and so the location after the right parenthesis will be a title uppercase location; for example, the location immediately after "He told [Dr.]" is a title uppercase location.

In an embodiment, except as specified in the preceding paragraph, when the interface is said to ignore a right parenthesis for capitalization purposes, if the right parenthesis is immediately preceded by a title abbreviation, then the location immediately after the parenthetical enclosure is a non-alterable sentence uppercase location, not a title uppercase location. In an embodiment, when the interface is said to ignore a parenthetical enclosure for capitalization purposes, if the parenthetical enclosure is immediately preceded by a title abbreviation, then the location immediately after the parenthetical enclosure is a non-alterable sentence uppercase location, not a title uppercase location.

In an embodiment, except as specified above, if ignoring a parenthetical enclosure for capitalization purposes would cause the capitalization attribute set of the location after the parenthetical enclosure to not include the alterable attribute, then the interface will ignore the parenthetical enclosure for capitalization purposes; for example, the location immediately after "He read the cited source (Wilson et al.)" is a non-alterable lowercase location.

In an embodiment, except as specified above, if the first character within a parenthetical enclosure is an uppercase letter and the last character within the parenthetical enclosure is a question mark or exclamation point, then the interface will determine the capitalization attribute set that the location after the parenthetical enclosure will have if it ignores the parenthetical enclosure for capitalization purposes. If that capitalization attribute set does not include the alterable attribute, then the interface will ignore the parenthetical enclosure for capitalization purposes (as is specified in the preceding paragraph). If that capitalization attribute set includes the alterable attribute, then the interface will run a text analysis algorithm that attempts to determine whether the first word within the parenthetical enclosure and the last word within the parenthetical enclosure are part of the same sentence. If the algorithm determines with confidence that they are not part of the same sentence, then the location after the parenthetical enclosure is a non-alterable uppercase location; otherwise, the capitalization score of the location after the parenthetical enclosure equals a certain amount more than the capitalization score that location would have if the interface ignored the parenthetical enclosure for capitalization purposes. For example, if the location after "He responded to Wilson et al." would be an alterable uppercase location, then the location after "He responded to Wilson et al. (Did you hear?)" will be an alterable uppercase location with a higher capitalization score, so the interface's decision to capitalize the character after "He responded to Wilson et al. (Did you hear?)" would have a lower probability of alteration. The location after "He responded to Wilson et al. (His response was quite clever. Did you hear?)" will be a non-alterable uppercase location.

In an embodiment, except as specified above, if the first character within a parenthetical enclosure is a lowercase letter, then the location immediately after the parenthetical enclosure is a non-alterable lowercase location; for example, the location immediately after "He responded to Wilson et al. (or so I hear)" is a non-alterable lowercase location.

In an embodiment, except as specified above, if ignoring the right parenthesis for capitalization purposes would cause the capitalization attribute set of the location after a parenthetical enclosure to not include the alterable attribute, then the interface will ignore the right parenthesis for capitalization purposes; for example, if the location after "He responded to Wilson et al." would be an alterable uppercase location, then the location immediately after "He responded to Wilson et al. (I heard)" is a non-alterable lowercase location, and the location immediately after "He responded to Wilson et al. (I heard.)" is a non-alterable uppercase location.

In an embodiment, except as specified above, the location after a parenthetical enclosure is an alterable uppercase location with a low probability of alteration. For example, in an embodiment, the location after "He responded to Wilson et al. (I saw his notes, articles, etc.)" is an alterable uppercase location with a low probability of alteration. It may be noted that in order for none of the circumstances that are specified in the preceding paragraphs to be applicable, the location before the parenthetical enclosure must be an alterable capitalization location, and the first character within the parenthetical enclosure must not be a lowercase letter, and it must be the case that ignoring the right parenthesis for capitalization purposes would cause the location after the parenthetical enclosure to be an alterable capitalization location. For such cases, additional sophisticated rules could presumably be specified that would increase the tendency of the interface to yield advantageous results in such cases, but such cases may be so rare that it may not be worth the effort to implement more sophisticated rules for such cases, even if the interface is expected to be used by many people.

Alterable Capitalization

Below, the present specification will describe circumstances in which the interface will make alterable capitalization decisions, in some embodiments.

In an embodiment, once an alterable capitalization decision exists such that altering the decision will toggle a letter from uppercase to lowercase or vice versa, any additional characters after that letter that become part of the same word will also become included in the alterable block of the alterable capitalization decision. For example, in such an embodiment, if the interface alterably enters lowercase mode and then the user types the word "he," then the alterable block of the resulting alterable capitalization decision will consist of the entire word "he," and altering the decision will convert that word to "He."

In an embodiment, once an alterable capitalization decision exists such that altering the decision will toggle the first letter of a word from uppercase to lowercase or vice versa, if when the user finishes typing that word the interface's autocorrect feature recognizes the word the user typed as a word that possibly ought to be replaced with a capitalized word, then the interface may make another alterable decision whether or not to capitalize the same letter. For example, in an embodiment, if a user types "Smith vs. jones," the interface will alterably enter lowercase mode after the user types "Smith vs." and so the decision whether or not to capitalize the letter j will be alterable, and then later, if the interface decides not to capitalize the letter j, the interface may also make a contingent decision whether or not to capitalize the word "jones." Chapter 4 explains how the interface can deal with contingent duplicate decisions.

Inherent Capitalization Analysis

In the present specification, a "capitalization percentage chance" is the percentage chance that a user will prefer a letter to be uppercase in a certain situation, insofar as the interface is able to determine such a probability, so that a capitalization percentage chance greater than 50% means it is more likely than not that a user will prefer a letter to be uppercase. In an embodiment, capitalization scores are actually represented in terms of probabilities, so that for example the capitalization score of any capitalization attribute set that has the uppercase attribute is between 50% and 100%, and the representation of a capitalization score is thus a capitalization percentage chance. In an alternative embodiment, a capitalization score is not represented in terms of a capitalization percentage chance, but in certain circumstances, the interface will convert a capitalization score to a capitalization percentage chance or vice versa, by means of a conversion table or other conversion algorithm. (The features described herein were designed with the expectation that capitalization scores may not be especially precise, so such a conversion algorithm may not need to be especially precise either.)

In an embodiment, for purposes of the following paragraphs, a letter's location is considered to be synonymous with the potential cursor location that is immediately to the left of the letter, so for example, when the location immediately to the left of a letter is an uppercase location, the letter itself may be said to be "in an uppercase location."

For purposes of the present paragraph, an uppercase letter is considered to be "inherently uppercase" if it would be uppercase even if the word that contains the letter were not at the beginning of a sentence; for example, the first letter of the name "Jeff" is inherently uppercase. Any letter that is not inherently uppercase is "inherently lowercase." In an embodiment, in certain circumstances the interface may analyze a letter and assign it an "inherent capitalization probability," which is 0% when the interface is confident that the letter is inherently lowercase, or 100% when the interface is confident that the letter is inherently uppercase, or somewhere in between when the interface is not entirely certain one way or the other.

In an embodiment, when the interface assigns an inherent capitalization probability to a letter, if the letter is lowercase, then the interface will assign the letter a status of inherently lowercase. If the letter is uppercase and is in a non-alterable lowercase location, then the interface will assign the letter a status of inherently uppercase.

In an embodiment, when the interface assigns an inherent capitalization probability to a letter, if the letter is uppercase and is in a non-alterable uppercase location, then the interface will determine the "inherent capitalization frequency" of the word that the letter is at the beginning of, and will assign that inherent capitalization frequency to the letter as its inherent capitalization probability.

In an embodiment, in order to determine the inherent capitalization frequency of a word, if the user is editing a document, the interface will search the document for any occurrence of the word where its first letter is in a non-alterable lowercase location, and if there are any such occurrences, the inherent capitalization frequency of the word is the percentage of such occurrences that begin with an uppercase letter. In an embodiment, in order to determine the inherent capitalization frequency of a word, if the user is not editing a document, or if there are no occurrences of the word in non-alterable lowercase locations in the document, the interface will consult a table that includes a list of words that are often capitalized when in the middle of sentences along with their inherent capitalization frequencies, where each such inherent capitalization frequency is the frequency with which a word is capitalized when in the middle of a sentence. For example, in an embodiment, such a list includes the word "Jeff" with an inherent capitalization frequency of 100%, and so the first letter of that word will be assigned an inherent capitalization probability of inherently uppercase even when it is in a non-alterable uppercase location. In an embodiment, for any word that is not included in such a list, the interface will consult a dictionary of non-capitalized English words; if the word is in the dictionary, then it will be assigned an inherent capitalization frequency that is very low (such as, in an embodiment, 5%), and if the word is not in the dictionary, then it will be assigned an inherent capitalization frequency that is rather high (such as, in an embodiment, 80%).

In an embodiment, when the interface assigns an inherent capitalization probability to a letter, if the letter is uppercase and is in an alterable capitalization location, then the interface will determine the value of the inherent capitalization frequency of the word that the letter is at the beginning of, as described in the preceding paragraph, and then the interface will increase that value and then assign it to the letter as its inherent capitalization probability. In an embodiment, the interface will increase that value only slightly if the location has a relatively high capitalization score, and increase it a great deal if the location has a very low capitalization score. In particular, in an embodiment, the interface will calculate the inherent capitalization probability of an uppercase letter in an alterable capitalization location by means of the formula $$I = \frac{F}{F + (1 - F)L},$$

where F is the inherent capitalization frequency of the word that the letter is at the beginning of, L is the capitalization percentage chance of the alterable capitalization location where the letter is located, and I is the inherent capitalization probability that is then assigned to the letter. (This formula may also be applied to a letter that is uppercase and is in a non-alterable capitalization location: if it is a non-alterable lowercase location then L=0 and the formula yields I=1, and if it is a non-alterable uppercase location then L=1 and the formula yields I=F, so in either case this corresponds to the behavior described in the preceding paragraphs.) For example, if a word has an inherent capitalization frequency of 20% and its first letter is in a location that has a capitalization percentage chance of 50%, then the inherent capitalization probability of that letter will equal $$I = \frac{0.2}{0.2 + (1 - 0.2)(0.5)},$$

which equals approximately 33%, which is a moderate amount more than the word's inherent capitalization frequency of 20%.

In an embodiment, as an exception to the behavior described above, when the interface would assign an inherent capitalization probability to a letter, if somehow the letter already had an inherent capitalization probability, then if the letter's previous inherent capitalization probability is farther from 50% than the new inherent capitalization probability would be, the interface will retain the previous inherent capitalization probability. For example, when the interface would assign an inherent capitalization probability of 33% to a letter, if somehow its inherent capitalization probability was already 100%, the interface will leave its inherent capitalization probability as 100%.

Tracking Changes to a Letter's Context

In an embodiment, in certain circumstances the interface will "remember a letter's capitalization status," which means that the interface will assign the letter an inherent capitalization probability and remember the capitalization score of its location. In an embodiment, whenever a letter becomes an "adjustable letter" as defined below, the interface will remember its capitalization status. In an embodiment, whenever a letter that was an adjustable letter ceases to be an adjustable letter, if the letter "had its context changed," as defined below, then the interface will "recapitalize the letter," which may cause the interface to convert the letter from uppercase to lowercase or vice versa, as explained below. If the letter has not had its context changed, then the interface will do nothing.

In an embodiment, for purposes of the behavior described in the following two paragraphs, the current input cursor location is always a "relevant change location."

In an embodiment, for purposes of the capitalization behaviors described below, an "adjustable letter" is any letter such that it would be possible to change the capitalization score of the letter's location by means of inserting text at a relevant change location. For example, in an embodiment, if the input cursor is located immediately to the left of the word "bluebird," then the first letter of that word is an adjustable letter because typing a period followed by a space character would cause the location of that letter to become an uppercase location, but the second letter of that word is not an adjustable letter because it will continue to be in a lowercase location regardless of anything the user may insert at the current cursor location. As another example, in an embodiment, if the location immediately after the word "nothing" is a relevant change location in the sentence "I said nothing (Should I have?) but I smiled at him," then the first letter of the word "but" is an adjustable letter because inserting a period at the relevant change location would change that character's location to an uppercase location.

In an alternative embodiment, an "adjustable letter" is the first letter that is after a relevant change location. Such an embodiment may be easier to implement than the embodiment described in the preceding paragraph, and will behave the same way in most cases. However, in the case of the second example described in the preceding paragraph, such an alternative embodiment could yield a different result than the embodiment described in the preceding paragraph in certain circumstances, because the first letter of the word "but" would not be an adjustable letter in such an alternative embodiment.

In an embodiment, whenever a user performs an action that causes the capitalization score of the location of an adjustable letter to change, this letter subsequently is an adjustable letter that "has had its context changed."

In an embodiment, whenever a user performs an action that will cause the interface to copy or cut a block of text to the clipboard of the computing device, before the interface does so, the interface will treat the location immediately before the block of text as a relevant change location. In many cases, this will cause the first letter of the text to become an adjustable letter, and so the interface will remember its capitalization status before it is copied or cut. Any letter that is thus an adjustable letter when it is copied or cut to the clipboard will continue to be treated as an adjustable letter while it is on the clipboard. If the text is then pasted from the clipboard, the pasted copy of the letter is an adjustable letter that "has had its context changed," unless the text is pasted to the exact same location that it was copied or cut from so that no actual movement occurred.

In an embodiment, whenever a user performs an action that will cause the interface to delete a block of text (such as selecting a block of text and pressing the Delete key), immediately before the interface deletes the text, the interface will move the input cursor to the end of the block of text, so that location will become a relevant change location before the text is deleted. In many cases, this will cause the first letter after the block of text to become an adjustable letter, and so the interface will remember that letter's capitalization status before the text is deleted; in many cases, the deletion of the text will then cause the first letter after the block of text to become an adjustable letter that has had its context changed. In an embodiment, such behavior is also applicable whenever a user cuts a block of text by means of actuating the Cut key.

Thus, in an embodiment, if by means of Cut and Paste functionality a user moves a block of text from one location that is not at the end of a document to another location that is not at the end of the document, this may ultimately cause the interface to recapitalize three letters: When the user cuts the block of text, the first letter of the block of text and the first letter after the block of text may both become adjustable, as described in the preceding two paragraphs. When the user then moves the input cursor to a new location, this may cause the first letter after the previous location of the block of text to no longer be adjustable, so the interface may recapitalize that letter. This may also cause the first letter after the new cursor location to become adjustable. When the user pastes the block of text, this may cause the first letter of the block of text to no longer be adjustable, so the interface may recapitalize that letter. Finally, whenever the user moves the input cursor away from the location where the block of text was pasted, this may cause the first letter after that location to no longer be adjustable, so the interface may recapitalize that letter.

Automatic Capitalization Adjustment

In an embodiment, when the interface recapitalizes a letter, the interface will first determine its "new capitalization probability." In an embodiment, when the interface determines a letter's new capitalization probability, if the letter is now in a non-alterable uppercase location, its new capitalization probability is 100%. If the letter is in a non-alterable lowercase location, its new capitalization probability equals its inherent capitalization probability.

In an embodiment, when the interface determines a letter's new capitalization probability, if the letter is in an alterable capitalization location, then its new capitalization probability will be somewhere between its inherent capitalization probability and 100%, and will be towards the higher end of that range if the location has a high capitalization score or towards the lower end of that range if the location has a low capitalization score. In particular, in an embodiment, when the interface determines a letter's new capitalization probability, the new capitalization probability will be calculated by means of the formula $N=I+L-IL$, where I is the letter's inherent capitalization probability and L is the capitalization percentage chance of the letter's new location. (When the letter is in a non-alterable capitalization location, if it is a non-alterable uppercase location then $L=1$ and the formula yields $N=1$, which equals 100%, and if it is a non-alterable lowercase location then $L=0$ and the formula yields $N=I$, so in either case this corresponds to the behavior described in the preceding paragraph.)

In an embodiment, when the interface recapitalizes a letter, if the letter is lowercase and its new capitalization probability is 0% or if the letter is uppercase and its new capitalization probability is 100%, the interface will do nothing. In an embodiment, in other circumstances, the interface will make an alterable capitalization decision regarding that letter: the interface will decide whether or not to change the capitalization of that letter, and whether it decides to change the capitalization of that letter or decides not to change the capitalization of that letter, the decision will be alterable. In an embodiment, the outcome of this decision is the same outcome that would be achieved by deleting the letter, interpreting the new capitalization probability as a capitalization percentage chance, converting it to a capitalization score, and retyping the letter at a location that has that capitalization score-except that in any case if the interface converts a letter from uppercase to lowercase the decision will be alterable with at least a probability of alteration that is moderately low but not very low, and if the interface converts a letter from lowercase to uppercase the decision will be alterable with at least a very low probability of alteration. For example, if a letter is uppercase and its new capitalization probability is 55%, then this capitalization percentage chance of 55% would correspond to the capitalization score of an alterable uppercase location such that typing a letter at that location would cause the interface to make an alterable capitalization decision with a very high probability of alteration. Therefore, if a letter is uppercase and its new capitalization probability is 55%, the interface will decide not to change the capitalization of that letter, but this decision will have a very high probability of alteration. If a letter is lowercase and its new capitalization probability is 100%, then the interface will change the letter to uppercase, and this decision will have a very low probability of alteration.

Although the calculations described above may seem somewhat complex, in many cases the relevant locations will be non-alterable capitalization locations and the relevant percentages will be 0% or 100%, and the resulting behavior will be relatively simple. For example, in an embodiment, if a portion of text says "Fight. Never stop!", and a user cuts the text "Never" from before the word "stop!" and pastes it before the word "Fight," then after the user moves the cursor away from its new location, the resulting text will say "Never fight. Stop!", and both of the capitalization changes that occurred will be alterable, and neither will have an especially high probability of alteration.

In an embodiment, whenever it is the case that if the input cursor were moved to a distant location then the interface would recapitalize a letter and would change its capitalization, the possibility of such a change to a letter's capitalization is treated as a pending autocorrection. Farther above, various interface behaviors pertaining to pending autocorrections are described; one such behavior is that in an embodiment, if a certain amount of time elapses while an autocorrection is pending, then its autocorrection block will be distinctively highlighted. For example, in an embodiment, if a user types a period after a word that is in the middle of a sentence and then pauses, then if the next word begins with a lowercase letter, the interface will highlight that letter in order to indicate that the user's next action may cause that letter to be automatically changed to an uppercase letter.

In an embodiment, after the interface recapitalizes a letter, the interface will continue to remember that letter's inherent capitalization probability. For example, in an embodiment, if a user deletes the first two words of the sentence "I know Rose never fails" and moves the input cursor elsewhere, and so the interface determines that the letter R is inherently uppercase but does not change it, yielding "Rose never fails," then if later the user inserts the words "Everyone knows" at the beginning of the sentence, then because the interface remembers that the letter R is inherently uppercase, the interface will not convert the letter R to lowercase and this will not be an alterable decision: this will simply yield the result "Everyone knows Rose never fails."

Alterable Transcription Capitalization

Speech recognition technology typically distinguishes recognized words and phrases that are inherently capitalized from words and phrases that are not inherently capitalized. For example, speech recognition technology typically capitalizes the word "I" even when it is in the middle of a sentence, but not the word "you." Generally, interfaces that use speech recognition technology attempt to determine when a word or phrase is at the beginning of a sentence, in order to appropriately capitalize the first word of a sentence.

In an embodiment of the present invention, when by means of speech recognition technology a user inputs a word or phrase that is not inherently capitalized, the interface will capitalize the first letter of the transcribed word or phrase if and only if the location immediately before the word or phrase is an uppercase location, and the interface's decision whether or not to capitalize that letter will be an alterable decision if and only if the location immediately before the word or phrase is an alterable capitalization location. Such alterable decisions will be referred to herein as "alterable capitalization decisions." For example, in an embodiment where any location that is immediately after a space character that is immediately after a colon is an alterable lowercase location, if the input cursor is at a non-alterable uppercase location when a user dictates "we told you colon no," then the result will be "We told you: no" (assuming the speech recognition technology hears the user correctly) and the interface's decision not to capitalize the word "no" will be an alterable capitalization decision.

Below, an embodiment is described in which the interface will not directly decide to capitalize the first letter after an uppercase location, but will instead decide to enter uppercase mode when the input cursor becomes located at an uppercase location, and then if a user types a letter while the interface is in uppercase mode, the letter will be capitalized. In an embodiment, if the interface has a capitalization mode that can be toggled by pressing and releasing the Shift key as described below, and the interface also has speech recognition technology, then when a user speaks text to be transcribed that begins with a word that is not inherently capitalized, then the interface will treat the first letter of that word in the same way that it would treat that letter if the user had typed it manually. For example, in such an embodiment, if the input cursor becomes located at a non-alterable uppercase location and so the interface decides to enter uppercase mode, but then the user presses and releases the Shift key so that the interface switches to lowercase mode, and then the user says "we told you," then the resulting transcribed text will begin with a lowercase letter even though the location immediately before the first word was an uppercase location, because the user manually switched to lowercase mode before dictating.

Capitalization Mode

In a typical prior art smartphone interface, pressing and releasing the Shift key will cause the interface to enter uppercase mode (if it was in lowercase mode), and while the interface is in uppercase mode, typing a letter will cause the letter to be capitalized and will cause the interface to switch to lowercase mode. Thus, to type a capital letter on a smartphone, instead of holding down the Shift key while typing a letter, a user will typically press and release the Shift key to enter uppercase mode and will then type the letter. To save keystrokes, certain prior art smartphone interfaces will make a decision to automatically enter uppercase mode in certain circumstances, by means of an algorithm that takes nearby text into account. For example, such interfaces will automatically enter uppercase mode when an algorithm determines that it is likely that the input cursor is at the beginning of a new sentence. A user may come to rely on such an automatic capitalization feature. Often, the present writer has incorrectly assumed that his smartphone's decision whether or not to automatically enter uppercase mode would match his wishes, and then failed to immediately notice the resulting capitalization mistake; in some cases, the present writer also subsequently failed to remember that backspacing a capital letter may cause a smartphone to automatically enter uppercase mode, and thus repeated a capitalization mistake he was trying to correct.

In an embodiment of the present invention, the interface has a capitalization mode that at any given moment is either uppercase mode or lowercase mode, and when a user types a letter, the interface will capitalize that letter if and only if the interface is in uppercase mode when the user types the letter. In an embodiment, pressing and releasing the Shift key of an on-screen virtual keyboard will cause the interface to switch from uppercase mode to lowercase mode or vice versa. (Such behavior may be particularly useful on a smartphone or other computing device where it may be relatively inconvenient for a user to hold down the Shift key with one finger while typing a letter with another finger.)

In an embodiment, for purposes of the capitalization features described herein, when the interface is said to "alterably enter uppercase mode," this means that the interface enters uppercase mode and its decision to enter uppercase mode rather than lowercase mode is a potentially alterable decision. Conversely, when the interface is said to "alterably enter lowercase mode," this means that the interface enters lowercase mode and its decision to enter lowercase mode rather than uppercase mode is a potentially alterable decision. Potentially alterable decisions to enter uppercase mode and potentially alterable decisions to enter lowercase mode will be referred to as "potentially alterable capitalization decisions."

In an embodiment, for purposes of the capitalization features described herein, when a location's capitalization attribute set is said to be "applied to the interface's current capitalization mode," this means that the interface decides to enter uppercase mode if the capitalization attribute set has the uppercase attribute, or decides to enter lowercase mode if the capitalization attribute set has the lowercase attribute. If the location's attribute set has the non-alterable attribute, then the decision whether to enter uppercase mode or lowercase mode is not alterable and not potentially alterable. If the location's attribute set includes the alterable attribute, then the decision whether to enter uppercase mode or lowercase mode is a potentially alterable capitalization decision, and the decision's probability of alteration (in an embodiment that has the alteration probability feature) equals the probability of alteration of the capitalization attribute set.

Alterably Setting Capitalization Mode

In an embodiment, whenever the input cursor becomes located at a new location, the interface will apply the new location's capitalization attribute set to the interface's current capitalization mode, regardless of whether the change of location is caused by a cursor navigation action or by some other action such as typing or deleting a character.

In an embodiment, as an exception to the behavior described in the preceding paragraph, after any actuation of the Shift key, if the user then inputs one or more consecutive characters that are not letters before the user either types a letter or performs a cursor navigation action, then in response to each such consecutive input of a non-letter character that causes the input cursor to become located at a new location, if applying the new location's capitalization attribute set to the interface's current capitalization mode would cause the interface's current capitalization mode to change from uppercase mode to lowercase mode then the interface will alterably enter uppercase mode instead, and if applying the new location's capitalization attribute set to the interface's current capitalization mode would cause the interface's current capitalization mode to change from lowercase mode to uppercase mode then the interface will alterably enter lowercase mode instead. In other words, in such an embodiment, when a user actuates the Shift key, even if the next character the user types is not a letter, the interface will make a potentially alterable decision to assume that the user still wants that actuation of the Shift key to affect the next letter the user types. For example, in an embodiment, if a user types a period and then a space character and the interface enters uppercase mode, and the user then presses the Shift key so the interface is in lowercase mode, and the user then presses the space bar, then although pressing the space bar causes the input cursor to become located at a new location that is an uppercase location, the interface will alterably enter lowercase mode, on the theory that the user probably switched to lowercase mode deliberately and still wishes the interface to remain in lowercase mode.

In an embodiment, whenever the left endpoint of a region of selected text becomes located at a new location, the interface will enter uppercase mode or lowercase mode or alterably enter uppercase mode or alterably enter lowercase mode, according to what the interface would do if the user had backspaced the first character of the selected text; for example, if backspacing a particular character would cause the interface to alterably enter uppercase mode, then positioning the left endpoint of a region of selected text immediately before that particular character will cause the interface to alterably enter uppercase mode. In an alternative embodiment, whenever the left endpoint of a region of selected text becomes located at a new location, for purposes of capitalization behaviors the interface will behave as though the input cursor became located at that location. (These two embodiments will behave the same way in most circumstances, but may behave differently when the left endpoint of a region of selected text is a lowercase location and yet the first character of the selected text is a capital letter, in which case backspacking that capital letter would have a special effect, as is explained below.)

In an embodiment, when the interface makes a potentially alterable capitalization decision, if then the user performs another action that causes a location's capitalization attribute set to be applied to the interface's current capitalization mode (without typing a letter first), then that previous potentially alterable capitalization decision will be deleted, even if applying the location's capitalization attribute set to the interface's current capitalization mode does not actually change the interface's current capitalization mode. For example, if a user moves the input cursor to an alterable uppercase location so that the interface makes a potentially alterable decision to enter uppercase mode, and then the user immediately moves the input cursor to a new alterable uppercase location (without typing a letter first), the previous potentially alterable capitalization decision will be deleted and the interface will make a new potentially alterable capitalization decision.

In an embodiment, when the interface makes a potentially alterable capitalization decision, any location on the display of the computing device that gives status information regarding the interface's current capitalization mode (such as the Shift key on a typical virtual keyboard) will become an attention object, and if the attention score of such an attention object exceeds a certain threshold value before the user performs another action, then the probability of alteration of that potentially alterable capitalization decision will be reduced; in an embodiment, if the attention score exceeds a certain higher threshold value before the user types a letter, then the interface will delete the potentially alterable capitalization decision altogether. Thus, for example, if such an embodiment has eye tracking technology that is able to determine within a fairly small radius where a user is looking, and the interface makes a potentially alterable decision to enter uppercase mode, and the user stops for a little while and detectably stares at the Shift key before typing a letter, then the interface may reduce the probability of alteration of the potentially alterable capitalization decision, on the assumption that the user was probably aware of and satisfied with its decision to enter uppercase mode.

Alterably Applying Capitalization Mode

In an embodiment, when the interface makes a potentially alterable capitalization decision, if the user then types a letter before the the user performs any action that affects the interface's capitalization mode other than pressing the Shift key, then the potentially alterable capitalization decision will become an alterable capitalization decision such that altering the decision will toggle that letter's capitalization, except possibly in certain circumstances that are described below. When the user performs any action that affects the interface's capitalization mode other than pressing the Shift key, any previously existing potentially alterable capitalization decision that is not yet an actually alterable capitalization decision will be deleted.

In particular, in an embodiment, when the interface makes a potentially alterable capitalization decision, if the user then presses Shift and then types a letter, then when the user types that letter the potentially alterable capitalization decision will become an alterable capitalization decision regarding that letter such that altering the decision will toggle that letter's capitalization. For example, if the interface alterably enters uppercase mode and then the user presses Shift so that the interface is in lowercase mode and then the user types the letter b, then an alterable capitalization decision will exist such that altering the decision will convert the lowercase letter b to an uppercase letter B. If the user had not expected the interface to enter uppercase mode when it did, and the user pressed Shift intending to switch to uppercase mode but mistakenly switched to lowercase mode instead, then altering such an alterable capitalization decision may be a convenient way for the user to correct the resulting mistake.

However, in an embodiment, when the interface makes a potentially alterable capitalization decision, if the user then presses the Shift key and then types a letter, then if pressing the Shift key was an action that had a moderately high deliberation score, then the probability of alteration of the resulting alterable capitalization decision will be reduced; if pressing the Shift key was an action that had a very high deliberation score, then the resulting alterable capitalization decision will be deleted.

In an embodiment, when the interface makes a potentially alterable capitalization decision, if the user then presses the Shift key more than once before typing a letter, then the potentially alterable capitalization decision will be deleted. In an alternative embodiment, when the interface makes a potentially alterable capitalization decision, if the user then presses the Shift key more than once before typing a letter, each additional actuation of the Shift key after the first will greatly decrease the probability of alteration of the potentially alterable capitalization decision, but may not necessarily cause the interface to delete the decision.

Figure 21A:
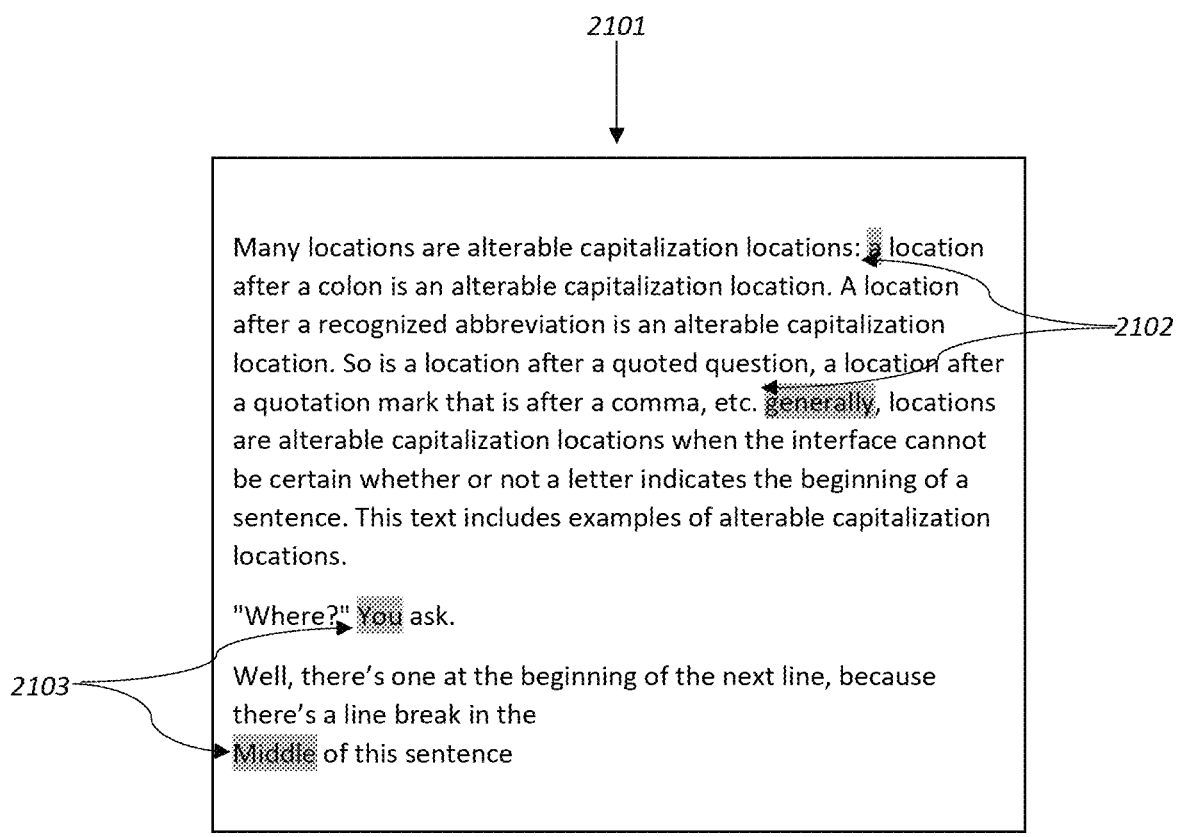
FIG. 21A illustrates features of an alterable capitalization decision.

Generally, alterable capitalization decisions as described above may facilitate correcting mistakes that occur when a user fails to notice that the interface did not enter uppercase mode when the user expected it to, or did enter uppercase mode when the user did not expect it to. In FIG. 21A, Block 2101 includes four highlighted words that would be the alterable blocks of alterable capitalization decisions if a user were to type that text without pressing the Shift key. The potential cursor location at the left of each highlighted word is an alterable capitalization location: the locations labeled 2102 are alterable lowercase locations, and the locations labeled 2103 are alterable uppercase locations. This figure illustrates how alterable capitalization decisions may coincide with potential user mistakes in that the default outcomes of all those alterable decisions are undesirable outcomes. Prior art interfaces would also yield undesirable capitalization outcomes in such circumstances, but they would not be alterable.

Capitalization Mode after Backspacing a Capital Letter

In an embodiment, when an actuation of the backspace key causes the interface to delete a capital letter but does not cause the input cursor to become located at an uppercase location, if the letter was not originally typed as a capital letter, or if the interface does not remember whether the letter was originally typed as a capital letter, then the interface will alterably enter lowercase mode. For example, in such an embodiment, if a user types "Ask jim" and autocorrection converts the letter j to a capital letter J, and then the user backspaces to delete the word Jim, then when the capital letter J is deleted the interface will alterably enter lowercase mode.

In an embodiment, when an actuation of the backspace key causes the interface to delete a capital letter but does not cause the input cursor to become located at an uppercase location, if the interface remembers that the letter was typed as a capital letter, then the interface will make a threshold decision whether to alterably enter uppercase mode or alterably enter lowercase mode based on the amount of time that elapsed since the letter was typed: if the capital letter that is deleted was typed as a capital letter sufficiently recently (such as, in an embodiment, within the last 15 seconds) then the interface will alterably enter uppercase mode, and if not, then the interface will alterably enter lowercase mode. For example, in such an embodiment, if a user types "Ask Jim" and very quickly backspaces to delete "Jim" then when the capital letter J is deleted the interface will alterably enter uppercase mode. In an embodiment, when the interface makes a potentially alterable capitalization decision in such circumstances, the decision will have a minimum probability of alteration that is low but not very low.

In an embodiment, when an actuation of the backspace key causes the interface to delete a capital letter, if that letter did not constitute an alterable block, then for purposes of the automatic decision variation feature the capital letter that is deleted will nevertheless be treated as the alterable block of an alterable capitalization decision that had an extremely low probability of alteration, so if the user then retypes the letter the automatic decision variation feature (as described in Chapter 17) may be triggered. For example, in an embodiment, if a user manually types a capital letter S by first pressing the Shift key and then pressing the S key, and then the user presses the backspace key, then the interface will alterably enter uppercase mode (as described in the preceding paragraph), and the interface will also treat this actuation of the backspace key as though it deleted the alterable block of an alterable capitalization decision, so if the user then presses the letter S again the interface may treat this as though the user deleted and retyped an alterable block consisting of the letter S and may thus convert the letter to lowercase due to the automatic decision variation feature.

Figure 21B:
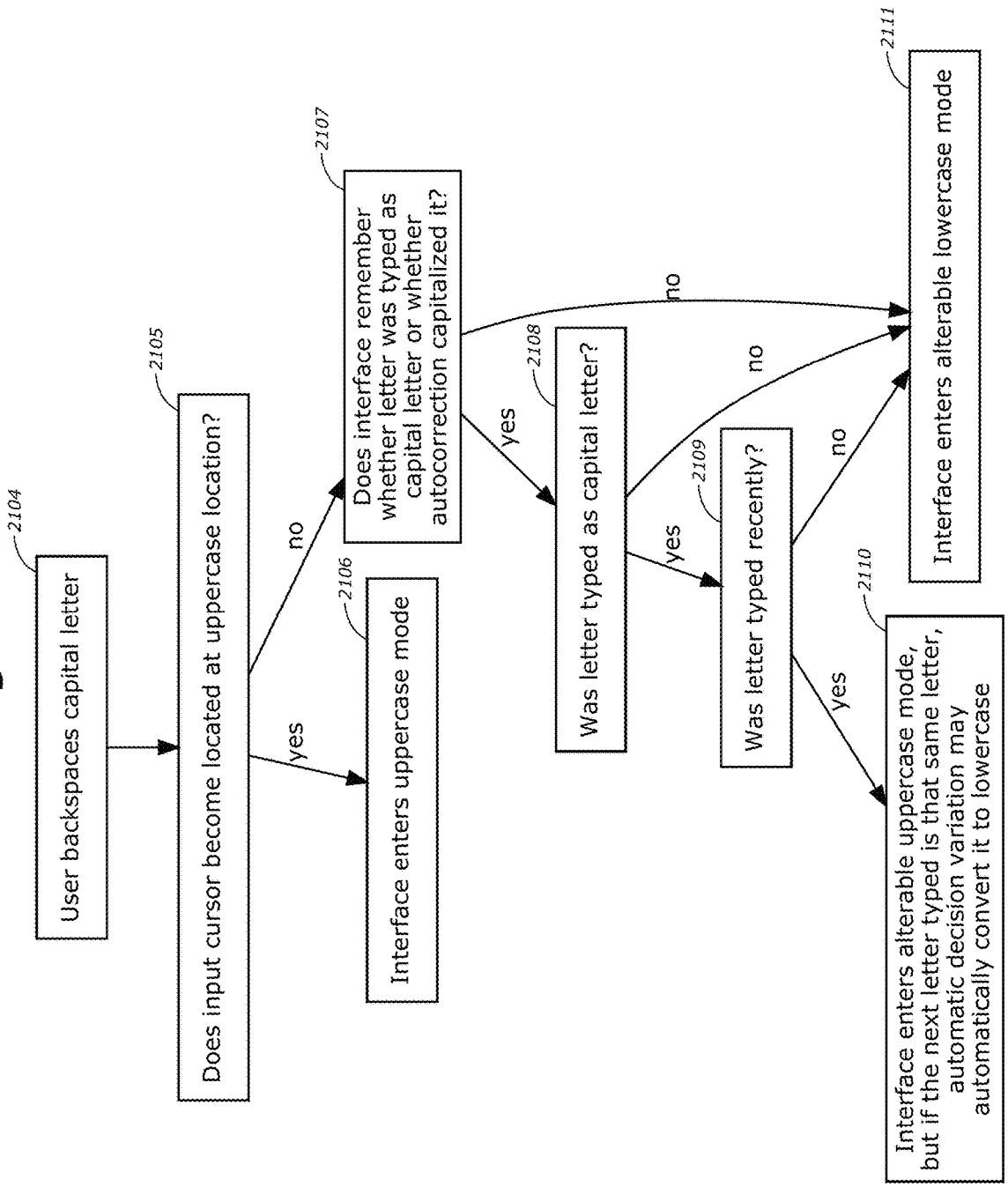
FIG. 21B is a flowchart that illustrates what happens when a user backspaces a capital letter, according to one embodiment.
Figure 22:
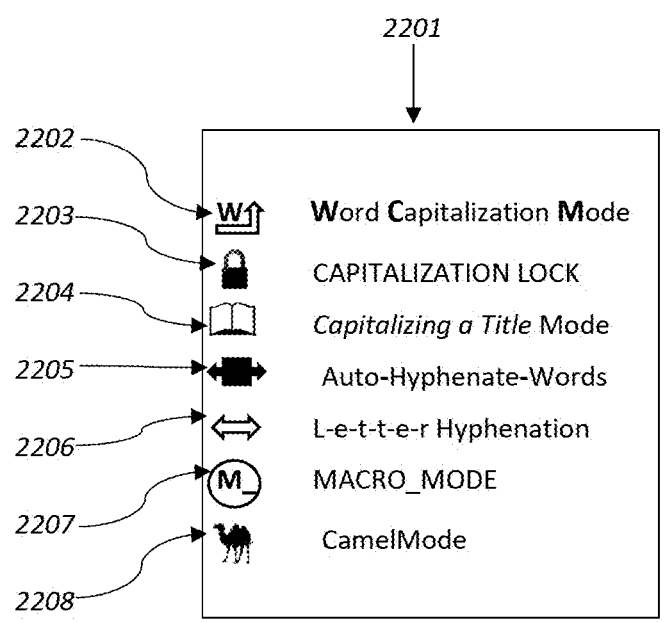
FIG. 22 illustrates an example of a word entry mode menu.

FIG. 21B is a flowchart that illustrates what happens when a user backspaces a capital letter, in an embodiment. The process starts in Block 2104 which says, "User backspaces capital letter" and proceeds with Block 2105, which asks, "Does input cursor become located at uppercase location?" If the answer is yes, the interface enters uppercase mode as normal (Block 2106). If the answer is no, the interface proceeds to a series of three questions. In each case, if the answer to the question is no, then the interface enters alterable lowercase mode (Block 2111). If the answer is yes, the process continues with the next question until all questions have been answered (Blocks 2107-2109). If the answer to all three questions is yes, then the interface enters alterable uppercase mode. However, even when the interface enters alterable uppercase mode, if the next letter typed is that same letter, the automatic decision variation feature may cause the interface to automatically convert it to lowercase (Block 2110).

Adaptive Capitalization

In an embodiment, if a potentially alterable capitalization decision is an adaptive decision, then the interface will evaluate the outcome of that decision based on whether or not the user's eventual decision whether to type an uppercase letter or a lowercase letter matches the interface's initial potentially alterable decision whether to enter uppercase mode or lowercase mode. For example, in such an embodiment, if the interface alterably enters uppercase mode and then the user presses Shift so that the interface is in lowercase mode and then the user types a lowercase letter, then at that point if the interface evaluates of the outcome of that decision then the decision will be regarded as having a non-beneficial outcome because the interface decided to enter uppercase mode but the user apparently wanted to type a lowercase letter. However, in an alternative embodiment, after the interface makes a potentially alterable capitalization decision, if the user presses Shift within a very short amount of time (such as, in an embodiment, within 0.5 seconds), then the interface will regard the decision as having a neutral outcome; in such an embodiment, the interface may be less likely to eliminate the need to press Shift in certain circumstances after a user has fully acclimated to the need to press Shift in those circumstances.

Various circumstances are described above that may lead to alterable capitalization decisions. In an embodiment, a distinct adaptive decision class will exist for each type of circumstance that may lead to an alterable capitalization decision. In an embodiment, each such capitalization decision class will be an adaptive threshold decision class such that the interface keeps track of a capitalization score for that decision class and the interface may automatically adjust that capitalization score. For example, where the present specification says that in certain circumstances deleting a capital letter causes the interface to alterably enter lowercase mode, it is to be understood that in an embodiment, the potentially alterable decision to enter lowercase mode is an adaptive decision, so if such decisions in such circumstances repeatedly have non-beneficial outcomes, sooner or later the interface will instead alterably enter uppercase mode in such circumstances. As another example, where the present specification says, "If an ellipsis that consists of three dots is immediately followed by a space character, then the location after that space character is an alterable uppercase location," it is to be understood that in an embodiment, any alterable capitalization decision regarding whether to capitalize a letter at such a location is an adaptive decision, so if such decisions repeatedly have non-beneficial outcomes, sooner or later such locations will become alterable lowercase locations instead.

Chapter 34: Text Formatting Improvements Text Formatting

Various interfaces allow users to input formatted text. In various interfaces, a text format may be composed of multiple distinct format elements that may vary independently, including foreground color, background color, underlining status, and so forth. In the present specification, a "format attribute" is a component of a format that may vary, such as foreground color, and a "format value" is one specific possibility for a format attribute, such as blue foreground color. In the present specification, the "active format" is the format that an interface will apply to the next character a user types if the user's next action is typing a character. A "format" is a set of all format values for all relevant format attributes; for example, a format may consist of the Times New Roman font, black foreground color, white background color, non-underlined, etc.

In prior art, interfaces that allow input of formatted text generally do not require a user to individually specify the format for each character the user types. Instead, a user can specify a particular format and then type any number of characters in that format before specifying a different format. Text formatting is thus contextual data as defined in Chapter 24. Most prior art interfaces that allow users to input formatted text are somewhat similar: for example, the interface of the desktop computer word processing application Microsoft Word generally behaves as described in the following paragraph, and so does the interface of the web page editor for the web-based application WordPress. (As an exception, as far as the present writer can discern, the "Text Highlight Color" toolbar button of Microsoft Word seems to behave in a way that is inconsistent with what is described below; the present writer has not figured out how that toolbar button works.)

In various prior art interfaces, when a user backspaces a character, the active format becomes the format that character had; that is, in various interfaces, by default, if a user backspaces a character and then types a character, the new character's font, size, foreground and background color, bold status, italic status, and so forth will match the character that was backspaced. When a user moves the input cursor to a new location that is not at the beginning of a line of input, the active format becomes the format of the character to the left of the input cursor. When a user moves the input cursor to a new location that is at the beginning of a line of input that is not empty, the active format becomes the format of the character to the right of the input cursor.

In WordPress, if a user presses Enter when the input cursor is at the end of a line of input, then WordPress reverts the active format to the default format (as well as inserting a line break). The present writer has done some experimentation to try to determine how Microsoft Word determines the active format when a user moves the input cursor to a new location that is at the beginning of an empty line of input, but has not succeeded at figuring it out. (In fact, on several occasions the present writer has thought that he had deleted all text of a certain format from a document in Microsoft Word, but later when he typed new text at the beginning of an empty line of input where the deleted text had been, that previously used format was applied to the new text, contrary to his wishes.)

In various interfaces, a user can perform formatting actions by various means; for example, in both Microsoft Word and WordPress, a user can toggle italic status by clicking a toolbar button. If a region of text is selected when a user performs a formatting action, the formatting action is applied to the selected region and to the active format. (As an exception, if for example one character of the selected region is italic and another character is not, toggling italic status of the selected region will cause the entire region to be italic or cause the entire region to be non-italic, rather than individually toggling each character.) If no text is selected when a user performs a formatting action, if the input cursor is in the middle of a word, the formatting action is applied to that word and to the active format. If no text is selected when a user performs a formatting action and the input cursor is not in the middle of a word, then the formatting action is applied only to the active format. For example, when the last character of a document is italic, if a user moves the input cursor to the end of the document and then types a character, the new character will by default be italic; if instead the user moves the input cursor to the end of the document, clicks a toolbar button to toggle italic status, and then types a character, the new character will not be italic.

In an embodiment of the present invention, in various circumstances the interface will make it easier for users to cause text to have a desired format. In particular, in an embodiment, when a user has caused text to have a format that is not the format the user desired, the interface may make it easier to recover from such a mistake. Such interface behavior is described in detail below.

Blank Characters in an embodiment, for purposes of the interface behaviors described below, a "blank character" is a space character or tab character or any other character that does not correspond to a visible mark when rendered and does not pertain to a line break. In an embodiment, whenever an interface is showing formatting marks so that a space character or tab character corresponds to a visible mark when rendered, the space character or tab character does not constitute a blank character.

In an embodiment, a "background attribute" is a format attribute such that various format values of that format attribute can be distinguished even when the format attribute is only applied to blank characters. For example, underlining status is a background attribute, because a user can visually distinguish whether or not a space character is underlined. A "foreground attribute" is a format attribute that is not a background attribute, such as bold status.

In an embodiment, the formats of two characters are considered to "match" if the two characters have the exact same format, or if at least one of the characters is a blank character and the formats of the two characters have the same format values for every background attribute, whether or not they have the same format values for every foreground attribute. For example, if one space character is in a normal font and another space character is in a bold font that is otherwise identical, then their formats match. In an alternative embodiment, the formats of two characters are considered to match only if the two characters have the exact same format; such an alternative embodiment may be less advantageous in some respects, but may be easier to implement and may still have significant advantages over prior art.

In the present specification, a "blank block" is a maximally large set of one or more blank characters such that all the characters are in the same line of text, and all the characters are adjacent (with no non-blank characters between them), and the formats of all of the blank characters match one another. Any particular blank character will be included within only one blank block, which may be said to be the blank block of that blank character. For example, in an embodiment, if a line of text consists of five consecutive space characters whose formats are identical except that only the second character is in a bold font, then the line of text contains one blank block consisting of all five characters, but if a line of text consists of five consecutive space characters whose formats are identical except that only the second character has a green background color, then that second character will be a distinct blank block, and so the line of text will contain a total of three blank blocks. In many cases blank characters are not consecutive, so in many cases a blank block will just be a single blank character; and when a group of blank characters are consecutive they are usually in the same font, so when a group of blank characters are consecutive they will usually form a single blank block.

In the present specification, a character is "visually ambiguous" if it is a blank character whose blank block is neither at the beginning nor at the end of its line of text, and its format matches the format of the last character before its blank block and also matches the format of the first character after its blank block, but the format of the last character before its blank block does not match the format of the first character after its blank block. For example, when an space character is between a red character and a blue character, the space character is visually ambiguous if its format matches the format of the red character and its format matches the format of the blue character, because the format of the red character does not match the format of the blue character. A character is "visually distinct" if it is not visually ambiguous.

Figure 23A:
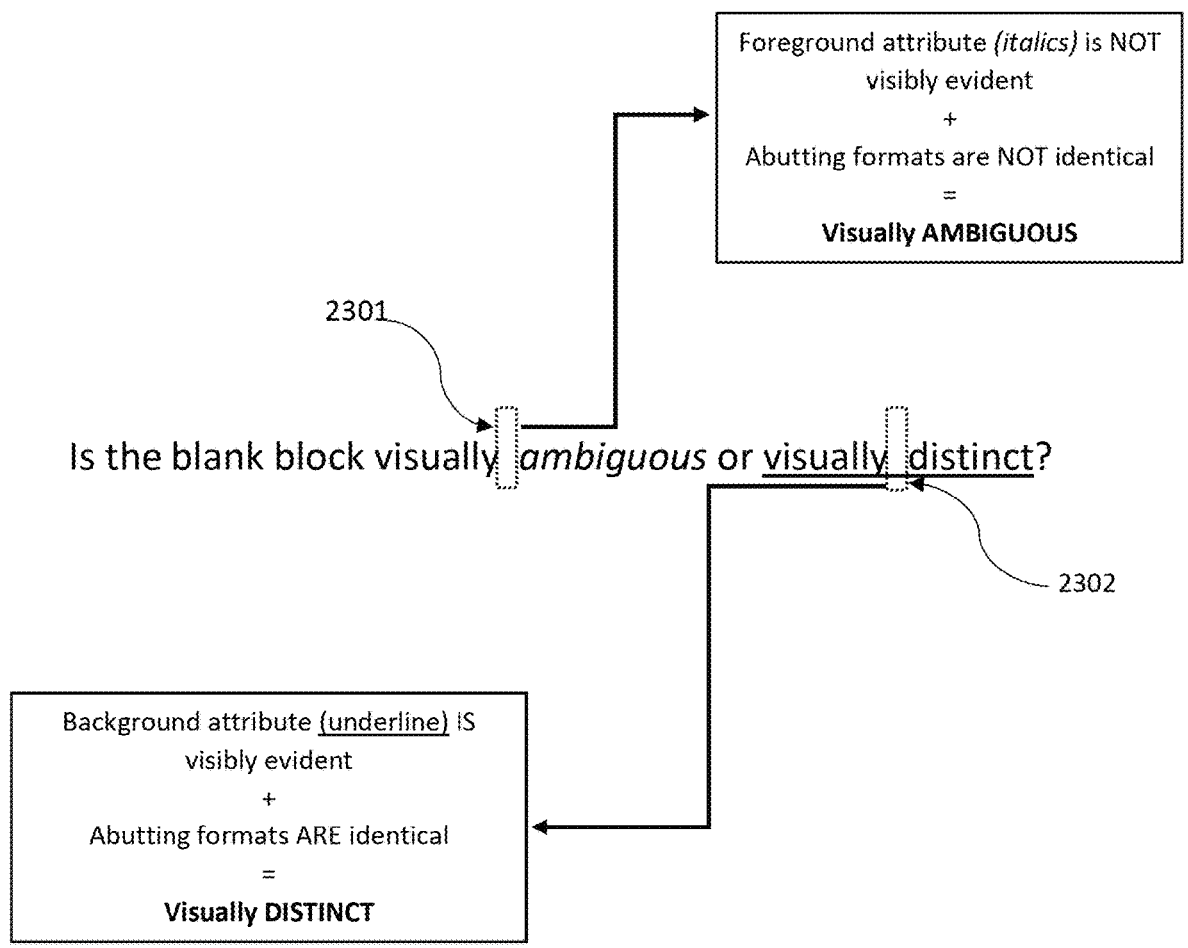
FIG. 23A illustrates a diagram identifying and deconstructing the pertinent format elements distinguishing visually ambiguous from visually distinct blank blocks, according to one embodiment.

FIG. 23A presents as a diagram identifying and deconstructing the pertinent format elements distinguishing visually ambiguous from visually distinct blank blocks. In FIG. 23A, blank block 2301, represented as the blank character between a standardly-formatted word and an italicized word, is classified as visually ambiguous because it meets the dual criteria that its abutting formats are not identical to each other and yet both formats appear identical to the format of the blank character because the divisive formatting element (italics, in this case) is identifiable as a "foreground attribute" whose presence or absence is not visibly discernible in the blank character constituting the blank block in question. By contrast, blank block 2302, represented as the blank character between two standardly-formatted and underlined words, is classified as visually distinct because of its characteristically identical abutting formats and because all "background attributes" that are visibly discernible in the blank character (including underlining, in this case) are shared with the abutting formats.

Hidden Formatting

In an embodiment, not only may each character in a document have its own individual formatting, but also a potential input cursor location may have its own individual formatting that does not necessarily match the formatting of a character immediately before it or a character immediately after it. In an embodiment, whenever moving the input cursor away from its current location and then immediately returning it to that location would change the active format, if the user does perform a cursor navigation action that will move the input cursor away from its current location, then before moving the input cursor, the interface will apply the active format to the current input cursor location so that the location has its own individual formatting. After moving the input cursor, the interface may change the active format based on the cursor's new location, but it will still remember the formatting of that previous input cursor location in case the user returns the cursor to that location.

For example, if a document contains no bold text and a user switches the active format to bold while the input cursor is at a certain location, but then the user moves the cursor away from that location before actually typing any bold text, then the bold format will, in a sense, be left behind: the interface will apply the bold format to the location where the cursor was before moving the cursor to its new location and changing the active format. As another example, in an embodiment, if a user has just finished deleting all highlighted text in a document and the active format is a highlighted format, then if the user moves the cursor away from its current location before typing any new highlighted text, the interface will apply the highlighted format to the location where the cursor was before moving the cursor to its new location and before changing the active format.

In an embodiment, when a format is applied to a potential input cursor location as described in the preceding paragraph, that format will be assigned an "inherent weight" that is initially a moderate value, and that weight will decrease over time until it becomes zero, at which point the location will cease to have its own individual formatting. Such an inherent weight is intended to reflect approximately how likely it is that a user who returns the input cursor to such a location will remember the format that was the active format when the input cursor was at that location, and will wish that format to become the active format again when the input cursor returns to that location.

Alterable Format Decisions

In the present specification, a "format set" consists of one or more formats, one of which is the "primary format" of the format set. For example, a format set may consist of a first format which is red underlined Helvetica and a second format which is black non-underlined Helvetica, with the first format as the primary format.

In an embodiment, a format that is in a format set may be assigned a "weight" that reflects approximately how likely the user is to want that format to be applied to certain characters, insofar as the interface is able to determine such a likelihood. In an embodiment, the primary format of a format set is always a format that has the highest weight within the format set. Below, whenever a certain format is said to be the primary format of a format set, this also means the format has a very high weight within that format set.

Below, the present specification will explain various circumstances in which the interface will determine certain format sets that include certain formats for various reasons. In an embodiment, if a format set would include a particular format for more than one reason, then the interface will include only one copy of that format in the format set, and the interface will assign it a weight that is slightly greater than the greatest weight it would have otherwise been assigned. In an embodiment, if a first format set is said to include a second format set, then that means it includes each format of the second format set. If a first format set is said to include a second format set with its weight reduced by a certain percentage, that means it includes each format of the second format set with the weight of each such format reduced by that percentage.

In an embodiment, in certain circumstances, rather than merely applying a particular format to one or more characters, the interface will apply a format set to those characters. When the interface applies a format set to one or more characters, the interface applies the primary format of the format set to those characters, and if the format set has more than one format then the decision to apply the primary format to those characters rather than applying some other format from the format set to those characters is an alterable decision. Such an alterable decision will be referred to herein as an "alterable format decision." An alterable format decision will have one alternate option for each particular format in the format set other than the primary format, and selecting such an alternate option will cause the interface to apply the corresponding format to the characters that the format set was applied to. For example, if a format set includes an italic format and an underlined format, and the italic format is the primary format of the format set, then applying that format set to a paragraph will cause the interface to make an alterable decision to cause the paragraph to become italicized, and altering that decision will cause the interface to change the paragraph from italicized to underlined.

In an embodiment, the probability of alteration of each alternate option of an alterable format decision will reflect the ratio of the weight of the relevant format to the weight of the primary format of the format set. For example, in an embodiment, if a format set includes a first format that is the primary format, a second format that has just as much weight as the primary format, and a third format that has a much lower weight than the primary format, then when the interface applies that format set to one or more characters, the resulting alterable format decision will have an alternate option with a very high probability of alteration for the second format and an alternate option with a low probability of alteration for the third format.

In an embodiment, in certain circumstances, rather than merely setting an active format that will be applied to the next character a user types if the user's next action is typing a character, the interface will set an "active format set."

In an embodiment, when the interface sets an active format set that has more than one format, its decision to cause the primary format of that format set to become the active format rather than causing some other format of that format set to become the active format is an alterable format decision that is an alterable input state decision. Because the alterable block of an alterable input state decision may continue to grow as a user types additional characters, in such an embodiment, if for example a user types a few words after the interface sets an active format set and then realizes that these words are not in the format he expected, then the user may be able to correct this mistake by means of a single actuation of the alteration key.

In an alternative embodiment, when the interface sets an active format set that has more than one format, its decision to cause the primary format of that format set to become the active format rather than causing some other format of that format set to become the active format is a potentially alterable decision, but that decision is not actually alterable until the user types at least one character to which that format set is applied, whereupon it becomes an alterable format decision that is an alterable input state decision as described in the preceding paragraph. In an embodiment, if such a decision is an adaptive decision, and if the user types at least one character before moving the input cursor to a new location, then the interface will evaluate the outcome of that decision based on the format of that character; for example, if the interface sets an active format set that has a bold font and a plain font, and the interface causes the bold font to become the active format because it is the primary format, and the user manually switches to the plain font before beginning to type, then the interface's decision to cause the bold font to become the active format will be considered to have had a non-beneficial outcome.

In an alternative embodiment, when the interface would set an active format set that has more than one format, the interface will merely cause the primary format of that format set to become the active format, and will not make an alterable format decision. Such an embodiment still may have significant advantages over prior art when its initial choice of an active format is a more intelligent choice than a prior art interface would make, even though that choice cannot be altered by means of alteration functionality.

Selecting Adjacent Formats Via Arrow Keys

In an embodiment, in certain circumstances that are described below, one or more formats may become "left-adjacent" or "right-adjacent" formats; for example, in certain circumstances, when a user moves the input cursor to the beginning of a document, a bold font may become the active format while a normal font becomes a left-adjacent format. In an embodiment, despite the term "left-adjacent," the format of the character immediately to the left of the cursor location may not be a "left-adjacent" format for purposes of the present specification: a "left-adjacent" format exists only in the circumstances that are explicitly described herein. Likewise, the format of the character immediately to the right of the cursor location may not be a "right-adjacent format."

In an embodiment, the active format is never left-adjacent or right-adjacent: whenever a format that is left-adjacent or right-adjacent becomes the active format, it ceases to be left-adjacent or right-adjacent. Whenever a user performs an action that causes the input cursor to move (including the action of typing a character), all formats that were previously left-adjacent or right-adjacent formats immediately cease to be left-adjacent or right-adjacent, but if that action consists of explicitly moving the input cursor, then that action may then itself cause one or more formats to become left-adjacent or right-adjacent, as described below.

In an embodiment, if a user actuates the left arrow key when there is a left-adjacent format, then instead of moving the input cursor, the interface will cause a left-adjacent format to become the active format, and the format that was previously the active format will become a right-adjacent format. If a user actuates the right arrow key when there is a right-adjacent format, then instead of moving the input cursor the interface will cause the right-adjacent format to become the active format, and the format that was previously the active format will become a left-adjacent format. In an embodiment, in such circumstances, if more than one format is left-adjacent or right-adjacent, the interface will if possible cause the left-adjacent or right-adjacent format that has the highest weight in the active format set to become the active format. Such a means of changing the active format may be convenient even in an embodiment that does not have alteration functionality.

In an embodiment, when the input cursor is at the beginning of a document, if a user actuates the left arrow key when there is no left-adjacent format, the interface will treat this as explicitly moving the input cursor to the beginning of the document, which will not cause the cursor to actually move but may cause the interface to change the active format and may cause one or more formats to become left-adjacent formats, as is described farther below. Conversely, when the input cursor is at the end of a document, if a user actuates the right arrow key when there is no right-adjacent format, the interface will treat this as explicitly moving the input cursor to the end of the document, which will not cause the cursor to move but may cause the interface to change the active format and may cause one or more formats to become right-adjacent formats.

For example, in an embodiment, when the active format is a bold font and there is one left-adjacent format, which is a normal font, then if a user actuates the left arrow key, then the normal font will become the active format. After that, if the user's next action is an actuation of the right arrow key, then this will undo the effect of pressing the left arrow key. If instead the user's next action is a second consecutive actuation of the left arrow key, then this will move the input cursor normally, except that if the input cursor was at the beginning of the document when the user performed the second consecutive actuation of the left arrow key then the interface will treat that actuation as explicitly moving the input cursor to the beginning of the document, which may for example cause the bold font to again become the active format and cause the normal font to again become a left-adjacent format.

In an embodiment, when an actuation of the left arrow key or right arrow key causes the interface to change which format is the active format without moving the input cursor, that change is treated as though it were an interface-specified change that is a subtle change for purposes of interface behaviors described in Chapter 8, and so a block descriptor will appear for that change. In an embodiment, such a block descriptor will not be highlighted.

Text-Specific Format Sets

In an embodiment, in certain circumstances the interface may determine an "included format set" for a certain portion of text. In an embodiment, the included format set for a portion of text will include every format that is applied to any character within that portion of text, with a weight that is proportional to the prevalence of that format within that portion of text. For example, if a paragraph of several sentences is mostly plain text but includes one sentence that is bold and a single character that is italicized, then its included format set will include the plain text format with a high weight, the bold format with a moderately low weight, and the italic format with a very low weight.

In an embodiment, in certain circumstances the interface may determine a "prevalent format set" for a certain portion of text. In an embodiment, the prevalent format set for a portion of text will include every format that is applied to at least a certain minimum percentage of that portion of text (such as, in an embodiment, at least 20%), with a weight that is proportional to the amount by which the prevalence of that format exceeds the minimum percentage. For example, if a paragraph of several sentences is mostly plain text but includes one sentence that is bold and a single character that is italicized, then its prevalent format set will include the plain text format with a high weight and the bold format with a very low weight, and will not include the italic format at all. In an alternative embodiment, the prevalent format set for a portion of text will simply be the same as the included format set for that portion of text.

Normal Format Sets

In an embodiment, in certain circumstances the interface will determine a "normal format set." Generally, such a format set is intended to include at least one format that a user will perceive as the format that is currently appropriate for text that is not emphasized in any way; when it is not easy for the interface to determine with certainty what particular format fits that description, the normal format set may include more than one format that may fit that description.

In an embodiment, when the interface determines a normal format set, it will include the format that is used most in the current document. In an embodiment, if that format is bold or italic or otherwise has a distinctive attribute, then the interface will also include a plain text version of that format (with such distinctiveness removed) in the normal format set. In an embodiment, a format's choice of font will never be treated as distinctive. For example, in an embodiment, when a document contains exclusively purple text in the Times New Roman font, the normal format set will include both a purple Times New Roman format and a black Times New Roman format. In an embodiment, when multiple formats are the most used in the current document, all such formats will be included in the normal format set, along with plain text versions of all such formats.

In an embodiment, when the interface determines a normal format set, along with the format that is used most in the current document, the interface will include every format that is used by at least a certain percentage of the current document (such as, in an embodiment, at least 20% of the current document), along with a plain text version of every such format. In an embodiment, each such format will have less weight in the normal format set the less it is used.

Positional Formatting

In the present specification, a user may be said to "explicitly move the input cursor" when the user performs a cursor navigation action, such as, for example, actuating an arrow key or clicking a location. Cursor movement that occurs due to input entry or deletion does not constitute explicitly moving the input cursor.

In an embodiment, when a user explicitly moves the input cursor to a new cursor location, the interface will set the active format set. Such behavior is explained in more detail below.

In an embodiment, when a user explicitly moves the input cursor to a new cursor location, the interface will cause the active format set to include the format of the nearest visually distinct character to the left of the input cursor, if any such character exists, and will also cause it to include the format of the nearest visually distinct character to the right of the input cursor, if any such character exists. If those two formats are the same, then this format will have a very high weight in the active format set. If those two formats are not the same, then for each of those formats, the weight of the format will equal a high weight minus a small amount per each visually ambiguous character in the relevant direction that is between the input cursor and the nearest visually distinct character in that direction. In an embodiment, if these two formats are not the same and have exactly the same weight, then the format of the nearest visually distinct character to the left of the input cursor is the primary format.

For example, in an embodiment, if red text is followed by a space character that is followed by blue text, and by pressing an arrow key the user moves the input cursor to after that space character, then the active format set will include the red format and the blue format, and the red format will have a slightly lower weight because one visually ambiguous character (the space character) is between the input cursor and the nearest visually distinct character to the left. If the user then types a word in that location, then the interface will decide to apply the blue font to the word the user types rather than the red font, and this decision will be an alterable decision with a high probability of alteration. If an additional space character had been present after the input cursor, so that the blue format's weight was reduced just as much as the red format's weight, then the interface would have decided to apply the red font instead; this decision would have been an alterable decision with a very high probability of alteration.

Figure 23B:
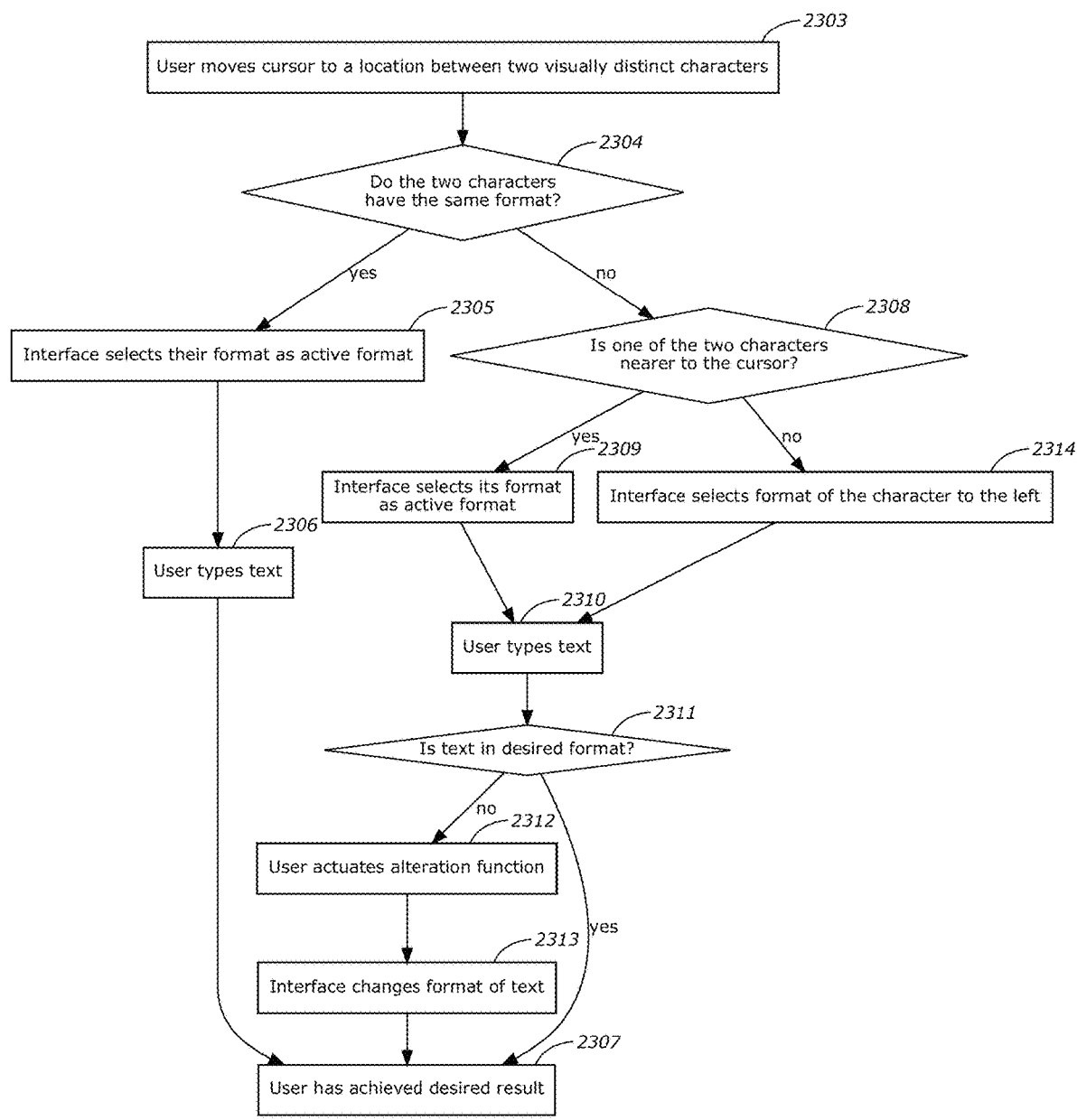
FIGS. 23B and 23C illustrate features related to positional formatting.

FIG. 23B illustrates the potential usefulness of the behaviors described above. In FIG. 23B, once a user moves the cursor to a location between two visually distinct characters (2303), the interface evaluates elements such as whether those two characters have the same format (2304). If they do, the interface selects that shared format as the active format (2305) so when the user types text (2306) they presumably achieve the desired result (2307). If instead the user has moved the cursor to a location between two characters that do not have the same format, then the interface will examine whether one of the two characters is positioned nearer to the cursor (2308) to determine the more relevant format. If one character is positioned more closely to the cursor, the interface selects that character's format as the active format (2309) for subsequent input for that location. If the two characters are equidistant, the interface defaults to select the format of the character to the left of the cursor. Regardless of the currently active format selected, the user's next input (2310) will allow the user to evaluate whether or not the text appears in the user's desired format (2311). If so, the user has achieved the desired result (2307).

If not, the user can then make use of alteration functionality (2312), prompting the interface to change the format of the text (2313) to the alternate option so that the user may achieve the desired result (2307) without the need to manually select the desired format.

In an alternative embodiment, when a user explicitly moves the input cursor to a new location, if a visually distinct character exists that is to the left of the input cursor and a visually distinct character exists that is to the right of the input cursor, and these two characters have different formats, and the distance from the input cursor to the nearest such character on the left equals the distance from the input cursor to the nearest such character on the right, then the format of the nearest such character on the left will become the active format, and the format of the nearest such character on the right will become a right-adjacent format. Such interface behavior may undesirably hinder the use of the right arrow key for its usual purpose, but may still confer a net advantage in an embodiment that does not have alteration functionality, or in an embodiment where it is relatively inconvenient to alter an alterable format decision, because in such an embodiment it may be a convenient way for a user who has positioned the input cursor between two adjacent characters that have different formats to explicitly select the format of the character on the right to be the active format before beginning to type.

In an embodiment, in certain cases a potential cursor location may have its own individual formatting that does not necessarily match any characters to the left or the right of the location, as is described above. In an embodiment, when a user explicitly moves the input cursor to such a cursor location, the interface will also cause the active format set to include that location's format. The weight of that location's format in the format set will be the location's inherent weight as defined above. For example, if the input cursor is at the beginning of a certain line of plain text when a user switches the active format to bold, but then before typing anything the user moves the input cursor somewhere else, then the bold format will be, in a sense, left behind: the location at the beginning of the line where the cursor was when the user switch the active format to bold will itself have the bold format with moderate weight. That weight will decrease over time, as described above. If the user moves the input cursor back to the beginning of that line very soon, before the inherent weight of the bold format has decreased much, then that bold format will not become the active format but it will be included in the active format set with a moderate weight, so if the user types a word then the interface will decide to apply the plain font to that word and its decision to apply the plain font rather than the bold font will be an alterable decision with a moderate probability of alteration.

In an embodiment, when a user explicitly moves the input cursor to a location that is at the beginning of a line that is not empty, the interface will cause the active format set to include the format of the last character that precedes that line if any such character exists, with a low weight, and that format will become a left-adjacent format. When a user explicitly moves the input cursor to a location that is at the end of a line that is not empty, the interface will cause the active format set to include the format of the first character that is after that line if any such character exists, with a low weight, and that format will become a right-adjacent format. For example, if a document happens to include one line of text that ends with a word that is in an italic font, and that line of text is followed by a line that is entirely in a normal font, and if the user moves the input cursor to immediately after the italicized word, then the italic font will become the active format, but the user can change this by pressing the right arrow key to switch to the normal font, or the user can type a few characters and then actuate the alteration key to change those characters from the italic font to the normal font.

In an embodiment, when a user explicitly moves the input cursor to a location that is at the beginning or end of a document, the interface will cause the active format set to include the normal format set, with a reduced weight; if the location is at the beginning of the document, then all formats in the normal format set will become left-adjacent formats, and if it is at the end of the document, then all formats in the normal format set will become right-adjacent formats. For example, if most of the characters within a document are in a plain font but the last character is in a superscript font, and if the user moves the input cursor to the end of the document then the superscript font will become the active format, but the user can change this by pressing the right arrow key to switch to a plain font, or the user can type a few characters and then actuate the alteration key to change those characters from the superscript font to the plain font.

In an embodiment, after a user types a character, if the cursor is then in a location such that explicitly moving the input cursor to that location would cause one or more left-adjacent or right-adjacent formats to exist according to the interface behaviors specified in the two preceding paragraphs, then such left-adjacent or right-adjacent formats will exist as though the user had explicitly moved the input cursor to that location. For example, if most of the characters within a document are in a plain font, and the input cursor is at the end of the document, and the user switches to a superscript font and types a character in the superscript font at the end of the document, then pressing the right arrow key will cause the interface to switch to the plain font.

Figure 23C:
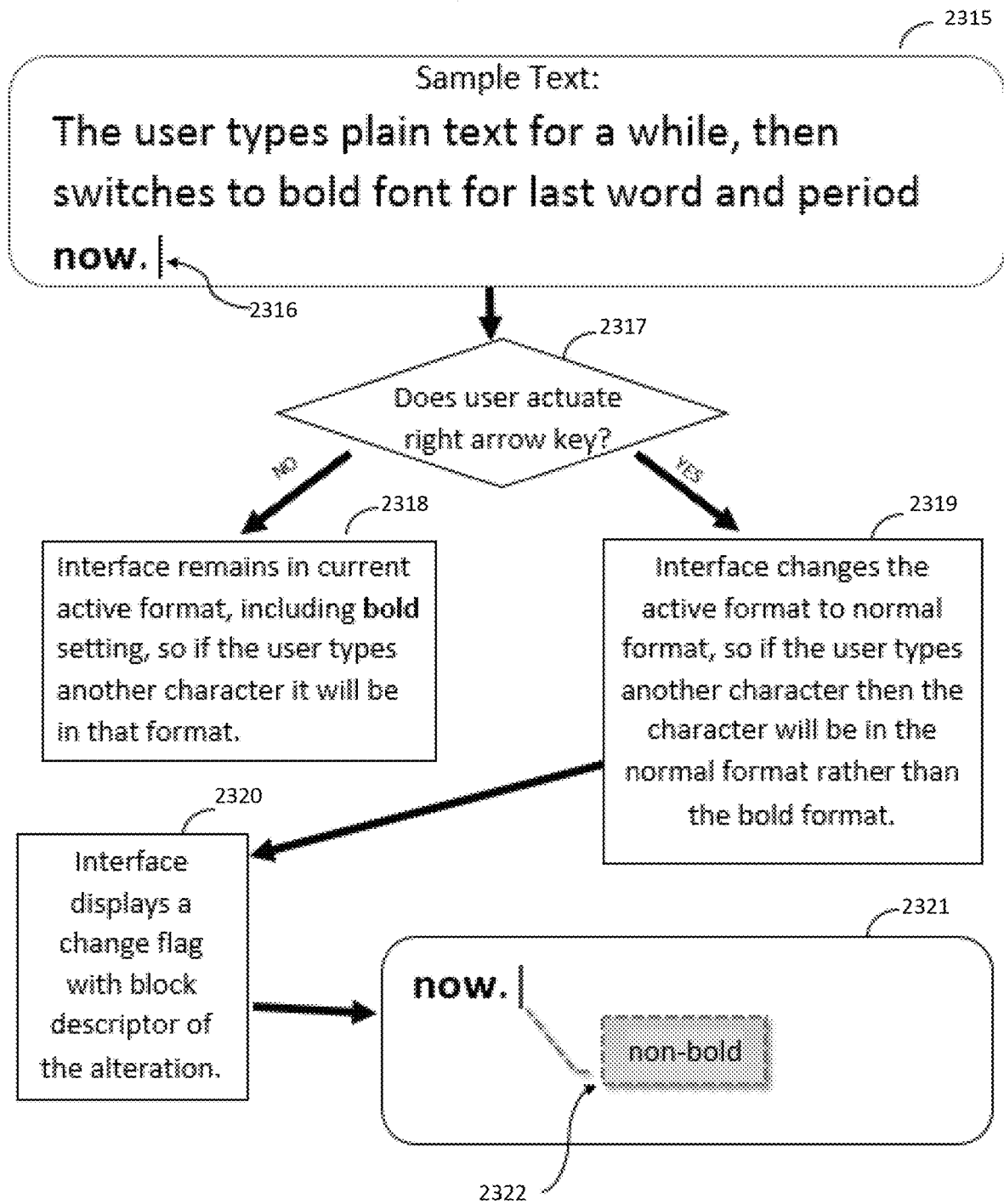

FIG. 23C is a flowchart that includes text that illustrates and explains the behavior described in the preceding paragraph such that actuating the right arrow key when the cursor is at the end of a line of text may cause the interface to change the active format: Block 2315 illustrates a situation where the active format is a bold format, but if the user actuates the right arrow key then the interface will behave as explained in Blocks 2319 and 2320 so the interface will change the active format to the normal format and display a block descriptor 2322 to inform the user of this change.

Paste Formatting

In various prior art interfaces, a user can copy and paste formatted text. In various interfaces, depending on the means by which a user pastes formatted text, the interface may either paste the formatted text with its formatting unchanged or may cause the formatting of the pasted text to entirely match the active format (which is the format that the interface would have applied if the user had typed a character rather than invoking the Paste command). For example, in WordPress, if a user presses Ctrl-V then the interface will paste formatted text with its formatting unchanged; if the user instead presses Ctrl-Shift-V then the interface will cause the formatting of the pasted text to match the active format, as though the user had retyped the individual characters of the pasted text rather than pasting the text.

In an embodiment of the present invention, when a user pastes formatted text into a document at the location of the input cursor, the primary format of the format set for the pasted copy of the text will be the original format of the formatted text; that is, the interface will alterably choose to keep the source formatting. In an embodiment, when a user pastes formatted text into a document at the location of the input cursor, the format set for the pasted copy of the text will also include every format that it would have included if the user had typed a character at that location. For example, if a user positions the input cursor between red text and green text and pastes blue text there, the interface will alterably decide to leave the pasted text blue; selecting one of the alternate options of this decision will cause the pasted text to become red, and selecting the other will cause the pasted text to become green.

Figure 23D:
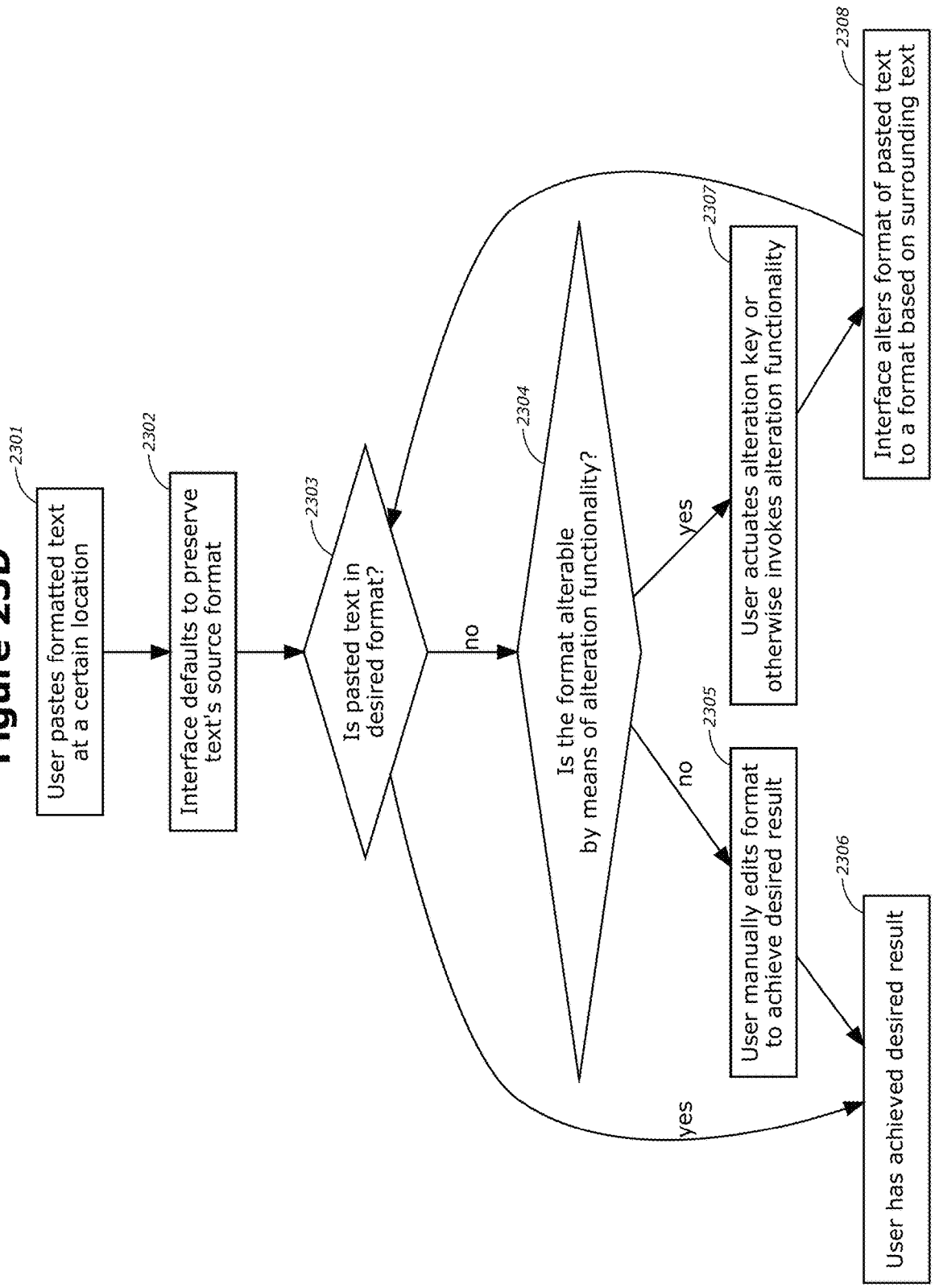
FIG. 23D is a flowchart demonstrating interface use of contextual data to inform pasted text format determinations as alterable format decisions, according to an embodiment.

FIG. 23D is a flowchart demonstrating interface use of contextual data to inform pasted text format determinations as alterable format decisions. When the user pastes formatted text into a location (2301) the interface defaults to preserve the pasted text's original source formatting (2302) but registers that formatting as an alterable decision. If the default format is what the user desired (2303), the decision is correct and the intended result achieved (2306). If the default original source formatting was not what the user desired (2303), user experience becomes defined by the interface's alteration functionality or its lack thereof (2304). When the format is alterable the user can simply invoke alteration functionality (2307) to prompt the interface to change the formatting to an alternate option determined by positional data (2308). (Usage of positional data is further detailed in FIG. 23B.) At that point, the user evaluates whether the text is in the desired format (2303), and the user either has achieved the desired result (2306) or can easily actuate alteration functionality again to prompt the interface to change the formatting to another not-previously-selected option. By contrast, if the interface lacks alteration functionality (2304), the user must manually edit the text format (if not forced to delete the input entirely and re-type it in the desired format) (2305) in order to achieve the desired result (2306).

Deletion Formatting

In an embodiment, immediately after a user deletes an individual character by means of the backspace key or Delete key, the primary format of the active format set will be the format that individual character had, and the active format set will also include every format that it would include if the input cursor were explicitly moved to its current location. For example, if a document consists entirely of plain text except for one line that is bold text, then if a user repeatedly presses the Backspace key until all the text in that line is deleted, the primary format of the active format set will be the bold format, and the active format set will also include the plain format. As another example, if the first letter of a word is underlined and the following letter is not, then if a user deletes that first letter and immediately retypes a new letter, the new letter will be underlined by default, but the interface's decision to underline the new letter will be an alterable decision.

In an embodiment, immediately after a user selects a region of input containing a plurality of characters and then actuates the backspace key or the Delete key so that all the characters within the region are deleted via a single keystroke, the primary format of the active format set will include the prevalent format set of the text that was deleted via that keystroke and will also include every format that it would include if the input cursor were explicitly moved to its current location. For example, if a document contains just one brief sentence that is in a bold font, and that sentence includes a couple italicized words, then if a user selects that sentence and then deletes the entire sentence by means of a single actuation of the backspace key, then the active format set will include the bold format, and will include the bold italic format with a lower weight, and will also include a plain format if the characters that are now immediately before and immediately after the cursor location are plain text characters.

Pattern-Recognition Formatting

In an embodiment, the interface will attempt to recognize distinctive format usage patterns. If the interface recognizes a distinctive format usage pattern, then the interface will automatically add the appropriate format to the active format set at the appropriate time in order to cause the pattern to continue. If the interface is very confident in recognizing such a distinctive format usage pattern, then the interface will add the appropriate format to the active format set as the primary format.

In particular, in an embodiment, when a document has at least three blank lines, if each line that is immediately after a blank line has the same first particular format, and each such line is immediately followed by a line that has the same second particular format that is distinct from the first particular format, then when the user adds a line at the end of the document, if that line is immediately after a blank line, then the interface will add that first particular format to the active format set as the primary format, and unless the user then breaks the pattern, at the start of the following line the interface will add that second particular format to the active format set as the primary format. For example, in such an embodiment, if a blank line is always followed by a line that is in a particular bold font (because it is a section heading) that is followed by a line that is in a particular normal font, then the interface will learn to automatically switch to that particular bold font after a blank line, and then switch back to that particular normal font at the beginning of the following line.

Various other means of identifying distinctive format usage patterns will be evident to those of ordinary skill in the art, and especially clever means of identifying distinctive format usage patterns may be evident to the especially skilled practitioner. One possible advantage of the alterable format set functionality that is described above is that once such functionality is deployed, an interface designer can aggressively deploy smart algorithms that attempt to guess what format a user wants with relatively little risk that such algorithms will cause very much inconvenience when they guess incorrectly.

Targeted Formatting

The alteration key and other alteration functionality may be quite useful for efficiently correcting mistakes, but do not necessarily need to be devoted to that purpose exclusively: in an embodiment, alteration functionality may also be used to make other changes. In particular, in an embodiment, the targeted format alteration feature described below may be used to change the format of a selected portion of a document.

In an embodiment, while a range of input is selected, the selected range is "targeted for alteration" as described in Chapter 14. In the following paragraphs, a selection that is targeted for alteration will be referred to as a "target."

In an embodiment, when a selection is targeted for alteration, the interface may cause one or more targeted alterable interface decisions to temporarily exist such that altering one of these decisions will cause the format of the target to change. Such an embodiment will be said to have "the targeted format alteration feature," and such an alterable interface decision will be referred to herein as a "targeted format decision."

In an embodiment, when a selection is targeted for alteration, if the target is the alterable block of an alterable format decision that already existed, then that alterable format decision will be treated as a targeted format decision for purposes of the behaviors described below even though it is not a targeted alterable interface decision as defined in Chapter 14, and so the interface may temporarily add additional formats to its format set, as described below. If it does, then if any of these additional formats would have a weight greater than the weight of the primary format that was already in the format set of the targeted format decision, then the weights of all these additional formats will be reduced by a sufficient percentage that none has a weight greater than the weight of the primary format. Also, if the interface adds additional formats to the format set of an alterable format decision when its alterable block becomes targeted for alteration, then any such additional format that is not selected when its alterable block ceases to be targeted for alteration will then be deleted from the format set of the alterable format decision.

In an embodiment, when a selection is targeted for alteration, if the target is not the alterable block of an alterable format decision that already existed, then the interface will cause a single targeted alterable interface decision to exist that is a targeted format decision, except that if such a decision would have no alternate options then the interface will not cause such a decision to exist. Such a decision will be an alterable format decision such that the primary format of its format set corresponds to leaving the format of the selection unchanged; the interface may also add other formats to its format set, as described below, and if it does, then the targeted format decision will thus have alternate options that have probabilities of alteration that are proportional to the weights of these additional formats in its format set.

In an embodiment, when a decision is a targeted format decision, its format set will include every format that is in use in the current document. Thus, for example, in an embodiment, if all the text in a document is either black or red, then selecting a black word and actuating the alteration key may cause the word to become red, and selecting a red word and actuating the alteration key may cause the word to become black.

In an embodiment, the interface will remember formats that a user has used even after a document is closed, and the format set of a targeted format decision not only will include every format that is in use in the current document, but also may include other formats that the user has recently used. In an embodiment, the interface will examine other documents on the same computing device that may be closely related to the current document, such as documents that are stored in the same folder on a computer's hard drive, and a targeted format decision may also include other formats that are stored on the same computing device as the current document.

Targeted Format Weights in an embodiment, for purposes of the interface behavior described in the following paragraphs, an "alternate format" is a format that is in the format set of a targeted format decision. Various factors are discussed below that the interface may take into consideration in assigning a weight to a format in the format set of a targeted format decision. When it is said that an alternate format is assigned a higher weight in certain circumstances, this means that it is assigned a higher weight than it would be assigned in other circumstances, all else being equal. For example, the following paragraph means that in an embodiment, an alternate format that is used in the current document will be assigned a higher weight than it would be assigned if it were not used in the current document, all else being equal.

In an embodiment, an alternate format that is used in the current document will be assigned a higher weight.

In an embodiment, an alternate format that is used by text that is located closer to the target will be assigned a higher weight than it would be assigned if it were located farther away, and in particular, an alternate format that is used by text that is immediately adjacent to the target will be assigned an especially high weight.

In an embodiment, the interface will count the number of distinct places that each alternate format is used within the current document, and an alternate format that corresponds to a higher number will be assigned a higher weight. In an embodiment, if the interface examines other documents on the same computing device to determine what alternate formats are available for a targeted format decision, then the interface will count the number of distinct places that each alternate format is used within other documents and will add a percentage of this number to the number of distinct places that each alternate format is used within the current document, and an alternate format that corresponds to a higher total will be assigned a higher weight. (In other words, in an embodiment, alternate formats that are more heavily used will have a higher weight, especially if they are more heavily used in the current document.) In an embodiment, the percentage mentioned in the present paragraph is a higher percentage for documents that the user has edited more recently; in an alternative embodiment, the percentage is a fixed percentage.

In an embodiment, an alternate format that the user selected more recently will be assigned a higher weight. For purposes of the present paragraph, "selecting" a format consists of explicitly choosing that format by some means such as clicking format-related buttons on a toolbar or performing targeted format alteration; merely locating the input cursor within a region where a format has previously been applied and typing within that region does not constitute "selecting" that format.

In an embodiment, an alternate format that has more format values in common with the entire target will be assigned a higher weight; for example, if the selection that is targeted for alteration includes only black underlined text and blue underlined text, then an alternate format that includes underlining will be assigned a higher weight than an alternate format that does not, all else being equal.

In an embodiment, for each format value that an alternate format does not have in common with the entire target, the alternate format will be assigned a higher weight if it does not have that format value in common with the majority of the current document than the weight it would be assigned if it did have that format value in common with the majority of the current document, all else being equal. In other words, formats that diverge farther from the document's default format will tend to have higher weights. In an embodiment, the weight bias described in the present paragraph will be sufficiently strong that if an alternate format consists of the format that is used in the majority of the current document, then this format still may not necessarily have the highest weight of all the alternate formats. For example, in an embodiment, if the majority of a document consists of non-underlined black text and the selection that is targeted for alteration consists of non-underlined blue text, and if an alternate format consisting of underlined blue text exists, then the alternate format consisting of underlined blue text may have a higher weight than an alternate format consisting of non-underlined black text even though non-underlined black text is used in the majority of the current document.

In an embodiment, when the selection that is targeted for alteration has the same format as the text that immediately precedes the selection and the same format as the text that immediately follows the selection, the weight bias disclosed in the preceding paragraph will be even stronger. For example, in such an embodiment, if the majority of a document consists of non-underlined black text and the selection that is targeted for alteration consists of a single word that is in the middle of a sentence that entirely consists of non-underlined blue text, then the behavior disclosed in the present paragraph will cause the interface to have a substantial bias against causing that word to become non-underlined black text, as opposed to, say, underlined blue text.

However, in an embodiment, as an exception to the behaviors disclosed in the preceding two paragraphs, when the selection that is targeted for alteration has the same format as the text that immediately precedes the selection and the same format as the text that immediately follows the selection, if the selection is italicized and the majority of the current document is not italicized, then an alternate format that is identical to the selection's current format except that it is not italicized will not be assigned a lower weight due to not being italicized. For example, in such an embodiment, if the selection that is targeted for alteration consists of a single italicized word that is in the middle of an italicized sentence, then the behavior disclosed in the preceding two paragraphs will not be applicable and so the interface may not necessarily have any bias against causing that word to become non-italicized text.

Subsequent Formatting

In an embodiment, for purposes of the interface behavior described in the following paragraphs, a "subsequent format decision" is an alterable format decision such that altering the decision will change which format is the active format but will not change the format of any characters that exist yet. For example, if a user moves the input cursor to a new location and the interface makes an alterable input state decision whether to set the active format to a red format or a blue format, that decision is then a subsequent format decision, but as soon as the user types a character, it is no longer a subsequent format decision.

Because altering a subsequent format decision does not change the format of any characters that exist yet, in an embodiment, such an alterable decision is a subtle change for purposes of the relevant interface behaviors that are described in Chapter 8, which means that when such a decision is a highlighted alterable decision, in an embodiment, the interface may cause a block descriptor to appear that contains a brief description of the status of such an alterable decision, as is described in Chapter 8. In an embodiment, such a brief description will include only the minimum explanation necessary to distinguish a particular option of a subsequent format decision from the other options; for example, if the two options of a subsequent format decision consist of setting the active format to be either italicized underlined red or italicized underlined blue, then the brief descriptions of those options will consist of only the words "red" and "blue" respectively. In an embodiment, the text of such a brief description will be displayed in the actual format that it is a description of, provided that this format does not cause the text to be illegible.

In an embodiment, whenever the input cursor is at a location where it is possible to input formatted text, and no text is selected, a subsequent format decision will exist, except that if such a decision would have no alternate options then such a decision will not exist. The format set of such a decision will be referred to as the "subsequent format set." That is, in an embodiment, except when there is a subsequent format decision that exists due to an interface behavior that is described above (such as due to the interface causing a format set that has more than one format to become the active format set), or when there is text that is selected, the interface will cause a subsequent format decision to temporarily exist, unless such a decision would have no alternate options. In an embodiment, such a decision will exist only until the user performs an editing action such as moving the input cursor or typing a character, whereupon the interface will delete the decision (but may then immediately cause another subsequent format decision to temporarily exist). For example, in an embodiment, if a user alters a temporarily existing subsequent format decision and thus causes the active format to change from red to blue, and then the user types a character, then the decision the user altered will no longer exist and so the user cannot change the color of the character he just typed by altering that decision; a new temporarily existing subsequent format decision may then exist so that the user can change the active format from blue back to red, but doing so would not affect any character the user already typed.

In an embodiment, whenever there is a visually distinct character that is to the right of the input cursor, if the nearest such character has a format other than the active format, the subsequent format set will include the format of that character with a high weight, minus a small amount per each visually ambiguous character that is between the input cursor and that character. When the input cursor is at the end of a line that is not empty, the subsequent format set will include the format of the first character that is after that line if any such character exists, with a low weight. When the input cursor is at the end of a document, the subsequent format set will include the normal format set, with a reduced weight.

In an embodiment, the subsequent format set will include every format that would be included in the format set of any targeted format alteration decision as described above, and the same factors that would affect the weights of the formats in the format set of a targeted format alteration decision as described above correspondingly affect the weights of these formats in the subsequent format set, except that factors that affect format weights that are dependent on the content of the target in a targeted format alteration decision are not relevant in determining the format of a weight in the subsequent format set, since there is no selection that is targeted for alteration. (Such behavior is possible even in an embodiment that does not have targeted format alteration decisions: the above explanation of how to determine what formats are included in the format set of a targeted format alteration decision can instead be used as an explanation of how to determine what formats are included in the subsequent format set.) Thus, for example, in an embodiment, if a document contains some blue text in just one location, and that location is quite far away from the input cursor location, then the subsequent format set will include the blue format, but with a relatively low weight because it is used far away and in only one place.

In an embodiment, for each alternate option of a temporarily existing subsequent format decision, its probability of alteration will equal only a certain percentage (such as, in an embodiment, 50%) of the probability of alteration it would have if the temporarily existing subsequent format decision were an ordinary alterable format decision. For example, in an embodiment, if a character moves the input cursor to a location that is between a red letter and a blue letter, then the interface will make an alterable format decision to set the active format to be red instead of blue, and the blue format will have a high weight in the format set of that decision, so the alternate option of that decision will have a very high probability of alteration (such as, in an embodiment, 5.0). Such a decision is an ordinary alterable format decision, and is an alterable input state decision. If the user then types a character that is red, then that alterable input state decision may still exist, so the user can change that character from red to blue by altering that decision, but now a temporarily existing subsequent format decision will also exist. Such a temporarily existing subsequent format decision will not have a very high probability of alteration: the blue format has a high weight in the format set of that decision, but the corresponding alternate option of that decision has a probability of alteration that equals only a certain percentage of the probability of alteration it would ordinarily have, so that alternate option has a moderate probability of alteration (such as, in an embodiment, 2.5). If the user continues to type red text within the alterable block of the alterable input state decision, gradually that decision's probability of alteration will decrease so that its probability of alteration may become lower than that of a temporarily existing subsequent format decision. Thus, in such an embodiment, it may be the case that when a user moves the input cursor to a location that is between two formats and begins to type, if the text the user is typing is not in the format the user desires, the user can retroactively correct this mistake by actuating the alteration key once; if it is in the format the user desires, the user can continue to type text in this format, and then a while later, if the user wants to switch to the other format without affecting the text he has already typed, he may be able to achieve this by actuating the alteration key once, provided that the alterable input state decision regarding the text he has already typed has come to have a lower probability of alteration than the temporarily existing subsequent format decision.

Text Formatting Improvements in Perspective

The behaviors that are described above that pertain to formatting of text may be advantageous even in an embodiment that does not have any functionality pertaining to alterable interface decisions. Although in such an embodiment the interface's initial choice of an active format cannot be altered by means of alteration functionality, such an initial choice may still be a more desirable choice than a prior art interface would make. For example, in an embodiment, as described above, if a red word and a blue word are separated by a sequence of space characters and a user moves the input cursor to a location within that sequence of space characters, then the interface will set the active format to be either red or blue depending on which word the input cursor is closer to. In those circumstances, a typical prior art interface would set the active format based on the foreground color of the space character immediately to the left of the input cursor in its new location, which is something that the user cannot actually see because a space character has no foreground text. Such prior art behavior may be undesirable, because it is often undesirable to base interface decisions on information that users cannot actually see.

However, the behaviors that are described above that pertain to formatting text may be significantly more advantageous in an embodiment that facilitates altering alterable interface decisions. On many occasions, the present writer has made formatting mistakes that could have been easily corrected in an embodiment that makes alterable format decisions as described above and that facilitates altering alterable interface decisions. For example, the behaviors that are described above that pertain to formatting text may be advantageous in an embodiment that has the automatic decision variation feature that is described in Chapter 17: on several occasions, the present writer moved the input cursor to a location between one word that had a certain format and another word that had a different format, and began to type, and then realized the text he was typing did not have the format he desired, and then deleted the text and began to type again, only to realize that he had just repeated his mistake; in an embodiment that makes alterable format decisions as described above and that has the automatic decision variation feature, such behavior could actually correct the mistake. Even better, when such an embodiment also has an alteration key as described in Chapter 2 and highlights alterable decisions as described in Chapter 5, if a user moves the input cursor to a location between two words that are in different formats and begins to type, then the text will become a highlighted alterable block, so if the text is not in the desired format then the user will be able to alter the format by means of a single actuation of the alteration key.

Chapter 36: Alterable Cell Formatting Cell Formatting Terminology

The following discussion of cell formatting will refer to a set of individually formattable cells that are arranged in rows and columns as a "spreadsheet." Those of ordinary skill in the art will understand that certain behaviors that are described below may be applied to an individual worksheet within a spreadsheet document, and may also be applied to a table within a word processing document if the cells within the table are individually formattable, and may be applied to any other structure that is composed of individually formattable cells that are arranged in rows and columns.

Generally, a cell format may be composed of multiple distinct format elements that may vary independently, including foreground color, background color, underlined or non-underlined status, number format, and so forth. In the present specification, a "format attribute" is a component of a format that may vary, such as foreground color, and a "format value" is one specific possibility for a format attribute, such as blue foreground color.

In prior art spreadsheet software, not only does each spreadsheet cell have a specific cell format, but also each worksheet has a specific format, and each row or column may have a specific format; such zone formats may be applied to formats of individual spreadsheet cells in certain circumstances. In particular, in Microsoft Excel, if a user selects a certain first cell and performs the Cut action and then selects a second cell and performs the Paste action, then the contents and format of the first cell will be moved into the second cell, and the first cell will then be emptied of its contents and its former format; that first cell will then take on the format of its row if its row has a specific format, or the format of its column if its column has a specific format but its row does not, or the format of its worksheet if neither its row nor its column have a specific format.

In the present specification, a "string format attribute" is a format attribute such that selecting a different format value for that format attribute in a cell (without changing the value stored in that cell) may cause the characters that are displayed in that cell to be replaced by different characters. For example, date format is a string format attribute, because the same value may be displayed as the characters "7-Mar" or as the characters "3/7" depending on what date format is selected.

In an embodiment, for purposes of the present chapter, a cell "expresses" a format attribute when and only when it is possible for a user to discern by looking at the cell what format value is selected for that format attribute in that cell. For example, a cell that contains no value expresses its background color but does not express its foreground color. A cell that contains the word "Date" but does not actually contain a date does not express its date format. In an embodiment, a vertical alignment format attribute determines which line to display when a cell contains multiple lines of text but does not have sufficient height to simultaneously display multiple lines of text; in such an embodiment, a cell that does not contain multiple lines of text does not express its vertical alignment.

In an embodiment, for purposes of the behaviors described below, a cell "debuts" a format attribute the first time that the cell expresses the format attribute and is visible. A row, column, or spreadsheet is said to debut a format attribute the first time that any cell within the row, column, or spreadsheet debuts the format attribute. For example, when a new row of empty cells is inserted, that row debuts its background color immediately, unless for some reason the new row is not visible at all.

Format Zones

In an embodiment, a spreadsheet may have one or more rectangular "format zones," where each format zone consists of a region within the spreadsheet along with one or more format values for format attributes that are by default applied to cells within that region. For example, a format zone may consist of the top row of the spreadsheet and a horizontally centered format value for the horizontal alignment format attribute, in which case the text in each cell of the top row of the spreadsheet will by default be horizontally centered within the cell. A format zone need not necessarily have a format value for every format attribute; for example, a format zone may have a horizontally centered format value for the horizontal alignment format attribute and a non-bold format value for the bold status format attribute, yet not have any particular value for the background color format attribute.

Below, instead of always referring to a "row or column" of a spreadsheet, the present specification will generally discuss interface behaviors that pertain to format zones in terms of rows, but it is to be understood that columns are equally in view. For example, the present specification may refer to the "row number" of an unspecified boundary of a format zone, but in an embodiment, the particular boundary may happen to be the left boundary or the right boundary of a format zone, in which case its so-called "row number" is actually a column number. Also, instead of always explaining an interface behavior in terms of how it may affect rows of a spreadsheet and then explaining the interface behavior in terms of how it may affect columns, the present specification will generally explain interface behaviors in terms of how they affect rows; it is to be understood that in an embodiment, corresponding interface behaviors will affect columns in a way that is exactly analagous. For example, when the present specification explains how inserting a row may affect top or bottom boundaries of format zones, it is to be understood that in an embodiment, inserting a column may affect left or right boundaries of format zones in a way that is exactly analagous.

In an embodiment, a format zone may have a precedence relative to other format zones, so that if a cell is within multiple format zones that have different format values for the same format attribute, then the format value applied to that cell is the one from the format zone that has the highest precedence. For example, in an embodiment, if a cell is within a bold format zone that has a precedence score of 1 and is also within a non-bold format zone that has a precedence score of 7, then the non-bold format is applied to that cell.

Below, when giving examples of the extent of format zones, the present specification will assume that rows and columns of a spreadsheet are numbered with positive integers, and will generally specify the row numbers and column numbers of boundaries of a format zone in terms of decimal values that are halfway between consecutive integers, so as to make it clear which rows and columns are included within the format zone and which are not. For example, a format zone may be said to have a top boundary of 1.5 and a bottom boundary of 3.5, which would mean that the zone includes only cells that are within rows 2 and 3, since 2 and 3 are the only positive integers that fall between 1.5 and 3.5. Those of ordinary skill in the art will understand that row numbers of boundaries can instead be represented in computer memory in terms of integer values, which may be preferable for implementation reasons; for example, a bottom boundary that is referred to herein as a bottom boundary of 3.5 may instead be represented in computer memory by the integer value 4, in which case the row 4 is not considered to fall within a zone that has a bottom boundary that is represented by the value 4, but may fall within a zone that has a top boundary that is represented by the value 4. Additionally, as special cases, when the present specification says that a top boundary or left boundary is 0, or says that a bottom boundary or right boundary is infinity, this means that the zone essentially has no boundary in that direction, in an embodiment.

Flexible Format Zone Boundaries

In an embodiment, each particular boundary of a format zone may or may not be "flexible." When a boundary is not flexible, it may be spoken of as having a "definite row number." When a boundary is flexible, it has two distinct row numbers: a "default row number" and an "alternate row number." The alternate row number has a "probability of alteration." A boundary does not itself constitute an alterable decision, but in certain circumstances the presence of a format zone that has a flexible boundary will cause the interface to make an alterable decision pertaining to that boundary, which is why an alternate row number may be said to have a probability of alteration. When a boundary is flexible, its default row number and alternate row number are "possible row numbers," along with every row number in between those numbers, and its "ambiguous range" is the set of integer row numbers between its smallest possible row number and its largest possible row number. For example, if a boundary has a default row number of 3.5 and an alternate row number of 5.5, then its possible row numbers are 3.5, 4.5, and 5.5, and its ambiguous range is row number 4 and row number 5.

Essentially, in an embodiment, when a format zone has a boundary that is flexible, this means that the interface is uncertain how far the user wants the format zone to extend. For example, if a bold format zone has a bottom boundary with a default row number of 3.5 and an alternate row number of 4.5 with a high probability of alteration, this means that the interface has decided not to apply the bold format to row 4 but believes it is reasonably likely the user will wish to alter this decision at some point.

In the present specification, a boundary of a format zone may be spoken of as though it were entirely synonymous with its row number. For example, rather than saying that a format zone has a bottom boundary with a default row number of 3.5 and an alternate row number of 4.5, the present specification may equivalently say that the format zone has a default bottom boundary of 3.5 and an alternate bottom boundary of 4.5.

In an embodiment, for purposes of the interface behaviors described below, when a format zone has a boundary that is flexible, the "ambiguous region" of the format zone is the set of spreadsheet cells that may either be included within the format zone or excluded from the format zone, depending on which possible row numbers and possible column numbers are used to delineate the extent of the format zone. The "default region" is the set of spreadsheet cells that are included within the format zone if no alternate row numbers or alternate column numbers are used. For example, if a format zone has a definite left boundary of 0.5, a definite right boundary of 1.5, a definite top boundary of 2.5, and a flexible bottom boundary with a default row number of 4.5 and an alternate row number of 3.5, then the ambiguous region of that format zone consists of the cell in row 4 and column 1; the default region of that format zone consists of both the cell in row 4 and column 1 and the cell in row 3 and column 1.

Applying Formats to Cells

In an embodiment, if a user selects a rectangular region that includes one or more cells and then explicitly applies one or more particular format values to that region, rather than merely applying that value or values to every cell within the region, the interface will create a format zone that consists of that region and those format values. In an embodiment, whenever multiple consecutive user actions cause the interface to apply one or more particular format values to the same rectangular region, for each such action after the first, the interface will not create a new format zone, but will instead add those new format values to the format zone it created in response to the first such action, and will delete any format value that was previously present in that format zone that is now contradicted by these new format values. Thus, a sequence of one or more consecutive user actions that causes the interface to apply one or more particular format values to the same rectangular region constitutes a single "format zone creation action." For example, in an embodiment if a user clicks a single cell, then clicks a toolbar button that causes the background color of that cell to become light green and the foreground color to become dark green, and then clicks a toolbar button that causes the foreground color of that cell to become black, then the outcome of these actions will be that a format zone exists that consists of that single cell with a background color of light green and a foreground color of black.

In an embodiment, after a format zone creation action, before the interface responds to the next user action, the interface will analyze the new format zone and may make its boundaries flexible, as follows: for each of the four boundaries of the new format zone, the interface will determine whether the zone could be extended farther in that direction without actually causing any additional cells to express any format value of the format zone, and if so, then the interface will make that boundary's alternate row number be as far as possible in that direction subject to that constraint. In an embodiment, if the interface thus makes a new format zone boundary flexible, then the probability of alteration of its alternate row number will be moderate if the alternate row number is infinity, or very low otherwise. For example, if a spreadsheet contains values in every cell that is within rows 1-10 and within columns 1-3 but does not contain values in any other cells, and a user selects columns 1-3 in row 1 and makes these cells bold, then the new bold format zone will have a definite bottom boundary of 1.5 because extending that boundary any farther down would cause a cell in a row 2 to express the bold attribute. It will have a default right boundary of 3.5 with an alternate right boundary of infinity and a moderate probability of alteration, to reflect the fact that the user may actually prefer for everything in row 1 to be bold, and may have explicitly applied the bold format to only columns 1-3 simply because those were the only columns that contained anything yet. The new bold format zone will also have default top and left boundaries of 0.5, and alternate top and left boundaries of 0 with very low probabilities of alteration.

Row and Column Insertion

In prior art spreadsheet software, when a column is inserted into a worksheet, it will take on all the formatting of the column to its left: that is, the format for the new column will be the format of the column to its left, and format of each individual cell within the new column will be the format of the individual cell immediately to its left. As an exception, when a column is inserted as the new far left column of a worksheet, it cannot take on the formatting of the column to its left because there is no such column, and will instead take on the formatting of the column to its right. Similarly, when a row is inserted into a worksheet, it will take on all the formatting of the row above it, unless it is the top row, in which case it will take on all the formatting of the row below it. In Microsoft Excel, however, immediately after a row is inserted into a worksheet, a small button will appear such that if a user clicks the button before modifying the spreadsheet, then Microsoft Excel will open a small menu with three radio buttons labeled with three options: "Format Same as Above," "Format Same as Below," and "Clear Formatting." The first radio button will be initially selected, corresponding to the fact that the row that was just inserted took on all the formatting of the row above it (if possible). Selecting the second option will cause the row that was just inserted to take on all the formatting of the row below it; selecting the third option will cause the formatting of the entire row that was just inserted and of every cell within it to revert to default formatting. After a row is inserted into a spreadsheet and such a button appears, as soon as the user modifies the spreadsheet other than by clicking the button and selecting a menu option, the button will disappear. In Microsoft Excel, immediately after a column is inserted into a worksheet, no such button appears.

In an embodiment of the present invention, the interface treats column insertion in a spreadsheet in a way that is exactly analogous to the way it treats row insertion, which is explained in the following paragraphs.

For purposes of the following discussion of row insertion, when one or more new rows of a spreadsheet are inserted above a particular previously existing row, the new rows will be spoken of as being inserted at an "insertion row" that has a row number that is 0.5 less than the number of the row that they are inserted above. For example, if a single new row is inserted above row 1 of a spreadsheet, the new row will be spoken of as being inserted at insertion row 0.5, or as having an insertion row number of 0.5. In an embodiment, when new rows are inserted, row numbering will be updated, so if for example a new row is "inserted at row 0.5," the newly inserted row will become the new row 1, and the previous row 1 will become row 2, and so forth.

In an embodiment, when one or more new rows of a spreadsheet are inserted above a previously existing row, row numbers for boundaries of format zones will be updated as follows: Each top boundary row number or bottom boundary row number that is greater than the insertion row number will be increased by the number of rows inserted. If any flexible top boundary or flexible bottom boundary has either a default row number or an alternate row number that is exactly equal to the insertion row number, then that row number will be increased by the number of rows inserted if and only if such an increase will cause the boundary's ambiguous range to include the inserted rows. For example, if a format zone has a default bottom boundary of 3.5 when a user inserts one row at the insertion row number of 3.5, then that default bottom boundary will be increased by 1 if the alternate bottom boundary is 0.5, but not if the alternate bottom boundary is 5.5, so in either case after the insertion the bottom boundary's ambiguous range will include the newly inserted row 4.

In an embodiment, as a special case, when one or more new rows of a spreadsheet are inserted above a previously existing row, if any top boundary or bottom boundary has a definite row number that is exactly equal to the insertion row number, then that boundary will become flexible: either its default row number will equal its former definite row number and its alternate row number will equal that number increased by the number of rows inserted, or vice versa. All the row numbers of the inserted rows will thus be included in the ambiguous range of the newly flexible boundary. Essentially, this means that when a user inserts rows immediately above or immediately below a format zone, the interface's decision whether or not to extend the format zone to include the new rows is a decision that may become alterable.

In an embodiment, when row insertion causes a top or bottom boundary to become flexible as described in the preceding paragraph, its default row number will become greater than its alternate row number. As a result, if a row is inserted that is immediately below one format zone and immediately above another format zone, then by default the cells of the inserted row will be formatted the same way as the cells of the row above. In an embodiment, as an exception, when row insertion causes a bottom boundary to become flexible as described in the preceding paragraph, if the default region of the format zone previously included only one row, then the alternate row number of the bottom boundary of the format zone will become greater than its default row number, so that the default region will still include only one row.

Alterable Cell Format Expression

In an embodiment, when a user action causes one or more cells to debut one or more format attributes, the interface will then determine whether or not at least one of these cells is within the ambiguous region of a format zone that pertains to a debuted attribute. If so, then the interface will make an "alterable format expression decision." The default option of the alterable format expression decision will consist of the result that obtains by ignoring alternate row numbers of flexible boundaries of format zones. The alterable format expression decision will have one alternate option for each distinct possible configuration of format values that could be achieved for those format attributes of those cells by means of replacing one or more default row numbers of flexible boundaries of format zones with alternate row numbers.

In an embodiment, when a user explicitly selects an option of an alterable format expression decision, the decision will cease to be alterable. In an embodiment, when an alterable format expression decision ceases to be alterable, either because a user explicitly selected an option of the decision or for some other reason, the interface will then regard the format values that had previously been alterable as fixed, and will then update the relevant format zone boundaries so that the relevant cell or cells are no longer included in the ambiguous region of any relevant format zone.

For example, suppose that in such an embodiment, all the cells of a spreadsheet have a white background except that there is a format zone that consists of a single row with a green background. A user inserts a new row immediately below that row. The bottom boundary of the format zone becomes flexible so its ambiguous region includes the new row. The cells of the new row immediately debut the background color format attribute. The interface makes an alterable format expression decision such that the default option is that these new cells have a white background color and the alternate option is that they have a green background color. The user alters the decision, so the cells now have a green background color. The user performs some unrelated action; the user has now explicitly selected an option of the alterable format expression decision. The green background color is now a fixed format value. The interface updates the format zone so that its bottom boundary is no longer flexible, and now definitely includes the new row.

As another example, suppose that in such an embodiment, a format zone consists of several rows with a bold font. A user inserts a new row immediately below these rows. The default bottom boundary of the format zone is such that the format zone will include the new row, but the alternate bottom boundary of the format zone is such that the format zone will not include the new row. The cells of the new row are empty and do not yet debut the bold status format attribute. The user then types input in one of the cells and presses Enter. That cell now debuts the bold status format attribute, so the interface will determine every distinct possible configuration of format values that could be achieved for the bold status format attribute of that cell by means of adjusting format zone boundaries: namely, it could have the bold format value or not have the bold format value. The interface thus makes an alterable format expression decision; by default, it causes that cell to have the bold format value. The user alters the decision so the cell does not have the bold format value. Once the user has explicitly selected that option, the interface will update the format zone's bottom boundary, so other cells in the new row will not have the bold format value either.

Figure 24:
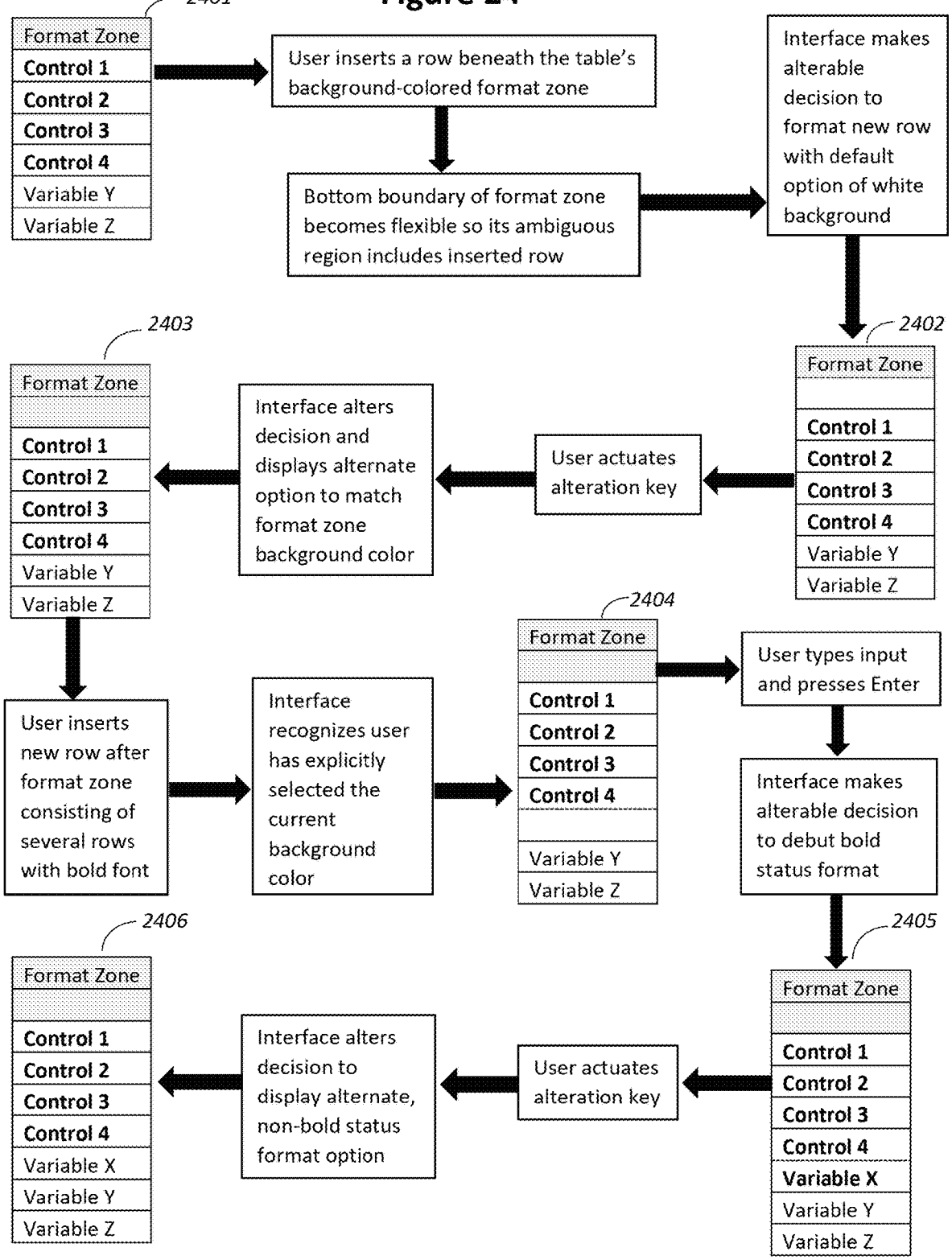
FIG. 24 illustrates alterable format expression decisions in action, according to an embodiment.

FIG. 24 illustrates alterable format expression decisions in action. Block 2401 shows a table featuring an initial format zone consisting of a single row with a nonwhite background color. When the user inserts a row directly beneath Format Zone 1, its bottom boundary becomes flexible so its ambiguous region includes the newly inserted row, and that row's background color is immediately the subject of an alterable format expression decision. Block 2403 shows the same table after the user actuates the alteration key, causing the interface to alter the background format from white to the alternate color option; the bottom boundary remains flexible until Block 2404, when the user performs an unrelated action and the interface recognizes they have explicitly selected the current option of the alterable format expression decision. Block 2404 shows the same table after the user has inserted a row beneath Format Zone 2, which consists of several rows of bold text. At this point, Format Zone 2's bottom boundary becomes flexible so its ambiguous region includes the new row directly beneath, but the interface has not yet made an alterable decision regarding that row since that row has not debuted the bold status attribute. After the user adds input, that cell debuts the bold status attribute as shown in Block 2405, and the interface makes a decision to select the bold formatting option, but Format Zone 2's bottom boundary line remains flexible and that decision is now alterable. When the user actuates the alteration key, it prompts the interface to alter the format expression decision and select the non-bold option, as shown in Block 2406.

Special Cell Formatting

In prior art spreadsheet software, if a user wishes to change the appearance of a border between cells or groups of cells, the user may do so by means of selecting cells that are adjacent to the border and then accessing functionality for editing the borders of selected cells. Accordingly, in an embodiment of the present invention, cell borders are implemented in terms of attributes of cells, and format zones are then applicable to cell borders in essentially the same way that they are applicable to other attributes of cells. For example, in an embodiment, if a user selects the top row of a spreadsheet and then chooses to create a heavy borderline below the selected cells, then the interface will accordingly create a format zone that initially contains only the top row, formatted in such a way that a heavy borderline is always below the bottommost row of the format zone, so if additional rows are later inserted in that format zone, then that heavy borderline will move accordingly.

Number Formatting

In prior art spreadsheet applications, a spreadsheet cell may contain a number rather than containing text; when it does, the cell's "number format" determines the specific sequence of characters that is displayed as the value of the cell. For example, in the prior art Microsoft Excel spreadsheet application, if a spreadsheet cell contains the number −2, then a user may change the cell's number format so that the value of −2 that is stored in the cell is displayed as "−2," or "−2.0," or "($2.00)," or various other possibilities.

In Microsoft Excel, when a spreadsheet cell contains a number, the cell's number format may indicate that the value of the cell is to be displayed as a date, a time of day, or a date-and-time combination. When it does, Excel will interpret the number stored in the spreadsheet cell as a decimal number of 24-hour days that elapsed after midnight on the fictional date of 1/0/1900, and will then display the resulting date and time, or just the date, or just the time of day. For example, if a cell contains the number 42737.4 and then a user changes the cell's number format so that the value is displayed as a date-and-time combination, then Microsoft Excel will display the value of the cell as "1/2/17 9:36 AM" (or as an equivalent date-and-time combination with a slightly different format), because 1/2/2017 is 42737 days later than the beginning of 1900 and 9:36 AM is 0.4 days later than midnight. If the user then changes the cell's number format so that the same value is displayed as only a date or as only a time, then Excel will accordingly display only the date "1/2/17" or only the time "9:36 AM," but the cell will still contain the same underlying numeric value of 42737.4.

Conversely, in Microsoft Excel, if a user inputs a specified date into a cell without specifying a time, then Excel will store this in terms of the number of days between I/O/1900 and the specified date. For example, if a user inputs the date "1/5/1900" into a cell whose number format indicates that the value of the cell is to be displayed as a numeral and not as a date, then the resulting value will be displayed as "5.00" (or an equivalent numeral). If a user inputs a specified time into a cell without specifying a date, then Excel will store the specified time divided by 24 hours. For example, if a user inputs the time "36:00" into a cell whose number format indicates that the value of the cell is to be displayed as a numeral and not as a time, then the resulting value will be displayed as "1.50"; if that value is displayed as a date-and-time combination, it will be displayed as "1/1/1900 12:00 PM"; if it is displayed as a time, it will be displayed as "12:00 PM" or as "12:00," not as "36:00."

In prior art spreadsheet software, when a user inputs into a spreadsheet cell a sequence of characters that is interpreted as a number, in certain circumstances the cell's number format will determine how the spreadsheet interface interprets that sequence of characters and what value it thus stores in that cell. For example, in Microsoft Excel, if a user types "1/2" in a cell whose number format is "General," Excel will interpret this as a date within the current year, store this in terms of the number of days that elapsed from the beginning of 1900 until that date, and display the resulting value as "2-Jan"; if a user types "1/2" in a cell whose number format is a number format from the category "Currency," Excel may interpret this as a fractional number of dollars, store this as 0.5, and display the resulting value as "0.50"; if a user types "1/2" in a cell whose number format is "Text," Excel will store this as text instead of as a number and display it as "1/2."

In Microsoft Excel, the initial number format for every cell in a new document is "General." In the dialog box for setting a number format, Microsoft Excel says that "General format cells have no specific number format." It would be more accurate to say that when a cell's number format is the default number format "General," in response to the entry of a value in that cell Excel may automatically change the cell's number format to a number format that is suitable for the type of value that was entered, so that the value is displayed appropriately. For example, if a user types "23%" in a cell whose number format was "General," then in addition to storing the value 0.23 in the cell, Excel will automatically change the cell's number format to "Percentage" so that the value is displayed as "23%." After that, if the user then types "2" in the cell, the value 2 will be displayed as "200%" because the cell's number format has become "Percentage."

In Microsoft Excel, when a cell's number format is "General," in response to the entry in that cell of a time, or date, or month and day of the month, Excel will store the entry as a number that can be interpreted as a date-and-time combination, but Excel will change the cell's number format to a format such that only the information that the user explicitly specified will be displayed. For example, if a cell's number format is "General," and a user who wishes to calculate the value of 12 minus 4 mistakenly types "12-4" in the cell, then Excel will interpret this input as a month and day of the month. Excel will assume that the user intends to refer to December 4 in the current year and will store the entry as a number that can be interpreted as midnight on December 4 in the current year, but Excel will change the cell's number format to a date format such that the year and the time of day, which the user did not explicitly specify, will not be displayed: Excel will display the cell's value as "4-Dec." After that, if the user then types "=12-4" in the cell, then Excel will calculate that the resulting value is 8, but it will display this value as the date "8-Jan" rather than displaying it as the number "8" because the cell's number format has become a date format that displays only the month and day of the month.

Alterable Number Formatting

In an embodiment, certain format attributes are "number format attributes," where a number format attribute is a string format attribute that may affect the characters that are displayed in a cell whenever the value contained in the cell is a numeric value (such as an integer or a date). A cell's "number format" is the set of all format values of its number format attributes. In an embodiment, a cell's number format may affect the way input is interpreted for the cell; for example, when a user inputs "1/2" as the value for a cell, the interface may interpret this input as a fraction or as a day of the year, depending on the cell's number format.

In an embodiment, when a user inputs into a value into a cell or when a spreadsheet application calculates the value for a cell, if the cell's number format will affect the characters that are displayed as the resulting value of the cell, then in certain circumstances the interface may make an alterable decision whether or not to change the cell's number format, as is described below. Such an alterable decision is an "alterable number format decision."

In an embodiment, when a user types a sequence of characters in a cell and presses Enter, if the cell's current number format is such that the interface will interpret that sequence of characters as a numeric value and will then display that value in terms of a sequence of characters that is not identical to the sequence of characters the user typed, then the interface's decision not to change the cell's number format to some other number format is an alterable number format decision. Such an alterable number format decision will have at least one alternate option such that selecting that option will cause the interface to change the cell's number format to some other number format and also to reinterpret the sequence of characters the user typed as though that other number format had already been selected before the user pressed Enter, and will thus change the cell's number format in such a way as to cause the value stored in the cell to be displayed in terms of a sequence of characters that is identical to the sequence of characters the user typed. For example, in an embodiment, if a user types "1/2" in a cell and presses Enter, and the interface interprets this as a date and stores a numeric value accordingly, and due to the cell's number format's rules for displaying dates the interface displays this value as "1/2/2017," then an alterable number format decision will exist that has an alternate option such that selecting the alternate option will change the cell's number format so as to cause the interface to display the value as "1/2" instead, such as by changing the cell's number format to a number format that displays the month and day but not the year.

In an embodiment, when a user types a sequence of characters in a cell and presses Enter, if some number format exists other than the cell's current number format such that if that other number format had been the cell's current number format then the interface would have stored a different value as the contents of the cell, then the interface's decision not to change the cell's number format before interpreting the sequence of characters the user typed is an alterable number format decision. Such an alterable number format decision will have at least one alternate option corresponding to each possible value that could have been stored as the contents of the cell other than the value that actually was stored as the contents of the cell, so that selecting such an alternate option will cause the interface to change the cell's number format to some other format and also to reinterpret the sequence of characters the user typed as though that other number format had already been selected before the user pressed Enter, and will thus change the cell's number format in such a way as to cause the value stored in the cell to become that other particular possible value. For example, in an embodiment, if a user types "1/2" in a cell and presses Enter, and the interface interprets this as a date and stores this date in terms of the number of days that elapsed between the beginning of 1900 and this date, then an alterable number format decision will exist that has an alternate option such that selecting the alternate option will cause the interface to interpret "1/2" as a fraction and store the appropriate numeric value, and has another alternate option such that selecting the alternate option will cause the interface to store "1/2" as text rather than a numeric value.

As can be seen from the examples provided in the two preceding paragraphs, in an embodiment, in certain circumstances both of the two preceding paragraphs may simultaneously apply: when a user types a sequence of characters in a cell and presses Enter, the interface may cause an alterable number format decision to exist that includes certain alternate options due to circumstances that are described in the immediately preceding paragraph, and that also includes another alternate option due to circumstances that are described in the paragraph before that.

Smart Year Assumptions

In prior art spreadsheet applications, if a user inputs a month and day of the month into a cell without specifying a year, then the application will interpret this as the month and day of a date within the current year. For example, if an empty cell's number format is the Date format m/d/yyyy when a user inputs "1/2" into the cell, then if the current year is 2017, the application will store in the cell the number of days between 1/0/1900 and 1/2/2017, and will display that value as "1/2/2017."

In an embodiment, for purposes of the following discussion of smart year assumptions, a "day of the year" is a specific month along with a specific day within the month, but not including a specific year; for example, January 3 is a day of the year. A "date" includes both a day of the year and a specific year; for example, Jan. 3, 2017 is a date. A day of the year and a date "match" one another if and only if the date includes that day of the year; for example, January 3 matches Jan. 3, 2017. A day of the year "combined with" a specific year constitutes the date that matches that day of the year and falls within that year; for example, January 3 combined with 2017 constitutes Jan. 3, 2017.

In an embodiment, when a user types a sequence of characters in a cell that the interface interprets as a day of the year, if the user does not explicitly specify the year, and if the cell's format is such as to store a date instead of just a day of the year, then the interface will "make a year assumption" for that day of the year. When the interface makes a year assumption for a day of the year, it selects a particular year to be combined with that day of the year so as to create a complete date. In an embodiment, when the interface makes a year assumption, the year assumption may be an alterable decision, as is described below.

In an embodiment, when the interface makes an alterable year assumption, if the number format of the cell is such that information regarding the outcome of the interface's assumption is stored immediately but would not be displayed immediately, then the alterable year assumption is treated as a subtle change as defined in Chapter 8 (which may cause the outcome to be displayed immediately after all, within a change flag).

Below, a year assumption may be said to "include as an option" a specified date with "at least" a specified probability of alteration, in certain circumstances. This means that except in the special cases that are described in the present paragraph, the year assumption is an alterable year assumption such that one of its alternate options is that specified date and that option's probability of alteration is the specified probability of alteration. In an embodiment, as a special case, if more than one option of a year assumption would turn out to be the same specified date, then all the duplicates will be deleted, leaving only a single option that is that date, which will have the highest probability of alteration that any of those options would have had. As another special case, if an alternate option of the year assumption would turn out to be the same date as the default option, then that alternate option will be deleted. As another special case, if the year assumption does not have any alternate options (because they all turn out to be the same as the default option), it will not be an alterable year assumption after all. For example, hypothetically, if a year assumption has as its default option 1/3/2017, and the year assumption includes as an option January 3 of the current year with at least a high probability of alteration, and the year assumption also includes as an option the nearest future occurrence of January 3 with at least a medium probability of alteration, then if the current date happens to be 1/2/2017 all these options will turn out to be the same, so the year assumption will not be alterable after all: the outcome will simply be 1/3/2017.

In the following paragraphs, the "current date" is the date on which the interface makes a year assumption, and the "current year" is the year of that date. In the following paragraphs, when the interface is said to select a particular date as the outcome of a year assumption for a particular day of the year, that selected date is always a date that is certain to match that particular day of the year. Thus, although the following paragraphs explain how year assumptions are made in terms of explaining a process by which the interface may select a particular date, each possible date will always include the same day of the year, so essentially the following paragraphs are just explaining a process by which the interface may select a particular year.

Below, various methods are described by which the interface will make your assumptions, in various embodiments. First, three alternative "non-context-sensitive methods" are described, and then a "context-sensitive method" is described. When a non-context-sensitive method makes a year assumption for a day of the year, it will take into account the current date, but will not take into account any dates in adjacent cells; when a context-sensitive method makes a year assumption, it may take into account dates in immediately adjacent cells. The context method that is described below is thus the most sophisticated method; however, even the simplest of the three non-context-sensitive methods described below is more sophisticated than prior art.

In an embodiment, when the interface makes a year assumption for a day of the year, it will use the context-sensitive method, which will in certain circumstances default to using a non-context-sensitive method. In various alternative embodiments, the interface will simply use some particular non-context-sensitive method in every case, and will thus never take into account dates in adjacent cells when making year assumptions.

In an embodiment, when the interface uses a non-context-sensitive method for making a year assumption, it will use the "adjustable proximity method," as follows: The interface will keep track of a "recency threshold" which may range from 0 to 365 inclusive. In an embodiment, the initial value of this recency threshold is 182 (which is approximately half of 365). When the interface makes a year assumption for a day of the year, if that day of the year matches the current date, then the interface will select the current date and this will not be an alterable decision. Otherwise, the interface will determine how many days ago any such day of the year occurred; this is the date's recency score. The interface will then make a threshold decision whether to select the nearest past date that matches that day of the year or whether to select the nearest future date that matches that day of the year. The recency threshold will serve as the threshold of this decision, and the recency score will serve as the decision score, as follows: if the recency score is less or equal to than the recency threshold then the interface will select the nearest past date that matches that day of the year, and if it is greater than the recency threshold then the interface will select the nearest future date that matches that day of the year. In an embodiment, such alterable year assumptions are adaptive threshold decisions. For example, in an embodiment, if on 1/3/2017 a user types "12/31" into a spreadsheet cell and the interface interprets this as the month and day of a date, and if the recency threshold is currently 182, then because 12/31/2016 was only three days ago, the interface will alterably decide to yield the result 12/31/2016, and because the recency score of 3 is much less than the recency threshold of 182, this decision will have a low probability of alteration. If the user alters this decision so that the interface yields the result 12/31/2017, then the recency threshold will be reduced to 2, so the next time the interface makes an alterable year assumption, if the current date is still 1/3/2017, then the interface will definitely select a date in 2017.

In an alternative embodiment, when the interface uses a non-context-sensitive method for making a year assumption, it will use the "simple proximity method," as follows: When the interface makes a year assumption for a day of the year, if that day of the year matches the current date, then the interface will select the current date and this will not be an alterable decision. Otherwise, the interface will select the nearest date that matches that day of the year, and this decision will be an alterable decision that has a probability of alteration that is proportional to how distant that date is from the current date: if that date is very close to the current date then the alterable year assumption will have a very low probability of alteration, but if that date is about six months away (and so there is a different date that matches the same day of the year and is nearly as close to the current date) then the alterable year assumption will have a very high probability of alteration. In other words, the simple proximity method will always yield the same result that the adjustable proximity method described in the preceding paragraph would yield if its recency threshold equaled its initial value of 182.

In another alternative embodiment, when the interface uses a non-context-sensitive method for making a year assumption, it will use the "current-year method," as follows: When the interface makes a year assumption for a day of the year, the interface will in every case initially select the "current-year date," which is the date of that day within the current year. If that day of the year matches the current date, then this will not be an alterable decision. Otherwise, the decision to select the current-year date will be an alterable decision such that altering the decision will cause the interface to instead select the "nearest other date," which is either the occurrence of that day of the year within the previous year or the occurrence of that day of the year within the next year, whichever is closer to the current date. If the current-year date is more than 182 days away from the current date (and so the nearest other date is actually closer to the current date) then the alterable year assumption will have a very high probability of alteration; otherwise, the alterable year assumption will have a probability of alteration that is proportional to how distant the current-year date is from the current date. In other words, whenever the simple proximity method described in the preceding paragraph would yield a date that is in the current year, the current-year method will yield the same result (with the same probability of alteration); whenever the simple proximity method would not yield a date that is in the current year, the current-year method will yield a date that is in the current year but its decision to do so will be an alterable decision with a very high probability of alteration.

In an embodiment, when the interface uses a context-sensitive method for making a year assumption, it will do so as follows: When the interface makes a year assumption for a day of the year for a particular spreadsheet cell, it will first determine the year assumption that the interface would make if it used a non-context-sensitive method for making year assumptions. If the particular spreadsheet cell is neither immediately below a cell that contains a date nor immediately to the right of a cell that contains a date, then that year assumption will be the result, with no modification. However, if that cell is immediately below a cell that contains a date, the interface will modify the year assumption so as to include as an option the earliest date matching that day of the year that occurs on or after the date in the cell above, with at least a high probability of alteration; and if that cell is immediately to the right of a cell that contains a date, the interface will modify the year assumption so as to include as an option the earliest date matching that day of the year that occurs on or after the date in the cell to its left, with at least a high probability of alteration. For example, if on 1/3/2017 a user types "1/3" into a spreadsheet cell that is immediately below a spreadsheet cell containing the date 12/30/2014, then although the interface will yield the date 1/3/2017, its decision to do so will be an alterable year assumption that has 1/3/2015 as an alternate option with a high probability of alteration.

What is claimed is:

1. A system having a unified alteration interface, the system comprising:
an input device configured to receive keystroke input from a user;
a display configured to display information to the user;
at least one non-transitory computer readable medium having stored thereon executable instructions; and
at least one processor in communication with the at least one non-transitory computer readable medium and configured to execute the instructions to cause the system to at least:
identify one or more keystrokes as comprising a single word;
subsequent to a sequence of keystrokes that comprises a single word, upon the execution of a keystroke that does not comprise the same word, in at least certain circumstances to at least: autocorrect the word so that it does not consist of the exact sequence of keystrokes that were received from the user; store, in a memory, at least the original non-autocorrected word that consists of the exact sequence of keystrokes that was received from the user; highlight on the display the autocorrected word; and, upon actuation of a mechanism for altering the highlighted word, replace the autocorrected word with a replacement word consisting of the original non-autocorrected word; and subsequent to a sequence of keystrokes comprising a single word, upon the execution of a keystroke that does not comprise the same word, in at least certain circumstances to at least: highlight on the display the word without autocorrecting it; and, upon actuation of a mechanism for altering the highlighted word, replace the non-autocorrected word with a replacement word consisting of an autocorrected version of the non-autocorrected word.

2. The system of claim 1, where the highlight on the display consists of one of the following: an underline; a bold font; a background color different than the surrounding background color.

3. The system of claim 1, wherein subsequent to a sequence of keystrokes comprising a single word, upon the execution of a keystroke that does not comprise the same word, the system will make a determination whether or not to immediately autocorrect the word and will also make a determination whether or not to highlight the word, and wherein in at least certain circumstances the system will autocorrect the word and not highlight the word.

4. The system of claim 1, wherein the mechanism for altering a highlighted autocorrected word is the same as the mechanism for altering a highlighted non-autocorrected word.

5. The system of claim 4, wherein the mechanism for altering a highlighted word consists of tapping the display device at the location of the highlighted word.

6. The system of claim 4, wherein subsequent to an actuation of the mechanism for altering a highlighted word, the replacement word will be itself be highlighted, and a second consecutive actuation of said mechanism will cause the replacement word to itself be replaced.

7. The system of claim 6, wherein subsequent to an actuation of the mechanism for altering a highlighted word, sufficiently many consecutive actuations of said mechanism will cause the highlighted word to revert to the word that was present prior to the first actuation of said mechanism.

8. A system having a cycling alteration interface, the system comprising:
a touchscreen display configured to display information to the user and receive user input;
at least one non-transitory computer readable medium having stored thereon executable instructions; and
at least one processor in communication with the at least one non-transitory computer readable medium and configured to execute the instructions to cause the system to at least:
identify one or more portions of the user input as one or more alterable decisions,
for each of the one or more alterable decisions, store, in a memory, information about one or more alternative options for the alterable decision;
highlight one or more of the one or more alterable decisions;
upon receiving a touch input on a highlighted alterable decision, select another of the one or more alternative options for the alterable decision, and alter the alterable decision to match the selected option, and display, on the display, the altered alterable decision;
upon receiving an at least second consecutive touch input on a highlighted alterable decision when at least one of the one or more alternative options for the alterable decision has not yet been selected, select such an alternative option, and alter the alterable decision to match the selected option, and display, on the display, the altered alterable decision; and
upon receiving an at least second consecutive touch input on a highlighted alterable decision when each of the one or more alternative options for the alterable decision has been selected once, select the option that was originally selected, and alter the alterable decision to match the selected option, and display, on the display, the altered alterable decision.

9. The system of claim 8, wherein the processor is further configured to, after receiving an at least second consecutive touch input on a highlighted alterable decision and in response to the at least second consecutive touch input selecting the option that was originally selected, remove the highlight from the alterable decision.

10. The system of claim 8, wherein the alterable decision comprises an autocorrection and the alternative options of the alterable decision comprise an alternative option of a word or sequence of letters that the user type and one or more additional alternative options of words that are similar to the word or sequence of letters that the user typed.

11. The system of claim 8, wherein the alterable decision comprises a capitalization decision and the alternative options of the alterable decision comprise an alternative option of a word beginning with an uppercase letter and an alternative option of the same word beginning with a lowercase letter.

12. The system of claim 8, wherein the wherein the alterable decision comprises a formatting decision and the alternative options of the alterable decision comprise a sequence of characters in a first format and the same sequence of characters in a second format.

13. A system having an adaptive state interface, the system comprising:
an input device configured to receive keystroke input from a user;
at least one display configured to display user input;
a memory unit configured to store at least a currently selected input state comprising contextual information affecting subsequently entered input;
an input device configured to allow a user to enter input, and configured to allow a user to selected a desired input state;
at least one non-transitory computer readable medium having stored thereon executable instructions; and
at least one processor in communication with the at least one non-transitory computer readable medium and configured to execute the instructions to cause the system to at least:
in response to an entry of input, identify one or more alternate input states for that input such that each alternate input state comprises an input state that, had it been selected when the input was entered, would have yielded results that the user might have preferred over the results that actually obtained;
after such an entry of input, in response to subsequent user activity, in certain circumstances make a determination that the user would have preferred an alternate input state over the input state that was in effect when the input was entered;
after such a determination, in response to zero or more subsequent user actions, to select the alternate input state that the system previously determined the user would have preferred.

14. The system of claim 13, wherein the input states comprise different text format options, and wherein in response to an entry of input the system will identify one or more alternate text formats, and in response to subsequent user activity in certain circumstances make a determination that the user would have preferred an alternate text format, and in response to zero or more subsequent user actions select an alternate text format.

15. The system of claim 13, wherein the input is spreadsheet cell input, and the alternate input states comprise distinct alternative cell format options, and wherein in response to subsequent user activity consisting of manual selection of an alternative cell format the system will make a determination that the user would have preferred the input state that the user subsequently selected, and wherein after such a determination, in response to zero or more subsequent user activity comprising the entry of additional input such that the same distinct alternative cell format options are viable, the system will select the cell format that the system previously determined the user would have preferred.

16. The system of claim 13, wherein the subsequent user activity that causes the system to make a determination that the user would have preferred an alternate input state comprises altering the input to make it identical to the input that would have obtained if the alternate input state had been in effect when the input was entered.

17. The system of claim 16, wherein the system further comprises an alteration key, and the subsequent user activity that causes the system to make a determination that the user would have preferred an alternate input state comprises an actuation of the alteration key that causes the input become identical to the input that would have obtained if the alternate input state had been in effect when the input was entered.

18. The system of claim 13, wherein the subsequent user activity that causes the system to make a determination that the user would have preferred an alternate input state comprises backspacing the input and retyping the same input, and wherein upon such a determination the system will select an alternate input state and retroactively apply it to the retyped input.

19. The system of claim 13, wherein the input states comprise different text format options, and wherein in response to an entry of input the system will identify one or more alternate text formats, and in response to user activity consisting of backspacing the input and retyping the same input the system will make a determination that the user would have preferred an alternate format, and wherein upon such a determination the system will select an alternate format and retroactively apply it to the retyped input.

20. The system of claim 18, wherein the system is further configured so that in response to a user backspacing input and retyping the same input the system will neither make a determination that the user would have preferred an alternate format nor select an alternate format if the amount of time that elapsed between the backspacing of the input and retyping the same input exceeds a threshold amount of time.

\* \* \* \* \*